(12) United States Patent
Hirai et al.

(10) Patent No.: US 10,953,668 B2
(45) Date of Patent: Mar. 23, 2021

(54) INK JET RECORDING INK, INK JET RECORDING METHOD, INFRARED READING METHOD, AND PRINTED MATERIAL

(71) Applicant: FUJIFILM CORPORATION, Tokyo (JP)

(72) Inventors: Yuki Hirai, Kanagawa (JP); Akihiro Hara, Kanagawa (JP); Daisuke Sasaki, Kanagawa (JP); Yoshihiro Jimbo, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 17 days.

(21) Appl. No.: 16/275,254

(22) Filed: Feb. 13, 2019

(65) Prior Publication Data
US 2019/0176487 A1 Jun. 13, 2019

Related U.S. Application Data

(63) Continuation of application No. PCT/JP2017/029661, filed on Aug. 18, 2017.

(30) Foreign Application Priority Data

Aug. 19, 2016 (JP) .............................. JP2016-161434
Dec. 27, 2016 (JP) .............................. JP2016-253444

(51) Int. Cl.
*B41J 11/00* (2006.01)
*C09D 11/322* (2014.01)
(Continued)

(52) U.S. Cl.
CPC .............. *B41J 11/002* (2013.01); *B41M 5/00* (2013.01); *B41M 5/0023* (2013.01);
(Continued)

(58) Field of Classification Search
CPC ..... B41J 2/01; B41J 2/11; B41J 2/1433; B41J 2/17; B41J 2/17593; B41J 2/2107;
(Continued)

(56) References Cited

U.S. PATENT DOCUMENTS

2002/0046680 A1 4/2002 Noro et al.
2008/0081912 A1* 4/2008 Harada ................ C09D 11/328
546/276.7
(Continued)

FOREIGN PATENT DOCUMENTS

EP 3299422 A1 3/2018
JP H11-282136 A 10/1999
(Continued)

OTHER PUBLICATIONS

Extended European Search Report dated Jul. 26, 2019, issued in corresponding EP Patent Application No. 17841568.3.
(Continued)

*Primary Examiner* — Manish S Shah
(74) *Attorney, Agent, or Firm* — Solaris Intellectual Property Group, PLLC

(57) ABSTRACT

Provided is an ink jet recording ink including: a colorant represented by the following Formula 1, in which an absorption maximum of a dry material of the ink jet recording ink is 700 nm to 1000 nm.

Formula 1

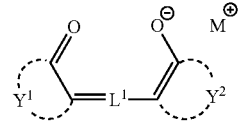

16 Claims, 1 Drawing Sheet

(51) Int. Cl.
  *B41M 5/00* (2006.01)
  *C09B 23/01* (2006.01)
  *C09D 11/033* (2014.01)
  *C09D 11/037* (2014.01)
  *C09D 11/328* (2014.01)

(52) U.S. Cl.
  CPC ........ *C09B 23/0091* (2013.01); *C09D 11/033* (2013.01); *C09D 11/037* (2013.01); *C09D 11/322* (2013.01); *C09D 11/328* (2013.01)

(58) Field of Classification Search
  CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 5/5277; B41J 2/045; B41J 2/16538; B41J 2002/16502; B41J 2/1623; B41J 2202/00; B41J 2202/03; B41J 2/14201; B41J 11/0015; B41J 11/002; B41J 2/04581; B41J 2/055; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218
  See application file for complete search history.

(56) References Cited

U.S. PATENT DOCUMENTS

| | | | | |
|---|---|---|---|---|
| 2010/0044652 A1* | 2/2010 | Kawaharada | ....... | C09B 67/0033 252/586 |
| 2011/0070407 A1* | 3/2011 | Kato | ............. | C09B 23/0058 428/172 |
| 2014/0030642 A1* | 1/2014 | Takasaki | ............. | C07F 3/003 430/7 |
| 2017/0029613 A1* | 2/2017 | Oyanagi | ............. | C09D 4/00 |
| 2017/0342288 A1 | 11/2017 | Kitade et al. | | |
| 2018/0120485 A1 | 5/2018 | Oota et al. | | |

FOREIGN PATENT DOCUMENTS

| | | | | |
|---|---|---|---|---|
| JP | 2000-272241 | A | 10/2000 | |
| JP | 2001-348520 | A | 12/2001 | |
| JP | 2002-020648 | A | 1/2002 | |
| JP | 2002-294107 | A | 10/2002 | |
| JP | 2003-305956 | A | 10/2003 | |
| JP | 2004-249541 | A | 9/2004 | |
| JP | 2005-114842 | A | 4/2005 | |
| JP | 2006-301603 | A | 11/2006 | |
| JP | 2008-033206 | A | 2/2008 | |
| JP | 2008-144004 | A | 6/2008 | |
| JP | 2008144004 | A * | 6/2008 | ............... B41J 2/01 |
| JP | 2009-109774 | A | 5/2009 | |
| JP | 2013-159765 | A | 8/2013 | |
| JP | 2014-044341 | A | 3/2014 | |
| WO | 03042989 | A1 | 5/2003 | |
| WO | 2016/098603 | A1 | 6/2016 | |
| WO | 2016/186050 | A1 | 11/2016 | |

OTHER PUBLICATIONS

English language translation of the following: Office action dated Dec. 3, 2019 from the JPO in a Japanese patent application No. 2018-534438 corresponding to the instant patent application.
International Search Report issued in International Application No. PCT/JP2017/029661 dated Sep. 26, 2017.
Written Opinion of the ISA issued in International Application No. PCT/JP2017/029661 dated Sep. 26, 2017.

* cited by examiner

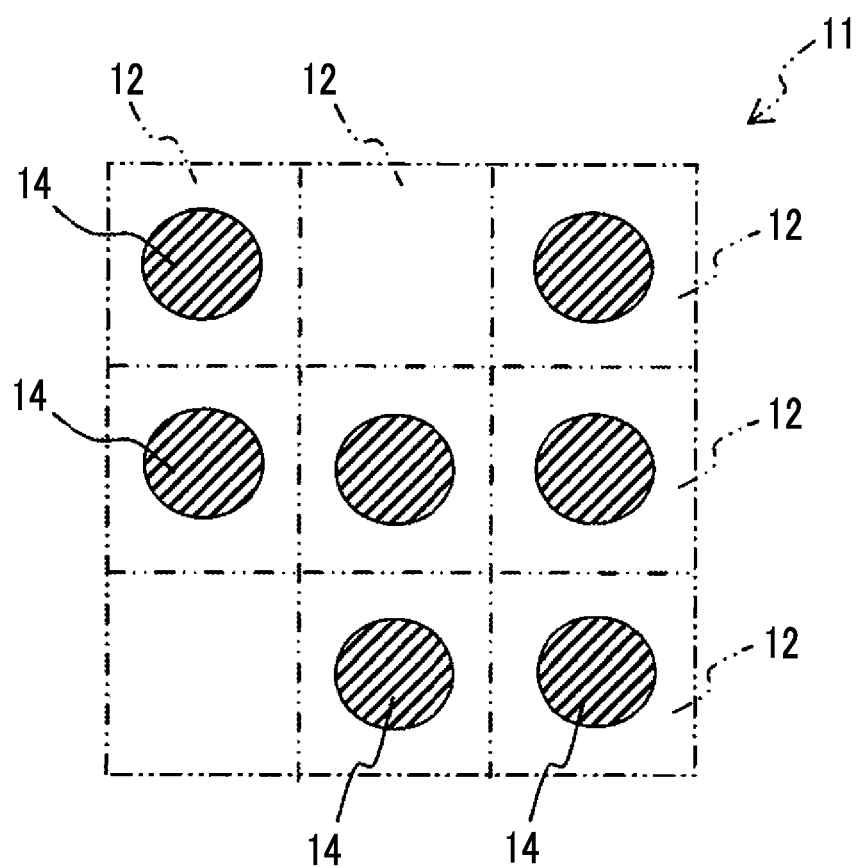

INK JET RECORDING INK, INK JET RECORDING METHOD, INFRARED READING METHOD, AND PRINTED MATERIAL

CROSS-REFERENCE TO RELATED APPLICATIONS

This application is a continuation application of International Application No. PCT/JP2017/029661, filed Aug. 18, 2017, the disclosure of which is incorporated herein by reference in its entirety. Further, this application claims priority from Japanese Patent Applications No. 2016-161434 filed Aug. 19, 2016, and No. 2016-253444, filed Dec. 27, 2016, and the disclosures of which are incorporated herein by reference in their entirety.

BACKGROUND OF THE INVENTION

1. Field of the Invention

The present disclosure relates to an ink jet recording ink, an ink jet recording method, an infrared reading method, and a printed material.

2. Description of the Related Art

In general, as means for optically reading information written on a certificate such as a stock certificate, a bond certificate, a check, a gift certificate, a lottery, or a commutation ticket, a code pattern that is readable using a bar code or an optical character reader (OCR) is provided in many cases. In addition, as a code pattern using optical reading, a bar code is widely used mainly in a physical distribution management system or the like. Further, recently, a two-dimensional code capable of a larger volume of data storage and high-density printing, for example, Data Code, Veri Code, Code 1, Maxi Code, or a two-dimensional bar code (QR code (registered trade name)) has been spread. In addition, a method using a dot pattern is also known.

As the above-described code pattern, a visible code pattern is general, which imposes various restrictions on a printed material, the restrictions including a restriction in designing a printed material and a restriction in securing a printing area. Therefore, a demand for excluding the visible code pattern has increased. Further, in order to prevent forgery of a certificate, it has been attempted to make a code pattern transparent by printing an ink not having an absorption band in a visible range. Making a code pattern transparent has advantageous effects in that a printed material can be freely designed, a printing area for printing a code pattern is not necessarily secured, and it is difficult to determine and identify a code pattern by visual inspection.

As an attempt to make a code pattern transparent (invisible), a technique of forming an infrared absorbing pattern using an ink that mainly absorbs infrared light outside a visible range is known.

As the ink used for forming the infrared absorbing pattern, an ink described in JP2008-144004A is known.

In addition, as an ink jet recording ink in which an oxonol compound is used as a colorant, a dispersion including an oxonol compound, or a color print, that described in JP2002-294107A, JP2002-020648A, or JP1999-282136A (JP-H11-282136A) is known.

For example, JP2008-144004A describes an ink jet recording ink including a colorant represented by the following Formula (I).

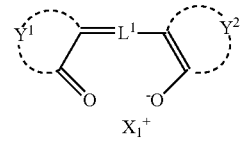

Formula (I)

JP2002-294107A describes an ink jet recording ink including J-aggregate particles that are formed using a method including: bringing a solution in which a dye capable of forming a J-aggregate is dissolved into contact with an aqueous medium; and subsequently performing a heating treatment on the solution.

JP2002-020648A describes a dispersion including an oxonol compound represented by the following formula.

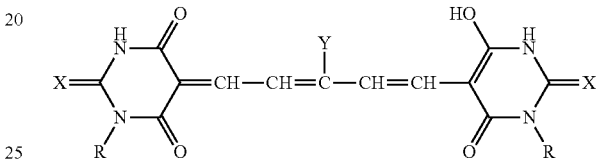

JP1999-282136A (JP-H11-282136A) describes a color print including a regular pattern that is formed using an infrared dye.

JP2013-159765A describes a coloring composition including a compound represented by the following Formula (C).

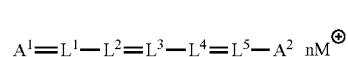

Formula (C)

JP2001-348520A describes an ink jet recording liquid including a solid fine particle dispersion that is obtained by dispersing a compound represented by the following Formula (I) or (II) in a medium.

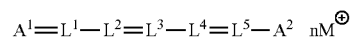

Formula (C)

SUMMARY OF THE INVENTION

An object that is achieved by an embodiment of the present invention is to provide an ink jet recording ink having excellent dispersion easiness during manufacturing, having excellent storage stability of the ink jet recording ink, and having excellent invisibility of the obtained infrared absorbing image. Another object that is achieved by another embodiment of the present invention is to provide an ink jet recording method in which the above-described ink jet recording ink is used. Still another object that is achieved by still another embodiment of the present invention is to provide an infrared reading method of reading an image that is a dry material of the above-described ink jet recording ink. Still another object that is achieved by still another embodiment of the present invention is to provide a printed material having excellent invisibility of the infrared absorbing image.

Means for achieving the objects include the following aspects.

<1> An ink jet recording ink comprising:
a colorant represented by the following Formula 1,
in which an absorption maximum of a dry material of the ink jet recording ink is 700 nm to 1000 nm,

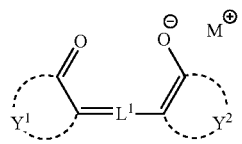

Formula 1 in Formula 1, $Y^1$ and $Y^2$ each independently represent a non-metal atomic group which forms an aliphatic ring or a heterocycle, $M^+$ represents a proton or a monovalent alkali metal cation or organic cation, $L^1$ represents a methine chain including 5 or 7 methine groups, and a methine group at a center of the methine chain has a substituent represented by the following Formula A, and

Formula A in Formula A, $S^A$ represents a single bond, an alkylene group, an alkenylene group, an alkynylene group, —O—, —S—, —$NR^{L1}$—, —C(=O)—, —C(=O)O—, —C(=O)$NR^{L1}$—, —S(=O)$_2$—, —$OR^{L2}$—, or a group including a combination thereof, $R^{L1}$ represents a hydrogen atom, a halogen atom, an alkyl group, an aryl group, or a monovalent heterocyclic group, $R^{L2}$ represents an alkylene group, an arylene group, or a divalent heterocyclic group, $T^A$ represents a halogen atom, an alkyl group, a cycloalkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group, in a case where $S^A$ represents a single bond or an alkylene group and $T^A$ represents an alkyl group, the total number of carbon atoms included in $S^A$ and $T^A$ is 3 or more, and * represents a binding site to the methine group at the center of the methine chain.

<2> The ink jet recording ink according to <1>,
in which the colorant represented by Formula 1 is a colorant represented by the following Formula 2,

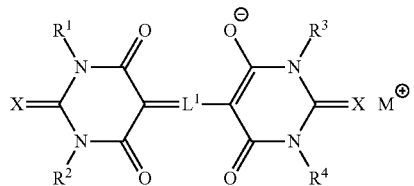

Formula 2 in Formula 2, $M^+$ represents a proton or a monovalent alkali metal cation or organic cation, $L^1$ represents a methine chain including 5 or 7 methine groups, and a methine group at a center of the methine chain has a substituent represented by the following Formula A,

Formula A in Formula A, $S^A$ represents a single bond, an alkylene group, an alkenylene group, an alkynylene group, —O—, —S—, —$NR^{L1}$—, —C(=O)—, —C(=O)O—, —C(=O)$NR^{L1}$—, —S(=O)$_2$—, —$OR^{L2}$—, or a group including a combination thereof, $R^{L1}$ represents a hydrogen atom, a halogen atom, an alkyl group, an aryl group, or a monovalent heterocyclic group, $R^{L2}$ represents an alkylene group, an arylene group, or a divalent heterocyclic group, $T^A$ represents a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group, in a case where $S^A$ represents a single bond or an alkylene group and $T^A$ represents an alkyl group, the total number of carbon atoms included in $S^A$ and $T^A$ is 3 or more, and * represents a binding site to the methine group at the center of the methine chain, $R^1$, $R^2$, $R^3$, and $R^4$ each independently represent a hydrogen atom, an alkyl group, an aryl group, or a monovalent heterocyclic group, and X's each independently represent an O atom, a S atom, or a Se atom.

<3> The ink jet recording ink according to <2>,
in which in Formula 2, at least one selected from the group consisting of $R^1$, $R^2$, $R^3$, and $R^4$ represents a hydrogen atom.

<4> The ink jet recording ink according to <2> or <3>,
in which the colorant represented by Formula 2 is a colorant represented by the following Formula 3,

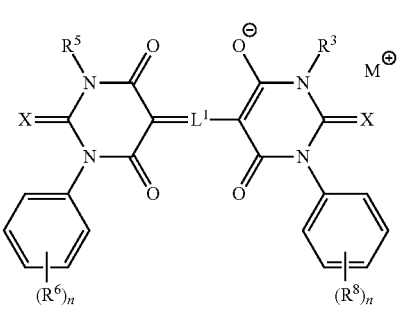

Formula 3 in Formula 3, $M^+$ represents a proton or a monovalent alkali metal cation or organic cation, $L^1$ represents a methine chain including 5 or 7 methine groups, and a methine group at a center of the methine chain has a substituent represented by the following Formula A,

Formula A in Formula A, $S^A$ represents a single bond, an alkylene group, an alkenylene group, an alkynylene group, —O—, —S—, —$NR^{L1}$—, —C(=O)—, —C(=O)O—, —C(=O)$NR^{L1}$—, —S(=O)$_2$—, —$OR^{L2}$—, or a group including a combination thereof, $R^{L1}$ represents a hydrogen atom, a halogen atom, an alkyl group, an aryl group, or a monovalent heterocyclic group, $R^{L2}$ represents an alkylene group, an arylene group, or a divalent heterocyclic group, $T^A$ represents a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group, in a case where $S^A$ represents a single bond or an alkylene group and $T^A$ represents an alkyl group, the total number of carbon atoms included in $S^A$ and $T^A$ is 3 or more, and * represents a binding site to the methine group at the center of the methine chain, $R^5$ and $R^7$ each independently represent a hydrogen atom, an alkyl group, an aryl group, or a monovalent heterocyclic group, $R^6$ and $R^8$ each independently represent an alkyl group, a halogen atom, an alkenyl group, an aryl group, a monovalent heterocyclic group, a nitro group, a cyano group, $-OR^{L3}$, $-C(=O)R^{L3}$, $-C(=O)OR^{L3}$, $-OC(=O)R^{L3}$, $-N(R^{L3})_2$, $-NHC(=O)R^{L3}$, $-C(=O)N(R^{L3})_2$, $-NHC(=O)OR^{L3}$, $-OC(=O)N(R^{L3})_2$, $-NHC(=O)N(R^{L3})_2$, $-SR^{L3}$, $-S(=O)_2R^{L3}$, $-S(=O)_2OR^{L3}$, $-NHS(=O)_2R^{L3}$, or $-S(=O)_2N(R^{L3})_2$, $R^{L3}$'s each independently represent a hydrogen atom, an alkyl group, an alkenyl group, an aryl group, or a monovalent heterocyclic group, n's each independently represent an integer of 1 to 5, and X's each independently represent an O atom, a S atom, or a Se atom.

<5> The ink jet recording ink according to <4>,
in which in Formula 3, at least one selected from the group consisting of $R^5$, $R^6$, $R^7$, and $R^8$ has a hydrogen-bonding group.

<6> The ink jet recording ink according to any one of <1> to <5>,
in which in Formulae 1 to 3, M$^+$ represents a monovalent alkali metal cation.

<7> The ink jet recording ink according to any one of <1> to <6>,
in which in the dry material, at least a part of the colorant represented by any one of Formulae 1 to 3 is a J-aggregate.

<8> The ink jet recording ink according to any one of <1> to <7>,
in which an optical density of the dry material at 450 nm is 1/7 or lower of an optical density of the dry material at an absorption maximum.

<9> The ink jet recording ink according to any one of <1> to <8>, comprising:
water and an organic solvent having a boiling point of 100° C. or higher under 101.325 kPa as a solvent.

<10> The ink jet recording ink according to any one of <1> to <9>,
in which a content of at least one of a divalent alkali earth metal element or a trivalent group 13 metal element is 10 ppm to 50000 ppm with respect to a total mass of the ink.

<11> An ink jet recording method comprising:
a step of forming an infrared absorbing image using the ink jet recording ink according to any one of <1> to <10>.

<12> A printed material comprising:
a substrate; and
an infrared absorbing image that is a dry material of the ink jet recording ink according to any one of <1> to <10>.

<13> A printed material comprising:
a substrate; and
an infrared absorbing image,
wherein the infrared absorbing image includes a colorant represented by the following Formula 1, and
an absorption maximum of the infrared absorbing image is 700 nm to 1000 nm,

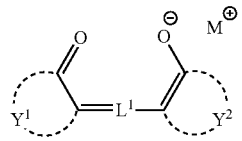

Formula 1 in Formula 1, $Y^1$ and $Y^2$ each independently represent a non-metal atomic group which forms an aliphatic ring or a heterocycle, M$^+$ represents a proton or a monovalent alkali metal cation or organic cation, L$^1$ represents a methine chain including 5 or 7 methine groups, and a methine group at a center of the methine chain has a substituent represented by the following Formula A, and $$*-S^A-T^A$$  Formula A in Formula A, $S^A$ represents a single bond, an alkylene group, an alkenylene group, an alkynylene group, $-O-$, $-S-$, $-NR^{L1}-$, $-C(=O)-$, $-C(=O)O-$, $-C(=O)NR^{L1}-$, $-S(=O)_2-$, $-OR^{L2}-$, or a group including a combination thereof, $R^{L1}$ represents a hydrogen atom, a halogen atom, an alkyl group, an aryl group, or a monovalent heterocyclic group, $R^{L2}$ represents an alkylene group, an arylene group, or a divalent heterocyclic group, $T^A$ represents a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group, in a case where $S^A$ represents a single bond or an alkylene group and $T^A$ represents an alkyl group, the total number of carbon atoms included in $S^A$ and $T^A$ is 3 or more, and * represents a binding site to the methine group at the center of the methine chain.

<14> An infrared reading method comprising:
a step of reading an infrared absorbing image that is a dry material of the ink jet recording ink according to any one of <1> to <10> or an infrared absorbing image that is included in the printed material according to <12> or <13>.

<15> A method of manufacturing the ink jet recording ink according to <10>, comprising:
a step of dispersing the colorant and at least one of a divalent alkali earth metal salt or a trivalent group 13 metal salt in water to prepare an aqueous dispersion such that a total content of a divalent alkali earth metal element and a trivalent group 13 metal element is 10 ppm to 50000 ppm with respect to the total mass of the ink; and
a step of mixing the aqueous dispersion and other components of the ink with each other.

<16> A method of manufacturing the ink jet recording ink according to <10>, comprising:
a step of dispersing the colorant in water to prepare an aqueous dispersion; and
a step of mixing the aqueous dispersion, at least one of a divalent alkali earth metal salt or a trivalent group 13 metal salt, and other components of the ink with each other such that a total content of a divalent alkali earth metal element and a trivalent group 13 metal element is 10 ppm to 50000 ppm with respect to the total mass of the ink.

According to an embodiment of the present invention, it is possible to provide an ink jet recording ink having excellent dispersion easiness during manufacturing, having excellent storage stability of the ink jet recording ink, and having excellent invisibility of the obtained infrared absorbing image. According to another embodiment of the present invention, it is possible to provide an ink jet recording method in which the above-described ink jet recording ink is used. According to still another embodiment of the present invention, it is possible to provide an infrared reading method of reading an image that is a dry material of the above-described ink jet recording ink. According to still another embodiment of the present invention, it is possible to provide a printed material having excellent invisibility of the obtained infrared absorbing image.

BRIEF DESCRIPTION OF THE DRAWINGS

FIG. 1 is a schematic plan view showing an example of arrangement of dot patterns in one first lattice.

DESCRIPTION OF THE PREFERRED EMBODIMENTS

Hereinafter, the details of the present disclosure will be described.

The following description regarding components has been made based on a representative embodiment of the present disclosure. However, the present invention is not limited to the embodiment.

In the present disclosure, numerical ranges represented by "to" include numerical values before and after "to" as lower limit values and upper limit values.

In the present disclosure, unless specified as a substituted group or as an unsubstituted group, a group (atomic group) denotes not only a group having no substituent but also a group having a substituent. For example, "alkyl group" denotes not only an alkyl group having no substituent (unsubstituted alkyl group) but also an alkyl group having a substituent (substituted alkyl group).

In addition, in this specification, a chemical structural formula may also be shown as a simple structural formula in which a hydrogen atom is not shown.

In the present disclosure, "(meth)acrylate" represents acrylate or methacrylate, "(meth)acryl" represents acryl and methacryl, and "(meth)acryloyl" represents acryloyl and methacryloyl.

In addition, in the present disclosure, a combination of preferable aspects is a more preferable aspect.

In the present disclosure, the term "step" denotes not only an individual step but also a step which is not clearly distinguishable from another step as long as an effect expected from the step can be achieved.

In addition, in the present disclosure, a combination of two or more preferable aspects is a more preferable aspect.

(Ink Jet Recording Ink)

An ink jet recording ink according to the present disclosure (hereinafter, also referred to as "ink") includes a colorant represented by Formula 1, in which an absorption maximum of a dry material of the ink jet recording ink is in a range of 700 nm to 1000 nm.

In the case of the ink jet recording ink described in JP2008-144004A, dispersion cannot be easily performed during manufacturing in some cases. Therefore, it was found that, in a state where a dispersant such as a surfactant is used, a relatively long period of time (for example, 3 hours) may be required for dispersion.

In addition, the ink jet recording ink described in JP2002-294107A is a visible ink jet recording ink, and it is difficult to use the ink jet recording ink described in JP2002-294107A in order to make the obtained image invisible. In addition, even in the case of the ink jet recording ink described in JP1999-282136A (JP-H11-282136A) in which an oxonol compound is used, the coloring composition described in JP2013-159765A, and the ink jet recording liquid described in JP2001-348520A, the invisibility of the obtained infrared absorbing image is not sufficient.

In the case of the ink jet recording ink described in JP2002-020648A in which a dispersion including an oxonol compound is used, there is room for further improvement from the viewpoint of storage stability of the ink jet recording ink (for example, stability in a case where the ink jet recording ink is stored at 60° C. and a relative humidity of 55% for about one week).

As a result of a thorough investigation, the present inventors found that, in a case where the colorant represented by Formula 1 is used, dispersion during manufacturing of the ink jet recording ink is easy, the storage stability of the ink is also improved, and the invisibility of the obtained infrared absorbing image is excellent.

The detailed reason why the above-described excellent effects are obtained is not clear but is presumed to be as follows.

In the colorant represented by Formula 1, M⁺ represents a proton or a monovalent alkali metal cation or organic cation. Therefore, aggregating properties of the colorant are weakened, and dispersion easiness is improved.

In addition, in the colorant represented by Formula 1, the number of methine groups in $L^1$ is 5 to 7, and a methine group at the center has a specific substituent represented by Formula A. As a result, the absorption wavelength increases, and appropriate hydrophilicity is exhibited. Therefore, the invisibility of the obtained infrared absorbing image is excellent, and the storage stability of the ink is excellent.

Further, with the ink jet recording ink composition according to the present disclosure, an infrared absorbing image having excellent light fastness, moist heat resistance, and readability is likely to be obtained.

The detailed reason for this point is not clear, but it is presumed that the ink jet recording ink composition according to the present disclosure exhibits the above-described effects due to a concerted action of the following three points of the compound represented by Formula 1 including: M⁺ represents a proton or a monovalent alkali metal cation or organic cation; $L^1$ represents a methine chain including 5 or 7 methine groups; and a methine group at a center of the methine chain has a substituent represented by the following Formula A.

Hereinafter, each of the components included in the ink jet recording ink according to the embodiment will be described.

<Colorant Represented by Formula 1>

The ink jet recording ink according to the present disclosure includes a colorant represented by the following Formula 1.

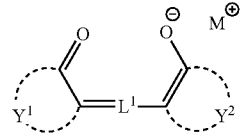

Formula 1

In Formula 1, $Y^1$ and $Y^2$ each independently represent a non-metal atomic group which forms an aliphatic ring or a heterocycle, M⁺ represents a proton or a monovalent alkali metal cation or organic cation, $L^1$ represents a methine chain including 5 or 7 methine groups, and a methine group at a center of the methine chain has a substituent represented by the following Formula A.

*—$S^A$-$T^A$   Formula A

In Formula A, $S^A$ represents a single bond, an alkylene group, an alkenylene group, an alkynylene group, —O—, —S—, —$NR^{L1}$—, —C(=O)—, —C(=O)O—, —C(=O)$NR^{L1}$—, —S(=O)$_2$—, —$OR^{L2}$—, or a group including a combination thereof, $R^{L1}$ represents a hydrogen atom, a halogen atom, an alkyl group, an aryl group, or a monovalent heterocyclic group, $R^{L2}$ represents an alkylene group, an arylene group, or a divalent heterocyclic group, $T^A$ represents a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group, in a case where $S^A$ represents a single bond or an alkylene group and $T^A$ represents an alkyl group, the total number of carbon atoms included in $S^A$ and $T^A$ is 3 or more, and * represents a binding site to the methine group at the center of the methine chain.

[$Y^1$ and $Y^2$]

$Y^1$ and $Y^2$ may represent the same non-metal atomic group or different non-metal atomic groups. From the viewpoint of synthesis suitability, it is preferable that $Y^1$ and $Y^2$ represent the same non-metal atomic group.

Examples of the aliphatic ring which is formed by $Y^1$ and $Y^2$ include an aliphatic ring having 5 to 10 carbon atoms. The aliphatic ring may have a substituent and may form a fused ring with an aliphatic ring, an aromatic ring, or another heterocycle.

Examples of the aliphatic ring which is formed by $Y^1$ and $Y^2$ include a 1,3-indandione ring, a 1,3-benzoindandione ring, and 2,3-dihydro-1H-phenalene-1,3-dione.

Examples of the heterocycle which is formed by Y1 and Y2 include a heterocycle which is a 5-membered ring or a 6-membered ring. Examples of a heteroatom included in the heterocycle include a nitrogen atom (N atom), an oxygen atom (O atom), and a sulfur atom (S atom). Among these, a N atom is preferable. The aliphatic ring may have a substituent and may form a fused ring with an aliphatic ring, an aromatic ring, or another heterocycle.

In Formula 1, $Y^1$ and $Y^2$ each independently represent preferably a non-metal atomic group which forms a heterocycle and more preferably a non-metal atomic group which form the same heterocycle.

Examples of the heterocycle which is formed by $Y^1$ and $Y^2$ include a 5-pyrazolone ring, an isoxazolone ring, a barbituric acid ring, a pyridone ring, a rhodanine ring, a pyrazolidinedione ring, a pyrazolopyridone ring, and a Meldrum's acid ring. From the viewpoint of invisibility, a barbituric acid ring is preferable.

[$M^+$]

$M^+$ represents a proton or a monovalent alkali metal cation or organic cation. From the viewpoint of the light fastness and moist heat resistance of the obtained infrared absorbing image, it is preferable that $M^+$ represents a monovalent alkali metal cation.

Examples of the monovalent alkali metal cation are not particularly limited and include a lithium ion ($Li^+$), a sodium ion ($Na^+$), a potassium ion ($K^+$), a rubidium ion ($Rb^+$), a cesium ion ($Cs^+$), and a francium ion ($Fr^+$). Among these, $Li^+$, $Na^+$, $K^+$, $Rb^+$, or $Cs^+$ is preferable, $Na^+$, $K^+$, $Rb^+$, or $Cs^+$ is more preferable, and $K^+$ is still more preferable.

The organic cation may be a monovalent organic cation or a polyvalent organic cation and is preferably a monovalent organic cation.

Examples of the organic cation include a tetraalkylammonium ion, a trialkylammonium ion, a pyridinium ion, a N-methylpyridinium ion, and a N-ethylpyridinium ion. Among these, a trialkylammonium ion is preferable, and a triethylammonium ion is more preferable.

In addition, from the viewpoint of dispersion easiness, a polyvalent organic cation can be used as the organic cation.

Examples of the polyvalent organic cation include N,N,N',N'-tetramethylethylenediammonium and Cation Master PD-7 (manufactured by Yokkaichi Chemical Co., Ltd.).

$M^+$ represents a counter cation, and the compound represented by Formula 1 is electrically neutral as a whole due to the presence of $M^+$.

[$L^1$]

$L^1$ represents a methine chain including 5 or 7 methine groups, and a methine group at a center of the methine chain has a substituent represented by the following Formula A.

$L^1$ represents a methine chain including 5 or 7 methine groups, and preferably a methine chain including 5 methine groups.

A methine group other than the methine group at the center of the methine chain may be substituted but is preferably unsubstituted.

It is also preferable that the methine chain is crosslinked at any position. For example, opposite carbon atoms adjacent to the methine group may be crosslinked to form a ring structure. The ring structure is not particularly limited and is preferably an aliphatic ring and more preferably a 5-membered ring or a 6-membered ring.

Specifically, $L^1$ represents preferably a group represented by the following Formula L1-1, L1-2, L2-1, or L2-2 and more preferably a group represented by the following Formula L1-1 or L1-2.

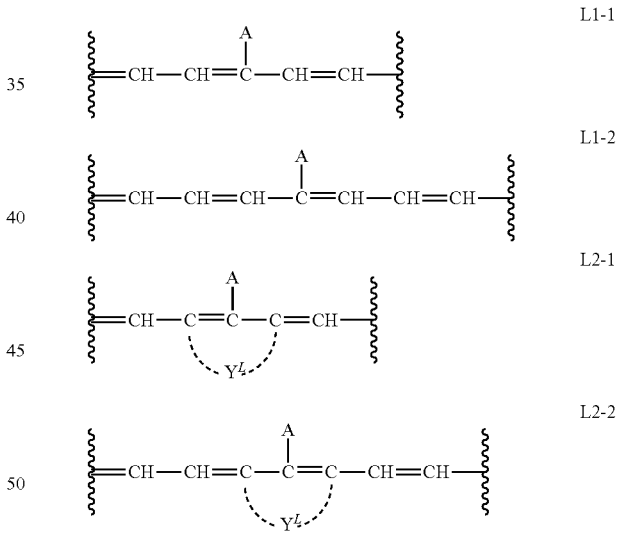

In Formulae L1-1, L1-2, L2-1, and L2-2, A represents a substituent represented by Formula A, and wave line portions each independently represent a binding site to a structure other than $L^1$ in Formula 1.

$Y^L$ represents a non-metal atomic group which forms an aliphatic ring or a heterocycle and preferably a non-metal atomic group which represents an aliphatic ring. As the aliphatic ring, a hydrocarbon ring as a 5-membered ring or a 6-membered ring is preferable.

As the group represented by Formula L2-1 or L2-2, a group represented by any one of the following Formulae L3-1 to L3-4 is preferable.

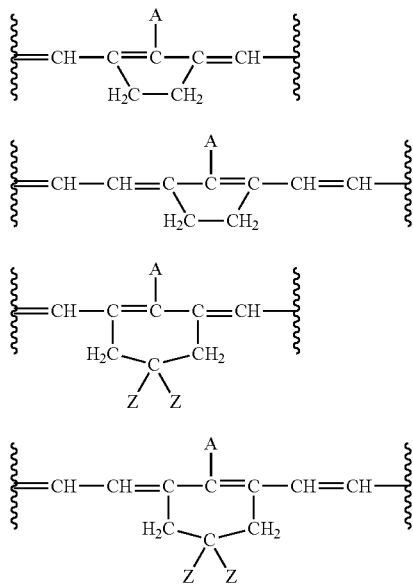

In Formulae L3-1 to L3-4, A represents a substituent represented by Formula A, and wave line portions each independently represent a binding site to a structure other than $L^1$ in Formula 1.

Z represents a hydrogen atom or an alkyl group, preferably a hydrogen atom or an alkyl group having 1 to 8 carbon atoms, and more preferably a hydrogen atom or a methyl group. Two Z's may be bonded to each other to form a ring structure.

—Substituent represented by Formula A—

In Formula A, $S^A$ represents a single bond, an alkylene group, an alkenylene group, an alkynylene group, —O—, —S—, —$NR^{L1}$—, —C(=O)—, —C(=O)O—, —C(=O)$NR^{L1}$—, —S(=O)$_2$—, —$OR^{L2}$—, or a group including a combination thereof. Among these, from the viewpoint of improving the invisibility of the obtained infrared absorbing image, a single bond, an alkylene group, an alkenylene group, or an alkynylene group is preferable, and a single bond is more preferable.

As the alkylene group, an alkylene group having 1 to 10 carbon atoms is preferable, an alkylene group having 1 to 4 carbon atoms is more preferable, and a methylene group or an ethylene group is still more preferable.

As the alkenylene group, an alkenylene group having 2 to 10 carbon atoms is preferable, an alkenylene group having 2 to 4 carbon atoms is more preferable, and an alkenylene group having 2 or 3 carbon atoms is still more preferable.

As the alkynylene group, an alkynylene group having 2 to 10 carbon atoms is preferable, an alkynylene group having 2 to 4 carbon atoms is more preferable, and an alkynylene group having 2 or 3 carbon atoms is still more preferable.

The alkylene group, the alkenylene group, and the alkynylene group may be linear or branched, and some or all of the carbon atoms included in each of the groups may form a cyclic structure. Unless specified otherwise, the above-described contents shall be applied to the description of the alkylene group, the alkenylene group, and the alkynylene group in the present disclosure.

In —C(=O)O—, the carbon atom is on the side of binding to $L^1$ and the oxygen atom may be on the side of binding to $T^4$ or vice versa.

In —C(=O)$NR^{L1}$—, the carbon atom is on the side of binding to $L^1$ and the nitrogen atom may be on the side of binding to $T^4$ or vice versa.

$R^{L1}$ represents a hydrogen atom, a halogen atom, an alkyl group, an aryl group, or a monovalent heterocyclic group, preferably a hydrogen atom, an alkyl group, or an aryl group, and more preferably a hydrogen atom.

As the alkyl group, an alkyl group having 1 to 10 carbon atoms is preferable, an alkyl group having 1 to 4 carbon atoms is more preferable, and an alkyl group having 1 or 2 carbon atoms is still more preferable.

The alkyl group may be linear or branched, and some or all of the carbon atoms included in the alkyl group may form a cyclic structure. Unless specified otherwise, the above-described contents shall be applied to the description of the alkyl group in the present disclosure.

As the aryl group, an aryl group having 6 to 20 carbon atoms is preferable, and a phenyl group or a naphthyl group is more preferable.

In the present disclosure, a monovalent heterocyclic group refers to a group obtained by removing one hydrogen atom from a heterocyclic compound, and a divalent heterocyclic group refers to a group obtained by removing two hydrogen atoms from a heterocyclic compound.

It is preferable that a heterocycle in the monovalent heterocyclic group is a 5-membered ring or a 6-membered ring. In addition, the heterocycle may form a fused ring with an aliphatic ring, an aromatic ring, or another heterocycle.

Examples of a heteroatom in the heterocycle include a N atom, an O atom, and a S atom. Among these, a N atom is preferable.

Examples of the heterocycle include a pyridine ring, a piperidine ring, a furan ring, a furfuran ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a pyrrolidone ring, a thiazole ring, a pyrazine ring, a thiadiazine ring, a benzoquinoline ring, and a thiadiazole ring.

$R^{L2}$ represents an alkylene group, an arylene group, or a divalent heterocyclic group and preferably an alkylene group.

As the alkylene group, an alkylene group having 1 to 10 carbon atoms is preferable, an alkylene group having 1 to 4 carbon atoms is more preferable, and an alkylene group having 1 or 2 carbon atoms is still more preferable.

As the arylene group, an arylene group having 6 to 20 carbon atoms is preferable, a phenylene group or a naphthylene group is more preferable, and a phenylene group is still more preferable.

As the divalent heterocyclic group, a structure obtained by further removing another hydrogen atom from the monovalent heterocyclic group of $R^L1$ is preferable.

In Formula A, $T^A$ represents a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group, preferably an aryl group, a monovalent heterocyclic group, or a trialkylsilyl group, and more preferably a phenyl group or a pyridyl group.

Examples of the halogen atom include a fluorine atom (F atom), a chlorine atom (Cl atom), a bromine atom (Br atom), and an iodine atom (I atom). Among these, a Cl atom or a Br atom is preferable, and a Cl atom is more preferable.

As the alkyl group, an alkyl group having 1 to 10 carbon atoms is preferable, an alkyl group having 1 to 4 carbon atoms is more preferable, and an alkyl group having 1 or 2 carbon atoms is still more preferable.

In a case where $T^A$ represents an alkyl group, $T^A$ may form a ring structure with another carbon atom in the methine chain. As the ring structure, s a 5-membered ring or a 6-membered ring is preferable.

As the aryl group, an aryl group having 6 to 20 carbon atoms is preferable, a phenyl group or a naphthyl group is more preferable, and a phenyl group is still more preferable.

It is preferable that a heterocycle in the monovalent heterocyclic group is a 5-membered ring or a 6-membered ring. In addition, the heterocycle may form a fused ring with an aliphatic ring, an aromatic ring, or another heterocycle.

Examples of a heteroatom in the heterocycle include a N atom, an O atom, and a S atom. Among these, a N atom is preferable.

Examples of the heterocycle include a pyridine ring, a triazine ring, a piperidine ring, a furan ring, a furfuran ring, a Meldrum's acid ring, a barbituric acid ring, a succinimide ring, a thiophene ring, a pyrrole ring, a quinoline ring, a morpholine ring, a thiomorpholine ring, an indole ring, an imidazole ring, a pyrazole ring, a carbazole ring, a phenothiazine ring, a phenoxazine ring, an indoline ring, a pyrrolidone ring, a thiazole ring, a pyrazine ring, a thiadiazine ring, a benzoquinoline ring, and a thiadiazole ring.

The heterocycle may form a salt structure. For example, the pyridine ring may form a pyridinium salt, and may be present as a pyridinium ion.

The aryl group or the monovalent heterocyclic group may have a substituent. Examples of the substituent include an alkyl group, an alkoxy group, a halogen atom, an alkenyl group, an alkynyl group, an aryl group, a monovalent heterocyclic group, a nitro group, a cyano group, —OR$^T$, —C(=O)R$^T$, —C(=O)OR$^T$, —OC(=O)R$^T$, —N(R$^T$)$_2$, —NHC(=O)R$^T$, —C(=O)N(R$^T$)$_2$, —NHC(=O)OR$^T$, —OC(=O)N(R$^T$)$_2$, —NHC(=O)N(R$^T$)$_2$, —SR$^T$, —S(=O)$_2$R$^T$, —S(=O)$_2$OR$^T$, —NHS(=O)$_2$R$^T$, and =S(=O)$_2$N(R$^T$)$_2$.

R$^T$'s each independently represent a hydrogen atom, an alkyl group, an aryl group, or a monovalent heterocyclic group and preferably a hydrogen atom, an alkyl group, or an aryl group.

As the alkyl group represented by R$^T$, an alkyl group having 1 to 12 carbon atoms is preferable, an alkyl group having 1 to 6 carbon atoms is more preferable, and a methyl group or an ethyl group is still more preferable.

As the alkyl group of the alkoxy group represented by R$^T$, an alkyl group having 1 to 12 carbon atoms is preferable, an alkyl group having 1 to 6 carbon atoms is more preferable, and a methyl group or an ethyl group is still more preferable.

As the aryl group represented by R$^T$, an aryl group having 6 to 20 carbon atoms is preferable, a phenyl group or a naphthyl group is more preferable, and a phenyl group is still more preferable.

It is preferable that a heterocycle in the monovalent heterocyclic group represented by R$^T$ is a 5-membered ring or a 6-membered ring. In addition, the heterocycle may form a fused ring with an aliphatic ring, an aromatic ring, or another heterocycle.

Examples of a heteroatom in the heterocycle include a N atom, an O atom, and a S atom. Among these, a N atom is preferable.

Examples of the heterocycle include a pyridine ring, a piperidine ring, a piperazine ring, a pyrrolidine ring, a furan ring, a tetrahydrofuran ring, a tetrahydropyran ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a pyrrolidone ring, a thiazole ring, a pyrazine ring, a thiadiazine ring, a benzoquinoline ring, and a thiadiazole ring.

The monovalent heterocyclic group may further have a substituent. Examples of the substituent include the groups represented by R$^T$, and preferable aspects thereof are also the same.

The amino group refers to an amino group or a substituted amino group, and a diarylamino group or a diheteroarylamino group is preferable.

Examples of a substituent of the substituted amino group include an alkyl group, an aryl group, and a monovalent heterocyclic group. The alkyl group, the aryl group, or the monovalent heterocyclic group has the same definition and the same preferable aspect as the alkyl group, the aryl group, or the monovalent heterocyclic group represented by T$^A$.

As the trialkylsilyl group, a trialkylsilyl group in which the number of carbon atoms in the alkyl group is 1 to 10 is preferable, and a trialkylsilyl group in which the number of carbon atoms in the alkyl group is 1 to 4 is more preferable. Preferable examples of the trialkylsilyl group include a trimethylsilyl group, a dimethylbutylsilyl group, a triethylsilyl group, and a triisopropylsilyl group.

As the trialkoxysilyl group, a trialkoxysilyl group in which the number of carbon atoms in the alkoxy group is 1 to 10 is preferable, and a trialkoxysilyl group in which the number of carbon atoms in the alkoxy group is 1 to 4 is more preferable. Preferable examples of the trialkoxysilyl group include a trimethoxysilyl group and a triethoxysilyl group.

In a case where S$^A$ represents a single bond or an alkylene group and T$^A$ represents an alkyl group, the total number of carbon atoms included in S$^A$ and T$^A$ is 3 or more. From the viewpoint of the invisibility of the obtained infrared absorbing image, the total number of carbon atoms is preferably 4 or more and more preferably 5 or more.

In a case where S$^A$ represents a single bond or an alkylene group and T$^A$ represents an alkyl group, when the total number of carbon atoms is 3 or more, the invisibility of the obtained infrared absorbing image is excellent.

In addition, from the viewpoint of dispersion easiness, the total number of carbon atoms is preferably 20 or less and more preferably 10 or less.

Specific examples of the substituent represented by Formula A include the following substituents A-1 to A-48. However, the substituent according to the present disclosure is not limited to these examples. In the following substituents A-1 to A-48, i-C$_{10}$ represents an isodecyl group, i-C$_8$ represents an isooctyl group, and * represents a binding site to L$^1$ in Formula 1.

Among the following substituents A-1 to A-48, from the viewpoint of invisibility, A-1, A-2, A-4, A-5, A-6, A-7, A-8, A-20, A-34, A-39, A-41, A-42, A-45 or A-48 is preferable, and A-1, A-2, A-4, A-8, A-39, or A-42 is more preferable.

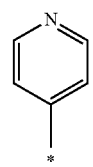

A-1

-continued
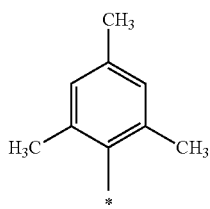
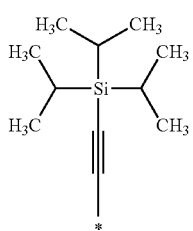
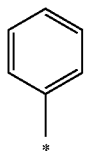
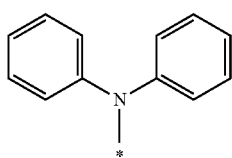
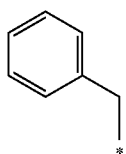
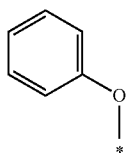
-continued
A-2
A-3
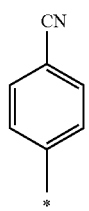
A-4
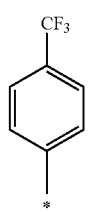
A-5
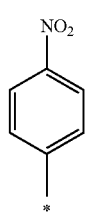
A-6
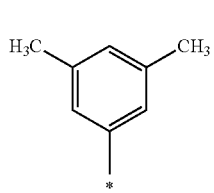
A-7
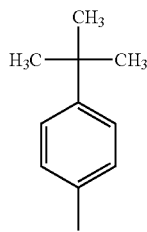
A-8
A-9
A-10
A-11
A-12
A-13
A-14
A-15
A-16
A-17
A-18
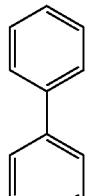
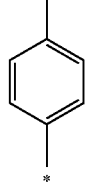

A-19 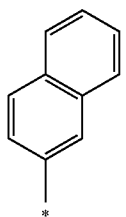
A-20 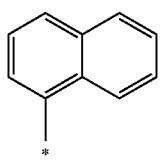
A-21 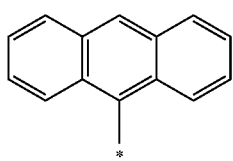
A-22 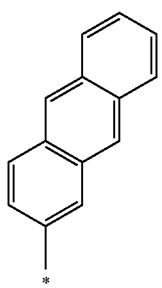
A-23 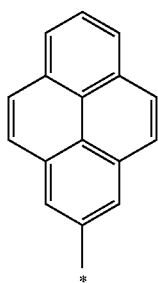
A-25 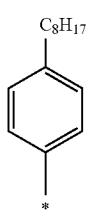
A-26 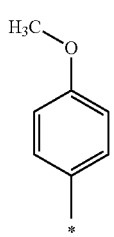
A-27 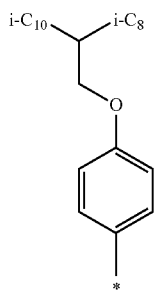
A-28 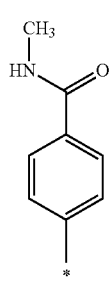
A-29 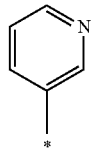
A-30 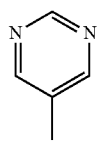
A-31 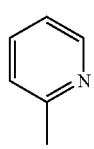
A-32 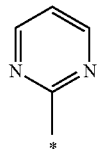
A-33 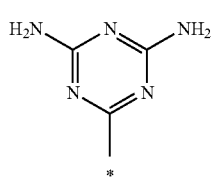

A-34 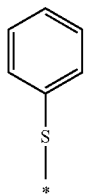

A-35 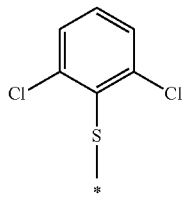

A-36 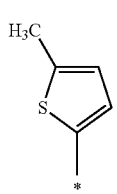

A-37 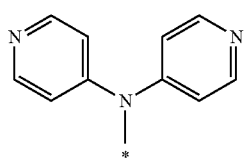

A-38 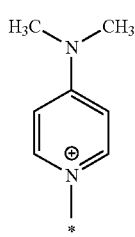

A-39 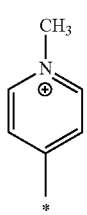

A-40 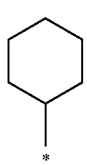

A-41 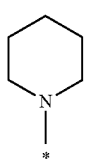

A-42 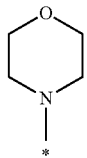

A-43 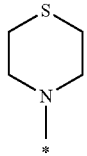

A-44 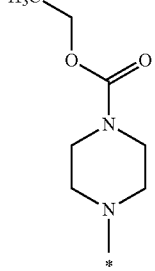

A-45 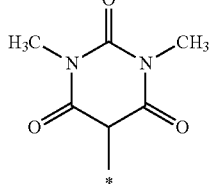

A-46 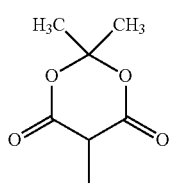

A-47 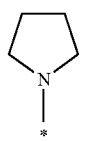

A-48 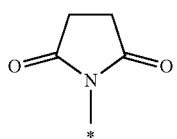

In the ink jet recording ink composition according to the present disclosure, the content of the colorant represented by Formula 1 is preferably 0.01 mass % to 30 mass %, more preferably 0.05 mass % to 20 mass %, and still more preferably 0.1 mass % 10 mass % with respect to the total mass of the ink jet recording ink composition.

In a case where the content of the colorant represented by Formula 1 is 0.01 mass % or higher, an infrared absorbing image having higher readability can be obtained.

In a case where the content of the colorant represented by Formula 1 is 30 mass % or lower, an infrared absorbing image having higher invisibility can be obtained.

The ink jet recording ink composition according to the present disclosure may include one colorant represented by Formula 1 or may include two or more colorants represented by Formula 1.

<Colorant Represented by Formula 2>

It is preferable that the colorant represented by Formula 1 is a colorant represented by the following Formula 2. In the ink jet recording ink composition according to the present disclosure, by using the colorant represented by Formula 2, an infrared absorbing image having higher invisibility can be obtained.

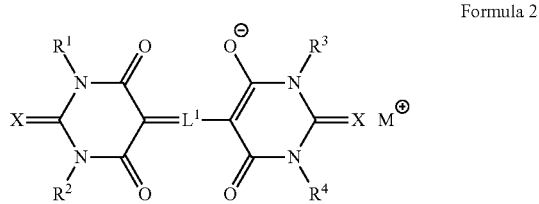

Formula 2

In Formula 2, $M^+$ represents a proton or a monovalent alkali metal cation or organic cation, $L^1$ represents a methine chain including 5 or 7 methine groups, and a methine group at a center of the methine chain has a substituent represented by the following Formula A.

Formula A

In Formula A, $S^A$ represents a single bond, an alkylene group, an alkenylene group, an alkynylene group, —O—, —S—, —NR$^{L1}$—, —C(=O)—, —C(=O)O—, —C(=O) NR$^{L1}$—, —S(=O)$_2$—, —OR$^{L2}$—, or a group including a combination thereof, $R^{L1}$ represents a hydrogen atom, a halogen atom, an alkyl group, an aryl group, or a monovalent heterocyclic group, $R^{L2}$ represents an alkylene group, an arylene group, or a divalent heterocyclic group, $T^A$ represents a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group, in a case where $S^A$ represents a single bond or an alkylene group and $T^A$ represents an alkyl group, the total number of carbon atoms included in $S^A$ and $T^A$ is 3 or more, and * represents a binding site to the methine group at the center of the methine chain.

$R^1$, $R^2$, $R^3$, and $R^4$ each independently represent a hydrogen atom, an alkyl group, an aryl group, or a monovalent heterocyclic group, and X's each independently represent an O atom, a S atom, or a Se atom.

[$L^1$ and $M^+$]

In Formula 2, $L^1$ and $M^+$ have the same definitions and the same preferable aspects as $L^1$ and $M^+$ in Formula 1.

[$R^1$, $R^2$, $R^3$, and $R^4$]

In Formula 2, $R^1$, $R^2$, $R^3$, and $R^4$ each independently represent a hydrogen atom, an alkyl group, an aryl group, or a monovalent heterocyclic group. From the viewpoints of the light fastness and invisibility of the obtained infrared absorbing image, a hydrogen atom or an aryl group is preferable, and a hydrogen atom or a phenyl group is more preferable.

As the alkyl group represented by $R^1$, $R^2$, $R^3$, and $R^4$, an alkyl group having 1 to 10 carbon atoms is preferable, an alkyl group having 1 to 4 carbon atoms is more preferable, and a methyl group or an ethyl group is still more preferable.

It is preferable that the alkyl group has a substituent. Examples of the substituent include examples of a substituent in the aryl group described below excluding an alkyl group, a nitro group, and a cyano group, and preferable aspects thereof are also the same.

As the aryl group represented by $R^1$, $R^2$, $R^3$, and $R^4$, an aryl group having 6 to 20 carbon atoms is preferable, a phenyl group or a naphthyl group is more preferable, and a phenyl group is still more preferable.

It is preferable that the aryl group has a substituent. Examples of the substituent include an alkyl group, a halogen atom, an alkenyl group, an aryl group, a monovalent heterocyclic group, a nitro group, a cyano group, —OR$^{L3}$, —C(=O)R$^{L3}$, —C(=O)OR$^{L3}$, —OC(=O)R$^{L3}$, —N(R$^{L3}$)$_2$, —NHC(=O)R$^{L3}$, —C(=O)N(R$^{L3}$)$_2$, —NHC(=O)OR$^{L3}$, —OC(=O)N(R$^{L3}$)$_2$, —NHC(=O)N(R$^{L3}$)$_2$, —SR$^{L3}$, —S(=O)$_2$R$^{L3}$, —S(=O)$_2$OR$^{L3}$, —NHS(=O)$_2$R$^{L3}$, and —S(=O)$_2$N(R$^{L3}$)$_2$.

In addition, from the viewpoint of improving the light fastness and moist heat resistance of the obtained infrared absorbing image, as the substituent, a hydrogen-bonding group is preferable. Among the above-described substituents, as the hydrogen-bonding group, for example, —OH, —C(=O)OH, —NHC(=O)R$^{L3}$, —C(=O)N(R$^{L3}$)$_2$, —NHC(=O)OR$^{L3}$, —OC(=O)N(R$^{L3}$)$_2$, —NHC(=O)N (R$^{L3}$)$_2$, —NHS(=O)$_2$R$^{L3}$, or —S(=O)$_2$N(R$^{L3}$)$_2$ is preferable, and —NHC(=O)OR$^{L3}$ is more preferable.

$R^{L3}$'s each independently represent a hydrogen atom, an alkyl group, an alkenyl group, an aryl group, or a monovalent heterocyclic group, and preferably a hydrogen atom, an alkyl group, or an aryl group.

As the alkyl group represented by $R^{L3}$, an alkyl group having 1 to 10 carbon atoms is preferable, an alkyl group having 1 to 4 carbon atoms is more preferable, and a methyl group or an ethyl group is still more preferable.

As the alkenyl group represented by $R^{L3}$, an alkenyl group having 2 to 10 carbon atoms is preferable, an alkenyl group having 2 to 4 carbon atoms is more preferable, and an alkenyl group having 2 or 3 carbon atoms is still more preferable.

As the aryl group represented by $R^{L3}$, an aryl group having 6 to 20 carbon atoms is preferable, a phenyl group or a naphthyl group is more preferable, and a phenyl group is still more preferable.

It is preferable that a heterocycle in the monovalent heterocyclic group represented by $R^{L3}$ is a 5-membered ring or a 6-membered ring. In addition, the heterocycle may form a fused ring with an aliphatic ring, an aromatic ring, or another heterocycle.

Examples of a heteroatom in the heterocycle include a N atom, an O atom, and a S atom. Among these, a N atom is preferable.

Examples of the heterocycle include a pyridine ring, a piperidine ring, a furan ring, a furfuran ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a pyrrolidone ring, a thiazole ring, a pyrazine ring, a thiadiazine ring, a benzoquinoline ring, and a thiadiazole ring.

The monovalent heterocyclic group may further have a substituent. Examples of the substituent include the groups represented by $R^{L3}$, and preferable aspects thereof are also the same.

It is preferable that a heterocycle in the monovalent heterocyclic group represented by $R^1$, $R^2$, $R^3$, and $R^4$ is a 5-membered ring or a 6-membered ring. In addition, the heterocycle may form a fused ring with an aliphatic ring, an aromatic ring, or another heterocycle.

Examples of a heteroatom in the heterocycle include a N atom, an O atom, and a S atom. Among these, a N atom is preferable.

Examples of the heterocycle include a pyridine ring, a piperidine ring, a furan ring, a furfuran ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a pyrrolidone ring, a thiazole ring, a pyrazine ring, a thiadiazine ring, a benzoquinoline ring, and a thiadiazole ring.

It is preferable that the monovalent heterocyclic group has a substituent. Examples of the substituent include the examples of the substituent in a case where $R^1$, $R^2$, $R^3$, and $R^4$ represent an aryl group, and preferable aspects thereof are also the same.

In addition, from the viewpoint of improving the light fastness and moist heat resistance of the obtained infrared absorbing image, it is preferable that at least one selected from the group consisting of $R^1$, $R^2$, $R^3$, and $R^4$ represent a hydrogen atom, it is more preferable that at least two selected from the group consisting of $R^1$, $R^2$, $R^3$, and $R^4$ represent a hydrogen atom, and it is still more preferable that two selected from the group consisting of $R^1$, $R^2$, $R^3$, and $R^4$ represent a hydrogen atom.

In a case where two selected from the group consisting of $R^1$, $R^2$, $R^3$, and $R^4$ represent a hydrogen atom, it is preferable that one of $R^1$ or $R^2$ and one of $R^3$ or $R^4$ represent a hydrogen atom.

Further, from the viewpoint of the invisibility of the obtained infrared absorbing image, it is more preferable that one of $R^1$ or $R^2$ and one of $R^3$ or $R^4$ represent a hydrogen atom and the other one of $R^1$ or $R^2$ and the other one of $R^3$ or $R^4$ represent a phenyl group. It is still more preferable that the phenyl group has a substituent as described above.

Specific examples of $R^1$, $R^2$, $R^3$, and $R^4$ include the following substituents R-1 to R-79. However, $R^1$, $R^2$, $R^3$, and $R^4$ according to the present disclosure are not limited to these examples. In the following substituents R-1 to R-79, a wave line portion represents a binding site to another structure in Formula 2.

Among the following substituents R-1 to R-79, from the viewpoint of light fastness, R-1, R-2, R-3, R-4, R-5, R-7, R-11, R-13, R-14, R-15, R-18, R-19, R-20, R-22, R-50, R-51, R-52, R-53, R-56, R-57, R-60, R-61, R-62, R-63, R-64, R-65, R-66, R-67, R-68, R-69, R-70, R-71, R-72, R-73, R-74, R-75, R-76, R-77, R-78, or R-79 is preferable, and R-1, R-2, R-4, R-7, R-11, R-13, R-14, R-15, R-18, R-19, R-51, R-52, R-53, R-56, R-57, R-60, R-61, R-62, R-63, R-64, or R-79 is more preferable.

In structures of the following substituents, Me represents a methyl group.

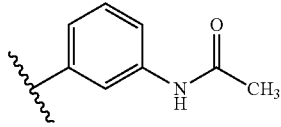

R-1

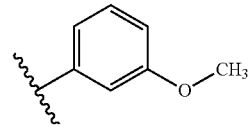

R-2

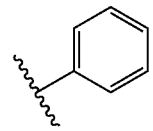

R-3

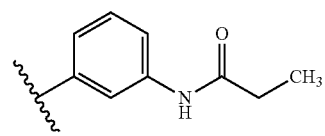

R-4

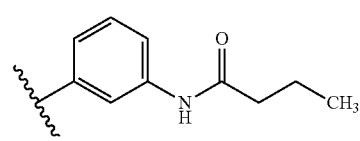

R-5

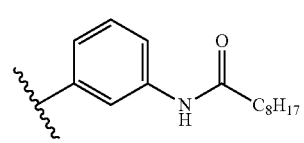

R-6

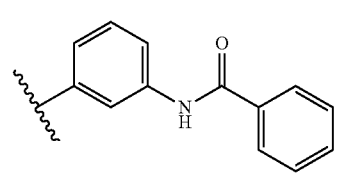

R-7

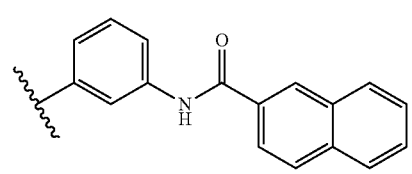

R-8

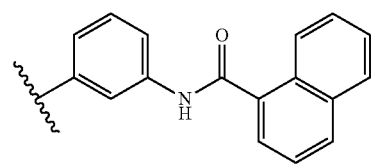

R-9

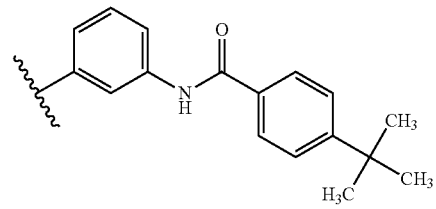

R-10

R-11

-continued
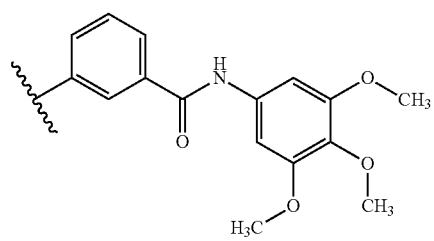 R-12
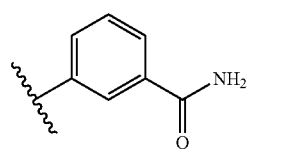 R-13
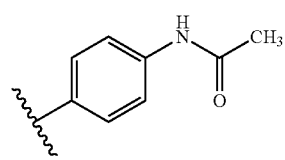 R-14
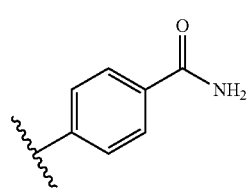 R-15
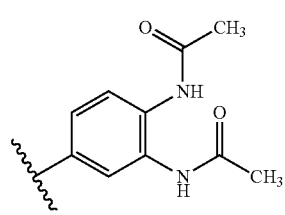 R-16
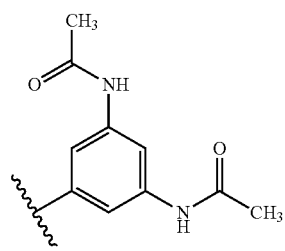 R-17
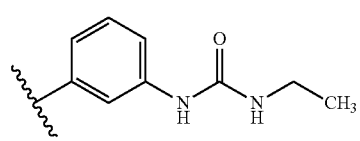 R-18
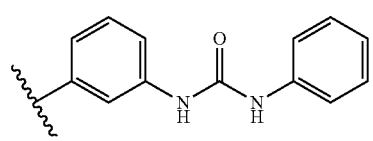 R-19
-continued
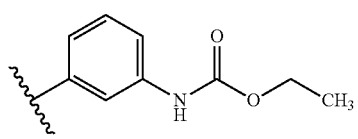 R-20
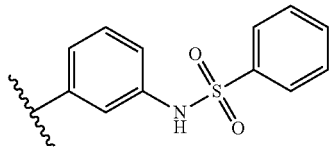 R-21
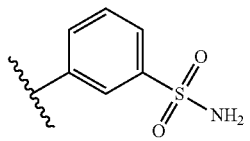 R-22
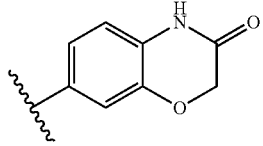 R-23
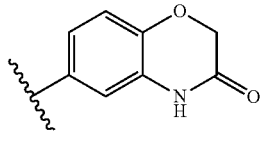 R-24
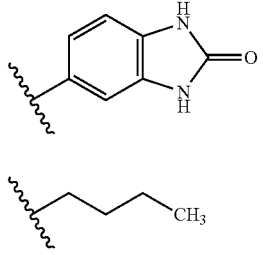 R-25
R-26
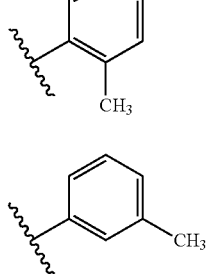 R-27
R-28
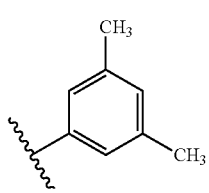 R-29

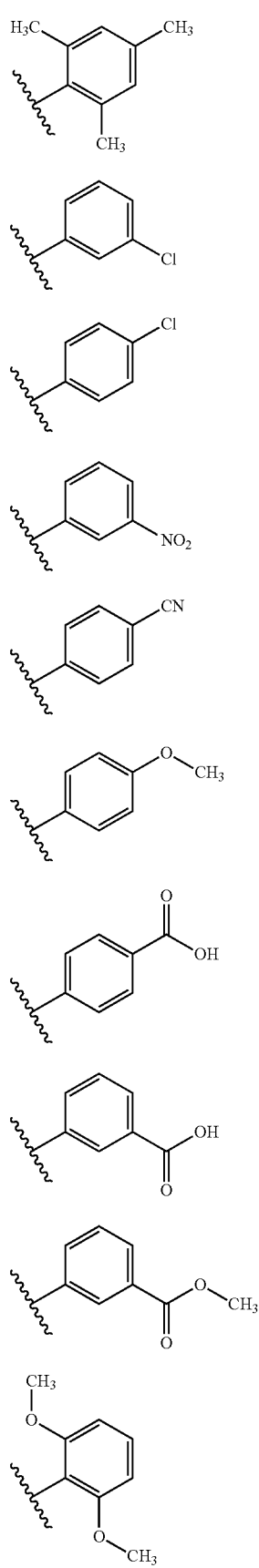
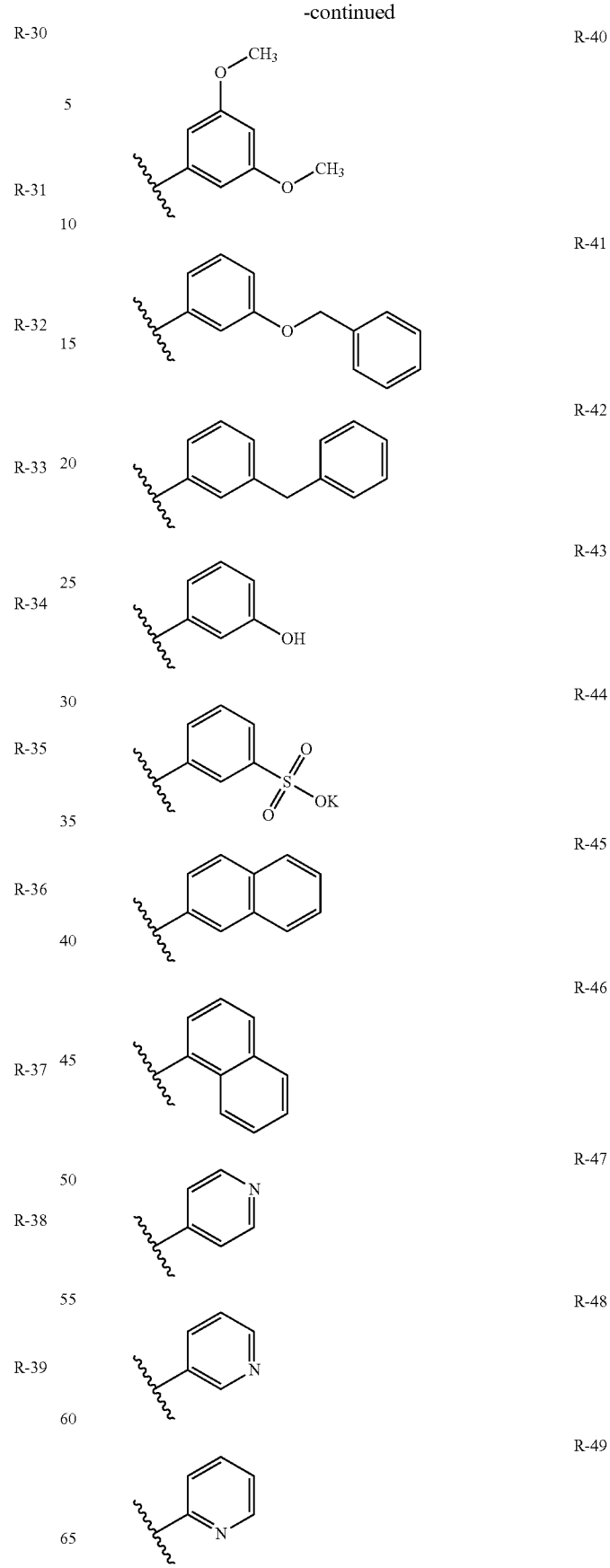

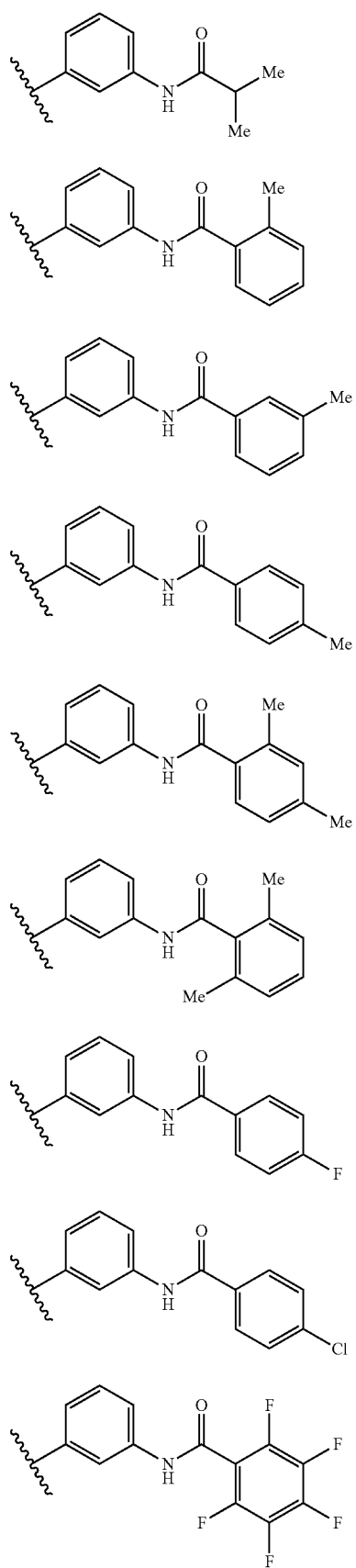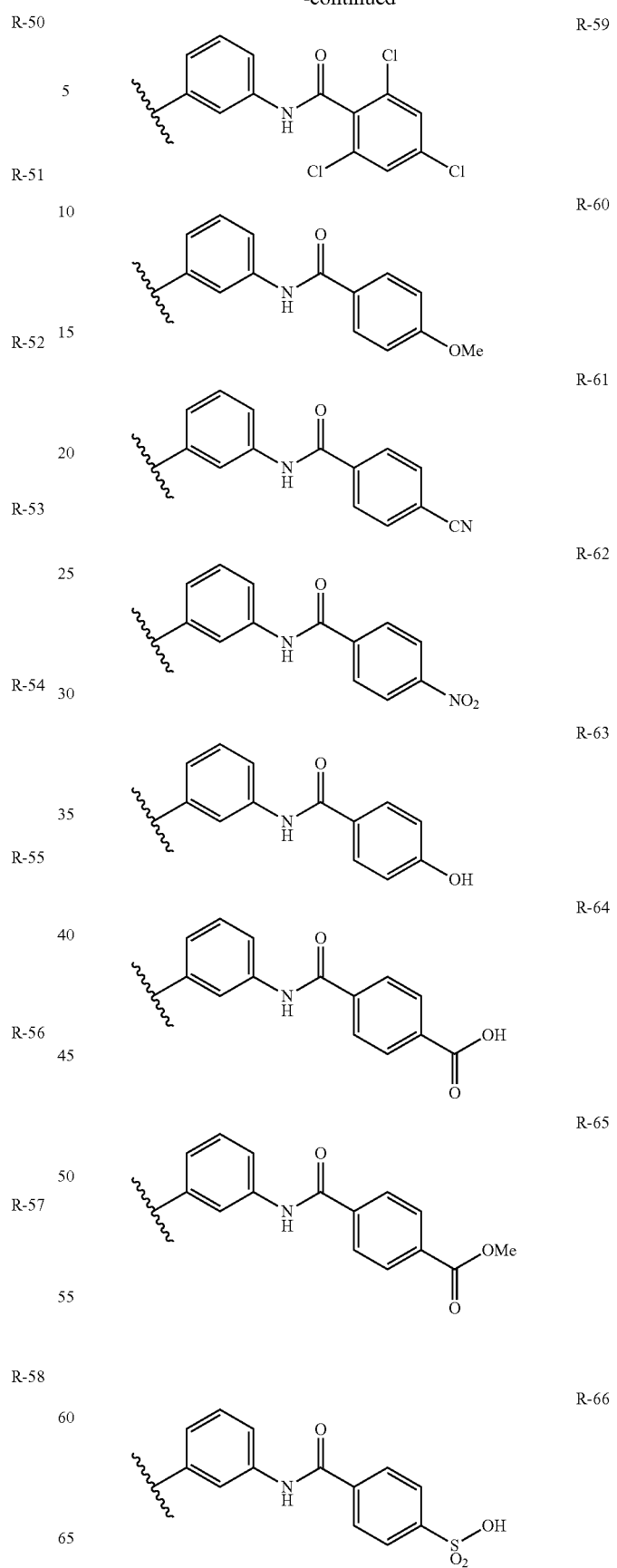

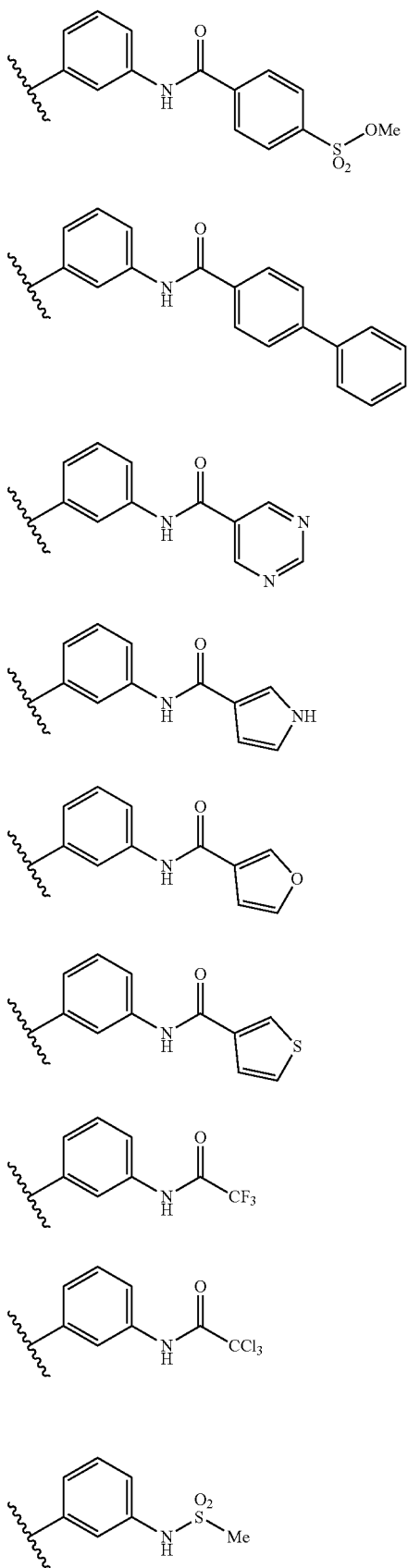

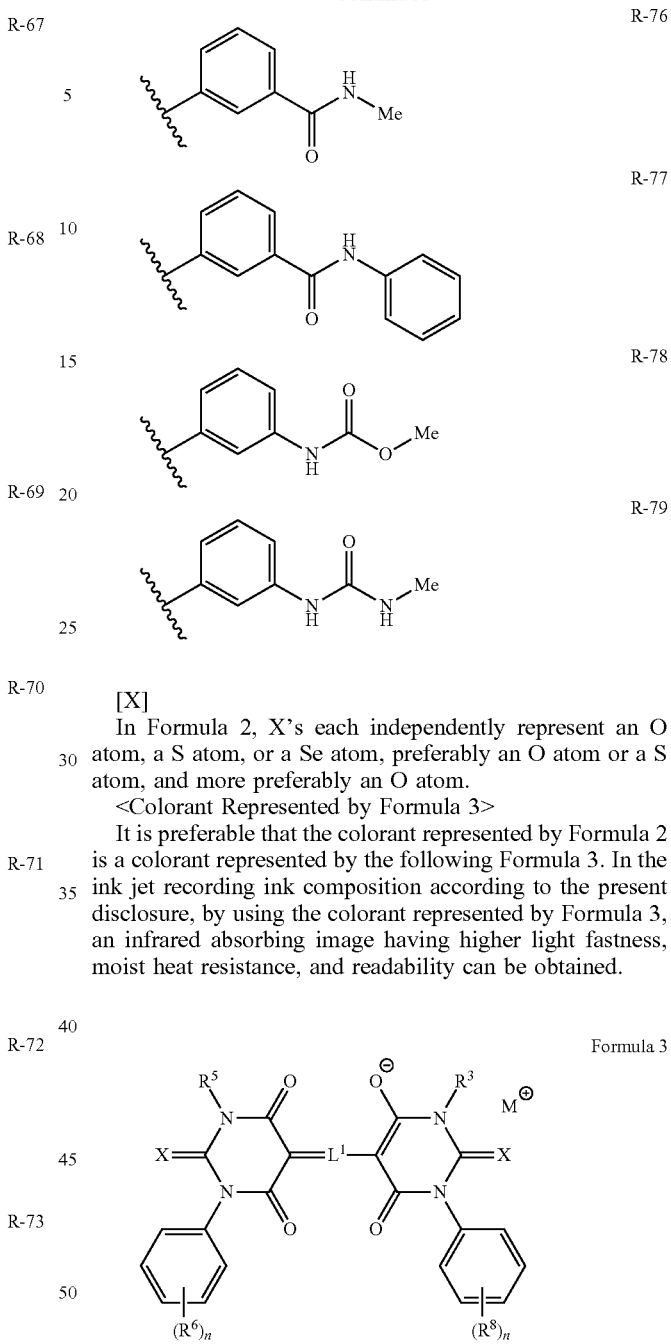

[X]

In Formula 2, X's each independently represent an O atom, a S atom, or a Se atom, preferably an O atom or a S atom, and more preferably an O atom.

<Colorant Represented by Formula 3>

It is preferable that the colorant represented by Formula 2 is a colorant represented by the following Formula 3. In the ink jet recording ink composition according to the present disclosure, by using the colorant represented by Formula 3, an infrared absorbing image having higher light fastness, moist heat resistance, and readability can be obtained.

In Formula 3, $M^+$ represents a proton or a monovalent alkali metal cation or organic cation, $L^1$ represents a methine chain including 5 or 7 methine groups, and a methine group at a center of the methine chain has a substituent represented by the following Formula A.

$$*\!-\!S^A\!-\!T^A \quad \text{Formula A}$$

In Formula A, $S^A$ represents a single bond, an alkylene group, an alkenylene group, an alkynylene group, —O—, —S—, —NR$^{L1}$—, —C(=O)—, —C(=O)O—, —C(=O)NR$^{L1}$—, —S(=O)$_2$—, —OR$^{L2}$—, or a group including a combination thereof, R$^{L1}$ represents a hydrogen atom, a halogen atom, an alkyl group, an aryl group, or a monovalent heterocyclic group, R$^{L2}$ represents an alkylene group, an arylene group, or a divalent heterocyclic group, $T^4$ represents a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group, in a case where $S^4$ represents a single bond or an alkylene group and $T^4$ represents an alkyl group, the total number of carbon atoms included in $S^4$ and $T^4$ is 3 or more, and * represents a binding site to the methine group at the center of the methine chain.

$R^5$ and $R^7$ each independently represent a hydrogen atom, an alkyl group, an aryl group, or a monovalent heterocyclic group, $R^6$ and $R^8$ each independently represent an alkyl group, a halogen atom, an alkenyl group, an aryl group, a monovalent heterocyclic group, a nitro group, a cyano group, —$OR^{L3}$, —$C(=O)R^{L3}$, —$C(=O)OR^{L3}$, —$OC(=O)R^{L3}$, —$N(R^{L3})_2$, —$NHC(=O)R^{L3}$, —$C(=O)N(R^{L3})_2$, —$NHC(=O)OR^{L3}$, —$OC(=O)N(R^{L3})_2$, —$NHC(=O)N(R^{L3})_2$, —$SR^{L3}$, —$S(=O)_2R^{L3}$, —$S(=O)_2OR^{L3}$, —$NHS(=O)_2R^{L3}$, or —$S(=O)_2N(R^{L3})_2$, $R^{L3}$'s each independently represent a hydrogen atom, an alkyl group, an alkenyl group, an aryl group, or a monovalent heterocyclic group, n's each independently represent an integer of 1 to 5, and X's each independently represent an O atom, a S atom, or a Se atom.

[$L^1$, $M^+$, and X]

In Formula 3, $L^1$, $M^+$, and X have the same definitions and the same preferable aspects as L, $M^+$, and X in Formula 2.

[$R^5$, $R^6$, $R^7$, and $R^8$]

$R^5$ and $R^7$ each independently represent a hydrogen atom, an alkyl group, an aryl group, or a monovalent heterocyclic group, and preferably a hydrogen atom.

The alkyl group, the aryl group, or the monovalent heterocyclic group represented by $R^5$ and $R^7$ has the same definition and the same preferable aspect as the alkyl group, the aryl group, or the monovalent heterocyclic group represented by $R^1$ and $R^3$.

$R^6$ and $R^8$ each independently represent an alkyl group, a halogen atom, an alkenyl group, an aryl group, a monovalent heterocyclic group, a nitro group, a cyano group, —$OR^{L3}$, —$C(=O)R^{L3}$, —$C(=O)OR^{L3}$, —$OC(=O)R^{L3}$, —$N(R^{L3})_2$, —$NHC(=O)R^{L3}$, —$C(=O)N(R^{L3})_2$, —$NHC(=O)OR^{L3}$, —$OC(=O)N(R^{L3})_2$, —$NHC(=O)N(R^{L3})_2$, —$SR^{L3}$, —$S(=O)_2R^{L3}$, —$S(=O)_2OR^{L3}$, —$NHS(=O)_2R^{L3}$, or —$S(=O)_2N(R^{L3})_2$.

$R^{L3}$ has the same definition and the same preferable range and the same preferable aspect as $R^{L3}$ in $R^1$ to $R^4$.

From the viewpoint of improving light fastness and moist heat resistance, it is preferable $R^6$ and $R^8$ each independently represent a hydrogen-bonding group. As the hydrogen-bonding group, for example, —OH, —$C(=O)OH$, —$NHC(=O)R^{L3}$, —$C(=O)N(R^{L3})_2$, —$NHC(=O)OR^{L3}$, —$OC(=O)N(R^{L3})_2$, —$NHC(=O)N(R^{L3})_2$, —$NHS(=O)_2R^{L3}$, or —$S(=O)_2N(R^{L3})_2$ is preferable, and —$NHC(=O)OR^{L4}$ is more preferable.

$R^{L3}$ has the same definition and the same preferable range and the same preferable aspect as $R^{L3}$ in $R^1$ to $R^4$.

$R^{L4}$ represents an alkyl group, preferably an alkyl group having 1 to 4 carbon atoms, and more preferably a methyl group.

In Formula 3, it is preferable that at least one selected from the group consisting of $R^5$, $R^6$, $R^7$, and $R^8$ has a hydrogen-bonding group, and it is more preferable that at least two selected from the group consisting of $R^5$, $R^6$, $R^7$, and $R^8$ have a hydrogen-bonding group.

In addition, from the viewpoint of synthesis suitability, it is preferable that $R^5$ and $R^7$ represent the same group and $R^6$ and $R^8$ represent the same group.

Further, it is more preferable that one of $R^5$ or $R^7$ represent a hydrogen atom and $R^6$ and $R^8$ represent the same hydrogen-bonding group.

[n]

n's each independently represent an integer of 1 to 5. From the viewpoint of dispersion easiness, n's each independently represent preferably an integer of 1 to 3, more preferably 1 or 2, and still more preferably 1.

<Method of Manufacturing Colorant Represented by any One of Formulae 1 to 3>

The colorant represented by any one of Formulae 1 to 3 used in the present disclosure can be synthesized with reference to, for example, methods described in JP2002-020648A and F. M. Harmer, "Heterocyclic Compounds Cyanine Dyes and Related Compounds" (John Willey&Sons, New York, London, 1964).

Hereinafter, specific examples (Compounds 1 to 8) of the colorant represented by any one Formulae 1 to 3 will be described. However, the colorant represented by any one Formulae 1 to 3 according to the present disclosure is not limited to these examples.

In the item "Skeleton" of the following tables, each of A, $R^a$, $R^b$, $R^c$, $R^d$, X, and $M^+$ of molecular skeletons SK-1 to SK-8 described below represents an atom, a molecule, or a group corresponding to each of A, $R^a$, $R^b$, $R^c$, $R^d$, X, and $M^+$ of the molecular skeletons SK-1 to SK-8. In addition, A-1 to A-4 described in the item "A" represent the above-described substituents A-1 to A-4, respectively. R-1 to R-79 descried in the items "$R^a$", "$R^b$", "$R^c$", and "$R^d$" represent the above-described substituents R-1 to R-49, respectively. Further, TEA described in the item "$M^+$" represents a triethylammonium ion. For example, the description "$K^+$:TEA=2:1" represents that a potassium ion and a triethylammonium ion are added at a molar ratio of 2:1.

Among the following specific examples, Among the following specific examples, Compound 1, Compound 8, Compound 9, Compound 10, Compound 11, Compound 13, Compound 17, Compound 19, Compound 20, Compound 21, Compound 24, Compound 25, Compound 26, Compound 28, Compound 2, Compound 56, Compound 57, Compound 58, Compound 59, Compound 61, Compound 65, Compound 67, Compound 68, Compound 69, Compound 72, Compound 73, Compound 74, Compound 76, Compound 153, Compound 6, Compound 154, Compound 155, Compound 156, Compound 158, Compound 162, Compound 164, Compound 165, Compound 166, Compound 169, Compound 170, Compound 171, Compound 173, Compound 201, Compound 202, Compound 203, Compound 204, Compound 205, Compound 207, Compound 211, Compound 213, Compound 214, Compound 215, Compound 218, Compound 219, Compound 220, Compound 222, Compound 250, Compound 251, Compound 252, Compound 253, Compound 254, Compound 256, Compound 260, Compound 262, Compound 263, Compound 264, Compound 267, Compound 268, Compound 269, Compound 271, Compound 299, Compound 300, Compound 301, Compound 302, Compound 303, Compound 305, Compound 307, Compound 309, Compound 311, Compound 312, Compound 313, Compound 316, Compound 318, Compound 320, Compound 348, Compound 349, Compound 350, Compound 351, Compound 352, Compound 354, Compound 358, Compound 360, Compound 361, Compound 362, Compound 365, Compound 366, Compound 367, Compound 369, Compound 936, Compound 937, Compound 938, Compound 939, Compound 940, Compound 942, Compound 946, Compound 948, Compound 949, Compound 951, Compound 953, Compound 954, Compound 955, Compound 957, Compound 1622, Compound 1623, Compound 1624, Compound 1625, Compound 1626, Compound 1628, Compound 1632, Compound 1634, Compound 1635, Compound 1636, Compound 1639, Compound 1640, Compound 1641, Compound 1643, Compound 1867, Compound 1868, Compound 1869, Compound 1870, Compound 1871, Compound 1873, Compound 1877, Compound 1878, Compound 1879, Compound 1880, Compound 1881, Compound 1884, Compound 1885, Compound 1886, Compound 1888, Compound 1965, Compound 1966, Compound 1967, Compound 1968, Compound 1969, Compound 1971, Compound 1975, Compound 1977, Compound 1978, Compound 1979, Compound 1982, Compound 1983, Compound 1984, Compound 1986, Compound 2014, Compound 2015, Compound 2016, Compound 2017, Compound 2018, Compound 2020, Compound 2024, Compound 2026, Compound 2027, Compound 2028, Compound 2031, Compound 2032, Compound 2033, Compound 2035, Compound 2161, Compound 2162, Compound 2163, Compound 2164, Compound 2165, Compound 2167, Compound 2171, Compound 2173, Compound 2174, Compound 2175, Compound 2177, Compound 2178, Compound 2179, Compound 2181, Compound 2308, Compound 2309, Compound 2310, Compound 2311, Compound 2312, Compound 2314, Compound 2318, Compound 2320, Compound 2321, Compound 2322, Compound 2325, Compound 2326, Compound 2327, Compound 2329, Compound 2504, Compound 2505, Compound 2506, Compound 2507, Compound 2510, Compound 2511, Compounds 2514 to 2533, Compound 2534, Compound 2535, Compound 2536, Compound 2537, Compound 2540, Compound 2541, Compounds 2544 to 2563, Compound 2564, Compound 2565, Compound 2566, Compound 2567, Compound 2570, Compound 2571, Compounds 2574 to 2593, Compound 2594, Compound 2595, Compound 2596, Compound 2597, Compound 2600, Compound 2601, Compound 2604, Compound 2605, Compound 2606, Compound 2607, Compound 2608, Compound 2623, Compound 2624, Compound 2625, Compound 2626, Compound 2627, Compound 2630, Compound 2631, Compound 2634, Compound 2635, Compound 2636, Compound 2637, Compound 2638, Compound 2653, Compound 2654, Compound 2655, Compound 2656, Compound 2657, Compound 2660, Compound 2661, Compound 2664, Compound 2665, Compound 2666, Compound 2667, Compound 2668, Compound 2683, Compound 2684, Compound 2685, Compound 2686, Compound 2687, Compound 2690, Compound 2691, Compounds 2694 to 2713, Compound 2774, Compound 2775, Compound 2776, Compound 2777, Compound 2780, Compound 2781, Compound 2784, Compound 2785, Compound 2786, Compound 2787, Compound 2788, Compound 2803, Compound 2834, Compound 2835, Compound 2836, Compound 2837, Compound 2840, Compound 2841, Compound 2844, Compound 2845, Compound 2846, Compound 2847, Compound 2848, Compound 2863, Compound 2864, Compound 2865, Compound 2866, Compound 2867, Compound 2870, Compound 2871, Compounds 2874 to 2893, Compound 2894, Compound 2895, Compound 2896, Compound 2897, Compound 2900, Compound 2901, Compounds 2904 to 2923, Compound 2924, Compound 2925, Compound 2926, Compound 2927, Compound 2930, Compound 2931, Compound 2934, Compound 2935, Compound 2936, Compound 2937, Compound 2938, Compound 2953, Compound 2954, Compound 2955, Compound 2956, Compound 2957, Compound 2960, Compound 2961, Compound 2964, Compound 2965, Compound 2966, Compound 2967, Compound 2968, Compound 2983, Compound 2984, Compound 2985, Compound 2987, Compound 2989, Compound 2991, Compound 2992, Compound 2993, Compound 2994, Compound 2995, Compound 2996, Compound 3010, Compounds 3012 to 3018, Compound 3032, Compound 3033, Compound 3034, Compound 3036, Compound 3038, Compound 3040, Compound 3041, Compound 3042, Compound 3043, Compound 3044, Compound 3045, Compound 3059, Compounds 3061 to 3067, Compound 3081, Compound 3082, Compound 3083, Compound 3085, Compound 3087, Compound 3089, Compound 3090, Compound 3091, Compound 3092, Compound 3093, Compound 3094, Compound 3108, Compounds 3110 to 3116, Compound 3130, Compound 3278, Compound 3279, Compound 3281, Compound 3283, Compound 3285, Compound 3286, Compound 3287, Compound 3288, Compound 3289, Compound 3290, Compound 3304, Compounds 3306 to 3312, Compound 3326, Compound 3425, Compound 3246, Compound 3428, Compound 3430, Compound 3432, Compound 3433, Compound 3434, Compound 3435, Compound 3436, Compound 3437, Compound 3451, Compounds 3453 to 3459, Compound 3473, Compound 3523, Compound 3524, Compound 3526, Compound 3528, Compounds 3530 to 3535, Compound 3549, Compounds 3551 to 3557, Compound 3571, Compounds 3670 to 3675, Compounds 3677 to 3683, Compound 3685, Compound 3696, Compounds 3698 to 3724, Compounds 3726 to 3732, Compound 3734, Compound 3745, Compounds 3747 to 3773, Compounds 3775 to 3781, Compound 3783, Compound 3794, Compounds 3796 to 3818, Compound 3820, Compound 3822, Compounds 3824 to 3830, Compound 3832, Compound 3843, Compounds 3845 to 3851, Compound 3865, Compound 3866, Compound 3867, Compound 3869, Compound 3871, Compounds 3873 to 3879, Compound 3881, Compound 3892, Compounds 3894 to 3900, Compound 3914, Compound 3915, Compound 3916, Compound 3918, Compound 3920, Compounds 3922 to 3928, Compound 3930, Compound 3941, Compounds 3943 to 3949, Compound 3963, Compounds 3964 to 3969, Compounds 3971 to 3977, Compound 3979, Compound 3990, Compounds 3992 to 4014, Compound 4016, Compound 4018, Compounds 4020 to 4026, Compound 4028, Compound 4039, Compounds 4041 to 4047, Compound 4061, Compound 4062, Compound 4063, Compound 4065, Compound 4067, Compounds 4069 to 4075, Compound 4077, Compound 4088, Compounds 4090 to 4096, Compounds 4110 to 4116, Compounds 4118 to 4124, Compound 4126, Compound 4137, Compounds 4139 to 4161, Compound 4163, Compound 4165, Compounds 4167 to 4173, Compound 4175, Compound 4186, Compounds 4188 to 4194, Compound 4208, Compounds 4209 to 4214, Compounds 4216 to 4222, Compound 4224, Compound 4235, Compounds 4237 to 4259, Compound 4261, Compound 4263, Compounds 4265 to 4271, Compound 4273, Compound 4284, Compounds 4286 to 4292, Compound 4306, Compound 4307, Compound 4308, Compound 4310, Compound 4312, Compounds 4314 to 4320, Compound 4322, Compound 4333, Compounds 4335 to 4341, Compound 4355, Compounds 4356 to 4361, Compounds 4363 to 4369, Compound 4371, Compound 4382, Compounds 4384 to 4410, Compounds 4412 to 4418, Compound 4420, Compound 4431, Compounds 4433 to 4459, Compounds 4461 to 4467, Compound 4469, Compound 4480, Compounds 4482 to 4504, Compound 4506, Compound 4508, Compounds 4510 to 4516, Compound 4529, Compounds 4531 to 4537, Compound 4551, Compound 4552, Compound 4553, Compound 4555, Compound 4557, Compounds 4559 to 4565, Compound 4578, Compounds 4580 to 4586, Compound 4600, Compound 4601, Compound 4602, Compound 4604, Compound 4606, Compounds 4608 to 4614, Compound 4627, Compounds 4629 to 4635, Compounds 4649 to 4655, Compounds 4657 to 4663, Compound 4665, Compound 4676, Compounds 4678 to 4700, Compound 4702, Compound 4704, Compounds 4706 to 4712, Compound 4725, Compounds 4727 to 4733, Compound 4747, Compound 4748, Compound 4749, Compound 4751, Compound 4753, Compounds 4755 to 4761, Compound 4774, Compounds 4776 to 4782, Compound 4796, Compounds 4797 to 4802, Compounds 4804 to 4810, Compound 4812, Compound 4823, Compounds 4825 to 4847, Compound 4849, Compound 4851, Compounds 4853 to 4859, Compound 4872, Compounds 4874 to 4880, Compound 4872, Compounds 4874 to 4880, Compound 4894, Compounds 4895 to 4900, Compounds 4902 to 4908, Compound 4910, Compound 4921, Compounds 4923 to 4945, Compound 4947, Compound 4949, Compounds 4951 to 4957, Compound 4970, Compounds 4972 to 4978, Compound 4992, Compound 4993, Compound 4994, Compound 4996, Compound 4998, Compounds 5000 to 5006, Compound 5019, Compounds 5021 to 5027, Compound 5041, Compounds 5042 to 5047, Compounds 5049 to 5055, Compound 5057, Compound 5068, Compounds 5070 to 5096, Compounds 5098 to 5104, Compound 5106, Compound 5117, Compounds 5119 to 5145, Compounds 5147 to 5153, Compound 5155, Compound 5166, Compounds 5168 to 5190, Compound 5192, Compound 5194, Compounds 5196 to 5202, Compound 5215, Compounds 5217 to 5223, Compound 5237, Compound 5238, Compound 5239, Compound 5241, Compound 5243, Compounds 5245 to 5251, Compound 5264, Compounds 5266 to 5272, Compound 5286, Compound 5287, Compound 5288, Compound 5290, Compound 5292, Compounds 5294 to 5300, Compound 5313, Compounds 5315 to 5321, Compounds 5335 to 5341, Compounds 5343 to 5349, Compound 5351, Compound 5362, Compounds 5364 to 5386, Compound 5388, Compound 5390, Compounds 5392 to 5398, Compound 5411, Compounds 5413 to 5419, Compound 5433, Compound 5434, Compound 5435, Compound 5437, Compound 5439, Compounds 5441 to 5447, Compound 5460, Compounds 5462 to 5468, Compounds 5482 to 5488, Compounds 5490 to 5496, Compound 5498, Compound 5509, Compounds 5511 to 5533, Compound 5535, Compound 5537, Compounds 5539 to 5545, Compound 5558, Compounds 5560 to 5566, Compounds 5580 to 5586, Compounds 5588 to 5594, Compound 5596, Compound 5607, Compounds 5609 to 5631, Compound 5633, Compound 5635, Compounds 5637 to 5643, Compound 5656, Compounds 5658 to 5664, Compound 5678, Compound 5679, Compound 5680, Compound 5682, Compound 5684, Compounds 5686 to 5692, Compound 5705, Compounds 5707 to 5713, or, Compound 5727 is preferable, and Compound 1, Compound 8, Compound 10, Compound 13, Compound 17, Compound 19, Compound 20, Compound 21, Compound 2, Compound 25, Compound 56, Compound 58, Compound 61, Compound 65, Compound 67, Compound 68, Compound 69, Compound 73, Compound 153, Compound 6, Compound 155, Compound 158, Compound 162, Compound 164, Compound 165, Compound 166, Compound 170, Compound 348, Compound 349, Compound 351, Compound 354, Compound 358, Compound 360, Compound 361, Compound 362, Compound 366, Compound 1867, Compound 1868, Compound 1870, Compound 1873, Compound 1877, Compound 1878, Compound 1879, Compound 1881, Compound 1885, Compound 2014, Compound 2015, Compound 2017, Compound 2020, Compound 2024, Compound 2026, Compound 2027, Compound 2028, Compound 2032, Compounds 2504 to 2507, Compound 2510, Compound 2511, Compounds 2514 to 2518, Compounds 2533 to 2537, Compound 2540, Compound 2541, Compounds 2544 to 2548, Compound 2563, Compounds 2564 to 2567, Compound 2570, Compound 2571, Compounds 2574 to 2578, Compounds 2684 to 2687, Compound 2690, Compound 2691, Compounds 2694 to 2698, Compounds 2864 to 2867, Compound 2870, Compound 2871, Compounds 2874 to 2878, Compound 2893, Compounds 2894 to 2897, Compound 2900, Compound 2901, Compounds 2904 to 2908, Compound 2923, Compound 2989, Compound 3670, Compound 3671, Compound 3673, Compound 3675, Compounds 3677 to 3682, Compound 3696, Compounds 3698 to 3704, Compound 3718, Compound 3719, Compound 3720, Compound 3722, Compound 3724, Compound 3726, Compounds 3727 to 3731, Compound 3745, Compounds 3747 to 3753, Compound 3767, Compound 3768, Compound 3769, Compound 3771, Compound 3773, Compounds 3775 to 3780, Compound 3794, Compounds 3796 to 3801, Compound 3964, Compound 3965, Compound 3967, Compound 3969, Compounds 3971 to 3976, Compound 3990, Compounds 3992 to 3998, Compound 4012, Compound 4111, Compound 4112, Compound 4114, Compound 4116, Compounds 4118 to 4123, Compound 4137, Compounds 4139 to 4145, Compound 4159, Compound 4209, Compound 4210, Compound 4212, Compound 4214, Compounds 4216 to 4221, Compound 4235, Compounds 4237 to 4243, Compound 4257, Compound 4356, Compound 4357, Compound 4359, Compound 4361, Compounds 4363 to 4368, Compound 4382, Compounds 4384 to 4390, Compound 4404, Compound 4405, Compound 4406, Compound 4408, Compound 4410, Compounds 4412 to 4417, Compound 4431, Compounds 4433 to 4439, Compound 4453, Compound 4454, Compound 4455, Compound 4457, Compound 4459, Compounds 4461 to 4466, Compound 4480, Compounds 4482 to 4488, Compound 4502, Compound 4650, Compound 4651, Compound 4653, Compound 4655, Compounds 4657 to 4662, Compound 4676, Compound 4678, Compounds 4679 to 4684, Compound 4698, Compound 4797, Compound 4798, Compound 4800, Compound 4802, Compounds 4804 to 4809, Compound 4823, Compounds 4825 to 4831, Compound 4845, Compound 4895, Compound 4896, Compound 4898, Compound 4900, Compounds 4902 to 4907, Compound 4921, Compounds 4923 to 4929, Compound 4943, Compound 5042, Compound 5043, Compound 5045, Compound 5047, Compounds 5049 to 5054, Compound 5068, Compounds 5070 to 5076, Compound 5090, Compound 5091, Compound 5092, Compound 5094, Compound 5096, Compounds 5098 to 5103, Compound 5117, Compounds 5119 to 5125, Compound 5139, Compound 5140, Compound 5141, Compound 5143, Compound 5145, Compounds 5147 to 5152, Compound 5166, Compounds 5168 to 5174, Compound 5188, Compound 5336, Compound 5337, Compound 5339, Compound 5341, Compounds 5343 to 5348, Compound 5362, Compounds 5364 to 5370, Compound 5384, Compound 5483, Compound 5484, Compound 5486, Compound 5488, Compounds 5490 to 5495, Compound 5509, Compounds 5511 to 5517, or, Compound 5531 is more preferable.

TABLE 1

| | Skeleton | A | $R^a$ | $R^b$ | $R^c$ | $R^d$ | X | $M^+$ |
|---|---|---|---|---|---|---|---|---|
| Compound 1 | SK-1 | A-1 | H | R-1 | H | R-1 | O | $K^+$ |
| Compound 2 | SK-1 | A-2 | H | R-1 | H | R-1 | O | $K^+$ |
| Compound 3 | SK-1 | A-1 | H | R-1 | H | R-1 | S | $K^+$ |
| Compound 4 | SK-1 | A-1 | H | R-1 | H | R-1 | O | TEA |
| Compound 5 | SK-1 | A-3 | H | R-1 | H | R-1 | O | $K^+$:TEA = 2:1 |
| Compound 6 | SK-1 | A-4 | H | R-2 | H | R-2 | O | $K^+$ |
| Compound 7 | SK-1 | A-4 | R-3 | R-3 | R-3 | R-3 | O | $K^+$ |

In the following Compounds 8 to 2356, the skeleton is SK-1, $R^a$ and $R^c$ in SK-1 represent a hydrogen atom (H), X represents an oxygen atom (O), $M^+$ represents a potassium ion ($K^+$), and A, $R^b$, and $R^d$ in SK-1 are as shown in Tables 2 to 22 below.

In the following Compounds 2357 to 2376, the skeleton is SK-2, $R^a$ and $R^c$ in SK-2 represent H, X represents O, $M^+$ represents $K^+$, and A, $R^b$, and $R^d$ in SK-2 are as shown in Tables 22 below.

In the following Compounds 2377 to 2396, the skeleton is SK-4, $R^a$ and $R^c$ in SK-4 represent H, X represents O, $M^+$ represents $K^+$, and A, $R^b$, and $R^d$ in SK-4 are as shown in Tables 22 below.

In the following Compounds 2397 to 2417, the skeleton is SK-5, $R^a$ and $R^c$ in SK-5 represent H, X represents O, $M^+$ represents $K^+$, and A, $R^b$, and $R^d$ in SK-5 are as shown in Tables 22 below.

In the following Compounds 2418 to 2436, the skeleton is SK-6, $R^a$ and $R^c$ in SK-6 represent H, X represents O, $M^+$ represents $K^+$, and A, $R^b$, and $R^d$ in SK-6 are as shown in Tables 22 below.

In the following Compounds 2437 to 2456, the skeleton is SK-8, $R^a$ and $R^c$ in SK-8 represent H, X represents O, $M^+$ represents $K^+$, and A, $R^b$, and $R^d$ in SK-8 are as shown in Tables 22 below.

In the following Compounds 2457 to 2466, the skeleton is SK-3, $R^a$ and $R^c$ in SK-3 represent H, X represents O, $M^+$ represents $K^+$, $Z^a$ and $Z^b$ represent H, and A, $R^b$, and $R^d$ in SK-3 are as shown in Tables 23 below.

In the following Compounds 2467 to 2476, the skeleton is SK-7, $R^a$ and $R^c$ in SK-7 represent H, X represents O, $M^+$ represents $K^+$, $Z^a$ and $Z^b$ represent H, and A, $R^b$, and $R^d$ in SK-7 are as shown in Tables 23 below.

In the following Compounds 2477 to 2486, the skeleton is SK-3, $R^a$ and $R^c$ in SK-3 represent H, X represents O, $M^+$ represents $K^+$, $Z^a$ and $Z^b$ represent $CH_3$ (methyl group), and A, $R^b$, and $R^d$ in SK-3 are as shown in Tables 23 below.

In the following Compounds 2487 to 2496, the skeleton is SK-7, $R^a$ and $R^c$ in SK-7 represent H, X represents O, $M^+$ represents $K^+$, $Z^a$ and $Z^b$ represent $CH_3$, and A, $R^b$, and $R^d$ in SK-7 are as shown in Tables 23 below.

In the following Compounds 2504 to 2983, the skeleton is SK-1, $R^a$ and $R^c$ in SK-1 represent a hydrogen atom (H), X represents an oxygen atom (O), $M^+$ represents a potassium ion ($K^+$), and A, $R^b$, and $R^d$ in SK-1 are as shown in Tables 24 to 28 below.

In the following Compounds 2984 to 3669, the skeleton is SK-1, $R^a$ and $R^c$ in SK-1 represent a hydrogen atom (H), X represents an oxygen atom (O), $M^+$ represents a lithium ion ($Li^+$), and A, $R^b$, and $R^d$ in SK-1 are as shown in Tables 29 to 34 below.

In the following Compounds 3670 to 4355, the skeleton is SK-1, $R^a$ and $R^c$ in SK-1 represent a hydrogen atom (H), X represents an oxygen atom (O), $M^+$ represents a sodium ion ($Na^+$), and A, $R^b$, and $R^d$ in SK-1 are as shown in Tables 35 to 40 below.

In the following Compounds 4356 to 5041, the skeleton is SK-1, $R^a$ and $R^c$ in SK-1 represent a hydrogen atom (H), X represents an oxygen atom (O), $M^+$ represents a rubidium ion ($Rb^+$), and A, $R^b$, and $R^d$ in SK-1 are as shown in Tables 41 to 46 below.

In the following Compounds 5042 to 5727, the skeleton is SK-1, $R^a$ and $R^c$ in SK-1 represent a hydrogen atom (H), X represents an oxygen atom (O), $M^+$ represents a cesium ion ($Cs^+$), and A, $R^b$, and $R^d$ in SK-1 are as shown in Tables 47 to 52 below.

TABLE 2

| Compound | A | $R^b$, $R^d$ |
|---|---|---|
| 8 | A-1 | R-2 |
| 9 | A-1 | R-3 |
| 10 | A-1 | R-4 |
| 11 | A-1 | R-5 |
| 12 | A-1 | R-6 |
| 13 | A-1 | R-7 |
| 14 | A-1 | R-8 |
| 15 | A-1 | R-9 |
| 16 | A-1 | R-10 |
| 17 | A-1 | R-11 |
| 18 | A-1 | R-12 |
| 19 | A-1 | R-13 |
| 20 | A-1 | R-14 |
| 21 | A-1 | R-15 |
| 22 | A-1 | R-16 |
| 23 | A-1 | R-17 |
| 24 | A-1 | R-18 |
| 25 | A-1 | R-19 |
| 26 | A-1 | R-20 |
| 27 | A-1 | R-21 |
| 28 | A-1 | R-22 |
| 29 | A-1 | R-23 |
| 30 | A-1 | R-24 |
| 31 | A-1 | R-25 |
| 32 | A-1 | R-26 |
| 33 | A-1 | R-27 |
| 34 | A-1 | R-28 |
| 35 | A-1 | R-29 |
| 36 | A-1 | R-30 |
| 37 | A-1 | R-31 |
| 38 | A-1 | R-32 |
| 39 | A-1 | R-33 |
| 40 | A-1 | R-34 |
| 41 | A-1 | R-35 |
| 42 | A-1 | R-36 |
| 43 | A-1 | R-37 |
| 44 | A-1 | R-38 |
| 45 | A-1 | R-39 |
| 46 | A-1 | R-40 |
| 47 | A-1 | R-41 |
| 48 | A-1 | R-42 |
| 49 | A-1 | R-43 |
| 50 | A-1 | R-44 |
| 51 | A-1 | R-45 |
| 52 | A-1 | R-46 |
| 53 | A-1 | R-47 |

TABLE 2-continued

| Compound | A | $R^b$, $R^d$ |
|---|---|---|
| 54 | A-1 | R-48 |
| 55 | A-1 | R-49 |
| 56 | A-2 | R-2 |
| 57 | A-2 | R-3 |
| 58 | A-2 | R-4 |
| 59 | A-2 | R-5 |
| 60 | A-2 | R-6 |
| 61 | A-2 | R-7 |
| 62 | A-2 | R-8 |
| 63 | A-2 | R-9 |
| 64 | A-2 | R-10 |
| 65 | A-2 | R-11 |
| 66 | A-2 | R-12 |
| 67 | A-2 | R-13 |
| 68 | A-2 | R-14 |
| 69 | A-2 | R-15 |
| 70 | A-2 | R-16 |
| 71 | A-2 | R-17 |
| 72 | A-2 | R-18 |
| 73 | A-2 | R-19 |
| 74 | A-2 | R-20 |
| 75 | A-2 | R-21 |
| 76 | A-2 | R-22 |
| 77 | A-2 | R-23 |
| 78 | A-2 | R-24 |
| 79 | A-2 | R-25 |
| 80 | A-2 | R-26 |
| 81 | A-2 | R-27 |
| 82 | A-2 | R-28 |
| 83 | A-2 | R-29 |
| 84 | A-2 | R-30 |
| 85 | A-2 | R-31 |
| 86 | A-2 | R-32 |
| 87 | A-2 | R-33 |
| 88 | A-2 | R-34 |
| 89 | A-2 | R-35 |
| 90 | A-2 | R-36 |
| 91 | A-2 | R-37 |
| 92 | A-2 | R-38 |
| 93 | A-2 | R-39 |
| 94 | A-2 | R-40 |
| 95 | A-2 | R-41 |
| 96 | A-2 | R-42 |
| 97 | A-2 | R-43 |
| 98 | A-2 | R-44 |
| 99 | A-2 | R-45 |
| 100 | A-2 | R-46 |
| 101 | A-2 | R-47 |
| 102 | A-2 | R-48 |
| 103 | A-2 | R-49 |
| 104 | A-3 | R-1 |
| 105 | A-3 | R-2 |
| 106 | A-3 | R-3 |
| 107 | A-3 | R-4 |
| 108 | A-3 | R-5 |
| 109 | A-3 | R-6 |
| 110 | A-3 | R-7 |
| 111 | A-3 | R-8 |
| 112 | A-3 | R-9 |
| 113 | A-3 | R-10 |
| 114 | A-3 | R-11 |
| 115 | A-3 | R-12 |
| 116 | A-3 | R-13 |
| 117 | A-3 | R-14 |
| 118 | A-3 | R-15 |
| 119 | A-3 | R-16 |
| 120 | A-3 | R-17 |
| 121 | A-3 | R-18 |
| 122 | A-3 | R-19 |
| 123 | A-3 | R-20 |
| 124 | A-3 | R-21 |

TABLE 3

| Compound | A | $R^b$, $R^d$ |
|---|---|---|
| 125 | A-3 | R-22 |
| 126 | A-3 | R-23 |
| 127 | A-3 | R-24 |
| 128 | A-3 | R-25 |
| 129 | A-3 | R-26 |
| 130 | A-3 | R-27 |
| 131 | A-3 | R-28 |
| 132 | A-3 | R-29 |
| 133 | A-3 | R-30 |
| 134 | A-3 | R-31 |
| 135 | A-3 | R-32 |
| 136 | A-3 | R-33 |
| 137 | A-3 | R-34 |
| 138 | A-3 | R-35 |
| 139 | A-3 | R-36 |
| 140 | A-3 | R-37 |
| 141 | A-3 | R-38 |
| 142 | A-3 | R-39 |
| 143 | A-3 | R-40 |
| 144 | A-3 | R-41 |
| 145 | A-3 | R-42 |
| 146 | A-3 | R-43 |
| 147 | A-3 | R-44 |
| 148 | A-3 | R-45 |
| 149 | A-3 | R-46 |
| 150 | A-3 | R-47 |
| 151 | A-3 | R-48 |
| 152 | A-3 | R-49 |
| 153 | A-4 | R-1 |
| 154 | A-4 | R-3 |
| 155 | A-4 | R-4 |
| 156 | A-4 | R-5 |
| 157 | A-4 | R-6 |
| 158 | A-4 | R-7 |
| 159 | A-4 | R-8 |
| 160 | A-4 | R-9 |
| 161 | A-4 | R-10 |
| 162 | A-4 | R-11 |
| 163 | A-4 | R-12 |
| 164 | A-4 | R-13 |
| 165 | A-4 | R-14 |
| 166 | A-4 | R-15 |
| 167 | A-4 | R-16 |
| 168 | A-4 | R-17 |
| 169 | A-4 | R-18 |
| 170 | A-4 | R-19 |
| 171 | A-4 | R-20 |
| 172 | A-4 | R-21 |
| 173 | A-4 | R-22 |
| 174 | A-4 | R-23 |
| 175 | A-4 | R-24 |
| 176 | A-4 | R-25 |
| 177 | A-4 | R-26 |
| 178 | A-4 | R-27 |
| 179 | A-4 | R-28 |
| 180 | A-4 | R-29 |
| 181 | A-4 | R-30 |
| 182 | A-4 | R-31 |
| 183 | A-4 | R-32 |
| 184 | A-4 | R-33 |
| 185 | A-4 | R-34 |
| 186 | A-4 | R-35 |
| 187 | A-4 | R-36 |
| 188 | A-4 | R-37 |
| 189 | A-4 | R-38 |
| 190 | A-4 | R-39 |
| 191 | A-4 | R-40 |
| 192 | A-4 | R-41 |
| 193 | A-4 | R-42 |
| 194 | A-4 | R-43 |
| 195 | A-4 | R-44 |
| 196 | A-4 | R-45 |
| 197 | A-4 | R-46 |
| 198 | A-4 | R-47 |
| 199 | A-4 | R-48 |
| 200 | A-4 | R-49 |
| 201 | A-5 | R-1 |
| 202 | A-5 | R-2 |

TABLE 3-continued

| Compound | A | $R^b$, $R^d$ |
|---|---|---|
| 203 | A-5 | R-3 |
| 204 | A-5 | R-4 |
| 205 | A-5 | R-5 |
| 206 | A-5 | R-6 |
| 207 | A-5 | R-7 |
| 208 | A-5 | R-8 |
| 209 | A-5 | R-9 |
| 210 | A-5 | R-10 |
| 211 | A-5 | R-11 |
| 212 | A-5 | R-12 |
| 213 | A-5 | R-13 |
| 214 | A-5 | R-14 |
| 215 | A-5 | R-15 |
| 216 | A-5 | R-16 |
| 217 | A-5 | R-17 |
| 218 | A-5 | R-18 |
| 219 | A-5 | R-19 |
| 220 | A-5 | R-20 |
| 221 | A-5 | R-21 |
| 222 | A-5 | R-22 |
| 223 | A-5 | R-23 |
| 224 | A-5 | R-24 |
| 225 | A-5 | R-25 |
| 226 | A-5 | R-26 |
| 227 | A-5 | R-27 |
| 228 | A-5 | R-28 |
| 229 | A-5 | R-29 |
| 230 | A-5 | R-30 |
| 231 | A-5 | R-31 |
| 232 | A-5 | R-32 |
| 233 | A-5 | R-33 |
| 234 | A-5 | R-34 |
| 235 | A-5 | R-35 |
| 236 | A-5 | R-36 |
| 237 | A-5 | R-37 |
| 238 | A-5 | R-38 |
| 239 | A-5 | R-39 |
| 240 | A-5 | R-40 |
| 241 | A-5 | R-41 |

TABLE 4

| Compound | A | $R^b$, $R^d$ |
|---|---|---|
| 242 | A-5 | R-42 |
| 243 | A-5 | R-43 |
| 244 | A-5 | R-44 |
| 245 | A-5 | R-45 |
| 246 | A-5 | R-46 |
| 247 | A-5 | R-47 |
| 248 | A-5 | R-48 |
| 249 | A-5 | R-49 |
| 250 | A-6 | R-1 |
| 251 | A-6 | R-2 |
| 252 | A-6 | R-3 |
| 253 | A-6 | R-4 |
| 254 | A-6 | R-5 |
| 255 | A-6 | R-6 |
| 256 | A-6 | R-7 |
| 257 | A-6 | R-8 |
| 258 | A-6 | R-9 |
| 259 | A-6 | R-10 |
| 260 | A-6 | R-11 |
| 261 | A-6 | R-12 |
| 262 | A-6 | R-13 |
| 263 | A-6 | R-14 |
| 264 | A-6 | R-15 |
| 265 | A-6 | R-16 |
| 266 | A-6 | R-17 |
| 267 | A-6 | R-18 |
| 268 | A-6 | R-19 |
| 269 | A-6 | R-20 |
| 270 | A-6 | R-21 |
| 271 | A-6 | R-22 |
| 272 | A-6 | R-23 |
| 273 | A-6 | R-24 |
| 274 | A-6 | R-25 |
| 275 | A-6 | R-26 |
| 276 | A-6 | R-27 |
| 277 | A-6 | R-28 |
| 278 | A-6 | R-29 |
| 279 | A-6 | R-30 |
| 280 | A-6 | R-31 |
| 281 | A-6 | R-32 |
| 282 | A-6 | R-33 |
| 283 | A-6 | R-34 |
| 284 | A-6 | R-35 |
| 285 | A-6 | R-36 |
| 286 | A-6 | R-37 |
| 287 | A-6 | R-38 |
| 288 | A-6 | R-39 |
| 289 | A-6 | R-40 |
| 290 | A-6 | R-41 |
| 291 | A-6 | R-42 |
| 292 | A-6 | R-43 |
| 293 | A-6 | R-44 |
| 294 | A-6 | R-45 |
| 295 | A-6 | R-46 |
| 296 | A-6 | R-47 |
| 297 | A-6 | R-48 |
| 298 | A-6 | R-49 |
| 299 | A-7 | R-11 |
| 300 | A-7 | R-12 |
| 301 | A-7 | R-13 |
| 302 | A-7 | R-14 |
| 303 | A-7 | R-15 |
| 304 | A-7 | R-16 |
| 305 | A-7 | R-17 |
| 306 | A-7 | R-18 |
| 307 | A-7 | R-19 |
| 308 | A-7 | R-20 |
| 309 | A-7 | R-21 |
| 310 | A-7 | R-22 |
| 311 | A-7 | R-23 |
| 312 | A-7 | R-24 |
| 313 | A-7 | R-25 |
| 314 | A-7 | R-16 |
| 315 | A-7 | R-17 |
| 316 | A-7 | R-18 |
| 317 | A-7 | R-19 |
| 318 | A-7 | R-20 |
| 319 | A-7 | R-21 |
| 320 | A-7 | R-22 |
| 321 | A-7 | R-23 |
| 322 | A-7 | R-24 |
| 323 | A-7 | R-25 |
| 324 | A-7 | R-26 |
| 325 | A-7 | R-27 |
| 326 | A-7 | R-28 |
| 327 | A-7 | R-29 |
| 328 | A-7 | R-30 |
| 329 | A-7 | R-31 |
| 330 | A-7 | R-32 |
| 331 | A-7 | R-33 |
| 332 | A-7 | R-34 |
| 333 | A-7 | R-35 |
| 334 | A-7 | R-36 |
| 335 | A-7 | R-37 |
| 336 | A-7 | R-38 |
| 337 | A-7 | R-39 |
| 338 | A-7 | R-40 |
| 339 | A-7 | R-41 |
| 340 | A-7 | R-42 |
| 341 | A-7 | R-43 |
| 342 | A-7 | R-44 |
| 343 | A-7 | R-45 |
| 344 | A-7 | R-46 |
| 345 | A-7 | R-47 |
| 346 | A-7 | R-48 |
| 347 | A-7 | R-49 |
| 348 | A-8 | R-1 |
| 349 | A-8 | R-2 |
| 350 | A-8 | R-3 |

TABLE 4-continued

| Compound | A | $R^b, R^d$ |
|---|---|---|
| 351 | A-8 | R-4 |
| 352 | A-8 | R-5 |
| 353 | A-8 | R-6 |
| 354 | A-8 | R-7 |
| 355 | A-8 | R-8 |
| 356 | A-8 | R-9 |
| 357 | A-8 | R-10 |
| 358 | A-8 | R-11 |

TABLE 5

| Compound | A | $R^b, R^d$ |
|---|---|---|
| 359 | A-8 | R-12 |
| 360 | A-8 | R-13 |
| 361 | A-8 | R-14 |
| 362 | A-8 | R-15 |
| 363 | A-8 | R-16 |
| 364 | A-8 | R-17 |
| 365 | A-8 | R-18 |
| 366 | A-8 | R-19 |
| 367 | A-8 | R-20 |
| 368 | A-8 | R-21 |
| 369 | A-8 | R-22 |
| 370 | A-8 | R-23 |
| 371 | A-8 | R-24 |
| 372 | A-8 | R-25 |
| 373 | A-8 | R-26 |
| 374 | A-8 | R-27 |
| 375 | A-8 | R-28 |
| 376 | A-8 | R-29 |
| 377 | A-8 | R-30 |
| 378 | A-8 | R-31 |
| 379 | A-8 | R-32 |
| 380 | A-8 | R-33 |
| 381 | A-8 | R-34 |
| 382 | A-8 | R-35 |
| 383 | A-8 | R-36 |
| 384 | A-8 | R-37 |
| 385 | A-8 | R-38 |
| 386 | A-8 | R-39 |
| 387 | A-8 | R-40 |
| 388 | A-8 | R-41 |
| 389 | A-8 | R-42 |
| 390 | A-8 | R-43 |
| 391 | A-8 | R-44 |
| 392 | A-8 | R-45 |
| 393 | A-8 | R-46 |
| 394 | A-8 | R-47 |
| 395 | A-8 | R-48 |
| 396 | A-8 | R-49 |
| 397 | A-9 | R-1 |
| 398 | A-9 | R-2 |
| 399 | A-9 | R-3 |
| 400 | A-9 | R-4 |
| 401 | A-9 | R-5 |
| 402 | A-9 | R-6 |
| 403 | A-9 | R-7 |
| 404 | A-9 | R-8 |
| 405 | A-9 | R-9 |
| 406 | A-9 | R-10 |
| 407 | A-9 | R-11 |
| 408 | A-9 | R-12 |
| 409 | A-9 | R-13 |
| 410 | A-9 | R-14 |
| 411 | A-9 | R-15 |
| 412 | A-9 | R-16 |
| 413 | A-9 | R-17 |
| 414 | A-9 | R-18 |
| 415 | A-9 | R-19 |
| 416 | A-9 | R-20 |
| 417 | A-9 | R-21 |
| 418 | A-9 | R-22 |
| 419 | A-9 | R-23 |
| 420 | A-9 | R-24 |

TABLE 5-continued

| Compound | A | $R^b, R^d$ |
|---|---|---|
| 421 | A-9 | R-25 |
| 422 | A-9 | R-26 |
| 423 | A-9 | R-27 |
| 424 | A-9 | R-28 |
| 425 | A-9 | R-29 |
| 426 | A-9 | R-30 |
| 427 | A-9 | R-31 |
| 428 | A-9 | R-32 |
| 429 | A-9 | R-33 |
| 430 | A-9 | R-34 |
| 431 | A-9 | R-35 |
| 432 | A-9 | R-36 |
| 433 | A-9 | R-37 |
| 434 | A-9 | R-38 |
| 435 | A-9 | R-39 |
| 436 | A-9 | R-40 |
| 437 | A-9 | R-41 |
| 438 | A-9 | R-42 |
| 439 | A-9 | R-43 |
| 440 | A-9 | R-44 |
| 441 | A-9 | R-45 |
| 442 | A-9 | R-46 |
| 443 | A-9 | R-47 |
| 444 | A-9 | R-48 |
| 445 | A-9 | R-49 |
| 446 | A-10 | R-1 |
| 447 | A-10 | R-2 |
| 448 | A-10 | R-3 |
| 449 | A-10 | R-4 |
| 450 | A-10 | R-5 |
| 451 | A-10 | R-6 |
| 452 | A-10 | R-7 |
| 453 | A-10 | R-8 |
| 454 | A-10 | R-9 |
| 455 | A-10 | R-10 |
| 456 | A-10 | R-11 |
| 457 | A-10 | R-12 |
| 458 | A-10 | R-13 |
| 459 | A-10 | R-14 |
| 460 | A-10 | R-15 |
| 461 | A-10 | R-16 |
| 462 | A-10 | R-17 |
| 463 | A-10 | R-18 |
| 464 | A-10 | R-19 |
| 465 | A-10 | R-20 |
| 466 | A-10 | R-21 |
| 467 | A-10 | R-22 |
| 468 | A-10 | R-23 |
| 469 | A-10 | R-24 |
| 470 | A-10 | R-25 |
| 471 | A-10 | R-26 |
| 472 | A-10 | R-27 |
| 473 | A-10 | R-28 |
| 474 | A-10 | R-29 |
| 475 | A-10 | R-30 |

TABLE 6

| Compound | A | $R^b, R^d$ |
|---|---|---|
| 476 | A-10 | R-31 |
| 477 | A-10 | R-32 |
| 478 | A-10 | R-33 |
| 479 | A-10 | R-34 |
| 480 | A-10 | R-35 |
| 481 | A-10 | R-36 |
| 482 | A-10 | R-37 |
| 483 | A-10 | R-38 |
| 484 | A-10 | R-39 |
| 485 | A-10 | R-40 |
| 486 | A-10 | R-41 |
| 487 | A-10 | R-42 |
| 488 | A-10 | R-43 |
| 489 | A-10 | R-44 |
| 490 | A-10 | R-45 |

TABLE 6-continued

| Compound | A | $R^b$, $R^d$ |
|---|---|---|
| 491 | A-10 | R-46 |
| 492 | A-10 | R-47 |
| 493 | A-10 | R-48 |
| 494 | A-10 | R-49 |
| 495 | A-11 | R-1 |
| 496 | A-11 | R-2 |
| 497 | A-11 | R-3 |
| 498 | A-11 | R-4 |
| 499 | A-11 | R-5 |
| 500 | A-11 | R-6 |
| 501 | A-11 | R-7 |
| 502 | A-11 | R-8 |
| 503 | A-11 | R-9 |
| 504 | A-11 | R-10 |
| 505 | A-11 | R-11 |
| 506 | A-11 | R-12 |
| 507 | A-11 | R-13 |
| 508 | A-11 | R-14 |
| 509 | A-11 | R-15 |
| 510 | A-11 | R-16 |
| 511 | A-11 | R-17 |
| 512 | A-11 | R-18 |
| 513 | A-11 | R-19 |
| 514 | A-11 | R-20 |
| 515 | A-11 | R-21 |
| 516 | A-11 | R-22 |
| 517 | A-11 | R-23 |
| 518 | A-11 | R-24 |
| 519 | A-11 | R-25 |
| 520 | A-11 | R-26 |
| 521 | A-11 | R-27 |
| 522 | A-11 | R-28 |
| 523 | A-11 | R-29 |
| 524 | A-11 | R-30 |
| 525 | A-11 | R-31 |
| 526 | A-11 | R-32 |
| 527 | A-11 | R-33 |
| 528 | A-11 | R-34 |
| 529 | A-11 | R-35 |
| 530 | A-11 | R-36 |
| 531 | A-11 | R-37 |
| 532 | A-11 | R-38 |
| 533 | A-11 | R-39 |
| 534 | A-11 | R-40 |
| 535 | A-11 | R-41 |
| 536 | A-11 | R-42 |
| 537 | A-11 | R-43 |
| 538 | A-11 | R-44 |
| 539 | A-11 | R-45 |
| 540 | A-11 | R-46 |
| 541 | A-11 | R-47 |
| 542 | A-11 | R-48 |
| 543 | A-11 | R-49 |
| 544 | A-12 | R-1 |
| 545 | A-12 | R-2 |
| 546 | A-12 | R-3 |
| 547 | A-12 | R-4 |
| 548 | A-12 | R-5 |
| 549 | A-12 | R-6 |
| 550 | A-12 | R-7 |
| 551 | A-12 | R-8 |
| 552 | A-12 | R-9 |
| 553 | A-12 | R-10 |
| 554 | A-12 | R-11 |
| 555 | A-12 | R-12 |
| 556 | A-12 | R-13 |
| 557 | A-12 | R-14 |
| 558 | A-12 | R-15 |
| 559 | A-12 | R-16 |
| 560 | A-12 | R-17 |
| 561 | A-12 | R-18 |
| 562 | A-12 | R-19 |
| 563 | A-12 | R-20 |
| 564 | A-12 | R-21 |
| 565 | A-12 | R-22 |
| 566 | A-12 | R-23 |
| 567 | A-12 | R-24 |
| 568 | A-12 | R-25 |

TABLE 6-continued

| Compound | A | $R^b$, $R^d$ |
|---|---|---|
| 569 | A-12 | R-26 |
| 570 | A-12 | R-27 |
| 571 | A-12 | R-28 |
| 572 | A-12 | R-29 |
| 573 | A-12 | R-30 |
| 574 | A-12 | R-31 |
| 575 | A-12 | R-32 |
| 576 | A-12 | R-33 |
| 577 | A-12 | R-34 |
| 578 | A-12 | R-35 |
| 579 | A-12 | R-36 |
| 580 | A-12 | R-37 |
| 581 | A-12 | R-38 |
| 582 | A-12 | R-39 |
| 583 | A-12 | R-40 |
| 584 | A-12 | R-41 |
| 585 | A-12 | R-42 |
| 586 | A-12 | R-43 |
| 587 | A-12 | R-44 |
| 588 | A-12 | R-45 |
| 589 | A-12 | R-46 |
| 590 | A-12 | R-47 |
| 591 | A-12 | R-48 |
| 592 | A-12 | R-49 |

TABLE 7

| Compound | A | $R^b$, $R^d$ |
|---|---|---|
| 593 | A-13 | R-1 |
| 594 | A-13 | R-2 |
| 595 | A-13 | R-3 |
| 596 | A-13 | R-4 |
| 597 | A-13 | R-5 |
| 598 | A-13 | R-6 |
| 599 | A-13 | R-7 |
| 600 | A-13 | R-8 |
| 601 | A-13 | R-9 |
| 602 | A-13 | R-10 |
| 603 | A-13 | R-11 |
| 604 | A-13 | R-12 |
| 605 | A-13 | R-13 |
| 606 | A-13 | R-14 |
| 607 | A-13 | R-15 |
| 608 | A-13 | R-16 |
| 609 | A-13 | R-17 |
| 610 | A-13 | R-18 |
| 611 | A-13 | R-19 |
| 612 | A-13 | R-20 |
| 613 | A-13 | R-21 |
| 614 | A-13 | R-22 |
| 615 | A-13 | R-23 |
| 616 | A-13 | R-24 |
| 617 | A-13 | R-25 |
| 618 | A-13 | R-26 |
| 619 | A-13 | R-27 |
| 620 | A-13 | R-28 |
| 621 | A-13 | R-29 |
| 622 | A-13 | R-30 |
| 623 | A-13 | R-31 |
| 624 | A-13 | R-32 |
| 625 | A-13 | R-33 |
| 626 | A-13 | R-34 |
| 627 | A-13 | R-35 |
| 628 | A-13 | R-36 |
| 629 | A-13 | R-37 |
| 630 | A-13 | R-38 |
| 631 | A-13 | R-39 |
| 632 | A-13 | R-40 |
| 633 | A-13 | R-41 |
| 634 | A-13 | R-42 |
| 635 | A-13 | R-43 |
| 636 | A-13 | R-44 |
| 637 | A-13 | R-45 |
| 638 | A-13 | R-46 |

TABLE 7-continued

| Compound | A | $R^b, R^d$ |
|---|---|---|
| 639 | A-13 | R-47 |
| 640 | A-13 | R-48 |
| 641 | A-13 | R-49 |
| 642 | A-14 | R-1 |
| 643 | A-14 | R-2 |
| 644 | A-14 | R-3 |
| 645 | A-14 | R-4 |
| 646 | A-14 | R-5 |
| 647 | A-14 | R-6 |
| 648 | A-14 | R-7 |
| 649 | A-14 | R-8 |
| 650 | A-14 | R-9 |
| 651 | A-14 | R-10 |
| 652 | A-14 | R-11 |
| 653 | A-14 | R-12 |
| 654 | A-14 | R-13 |
| 655 | A-14 | R-14 |
| 656 | A-14 | R-15 |
| 657 | A-14 | R-16 |
| 658 | A-14 | R-17 |
| 659 | A-14 | R-18 |
| 660 | A-14 | R-19 |
| 661 | A-14 | R-20 |
| 662 | A-14 | R-21 |
| 663 | A-14 | R-22 |
| 664 | A-14 | R-23 |
| 665 | A-14 | R-24 |
| 666 | A-14 | R-25 |
| 667 | A-14 | R-26 |
| 668 | A-14 | R-27 |
| 669 | A-14 | R-28 |
| 670 | A-14 | R-29 |
| 671 | A-14 | R-30 |
| 672 | A-14 | R-31 |
| 673 | A-14 | R-32 |
| 674 | A-14 | R-33 |
| 675 | A-14 | R-34 |
| 676 | A-14 | R-35 |
| 677 | A-14 | R-36 |
| 678 | A-14 | R-37 |
| 679 | A-14 | R-38 |
| 680 | A-14 | R-39 |
| 681 | A-14 | R-40 |
| 682 | A-14 | R-41 |
| 683 | A-14 | R-42 |
| 684 | A-14 | R-43 |
| 685 | A-14 | R-44 |
| 686 | A-14 | R-45 |
| 687 | A-14 | R-46 |
| 688 | A-14 | R-47 |
| 689 | A-14 | R-48 |
| 690 | A-14 | R-49 |
| 691 | A-15 | R-1 |
| 692 | A-15 | R-2 |
| 693 | A-15 | R-3 |
| 694 | A-15 | R-4 |
| 695 | A-15 | R-5 |
| 696 | A-15 | R-6 |
| 697 | A-15 | R-7 |
| 698 | A-15 | R-8 |
| 699 | A-15 | R-9 |
| 700 | A-15 | R-10 |
| 701 | A-15 | R-11 |
| 702 | A-15 | R-12 |
| 703 | A-15 | R-13 |
| 704 | A-15 | R-14 |
| 705 | A-15 | R-15 |
| 706 | A-15 | R-16 |
| 707 | A-15 | R-17 |
| 708 | A-15 | R-18 |
| 709 | A-15 | R-19 |

TABLE 8

| Compound | A | $R^b, R^d$ |
|---|---|---|
| 710 | A-15 | R-20 |
| 711 | A-15 | R-21 |
| 712 | A-15 | R-22 |
| 713 | A-15 | R-23 |
| 714 | A-15 | R-24 |
| 715 | A-15 | R-25 |
| 716 | A-15 | R-26 |
| 717 | A-15 | R-27 |
| 718 | A-15 | R-28 |
| 719 | A-15 | R-29 |
| 720 | A-15 | R-30 |
| 721 | A-15 | R-31 |
| 722 | A-15 | R-32 |
| 723 | A-15 | R-33 |
| 724 | A-15 | R-34 |
| 725 | A-15 | R-35 |
| 726 | A-15 | R-36 |
| 727 | A-15 | R-37 |
| 728 | A-15 | R-38 |
| 729 | A-15 | R-39 |
| 730 | A-15 | R-40 |
| 731 | A-15 | R-41 |
| 732 | A-15 | R-42 |
| 733 | A-15 | R-43 |
| 734 | A-15 | R-44 |
| 735 | A-15 | R-45 |
| 736 | A-15 | R-46 |
| 737 | A-15 | R-47 |
| 738 | A-15 | R-48 |
| 739 | A-15 | R-49 |
| 740 | A-16 | R-1 |
| 741 | A-16 | R-2 |
| 742 | A-16 | R-3 |
| 743 | A-16 | R-4 |
| 744 | A-16 | R-5 |
| 745 | A-16 | R-6 |
| 746 | A-16 | R-7 |
| 747 | A-16 | R-8 |
| 748 | A-16 | R-9 |
| 749 | A-16 | R-10 |
| 750 | A-16 | R-11 |
| 751 | A-16 | R-12 |
| 752 | A-16 | R-13 |
| 753 | A-16 | R-14 |
| 754 | A-16 | R-15 |
| 755 | A-16 | R-16 |
| 756 | A-16 | R-17 |
| 757 | A-16 | R-18 |
| 758 | A-16 | R-19 |
| 759 | A-16 | R-20 |
| 760 | A-16 | R-21 |
| 761 | A-16 | R-22 |
| 762 | A-16 | R-23 |
| 763 | A-16 | R-24 |
| 764 | A-16 | R-25 |
| 765 | A-16 | R-26 |
| 766 | A-16 | R-27 |
| 767 | A-16 | R-28 |
| 768 | A-16 | R-29 |
| 769 | A-16 | R-30 |
| 770 | A-16 | R-31 |
| 771 | A-16 | R-32 |
| 772 | A-16 | R-33 |
| 773 | A-16 | R-34 |
| 774 | A-16 | R-35 |
| 775 | A-16 | R-36 |
| 776 | A-16 | R-37 |
| 777 | A-16 | R-38 |
| 778 | A-16 | R-39 |
| 779 | A-16 | R-40 |
| 780 | A-16 | R-41 |
| 781 | A-16 | R-42 |
| 782 | A-16 | R-43 |
| 783 | A-16 | R-44 |
| 784 | A-16 | R-45 |
| 785 | A-16 | R-46 |
| 786 | A-16 | R-47 |
| 787 | A-16 | R-48 |

TABLE 8-continued

| Compound | A | $R^b$, $R^d$ |
|---|---|---|
| 788 | A-16 | R-49 |
| 789 | A-17 | R-1 |
| 790 | A-17 | R-2 |
| 791 | A-17 | R-3 |
| 792 | A-17 | R-4 |
| 793 | A-17 | R-5 |
| 794 | A-17 | R-6 |
| 795 | A-17 | R-7 |
| 796 | A-17 | R-8 |
| 797 | A-17 | R-9 |
| 798 | A-17 | R-10 |
| 799 | A-17 | R-11 |
| 800 | A-17 | R-12 |
| 801 | A-17 | R-13 |
| 802 | A-17 | R-14 |
| 803 | A-17 | R-15 |
| 804 | A-17 | R-16 |
| 805 | A-17 | R-17 |
| 806 | A-17 | R-18 |
| 807 | A-17 | R-19 |
| 808 | A-17 | R-20 |
| 809 | A-17 | R-21 |
| 810 | A-17 | R-22 |
| 811 | A-17 | R-23 |
| 812 | A-17 | R-24 |
| 813 | A-17 | R-25 |
| 814 | A-17 | R-26 |
| 815 | A-17 | R-27 |
| 816 | A-17 | R-28 |
| 817 | A-17 | R-29 |
| 818 | A-17 | R-30 |
| 819 | A-17 | R-31 |
| 820 | A-17 | R-32 |
| 821 | A-17 | R-33 |
| 822 | A-17 | R-34 |
| 823 | A-17 | R-35 |
| 824 | A-17 | R-36 |
| 825 | A-17 | R-37 |
| 826 | A-17 | R-38 |

TABLE 9

| Compound | A | $R^b$, $R^d$ |
|---|---|---|
| 827 | A-17 | R-39 |
| 828 | A-17 | R-40 |
| 829 | A-17 | R-41 |
| 830 | A-17 | R-42 |
| 831 | A-17 | R-43 |
| 832 | A-17 | R-44 |
| 833 | A-17 | R-45 |
| 834 | A-17 | R-46 |
| 835 | A-17 | R-47 |
| 836 | A-17 | R-48 |
| 837 | A-17 | R-49 |
| 838 | A-18 | R-1 |
| 839 | A-18 | R-2 |
| 840 | A-18 | R-3 |
| 841 | A-18 | R-4 |
| 842 | A-18 | R-5 |
| 843 | A-18 | R-6 |
| 844 | A-18 | R-7 |
| 845 | A-18 | R-8 |
| 846 | A-18 | R-9 |
| 847 | A-18 | R-10 |
| 848 | A-18 | R-11 |
| 849 | A-18 | R-12 |
| 850 | A-18 | R-13 |
| 851 | A-18 | R-14 |
| 852 | A-18 | R-15 |
| 853 | A-18 | R-16 |
| 854 | A-18 | R-17 |
| 855 | A-18 | R-18 |
| 856 | A-18 | R-19 |
| 857 | A-18 | R-20 |

TABLE 9-continued

| Compound | A | $R^b$, $R^d$ |
|---|---|---|
| 858 | A-18 | R-21 |
| 859 | A-18 | R-22 |
| 860 | A-18 | R-23 |
| 861 | A-18 | R-24 |
| 862 | A-18 | R-25 |
| 863 | A-18 | R-26 |
| 864 | A-18 | R-27 |
| 865 | A-18 | R-28 |
| 866 | A-18 | R-29 |
| 867 | A-18 | R-30 |
| 868 | A-18 | R-31 |
| 869 | A-18 | R-32 |
| 870 | A-18 | R-33 |
| 871 | A-18 | R-34 |
| 872 | A-18 | R-35 |
| 873 | A-18 | R-36 |
| 874 | A-18 | R-37 |
| 875 | A-18 | R-38 |
| 876 | A-18 | R-39 |
| 877 | A-18 | R-40 |
| 878 | A-18 | R-41 |
| 879 | A-18 | R-42 |
| 880 | A-18 | R-43 |
| 881 | A-18 | R-44 |
| 882 | A-18 | R-45 |
| 883 | A-18 | R-46 |
| 884 | A-18 | R-47 |
| 885 | A-18 | R-48 |
| 886 | A-18 | R-49 |
| 887 | A-19 | R-1 |
| 888 | A-19 | R-2 |
| 889 | A-19 | R-3 |
| 890 | A-19 | R-4 |
| 891 | A-19 | R-5 |
| 892 | A-19 | R-6 |
| 893 | A-19 | R-7 |
| 894 | A-19 | R-8 |
| 895 | A-19 | R-9 |
| 896 | A-19 | R-10 |
| 897 | A-19 | R-11 |
| 898 | A-19 | R-12 |
| 899 | A-19 | R-13 |
| 900 | A-19 | R-14 |
| 901 | A-19 | R-15 |
| 902 | A-19 | R-16 |
| 903 | A-19 | R-17 |
| 904 | A-19 | R-18 |
| 905 | A-19 | R-19 |
| 906 | A-19 | R-20 |
| 907 | A-19 | R-21 |
| 908 | A-19 | R-22 |
| 909 | A-19 | R-23 |
| 910 | A-19 | R-24 |
| 911 | A-19 | R-25 |
| 912 | A-19 | R-26 |
| 913 | A-19 | R-27 |
| 914 | A-19 | R-28 |
| 915 | A-19 | R-29 |
| 916 | A-19 | R-30 |
| 917 | A-19 | R-31 |
| 918 | A-19 | R-32 |
| 919 | A-19 | R-33 |
| 920 | A-19 | R-34 |
| 921 | A-19 | R-35 |
| 922 | A-19 | R-36 |
| 923 | A-19 | R-37 |
| 924 | A-19 | R-38 |
| 925 | A-19 | R-39 |
| 926 | A-19 | R-40 |
| 927 | A-19 | R-41 |
| 928 | A-19 | R-42 |
| 929 | A-19 | R-43 |
| 930 | A-19 | R-44 |
| 931 | A-19 | R-45 |
| 932 | A-19 | R-46 |
| 933 | A-19 | R-47 |
| 934 | A-19 | R-48 |
| 935 | A-19 | R-49 |

TABLE 9-continued

| Compound | A | $R^b$, $R^d$ |
|---|---|---|
| 936 | A-20 | R-1 |
| 937 | A-20 | R-2 |
| 938 | A-20 | R-3 |
| 939 | A-20 | R-4 |
| 940 | A-20 | R-5 |
| 941 | A-20 | R-6 |
| 942 | A-20 | R-7 |
| 943 | A-20 | R-8 |

TABLE 10

| Compound | A | $R^b$, $R^d$ |
|---|---|---|
| 944 | A-20 | R-9 |
| 945 | A-20 | R-10 |
| 946 | A-20 | R-11 |
| 947 | A-20 | R-12 |
| 948 | A-20 | R-13 |
| 949 | A-20 | R-14 |
| 950 | A-20 | R-15 |
| 951 | A-20 | R-16 |
| 952 | A-20 | R-17 |
| 953 | A-20 | R-18 |
| 954 | A-20 | R-19 |
| 955 | A-20 | R-20 |
| 956 | A-20 | R-21 |
| 957 | A-20 | R-22 |
| 958 | A-20 | R-23 |
| 959 | A-20 | R-24 |
| 960 | A-20 | R-25 |
| 961 | A-20 | R-26 |
| 962 | A-20 | R-27 |
| 963 | A-20 | R-28 |
| 964 | A-20 | R-29 |
| 965 | A-20 | R-30 |
| 966 | A-20 | R-31 |
| 967 | A-20 | R-32 |
| 968 | A-20 | R-33 |
| 969 | A-20 | R-34 |
| 970 | A-20 | R-35 |
| 971 | A-20 | R-36 |
| 972 | A-20 | R-37 |
| 973 | A-20 | R-38 |
| 974 | A-20 | R-39 |
| 975 | A-20 | R-40 |
| 976 | A-20 | R-41 |
| 977 | A-20 | R-42 |
| 978 | A-20 | R-43 |
| 979 | A-20 | R-44 |
| 980 | A-20 | R-45 |
| 981 | A-20 | R-46 |
| 982 | A-20 | R-47 |
| 983 | A-20 | R-48 |
| 984 | A-20 | R-49 |
| 985 | A-21 | R-1 |
| 986 | A-21 | R-2 |
| 987 | A-21 | R-3 |
| 988 | A-21 | R-4 |
| 989 | A-21 | R-5 |
| 990 | A-21 | R-6 |
| 991 | A-21 | R-7 |
| 992 | A-21 | R-8 |
| 993 | A-21 | R-9 |
| 994 | A-21 | R-10 |
| 995 | A-21 | R-11 |
| 996 | A-21 | R-12 |
| 997 | A-21 | R-13 |
| 998 | A-21 | R-14 |
| 999 | A-21 | R-15 |
| 1000 | A-21 | R-16 |
| 1001 | A-21 | R-17 |
| 1002 | A-21 | R-18 |
| 1003 | A-21 | R-19 |
| 1004 | A-21 | R-20 |
| 1005 | A-21 | R-21 |
| 1006 | A-21 | R-22 |
| 1007 | A-21 | R-23 |
| 1008 | A-21 | R-24 |
| 1009 | A-21 | R-25 |
| 1010 | A-21 | R-26 |
| 1011 | A-21 | R-27 |
| 1012 | A-21 | R-28 |
| 1013 | A-21 | R-29 |
| 1014 | A-21 | R-30 |
| 1015 | A-21 | R-31 |
| 1016 | A-21 | R-32 |
| 1017 | A-21 | R-33 |
| 1018 | A-21 | R-34 |
| 1019 | A-21 | R-35 |
| 1020 | A-21 | R-36 |
| 1021 | A-21 | R-37 |
| 1022 | A-21 | R-38 |
| 1023 | A-21 | R-39 |
| 1024 | A-21 | R-40 |
| 1025 | A-21 | R-41 |
| 1026 | A-21 | R-42 |
| 1027 | A-21 | R-43 |
| 1028 | A-21 | R-44 |
| 1029 | A-21 | R-45 |
| 1030 | A-21 | R-46 |
| 1031 | A-21 | R-47 |
| 1032 | A-21 | R-48 |
| 1033 | A-21 | R-49 |
| 1034 | A-22 | R-1 |
| 1035 | A-22 | R-2 |
| 1036 | A-22 | R-3 |
| 1037 | A-22 | R-4 |
| 1038 | A-22 | R-5 |
| 1039 | A-22 | R-6 |
| 1040 | A-22 | R-7 |
| 1041 | A-22 | R-8 |
| 1042 | A-22 | R-9 |
| 1043 | A-22 | R-10 |
| 1044 | A-22 | R-11 |
| 1045 | A-22 | R-12 |
| 1046 | A-22 | R-13 |
| 1047 | A-22 | R-14 |
| 1048 | A-22 | R-15 |
| 1049 | A-22 | R-16 |
| 1050 | A-22 | R-17 |
| 1051 | A-22 | R-18 |
| 1052 | A-22 | R-19 |
| 1053 | A-22 | R-20 |
| 1054 | A-22 | R-21 |
| 1055 | A-22 | R-22 |
| 1056 | A-22 | R-23 |
| 1057 | A-22 | R-24 |
| 1058 | A-22 | R-25 |
| 1059 | A-22 | R-26 |
| 1060 | A-22 | R-27 |

TABLE 11

| Compound | A | $R^b$, $R^d$ |
|---|---|---|
| 1061 | A-22 | R-28 |
| 1062 | A-22 | R-29 |
| 1063 | A-22 | R-30 |
| 1064 | A-22 | R-31 |
| 1065 | A-22 | R-32 |
| 1066 | A-22 | R-33 |
| 1067 | A-22 | R-34 |
| 1068 | A-22 | R-35 |
| 1069 | A-22 | R-36 |
| 1070 | A-22 | R-37 |
| 1071 | A-22 | R-38 |
| 1072 | A-22 | R-39 |
| 1073 | A-22 | R-40 |
| 1074 | A-22 | R-41 |
| 1075 | A-22 | R-42 |

TABLE 11-continued

| Compound | A | $R^b, R^d$ |
|---|---|---|
| 1076 | A-22 | R-43 |
| 1077 | A-22 | R-44 |
| 1078 | A-22 | R-45 |
| 1079 | A-22 | R-46 |
| 1080 | A-22 | R-47 |
| 1081 | A-22 | R-48 |
| 1082 | A-22 | R-49 |
| 1083 | A-23 | R-1 |
| 1084 | A-23 | R-2 |
| 1085 | A-23 | R-3 |
| 1086 | A-23 | R-4 |
| 1087 | A-23 | R-5 |
| 1088 | A-23 | R-6 |
| 1089 | A-23 | R-7 |
| 1090 | A-23 | R-8 |
| 1091 | A-23 | R-9 |
| 1092 | A-23 | R-10 |
| 1093 | A-23 | R-11 |
| 1094 | A-23 | R-12 |
| 1095 | A-23 | R-13 |
| 1096 | A-23 | R-14 |
| 1097 | A-23 | R-15 |
| 1098 | A-23 | R-16 |
| 1099 | A-23 | R-17 |
| 1100 | A-23 | R-18 |
| 1101 | A-23 | R-19 |
| 1102 | A-23 | R-20 |
| 1103 | A-23 | R-21 |
| 1104 | A-23 | R-22 |
| 1105 | A-23 | R-23 |
| 1106 | A-23 | R-24 |
| 1107 | A-23 | R-25 |
| 1108 | A-23 | R-26 |
| 1109 | A-23 | R-27 |
| 1110 | A-23 | R-28 |
| 1111 | A-23 | R-29 |
| 1112 | A-23 | R-30 |
| 1113 | A-23 | R-31 |
| 1114 | A-23 | R-32 |
| 1115 | A-23 | R-33 |
| 1116 | A-23 | R-34 |
| 1117 | A-23 | R-35 |
| 1118 | A-23 | R-36 |
| 1119 | A-23 | R-37 |
| 1120 | A-23 | R-38 |
| 1121 | A-23 | R-39 |
| 1122 | A-23 | R-40 |
| 1123 | A-23 | R-41 |
| 1124 | A-23 | R-42 |
| 1125 | A-23 | R-43 |
| 1126 | A-23 | R-44 |
| 1127 | A-23 | R-45 |
| 1128 | A-23 | R-46 |
| 1129 | A-23 | R-47 |
| 1130 | A-23 | R-48 |
| 1131 | A-23 | R-49 |
| 1132 | A-24 | R-1 |
| 1133 | A-24 | R-2 |
| 1134 | A-24 | R-3 |
| 1135 | A-24 | R-4 |
| 1136 | A-24 | R-5 |
| 1137 | A-24 | R-6 |
| 1138 | A-24 | R-7 |
| 1139 | A-24 | R-8 |
| 1140 | A-24 | R-9 |
| 1141 | A-24 | R-10 |
| 1142 | A-24 | R-11 |
| 1143 | A-24 | R-12 |
| 1144 | A-24 | R-13 |
| 1145 | A-24 | R-14 |
| 1146 | A-24 | R-15 |
| 1147 | A-24 | R-16 |
| 1148 | A-24 | R-17 |
| 1149 | A-24 | R-18 |
| 1150 | A-24 | R-19 |
| 1151 | A-24 | R-20 |
| 1152 | A-24 | R-21 |
| 1153 | A-24 | R-22 |
| 1154 | A-24 | R-23 |
| 1155 | A-24 | R-24 |
| 1156 | A-24 | R-25 |
| 1157 | A-24 | R-26 |
| 1158 | A-24 | R-27 |
| 1159 | A-24 | R-28 |
| 1160 | A-24 | R-29 |
| 1161 | A-24 | R-30 |
| 1162 | A-24 | R-31 |
| 1163 | A-24 | R-32 |
| 1164 | A-24 | R-33 |
| 1165 | A-24 | R-34 |
| 1166 | A-24 | R-35 |
| 1167 | A-24 | R-36 |
| 1168 | A-24 | R-37 |
| 1169 | A-24 | R-38 |
| 1170 | A-24 | R-39 |
| 1171 | A-24 | R-40 |
| 1172 | A-24 | R-41 |
| 1173 | A-24 | R-42 |
| 1174 | A-24 | R-43 |
| 1175 | A-24 | R-44 |
| 1176 | A-24 | R-45 |
| 1177 | A-24 | R-46 |

TABLE 12

| Compound | A | $R^b, R^d$ |
|---|---|---|
| 1178 | A-24 | R-47 |
| 1179 | A-24 | R-48 |
| 1180 | A-24 | R-49 |
| 1181 | A-25 | R-1 |
| 1182 | A-25 | R-2 |
| 1183 | A-25 | R-3 |
| 1184 | A-25 | R-4 |
| 1185 | A-25 | R-5 |
| 1186 | A-25 | R-6 |
| 1187 | A-25 | R-7 |
| 1188 | A-25 | R-8 |
| 1189 | A-25 | R-9 |
| 1190 | A-25 | R-10 |
| 1191 | A-25 | R-11 |
| 1192 | A-25 | R-12 |
| 1193 | A-25 | R-13 |
| 1194 | A-25 | R-14 |
| 1195 | A-25 | R-15 |
| 1196 | A-25 | R-16 |
| 1197 | A-25 | R-17 |
| 1198 | A-25 | R-18 |
| 1199 | A-25 | R-19 |
| 1200 | A-25 | R-20 |
| 1201 | A-25 | R-21 |
| 1202 | A-25 | R-22 |
| 1203 | A-25 | R-23 |
| 1204 | A-25 | R-24 |
| 1205 | A-25 | R-25 |
| 1206 | A-25 | R-26 |
| 1207 | A-25 | R-27 |
| 1208 | A-25 | R-28 |
| 1209 | A-25 | R-29 |
| 1210 | A-25 | R-30 |
| 1211 | A-25 | R-31 |
| 1212 | A-25 | R-32 |
| 1213 | A-25 | R-33 |
| 1214 | A-25 | R-34 |
| 1215 | A-25 | R-35 |
| 1216 | A-25 | R-36 |
| 1217 | A-25 | R-37 |
| 1218 | A-25 | R-38 |
| 1219 | A-25 | R-39 |
| 1220 | A-25 | R-40 |
| 1221 | A-25 | R-41 |
| 1222 | A-25 | R-42 |
| 1223 | A-25 | R-43 |

TABLE 12-continued

| | A | $R^b$, $R^d$ |
|---|---|---|
| 1224 | A-25 | R-44 |
| 1225 | A-25 | R-45 |
| 1226 | A-25 | R-46 |
| 1227 | A-25 | R-47 |
| 1228 | A-25 | R-48 |
| 1229 | A-25 | R-49 |
| 1230 | A-26 | R-1 |
| 1231 | A-26 | R-2 |
| 1232 | A-26 | R-3 |
| 1233 | A-26 | R-4 |
| 1234 | A-26 | R-5 |
| 1235 | A-26 | R-6 |
| 1236 | A-26 | R-7 |
| 1237 | A-26 | R-8 |
| 1238 | A-26 | R-9 |
| 1239 | A-26 | R-10 |
| 1240 | A-26 | R-11 |
| 1241 | A-26 | R-12 |
| 1242 | A-26 | R-13 |
| 1243 | A-26 | R-14 |
| 1244 | A-26 | R-15 |
| 1245 | A-26 | R-16 |
| 1246 | A-26 | R-17 |
| 1247 | A-26 | R-18 |
| 1248 | A-26 | R-19 |
| 1249 | A-26 | R-20 |
| 1250 | A-26 | R-21 |
| 1251 | A-26 | R-22 |
| 1252 | A-26 | R-23 |
| 1253 | A-26 | R-24 |
| 1254 | A-26 | R-25 |
| 1255 | A-26 | R-26 |
| 1256 | A-26 | R-27 |
| 1257 | A-26 | R-28 |
| 1258 | A-26 | R-29 |
| 1259 | A-26 | R-30 |
| 1260 | A-26 | R-31 |
| 1261 | A-26 | R-32 |
| 1262 | A-26 | R-33 |
| 1263 | A-26 | R-34 |
| 1264 | A-26 | R-35 |
| 1265 | A-26 | R-36 |
| 1266 | A-26 | R-37 |
| 1267 | A-26 | R-38 |
| 1268 | A-26 | R-39 |
| 1269 | A-26 | R-40 |
| 1270 | A-26 | R-41 |
| 1271 | A-26 | R-42 |
| 1272 | A-26 | R-43 |
| 1273 | A-26 | R-44 |
| 1274 | A-26 | R-45 |
| 1275 | A-26 | R-46 |
| 1276 | A-26 | R-47 |
| 1277 | A-26 | R-48 |
| 1278 | A-26 | R-49 |
| 1279 | A-27 | R-1 |
| 1280 | A-27 | R-2 |
| 1281 | A-27 | R-3 |
| 1282 | A-27 | R-4 |
| 1283 | A-27 | R-5 |
| 1284 | A-27 | R-6 |
| 1285 | A-27 | R-7 |
| 1286 | A-27 | R-8 |
| 1287 | A-27 | R-9 |
| 1288 | A-27 | R-10 |
| 1289 | A-27 | R-11 |
| 1290 | A-27 | R-12 |
| 1291 | A-27 | R-13 |
| 1292 | A-27 | R-14 |
| 1293 | A-27 | R-15 |
| 1294 | A-27 | R-16 |

TABLE 13

| | | A | $R^b$, $R^d$ |
|---|---|---|---|
| Compound | 1295 | A-27 | R-17 |
| | 1296 | A-27 | R-18 |
| | 1297 | A-27 | R-19 |
| | 1298 | A-27 | R-20 |
| | 1299 | A-27 | R-21 |
| | 1300 | A-27 | R-22 |
| | 1301 | A-27 | R-23 |
| | 1302 | A-27 | R-24 |
| | 1303 | A-27 | R-25 |
| | 1304 | A-27 | R-26 |
| | 1305 | A-27 | R-27 |
| | 1306 | A-27 | R-28 |
| | 1307 | A-27 | R-29 |
| | 1308 | A-27 | R-30 |
| | 1309 | A-27 | R-31 |
| | 1310 | A-27 | R-32 |
| | 1311 | A-27 | R-33 |
| | 1312 | A-27 | R-34 |
| | 1313 | A-27 | R-35 |
| | 1314 | A-27 | R-36 |
| | 1315 | A-27 | R-37 |
| | 1316 | A-27 | R-38 |
| | 1317 | A-27 | R-39 |
| | 1318 | A-27 | R-40 |
| | 1319 | A-27 | R-41 |
| | 1320 | A-27 | R-42 |
| | 1321 | A-27 | R-43 |
| | 1322 | A-27 | R-44 |
| | 1323 | A-27 | R-45 |
| | 1324 | A-27 | R-46 |
| | 1325 | A-27 | R-47 |
| | 1326 | A-27 | R-48 |
| | 1327 | A-27 | R-49 |
| | 1328 | A-28 | R-1 |
| | 1329 | A-28 | R-2 |
| | 1330 | A-28 | R-3 |
| | 1331 | A-28 | R-4 |
| | 1332 | A-28 | R-5 |
| | 1333 | A-28 | R-6 |
| | 1334 | A-28 | R-7 |
| | 1335 | A-28 | R-8 |
| | 1336 | A-28 | R-9 |
| | 1337 | A-28 | R-10 |
| | 1338 | A-28 | R-11 |
| | 1339 | A-28 | R-12 |
| | 1340 | A-28 | R-13 |
| | 1341 | A-28 | R-14 |
| | 1342 | A-28 | R-15 |
| | 1343 | A-28 | R-16 |
| | 1344 | A-28 | R-17 |
| | 1345 | A-28 | R-18 |
| | 1346 | A-28 | R-19 |
| | 1347 | A-28 | R-20 |
| | 1348 | A-28 | R-21 |
| | 1349 | A-28 | R-22 |
| | 1350 | A-28 | R-23 |
| | 1351 | A-28 | R-24 |
| | 1352 | A-28 | R-25 |
| | 1353 | A-28 | R-26 |
| | 1354 | A-28 | R-27 |
| | 1355 | A-28 | R-28 |
| | 1356 | A-28 | R-29 |
| | 1357 | A-28 | R-30 |
| | 1358 | A-28 | R-31 |
| | 1359 | A-28 | R-32 |
| | 1360 | A-28 | R-33 |
| | 1361 | A-28 | R-34 |
| | 1362 | A-28 | R-35 |
| | 1363 | A-28 | R-36 |
| | 1364 | A-28 | R-37 |
| | 1365 | A-28 | R-38 |
| | 1366 | A-28 | R-39 |
| | 1367 | A-28 | R-40 |
| | 1368 | A-28 | R-41 |
| | 1369 | A-28 | R-42 |
| | 1370 | A-28 | R-43 |
| | 1371 | A-28 | R-44 |
| | 1372 | A-28 | R-45 |

TABLE 13-continued

| | A | $R^b$, $R^d$ |
|---|---|---|
| 1373 | A-28 | R-46 |
| 1374 | A-28 | R-47 |
| 1375 | A-28 | R-48 |
| 1376 | A-28 | R-49 |
| 1377 | A-29 | R-1 |
| 1378 | A-29 | R-2 |
| 1379 | A-29 | R-3 |
| 1380 | A-29 | R-4 |
| 1381 | A-29 | R-5 |
| 1382 | A-29 | R-6 |
| 1383 | A-29 | R-7 |
| 1384 | A-29 | R-8 |
| 1385 | A-29 | R-9 |
| 1386 | A-29 | R-10 |
| 1387 | A-29 | R-11 |
| 1388 | A-29 | R-12 |
| 1389 | A-29 | R-13 |
| 1390 | A-29 | R-14 |
| 1391 | A-29 | R-15 |
| 1392 | A-29 | R-16 |
| 1393 | A-29 | R-17 |
| 1394 | A-29 | R-18 |
| 1395 | A-29 | R-19 |
| 1396 | A-29 | R-20 |
| 1397 | A-29 | R-21 |
| 1398 | A-29 | R-22 |
| 1399 | A-29 | R-23 |
| 1400 | A-29 | R-24 |
| 1401 | A-29 | R-25 |
| 1402 | A-29 | R-26 |
| 1403 | A-29 | R-27 |
| 1404 | A-29 | R-28 |
| 1405 | A-29 | R-29 |
| 1406 | A-29 | R-30 |
| 1407 | A-29 | R-31 |
| 1408 | A-29 | R-32 |
| 1409 | A-29 | R-33 |
| 1410 | A-29 | R-34 |
| 1411 | A-29 | R-35 |

TABLE 14

| | | A | $R^b$, $R^d$ |
|---|---|---|---|
| Compound | 1412 | A-29 | R-36 |
| | 1413 | A-29 | R-37 |
| | 1414 | A-29 | R-38 |
| | 1415 | A-29 | R-39 |
| | 1416 | A-29 | R-40 |
| | 1417 | A-29 | R-41 |
| | 1418 | A-29 | R-42 |
| | 1419 | A-29 | R-43 |
| | 1420 | A-29 | R-44 |
| | 1421 | A-29 | R-45 |
| | 1422 | A-29 | R-46 |
| | 1423 | A-29 | R-47 |
| | 1424 | A-29 | R-48 |
| | 1425 | A-29 | R-49 |
| | 1426 | A-30 | R-1 |
| | 1427 | A-30 | R-2 |
| | 1428 | A-30 | R-3 |
| | 1429 | A-30 | R-4 |
| | 1430 | A-30 | R-5 |
| | 1431 | A-30 | R-6 |
| | 1432 | A-30 | R-7 |
| | 1433 | A-30 | R-8 |
| | 1434 | A-30 | R-9 |
| | 1435 | A-30 | R-10 |
| | 1436 | A-30 | R-11 |
| | 1437 | A-30 | R-12 |
| | 1438 | A-30 | R-13 |
| | 1439 | A-30 | R-14 |
| | 1440 | A-30 | R-15 |
| | 1441 | A-30 | R-16 |
| | 1442 | A-30 | R-17 |

TABLE 14-continued

| | A | $R^b$, $R^d$ |
|---|---|---|
| 1443 | A-30 | R-18 |
| 1444 | A-30 | R-19 |
| 1445 | A-30 | R-20 |
| 1446 | A-30 | R-21 |
| 1447 | A-30 | R-22 |
| 1448 | A-30 | R-23 |
| 1449 | A-30 | R-24 |
| 1450 | A-30 | R-25 |
| 1451 | A-30 | R-26 |
| 1452 | A-30 | R-27 |
| 1453 | A-30 | R-28 |
| 1454 | A-30 | R-29 |
| 1455 | A-30 | R-30 |
| 1456 | A-30 | R-31 |
| 1457 | A-30 | R-32 |
| 1458 | A-30 | R-33 |
| 1459 | A-30 | R-34 |
| 1460 | A-30 | R-35 |
| 1461 | A-30 | R-36 |
| 1462 | A-30 | R-37 |
| 1463 | A-30 | R-38 |
| 1464 | A-30 | R-39 |
| 1465 | A-30 | R-40 |
| 1466 | A-30 | R-41 |
| 1467 | A-30 | R-42 |
| 1468 | A-30 | R-43 |
| 1469 | A-30 | R-44 |
| 1470 | A-30 | R-45 |
| 1471 | A-30 | R-46 |
| 1472 | A-30 | R-47 |
| 1473 | A-30 | R-48 |
| 1474 | A-30 | R-49 |
| 1475 | A-31 | R-1 |
| 1476 | A-31 | R-2 |
| 1477 | A-31 | R-3 |
| 1478 | A-31 | R-4 |
| 1479 | A-31 | R-5 |
| 1480 | A-31 | R-6 |
| 1481 | A-31 | R-7 |
| 1482 | A-31 | R-8 |
| 1483 | A-31 | R-9 |
| 1484 | A-31 | R-10 |
| 1485 | A-31 | R-11 |
| 1486 | A-31 | R-12 |
| 1487 | A-31 | R-13 |
| 1488 | A-31 | R-14 |
| 1489 | A-31 | R-15 |
| 1490 | A-31 | R-16 |
| 1491 | A-31 | R-17 |
| 1492 | A-31 | R-18 |
| 1493 | A-31 | R-19 |
| 1494 | A-31 | R-20 |
| 1495 | A-31 | R-21 |
| 1496 | A-31 | R-22 |
| 1497 | A-31 | R-23 |
| 1498 | A-31 | R-24 |
| 1499 | A-31 | R-25 |
| 1500 | A-31 | R-26 |
| 1501 | A-31 | R-27 |
| 1502 | A-31 | R-28 |
| 1503 | A-31 | R-29 |
| 1504 | A-31 | R-30 |
| 1505 | A-31 | R-31 |
| 1506 | A-31 | R-32 |
| 1507 | A-31 | R-33 |
| 1508 | A-31 | R-34 |
| 1509 | A-31 | R-35 |
| 1510 | A-31 | R-36 |
| 1511 | A-31 | R-37 |
| 1512 | A-31 | R-38 |
| 1513 | A-31 | R-39 |
| 1514 | A-31 | R-40 |
| 1515 | A-31 | R-41 |
| 1516 | A-31 | R-42 |
| 1517 | A-31 | R-43 |
| 1518 | A-31 | R-44 |
| 1519 | A-31 | R-45 |
| 1520 | A-31 | R-46 |

TABLE 14-continued

| | A | $R^b$, $R^d$ |
|---|---|---|
| 1521 | A-31 | R-47 |
| 1522 | A-31 | R-48 |
| 1523 | A-31 | R-49 |
| 1524 | A-32 | R-1 |
| 1525 | A-32 | R-2 |
| 1526 | A-32 | R-3 |
| 1527 | A-32 | R-4 |
| 1528 | A-32 | R-5 |

TABLE 15

| | | A | $R^b$, $R^d$ |
|---|---|---|---|
| Compound | 1529 | A-32 | R-6 |
| | 1530 | A-32 | R-7 |
| | 1531 | A-32 | R-8 |
| | 1532 | A-32 | R-9 |
| | 1533 | A-32 | R-10 |
| | 1534 | A-32 | R-11 |
| | 1535 | A-32 | R-12 |
| | 1536 | A-32 | R-13 |
| | 1537 | A-32 | R-14 |
| | 1538 | A-32 | R-15 |
| | 1539 | A-32 | R-16 |
| | 1540 | A-32 | R-17 |
| | 1541 | A-32 | R-18 |
| | 1542 | A-32 | R-19 |
| | 1543 | A-32 | R-20 |
| | 1544 | A-32 | R-21 |
| | 1545 | A-32 | R-22 |
| | 1546 | A-32 | R-23 |
| | 1547 | A-32 | R-24 |
| | 1548 | A-32 | R-25 |
| | 1549 | A-32 | R-26 |
| | 1550 | A-32 | R-27 |
| | 1551 | A-32 | R-28 |
| | 1552 | A-32 | R-29 |
| | 1553 | A-32 | R-30 |
| | 1554 | A-32 | R-31 |
| | 1555 | A-32 | R-32 |
| | 1556 | A-32 | R-33 |
| | 1557 | A-32 | R-34 |
| | 1558 | A-32 | R-35 |
| | 1559 | A-32 | R-36 |
| | 1560 | A-32 | R-37 |
| | 1561 | A-32 | R-38 |
| | 1562 | A-32 | R-39 |
| | 1563 | A-32 | R-40 |
| | 1564 | A-32 | R-41 |
| | 1565 | A-32 | R-42 |
| | 1566 | A-32 | R-43 |
| | 1567 | A-32 | R-44 |
| | 1568 | A-32 | R-45 |
| | 1569 | A-32 | R-46 |
| | 1570 | A-32 | R-47 |
| | 1571 | A-32 | R-48 |
| | 1572 | A-32 | R-49 |
| | 1573 | A-33 | R-1 |
| | 1574 | A-33 | R-2 |
| | 1575 | A-33 | R-3 |
| | 1576 | A-33 | R-4 |
| | 1577 | A-33 | R-5 |
| | 1578 | A-33 | R-6 |
| | 1579 | A-33 | R-7 |
| | 1580 | A-33 | R-8 |
| | 1581 | A-33 | R-9 |
| | 1582 | A-33 | R-10 |
| | 1583 | A-33 | R-11 |
| | 1584 | A-33 | R-12 |
| | 1585 | A-33 | R-13 |
| | 1586 | A-33 | R-14 |
| | 1587 | A-33 | R-15 |
| | 1588 | A-33 | R-16 |
| | 1589 | A-33 | R-17 |
| | 1590 | A-33 | R-18 |

TABLE 15-continued

| | A | $R^b$, $R^d$ |
|---|---|---|
| 1591 | A-33 | R-19 |
| 1592 | A-33 | R-20 |
| 1593 | A-33 | R-21 |
| 1594 | A-33 | R-22 |
| 1595 | A-33 | R-23 |
| 1596 | A-33 | R-24 |
| 1597 | A-33 | R-25 |
| 1598 | A-33 | R-26 |
| 1599 | A-33 | R-27 |
| 1600 | A-33 | R-28 |
| 1601 | A-33 | R-29 |
| 1602 | A-33 | R-30 |
| 1603 | A-33 | R-31 |
| 1604 | A-33 | R-32 |
| 1605 | A-33 | R-33 |
| 1606 | A-33 | R-34 |
| 1607 | A-33 | R-35 |
| 1608 | A-33 | R-36 |
| 1609 | A-33 | R-37 |
| 1610 | A-33 | R-38 |
| 1611 | A-33 | R-39 |
| 1612 | A-33 | R-40 |
| 1613 | A-33 | R-41 |
| 1614 | A-33 | R-42 |
| 1615 | A-33 | R-43 |
| 1616 | A-33 | R-44 |
| 1617 | A-33 | R-45 |
| 1618 | A-33 | R-46 |
| 1619 | A-33 | R-47 |
| 1620 | A-33 | R-48 |
| 1621 | A-33 | R-49 |
| 1622 | A-34 | R-1 |
| 1623 | A-34 | R-2 |
| 1624 | A-34 | R-3 |
| 1625 | A-34 | R-4 |
| 1626 | A-34 | R-5 |
| 1627 | A-34 | R-6 |
| 1628 | A-34 | R-7 |
| 1629 | A-34 | R-8 |
| 1630 | A-34 | R-9 |
| 1631 | A-34 | R-10 |
| 1632 | A-34 | R-11 |
| 1633 | A-34 | R-12 |
| 1634 | A-34 | R-13 |
| 1635 | A-34 | R-14 |
| 1636 | A-34 | R-15 |
| 1637 | A-34 | R-16 |
| 1638 | A-34 | R-17 |
| 1639 | A-34 | R-18 |
| 1640 | A-34 | R-19 |
| 1641 | A-34 | R-20 |
| 1642 | A-34 | R-21 |
| 1643 | A-34 | R-22 |
| 1644 | A-34 | R-23 |
| 1645 | A-34 | R-24 |

TABLE 16

| | | A | $R^b$, $R^d$ |
|---|---|---|---|
| Compound | 1646 | A-34 | R-25 |
| | 1647 | A-34 | R-26 |
| | 1648 | A-34 | R-27 |
| | 1649 | A-34 | R-28 |
| | 1650 | A-34 | R-29 |
| | 1651 | A-34 | R-30 |
| | 1652 | A-34 | R-31 |
| | 1653 | A-34 | R-32 |
| | 1654 | A-34 | R-33 |
| | 1655 | A-34 | R-34 |
| | 1656 | A-34 | R-35 |
| | 1657 | A-34 | R-36 |
| | 1658 | A-34 | R-37 |
| | 1659 | A-34 | R-38 |
| | 1660 | A-34 | R-39 |

TABLE 16-continued

| | A | $R^b$, $R^d$ |
|---|---|---|
| 1661 | A-34 | R-40 |
| 1662 | A-34 | R-41 |
| 1663 | A-34 | R-42 |
| 1664 | A-34 | R-43 |
| 1665 | A-34 | R-44 |
| 1666 | A-34 | R-45 |
| 1667 | A-34 | R-46 |
| 1668 | A-34 | R-47 |
| 1669 | A-34 | R-48 |
| 1670 | A-34 | R-49 |
| 1671 | A-35 | R-1 |
| 1672 | A-35 | R-2 |
| 1673 | A-35 | R-3 |
| 1674 | A-35 | R-4 |
| 1675 | A-35 | R-5 |
| 1676 | A-35 | R-6 |
| 1677 | A-35 | R-7 |
| 1678 | A-35 | R-8 |
| 1679 | A-35 | R-9 |
| 1680 | A-35 | R-10 |
| 1681 | A-35 | R-11 |
| 1682 | A-35 | R-12 |
| 1683 | A-35 | R-13 |
| 1684 | A-35 | R-14 |
| 1685 | A-35 | R-15 |
| 1686 | A-35 | R-16 |
| 1687 | A-35 | R-17 |
| 1688 | A-35 | R-18 |
| 1689 | A-35 | R-19 |
| 1690 | A-35 | R-20 |
| 1691 | A-35 | R-21 |
| 1692 | A-35 | R-22 |
| 1693 | A-35 | R-23 |
| 1694 | A-35 | R-24 |
| 1695 | A-35 | R-25 |
| 1696 | A-35 | R-26 |
| 1697 | A-35 | R-27 |
| 1698 | A-35 | R-28 |
| 1699 | A-35 | R-29 |
| 1700 | A-35 | R-30 |
| 1701 | A-35 | R-31 |
| 1702 | A-35 | R-32 |
| 1703 | A-35 | R-33 |
| 1704 | A-35 | R-34 |
| 1705 | A-35 | R-35 |
| 1706 | A-35 | R-36 |
| 1707 | A-35 | R-37 |
| 1708 | A-35 | R-38 |
| 1709 | A-35 | R-39 |
| 1710 | A-35 | R-40 |
| 1711 | A-35 | R-41 |
| 1712 | A-35 | R-42 |
| 1713 | A-35 | R-43 |
| 1714 | A-35 | R-44 |
| 1715 | A-35 | R-45 |
| 1716 | A-35 | R-46 |
| 1717 | A-35 | R-47 |
| 1718 | A-35 | R-48 |
| 1719 | A-35 | R-49 |
| 1720 | A-36 | R-1 |
| 1721 | A-36 | R-2 |
| 1722 | A-36 | R-3 |
| 1723 | A-36 | R-4 |
| 1724 | A-36 | R-5 |
| 1725 | A-36 | R-6 |
| 1726 | A-36 | R-7 |
| 1727 | A-36 | R-8 |
| 1728 | A-36 | R-9 |
| 1729 | A-36 | R-10 |
| 1730 | A-36 | R-11 |
| 1731 | A-36 | R-12 |
| 1732 | A-36 | R-13 |
| 1733 | A-36 | R-14 |
| 1734 | A-36 | R-15 |
| 1735 | A-36 | R-16 |
| 1736 | A-36 | R-17 |
| 1737 | A-36 | R-18 |
| 1738 | A-36 | R-19 |
| 1739 | A-36 | R-20 |
| 1740 | A-36 | R-21 |
| 1741 | A-36 | R-22 |
| 1742 | A-36 | R-23 |
| 1743 | A-36 | R-24 |
| 1744 | A-36 | R-25 |
| 1745 | A-36 | R-26 |
| 1746 | A-36 | R-27 |
| 1747 | A-36 | R-28 |
| 1748 | A-36 | R-29 |
| 1749 | A-36 | R-30 |
| 1750 | A-36 | R-31 |
| 1751 | A-36 | R-32 |
| 1752 | A-36 | R-33 |
| 1753 | A-36 | R-34 |
| 1754 | A-36 | R-35 |
| 1755 | A-36 | R-36 |
| 1756 | A-36 | R-37 |
| 1757 | A-36 | R-38 |
| 1758 | A-36 | R-39 |
| 1759 | A-36 | R-40 |
| 1760 | A-36 | R-41 |
| 1761 | A-36 | R-42 |
| 1762 | A-36 | R-43 |

TABLE 17

| | | A | $R^b$, $R^d$ |
|---|---|---|---|
| Compound | 1763 | A-36 | R-44 |
| | 1764 | A-36 | R-45 |
| | 1765 | A-36 | R-46 |
| | 1766 | A-36 | R-47 |
| | 1767 | A-36 | R-48 |
| | 1768 | A-36 | R-49 |
| | 1769 | A-37 | R-1 |
| | 1770 | A-37 | R-2 |
| | 1771 | A-37 | R-3 |
| | 1772 | A-37 | R-4 |
| | 1773 | A-37 | R-5 |
| | 1774 | A-37 | R-6 |
| | 1775 | A-37 | R-7 |
| | 1776 | A-37 | R-8 |
| | 1777 | A-37 | R-9 |
| | 1778 | A-37 | R-10 |
| | 1779 | A-37 | R-11 |
| | 1780 | A-37 | R-12 |
| | 1781 | A-37 | R-13 |
| | 1782 | A-37 | R-14 |
| | 1783 | A-37 | R-15 |
| | 1784 | A-37 | R-16 |
| | 1785 | A-37 | R-17 |
| | 1786 | A-37 | R-18 |
| | 1787 | A-37 | R-19 |
| | 1788 | A-37 | R-20 |
| | 1789 | A-37 | R-21 |
| | 1790 | A-37 | R-22 |
| | 1791 | A-37 | R-23 |
| | 1792 | A-37 | R-24 |
| | 1793 | A-37 | R-25 |
| | 1794 | A-37 | R-26 |
| | 1795 | A-37 | R-27 |
| | 1796 | A-37 | R-28 |
| | 1797 | A-37 | R-29 |
| | 1798 | A-37 | R-30 |
| | 1799 | A-37 | R-31 |
| | 1800 | A-37 | R-32 |
| | 1801 | A-37 | R-33 |
| | 1802 | A-37 | R-34 |
| | 1803 | A-37 | R-35 |
| | 1804 | A-37 | R-36 |
| | 1805 | A-37 | R-37 |
| | 1806 | A-37 | R-38 |
| | 1807 | A-37 | R-39 |
| | 1808 | A-37 | R-40 |

TABLE 17-continued

| | A | $R^b, R^d$ |
|---|---|---|
| 1809 | A-37 | R-41 |
| 1810 | A-37 | R-42 |
| 1811 | A-37 | R-43 |
| 1812 | A-37 | R-44 |
| 1813 | A-37 | R-45 |
| 1814 | A-37 | R-46 |
| 1815 | A-37 | R-47 |
| 1816 | A-37 | R-48 |
| 1817 | A-37 | R-49 |
| 1818 | A-38 | R-1 |
| 1819 | A-38 | R-2 |
| 1820 | A-38 | R-3 |
| 1821 | A-38 | R-4 |
| 1822 | A-38 | R-5 |
| 1823 | A-38 | R-6 |
| 1824 | A-38 | R-7 |
| 1825 | A-38 | R-8 |
| 1826 | A-38 | R-9 |
| 1827 | A-38 | R-10 |
| 1828 | A-38 | R-11 |
| 1829 | A-38 | R-12 |
| 1830 | A-38 | R-13 |
| 1831 | A-38 | R-14 |
| 1832 | A-38 | R-15 |
| 1833 | A-38 | R-16 |
| 1834 | A-38 | R-17 |
| 1835 | A-38 | R-18 |
| 1836 | A-38 | R-19 |
| 1837 | A-38 | R-20 |
| 1838 | A-38 | R-21 |
| 1839 | A-38 | R-22 |
| 1840 | A-38 | R-23 |
| 1841 | A-38 | R-24 |
| 1842 | A-38 | R-25 |
| 1843 | A-38 | R-26 |
| 1844 | A-38 | R-27 |
| 1845 | A-38 | R-28 |
| 1846 | A-38 | R-29 |
| 1847 | A-38 | R-30 |
| 1848 | A-38 | R-31 |
| 1849 | A-38 | R-32 |
| 1850 | A-38 | R-33 |
| 1851 | A-38 | R-34 |
| 1852 | A-38 | R-35 |
| 1853 | A-38 | R-36 |
| 1854 | A-38 | R-37 |
| 1855 | A-38 | R-38 |
| 1856 | A-38 | R-39 |
| 1857 | A-38 | R-40 |
| 1858 | A-38 | R-41 |
| 1859 | A-38 | R-42 |
| 1860 | A-38 | R-43 |
| 1861 | A-38 | R-44 |
| 1862 | A-38 | R-45 |
| 1863 | A-38 | R-46 |
| 1864 | A-38 | R-47 |
| 1865 | A-38 | R-48 |
| 1866 | A-38 | R-49 |
| 1867 | A-39 | R-1 |
| 1868 | A-39 | R-2 |
| 1869 | A-39 | R-3 |
| 1870 | A-39 | R-4 |
| 1871 | A-39 | R-5 |
| 1872 | A-39 | R-6 |
| 1873 | A-39 | R-7 |
| 1874 | A-39 | R-8 |
| 1875 | A-39 | R-9 |
| 1876 | A-39 | R-10 |
| 1877 | A-39 | R-11 |
| 1878 | A-39 | R-12 |
| 1879 | A-39 | R-13 |

TABLE 18

| | | A | $R^b, R^d$ |
|---|---|---|---|
| Compound | 1880 | A-39 | R-14 |
| | 1881 | A-39 | R-15 |
| | 1882 | A-39 | R-16 |
| | 1883 | A-39 | R-17 |
| | 1884 | A-39 | R-18 |
| | 1885 | A-39 | R-19 |
| | 1886 | A-39 | R-20 |
| | 1887 | A-39 | R-21 |
| | 1888 | A-39 | R-22 |
| | 1889 | A-39 | R-23 |
| | 1890 | A-39 | R-24 |
| | 1891 | A-39 | R-25 |
| | 1892 | A-39 | R-26 |
| | 1893 | A-39 | R-27 |
| | 1894 | A-39 | R-28 |
| | 1895 | A-39 | R-29 |
| | 1896 | A-39 | R-30 |
| | 1897 | A-39 | R-31 |
| | 1898 | A-39 | R-32 |
| | 1899 | A-39 | R-33 |
| | 1900 | A-39 | R-34 |
| | 1901 | A-39 | R-35 |
| | 1902 | A-39 | R-36 |
| | 1903 | A-39 | R-37 |
| | 1904 | A-39 | R-38 |
| | 1905 | A-39 | R-39 |
| | 1906 | A-39 | R-40 |
| | 1907 | A-39 | R-41 |
| | 1908 | A-39 | R-42 |
| | 1909 | A-39 | R-43 |
| | 1910 | A-39 | R-44 |
| | 1911 | A-39 | R-45 |
| | 1912 | A-39 | R-46 |
| | 1913 | A-39 | R-47 |
| | 1914 | A-39 | R-48 |
| | 1915 | A-39 | R-49 |
| | 1916 | A-40 | R-1 |
| | 1917 | A-40 | R-2 |
| | 1918 | A-40 | R-3 |
| | 1919 | A-40 | R-4 |
| | 1920 | A-40 | R-5 |
| | 1921 | A-40 | R-6 |
| | 1922 | A-40 | R-7 |
| | 1923 | A-40 | R-8 |
| | 1924 | A-40 | R-9 |
| | 1925 | A-40 | R-10 |
| | 1926 | A-40 | R-11 |
| | 1927 | A-40 | R-12 |
| | 1928 | A-40 | R-13 |
| | 1929 | A-40 | R-14 |
| | 1930 | A-40 | R-15 |
| | 1931 | A-40 | R-16 |
| | 1932 | A-40 | R-17 |
| | 1933 | A-40 | R-18 |
| | 1934 | A-40 | R-19 |
| | 1935 | A-40 | R-20 |
| | 1936 | A-40 | R-21 |
| | 1937 | A-40 | R-22 |
| | 1938 | A-40 | R-23 |
| | 1939 | A-40 | R-24 |
| | 1940 | A-40 | R-25 |
| | 1941 | A-40 | R-26 |
| | 1942 | A-40 | R-27 |
| | 1943 | A-40 | R-28 |
| | 1944 | A-40 | R-29 |
| | 1945 | A-40 | R-30 |
| | 1946 | A-40 | R-31 |
| | 1947 | A-40 | R-32 |
| | 1948 | A-40 | R-33 |
| | 1949 | A-40 | R-34 |
| | 1950 | A-40 | R-35 |
| | 1951 | A-40 | R-36 |
| | 1952 | A-40 | R-37 |
| | 1953 | A-40 | R-38 |
| | 1954 | A-40 | R-39 |
| | 1955 | A-40 | R-40 |
| | 1956 | A-40 | R-41 |
| | 1957 | A-40 | R-42 |

TABLE 18-continued

| | | A | $R^b$, $R^d$ |
|---|---|---|---|
| | 1958 | A-40 | R-43 |
| | 1959 | A-40 | R-44 |
| | 1960 | A-40 | R-45 |
| | 1961 | A-40 | R-46 |
| | 1962 | A-40 | R-47 |
| | 1963 | A-40 | R-48 |
| | 1964 | A-40 | R-49 |
| | 1965 | A-41 | R-1 |
| | 1966 | A-41 | R-2 |
| | 1967 | A-41 | R-3 |
| | 1968 | A-41 | R-4 |
| | 1969 | A-41 | R-5 |
| | 1970 | A-41 | R-6 |
| | 1971 | A-41 | R-7 |
| | 1972 | A-41 | R-8 |
| | 1973 | A-41 | R-9 |
| | 1974 | A-41 | R-10 |
| | 1975 | A-41 | R-11 |
| | 1976 | A-41 | R-12 |
| | 1977 | A-41 | R-13 |
| | 1978 | A-41 | R-14 |
| | 1979 | A-41 | R-15 |
| | 1980 | A-41 | R-16 |
| | 1981 | A-41 | R-17 |
| | 1982 | A-41 | R-18 |
| | 1983 | A-41 | R-19 |
| | 1984 | A-41 | R-20 |
| | 1985 | A-41 | R-21 |
| | 1986 | A-41 | R-22 |
| | 1987 | A-41 | R-23 |
| | 1988 | A-41 | R-24 |
| | 1989 | A-41 | R-25 |
| | 1990 | A-41 | R-26 |
| | 1991 | A-41 | R-27 |
| | 1992 | A-41 | R-28 |
| | 1993 | A-41 | R-29 |
| | 1994 | A-41 | R-30 |
| | 1995 | A-41 | R-31 |
| | 1996 | A-41 | R-32 |

TABLE 19

| | | A | $R^b$, $R^d$ |
|---|---|---|---|
| Compound | 1997 | A-41 | R-33 |
| | 1998 | A-41 | R-34 |
| | 1999 | A-41 | R-35 |
| | 2000 | A-41 | R-36 |
| | 2001 | A-41 | R-37 |
| | 2002 | A-41 | R-38 |
| | 2003 | A-41 | R-39 |
| | 2004 | A-41 | R-40 |
| | 2005 | A-41 | R-41 |
| | 2006 | A-41 | R-42 |
| | 2007 | A-41 | R-43 |
| | 2008 | A-41 | R-44 |
| | 2009 | A-41 | R-45 |
| | 2010 | A-41 | R-46 |
| | 2011 | A-41 | R-47 |
| | 2012 | A-41 | R-48 |
| | 2013 | A-41 | R-49 |
| | 2014 | A-42 | R-1 |
| | 2015 | A-42 | R-2 |
| | 2016 | A-42 | R-3 |
| | 2017 | A-42 | R-4 |
| | 2018 | A-42 | R-5 |
| | 2019 | A-42 | R-6 |
| | 2020 | A-42 | R-7 |
| | 2021 | A-42 | R-8 |
| | 2022 | A-42 | R-9 |
| | 2023 | A-42 | R-10 |
| | 2024 | A-42 | R-11 |
| | 2025 | A-42 | R-12 |
| | 2026 | A-42 | R-13 |
| | 2027 | A-42 | R-14 |

TABLE 19-continued

| | A | $R^b$, $R^d$ |
|---|---|---|
| 2028 | A-42 | R-15 |
| 2029 | A-42 | R-16 |
| 2030 | A-42 | R-17 |
| 2031 | A-42 | R-18 |
| 2032 | A-42 | R-19 |
| 2033 | A-42 | R-20 |
| 2034 | A-42 | R-21 |
| 2035 | A-42 | R-22 |
| 2036 | A-42 | R-23 |
| 2037 | A-42 | R-24 |
| 2038 | A-42 | R-25 |
| 2039 | A-42 | R-26 |
| 2040 | A-42 | R-27 |
| 2041 | A-42 | R-28 |
| 2042 | A-42 | R-29 |
| 2043 | A-42 | R-30 |
| 2044 | A-42 | R-31 |
| 2045 | A-42 | R-32 |
| 2046 | A-42 | R-33 |
| 2047 | A-42 | R-34 |
| 2048 | A-42 | R-35 |
| 2049 | A-42 | R-36 |
| 2050 | A-42 | R-37 |
| 2051 | A-42 | R-38 |
| 2052 | A-42 | R-39 |
| 2053 | A-42 | R-40 |
| 2054 | A-42 | R-41 |
| 2055 | A-42 | R-42 |
| 2056 | A-42 | R-43 |
| 2057 | A-42 | R-44 |
| 2058 | A-42 | R-45 |
| 2059 | A-42 | R-46 |
| 2060 | A-42 | R-47 |
| 2061 | A-42 | R-48 |
| 2062 | A-42 | R-49 |
| 2063 | A-43 | R-1 |
| 2064 | A-43 | R-2 |
| 2065 | A-43 | R-3 |
| 2066 | A-43 | R-4 |
| 2067 | A-43 | R-5 |
| 2068 | A-43 | R-6 |
| 2069 | A-43 | R-7 |
| 2070 | A-43 | R-8 |
| 2071 | A-43 | R-9 |
| 2072 | A-43 | R-10 |
| 2073 | A-43 | R-11 |
| 2074 | A-43 | R-12 |
| 2075 | A-43 | R-13 |
| 2076 | A-43 | R-14 |
| 2077 | A-43 | R-15 |
| 2078 | A-43 | R-16 |
| 2079 | A-43 | R-17 |
| 2080 | A-43 | R-18 |
| 2081 | A-43 | R-19 |
| 2082 | A-43 | R-20 |
| 2083 | A-43 | R-21 |
| 2084 | A-43 | R-22 |
| 2085 | A-43 | R-23 |
| 2086 | A-43 | R-24 |
| 2087 | A-43 | R-25 |
| 2088 | A-43 | R-26 |
| 2089 | A-43 | R-27 |
| 2090 | A-43 | R-28 |
| 2091 | A-43 | R-29 |
| 2092 | A-43 | R-30 |
| 2093 | A-43 | R-31 |
| 2094 | A-43 | R-32 |
| 2095 | A-43 | R-33 |
| 2096 | A-43 | R-34 |
| 2097 | A-43 | R-35 |
| 2098 | A-43 | R-36 |
| 2099 | A-43 | R-37 |
| 2100 | A-43 | R-38 |
| 2101 | A-43 | R-39 |
| 2102 | A-43 | R-40 |
| 2103 | A-43 | R-41 |
| 2104 | A-43 | R-42 |
| 2105 | A-43 | R-43 |

TABLE 19-continued

|  | | A | $R^b, R^d$ |
|---|---|---|---|
|  | 2106 | A-43 | R-44 |
|  | 2107 | A-43 | R-45 |
|  | 2108 | A-43 | R-46 |
|  | 2109 | A-43 | R-47 |
|  | 2110 | A-43 | R-48 |
|  | 2111 | A-43 | R-49 |
|  | 2112 | A-44 | R-1 |
|  | 2113 | A-44 | R-2 |

TABLE 20

|  | | A | $R^b, R^d$ |
|---|---|---|---|
| Compound | 2114 | A-44 | R-3 |
|  | 2115 | A-44 | R-4 |
|  | 2116 | A-44 | R-5 |
|  | 2117 | A-44 | R-6 |
|  | 2118 | A-44 | R-7 |
|  | 2119 | A-44 | R-8 |
|  | 2120 | A-44 | R-9 |
|  | 2121 | A-44 | R-10 |
|  | 2122 | A-44 | R-11 |
|  | 2123 | A-44 | R-12 |
|  | 2124 | A-44 | R-13 |
|  | 2125 | A-44 | R-14 |
|  | 2126 | A-44 | R-15 |
|  | 2127 | A-44 | R-16 |
|  | 2128 | A-44 | R-17 |
|  | 2129 | A-44 | R-18 |
|  | 2130 | A-44 | R-19 |
|  | 2131 | A-44 | R-20 |
|  | 2132 | A-44 | R-21 |
|  | 2133 | A-44 | R-22 |
|  | 2134 | A-44 | R-23 |
|  | 2135 | A-44 | R-24 |
|  | 2136 | A-44 | R-25 |
|  | 2137 | A-44 | R-26 |
|  | 2138 | A-44 | R-27 |
|  | 2139 | A-44 | R-28 |
|  | 2140 | A-44 | R-29 |
|  | 2141 | A-44 | R-30 |
|  | 2142 | A-44 | R-31 |
|  | 2143 | A-44 | R-32 |
|  | 2144 | A-44 | R-33 |
|  | 2145 | A-44 | R-34 |
|  | 2146 | A-44 | R-35 |
|  | 2147 | A-44 | R-36 |
|  | 2148 | A-44 | R-37 |
|  | 2149 | A-44 | R-38 |
|  | 2150 | A-44 | R-39 |
|  | 2151 | A-44 | R-40 |
|  | 2152 | A-44 | R-41 |
|  | 2153 | A-44 | R-42 |
|  | 2154 | A-44 | R-43 |
|  | 2155 | A-44 | R-44 |
|  | 2156 | A-44 | R-45 |
|  | 2157 | A-44 | R-46 |
|  | 2158 | A-44 | R-47 |
|  | 2159 | A-44 | R-48 |
|  | 2160 | A-44 | R-49 |
|  | 2161 | A-45 | R-1 |
|  | 2162 | A-45 | R-2 |
|  | 2163 | A-45 | R-3 |
|  | 2164 | A-45 | R-4 |
|  | 2165 | A-45 | R-5 |
|  | 2166 | A-45 | R-6 |
|  | 2167 | A-45 | R-7 |
|  | 2168 | A-45 | R-8 |
|  | 2169 | A-45 | R-9 |
|  | 2170 | A-45 | R-10 |
|  | 2171 | A-45 | R-11 |
|  | 2172 | A-45 | R-12 |
|  | 2173 | A-45 | R-13 |
|  | 2174 | A-45 | R-14 |
|  | 2175 | A-45 | R-15 |

TABLE 20-continued

|  | | A | $R^b, R^d$ |
|---|---|---|---|
|  | 2176 | A-45 | R-16 |
|  | 2177 | A-45 | R-17 |
|  | 2178 | A-45 | R-18 |
|  | 2179 | A-45 | R-19 |
|  | 2180 | A-45 | R-20 |
|  | 2181 | A-45 | R-21 |
|  | 2182 | A-45 | R-22 |
|  | 2183 | A-45 | R-23 |
|  | 2184 | A-45 | R-24 |
|  | 2185 | A-45 | R-25 |
|  | 2186 | A-45 | R-26 |
|  | 2187 | A-45 | R-27 |
|  | 2188 | A-45 | R-28 |
|  | 2189 | A-45 | R-29 |
|  | 2190 | A-45 | R-30 |
|  | 2191 | A-45 | R-31 |
|  | 2192 | A-45 | R-32 |
|  | 2193 | A-45 | R-33 |
|  | 2194 | A-45 | R-34 |
|  | 2195 | A-45 | R-35 |
|  | 2196 | A-45 | R-36 |
|  | 2197 | A-45 | R-37 |
|  | 2198 | A-45 | R-38 |
|  | 2199 | A-45 | R-39 |
|  | 2200 | A-45 | R-40 |
|  | 2201 | A-45 | R-41 |
|  | 2202 | A-45 | R-42 |
|  | 2203 | A-45 | R-43 |
|  | 2204 | A-45 | R-44 |
|  | 2205 | A-45 | R-45 |
|  | 2206 | A-45 | R-46 |
|  | 2207 | A-45 | R-47 |
|  | 2208 | A-45 | R-48 |
|  | 2209 | A-45 | R-49 |
|  | 2210 | A-46 | R-1 |
|  | 2211 | A-46 | R-2 |
|  | 2212 | A-46 | R-3 |
|  | 2213 | A-46 | R-4 |
|  | 2214 | A-46 | R-5 |
|  | 2215 | A-46 | R-6 |
|  | 2216 | A-46 | R-7 |
|  | 2217 | A-46 | R-8 |
|  | 2218 | A-46 | R-9 |
|  | 2219 | A-46 | R-10 |
|  | 2220 | A-46 | R-11 |
|  | 2221 | A-46 | R-12 |
|  | 2222 | A-46 | R-13 |
|  | 2223 | A-46 | R-14 |
|  | 2224 | A-46 | R-15 |
|  | 2225 | A-46 | R-16 |
|  | 2226 | A-46 | R-17 |
|  | 2227 | A-46 | R-18 |
|  | 2228 | A-46 | R-19 |
|  | 2229 | A-46 | R-20 |
|  | 2230 | A-46 | R-21 |

TABLE 21

|  | | A | $R^b, R^d$ |
|---|---|---|---|
| Compound | 2231 | A-46 | R-22 |
|  | 2232 | A-46 | R-23 |
|  | 2233 | A-46 | R-24 |
|  | 2234 | A-46 | R-25 |
|  | 2235 | A-46 | R-26 |
|  | 2236 | A-46 | R-27 |
|  | 2237 | A-46 | R-28 |
|  | 2238 | A-46 | R-29 |
|  | 2239 | A-46 | R-30 |
|  | 2240 | A-46 | R-31 |
|  | 2241 | A-46 | R-32 |
|  | 2242 | A-46 | R-33 |
|  | 2243 | A-46 | R-34 |
|  | 2244 | A-46 | R-35 |
|  | 2245 | A-46 | R-36 |

TABLE 21-continued

| | A | $R^b, R^d$ |
|---|---|---|
| 2246 | A-46 | R-37 |
| 2247 | A-46 | R-38 |
| 2248 | A-46 | R-39 |
| 2249 | A-46 | R-40 |
| 2250 | A-46 | R-41 |
| 2251 | A-46 | R-42 |
| 2252 | A-46 | R-43 |
| 2253 | A-46 | R-44 |
| 2254 | A-46 | R-45 |
| 2255 | A-46 | R-46 |
| 2256 | A-46 | R-47 |
| 2257 | A-46 | R-48 |
| 2258 | A-46 | R-49 |
| 2259 | A-47 | R-1 |
| 2260 | A-47 | R-2 |
| 2261 | A-47 | R-3 |
| 2262 | A-47 | R-4 |
| 2263 | A-47 | R-5 |
| 2264 | A-47 | R-6 |
| 2265 | A-47 | R-7 |
| 2266 | A-47 | R-8 |
| 2267 | A-47 | R-9 |
| 2268 | A-47 | R-10 |
| 2269 | A-47 | R-11 |
| 2270 | A-47 | R-12 |
| 2271 | A-47 | R-13 |
| 2272 | A-47 | R-14 |
| 2273 | A-47 | R-15 |
| 2274 | A-47 | R-16 |
| 2275 | A-47 | R-17 |
| 2276 | A-47 | R-18 |
| 2277 | A-47 | R-19 |
| 2278 | A-47 | R-20 |
| 2279 | A-47 | R-21 |
| 2280 | A-47 | R-22 |
| 2281 | A-47 | R-23 |
| 2282 | A-47 | R-24 |
| 2283 | A-47 | R-25 |
| 2284 | A-47 | R-26 |
| 2285 | A-47 | R-27 |
| 2286 | A-47 | R-28 |
| 2287 | A-47 | R-29 |
| 2288 | A-47 | R-30 |
| 2289 | A-47 | R-31 |
| 2290 | A-47 | R-32 |
| 2291 | A-47 | R-33 |
| 2292 | A-47 | R-34 |
| 2293 | A-47 | R-35 |
| 2294 | A-47 | R-36 |
| 2295 | A-47 | R-37 |
| 2296 | A-47 | R-38 |
| 2297 | A-47 | R-39 |
| 2298 | A-47 | R-40 |
| 2299 | A-47 | R-41 |
| 2300 | A-47 | R-42 |
| 2301 | A-47 | R-43 |
| 2302 | A-47 | R-44 |
| 2303 | A-47 | R-45 |
| 2304 | A-47 | R-46 |
| 2305 | A-47 | R-47 |
| 2306 | A-47 | R-48 |
| 2307 | A-47 | R-49 |
| 2308 | A-48 | R-1 |
| 2309 | A-48 | R-2 |
| 2310 | A-48 | R-3 |
| 2311 | A-48 | R-4 |
| 2312 | A-48 | R-5 |
| 2313 | A-48 | R-6 |
| 2314 | A-48 | R-7 |
| 2315 | A-48 | R-8 |
| 2316 | A-48 | R-9 |
| 2317 | A-48 | R-10 |
| 2318 | A-48 | R-11 |
| 2319 | A-48 | R-12 |
| 2320 | A-48 | R-13 |
| 2321 | A-48 | R-14 |
| 2322 | A-48 | R-15 |
| 2323 | A-48 | R-16 |
| 2324 | A-48 | R-17 |
| 2325 | A-48 | R-18 |
| 2326 | A-48 | R-19 |
| 2327 | A-48 | R-20 |
| 2328 | A-48 | R-21 |
| 2329 | A-48 | R-22 |
| 2330 | A-48 | R-23 |
| 2331 | A-48 | R-24 |
| 2332 | A-48 | R-25 |
| 2333 | A-48 | R-26 |
| 2334 | A-48 | R-27 |
| 2335 | A-48 | R-28 |
| 2336 | A-48 | R-29 |
| 2337 | A-48 | R-30 |
| 2338 | A-48 | R-31 |
| 2339 | A-48 | R-32 |
| 2340 | A-48 | R-33 |
| 2341 | A-48 | R-34 |
| 2342 | A-48 | R-35 |
| 2343 | A-48 | R-36 |
| 2344 | A-48 | R-37 |
| 2345 | A-48 | R-38 |
| 2346 | A-48 | R-39 |
| 2347 | A-48 | R-40 |

TABLE 22

| | | A | $R^b, R^d$ |
|---|---|---|---|
| Compound | 2348 | A-48 | R-41 |
| | 2349 | A-48 | R-42 |
| | 2350 | A-48 | R-43 |
| | 2351 | A-48 | R-44 |
| | 2352 | A-48 | R-45 |
| | 2353 | A-48 | R-46 |
| | 2354 | A-48 | R-47 |
| | 2355 | A-48 | R-48 |
| | 2356 | A-48 | R-49 |
| | 2357 | A-1 | R-1 |
| | 2358 | A-1 | R-2 |
| | 2359 | A-1 | R-7 |
| | 2360 | A-1 | R-13 |
| | 2361 | A-1 | R-14 |
| | 2362 | A-4 | R-1 |
| | 2363 | A-4 | R-2 |
| | 2364 | A-4 | R-7 |
| | 2365 | A-4 | R-13 |
| | 2366 | A-4 | R-14 |
| | 2367 | A-8 | R-1 |
| | 2368 | A-8 | R-2 |
| | 2369 | A-8 | R-7 |
| | 2370 | A-8 | R-13 |
| | 2371 | A-8 | R-14 |
| | 2372 | A-42 | R-1 |
| | 2373 | A-42 | R-2 |
| | 2374 | A-42 | R-7 |
| | 2375 | A-42 | R-13 |
| | 2376 | A-42 | R-14 |
| | 2377 | A-1 | R-1 |
| | 2378 | A-1 | R-2 |
| | 2379 | A-1 | R-7 |
| | 2380 | A-1 | R-13 |
| | 2381 | A-1 | R-14 |
| | 2382 | A-4 | R-1 |
| | 2383 | A-4 | R-2 |
| | 2384 | A-4 | R-7 |
| | 2385 | A-4 | R-13 |
| | 2386 | A-4 | R-14 |

TABLE 22-continued
| | A | $R^b$, $R^d$ |
|---|---|---|
| 2387 | A-8 | R-1 |
| 2388 | A-8 | R-2 |
| 2389 | A-8 | R-7 |
| 2390 | A-8 | R-13 |
| 2391 | A-8 | R-14 |
| 2392 | A-42 | R-1 |
| 2393 | A-42 | R-2 |
| 2394 | A-42 | R-7 |
| 2395 | A-42 | R-13 |
| 2396 | A-42 | R-14 |
| 2397 | A-1 | R-1 |
| 2398 | A-1 | R-2 |
| 2399 | A-1 | R-7 |
| 2400 | A-1 | R-13 |
| 2401 | A-1 | R-14 |
| 2402 | A-4 | R-1 |
| 2403 | A-4 | R-2 |
| 2404 | A-4 | R-7 |
| 2405 | A-4 | R-13 |
| 2406 | A-4 | R-14 |
| 2407 | A-8 | R-1 |
| 2408 | A-8 | R-2 |
| 2409 | A-8 | R-7 |
| 2410 | A-8 | R-13 |
| 2411 | A-8 | R-14 |
| 2412 | A-42 | R-1 |
| 2413 | A-42 | R-2 |
| 2414 | A-42 | R-7 |
| 2415 | A-42 | R-13 |
| 2416 | A-42 | R-14 |
| 2417 | A-1 | R-1 |
| 2418 | A-1 | R-2 |
| 2419 | A-1 | R-7 |
| 2420 | A-1 | R-13 |
| 2421 | A-1 | R-14 |
| 2422 | A-4 | R-1 |
| 2423 | A-4 | R-2 |
| 2424 | A-4 | R-7 |
| 2425 | A-4 | R-13 |
| 2426 | A-4 | R-14 |
| 2427 | A-8 | R-1 |
| 2428 | A-8 | R-2 |
| 2429 | A-8 | R-7 |
| 2430 | A-8 | R-13 |
| 2431 | A-8 | R-14 |
| 2432 | A-42 | R-1 |
| 2433 | A-42 | R-2 |
| 2434 | A-42 | R-7 |
| 2435 | A-42 | R-13 |
| 2436 | A-42 | R-14 |
| 2437 | A-1 | R-1 |
| 2438 | A-1 | R-2 |
| 2439 | A-1 | R-7 |
| 2440 | A-1 | R-13 |
| 2441 | A-1 | R-14 |
| 2442 | A-4 | R-1 |
| 2443 | A-4 | R-2 |
| 2444 | A-4 | R-7 |
| 2445 | A-4 | R-13 |
| 2446 | A-4 | R-14 |
| 2447 | A-8 | R-1 |
| 2448 | A-8 | R-2 |
| 2449 | A-8 | R-7 |
| 2450 | A-8 | R-13 |
| 2451 | A-8 | R-14 |
| 2452 | A-42 | R-1 |
| 2453 | A-42 | R-2 |
| 2454 | A-42 | R-7 |
| 2455 | A-42 | R-13 |
| 2456 | A-42 | R-14 |
TABLE 23
| | | A | $R^b$, $R^d$ |
|---|---|---|---|
| Compound | 2457 | A-1 | R-1 |
| | 2458 | A-1 | R-2 |
| | 2459 | A-1 | R-7 |
| | 2460 | A-1 | R-13 |
| | 2461 | A-1 | R-14 |
| | 2462 | A-4 | R-1 |
| | 2463 | A-4 | R-2 |
| | 2464 | A-4 | R-7 |
| | 2465 | A-4 | R-13 |
| | 2466 | A-4 | R-14 |
| | 2467 | A-8 | R-1 |
| | 2468 | A-8 | R-2 |
| | 2469 | A-8 | R-7 |
| | 2470 | A-8 | R-13 |
| | 2471 | A-8 | R-14 |
| | 2472 | A-42 | R-1 |
| | 2473 | A-42 | R-2 |
| | 2474 | A-42 | R-7 |
| | 2475 | A-42 | R-13 |
| | 2476 | A-42 | R-14 |
| | 2477 | A-1 | R-1 |
| | 2478 | A-1 | R-2 |
| | 2479 | A-1 | R-7 |
| | 2480 | A-1 | R-13 |
| | 2481 | A-1 | R-14 |
| | 2482 | A-4 | R-1 |
| | 2483 | A-4 | R-2 |
| | 2484 | A-4 | R-7 |
| | 2485 | A-4 | R-13 |
| | 2486 | A-4 | R-14 |
| | 2487 | A-8 | R-1 |
| | 2488 | A-8 | R-2 |
| | 2489 | A-8 | R-7 |
| | 2490 | A-8 | R-13 |
| | 2491 | A-8 | R-14 |
| | 2492 | A-42 | R-1 |
| | 2493 | A-42 | R-2 |
| | 2494 | A-42 | R-7 |
| | 2495 | A-42 | R-13 |
| | 2496 | A-42 | R-14 |
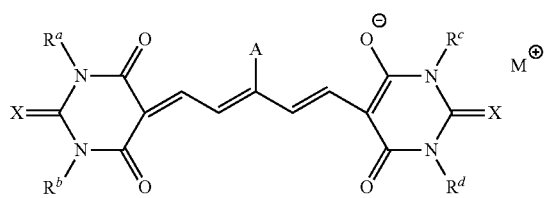
SK-1
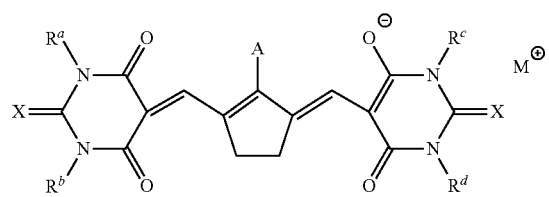
SK-2

SK-3 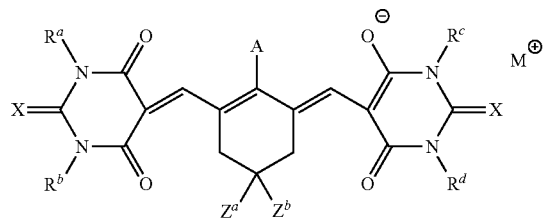
SK-4 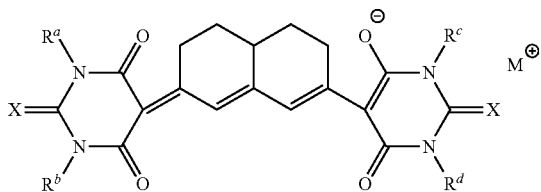
SK-5 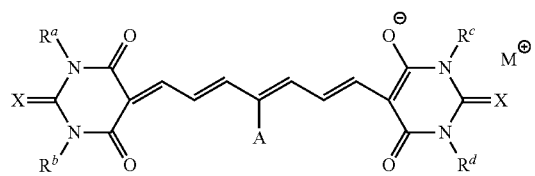
SK-6 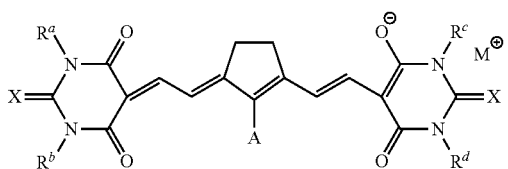
SK-7 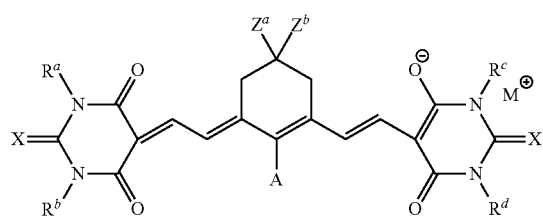
SK-8 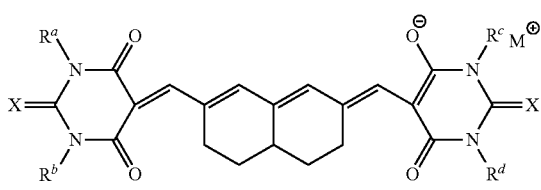
Compound 2497
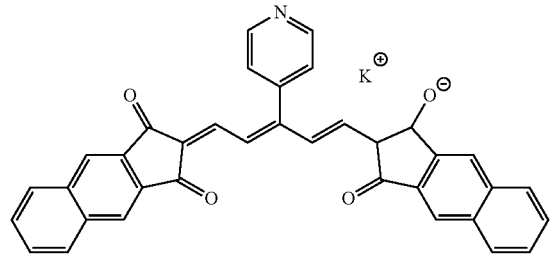
Compound 2498
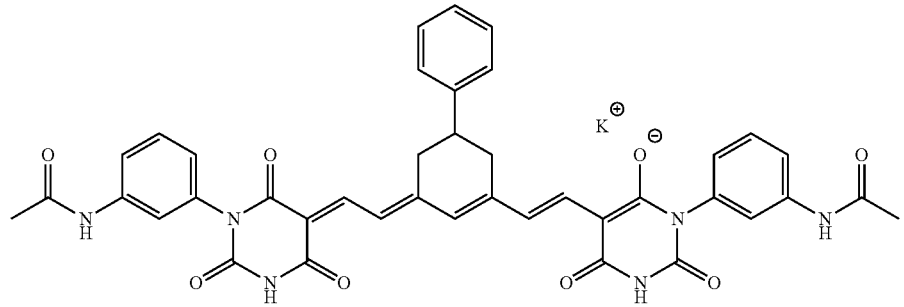
Compound 2499 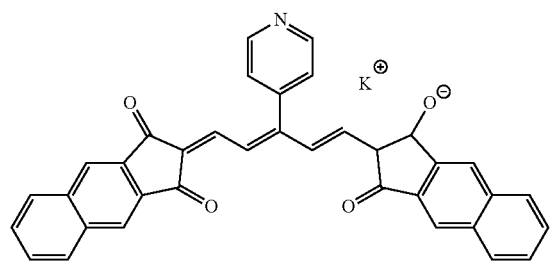
Compound 2500 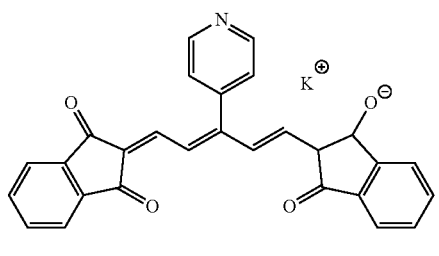

Compound 2501
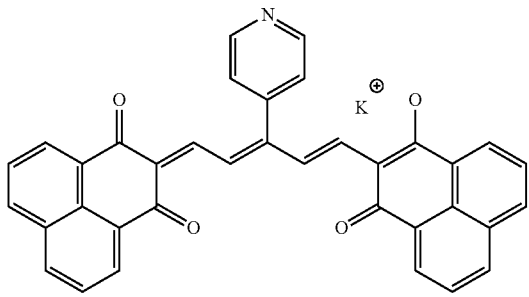
Compound 2502
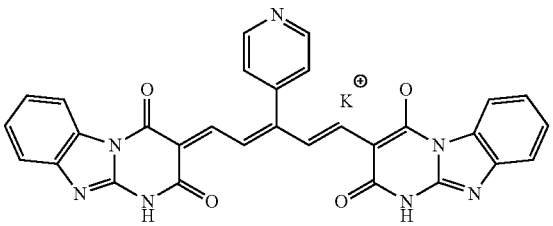
Compound 2503
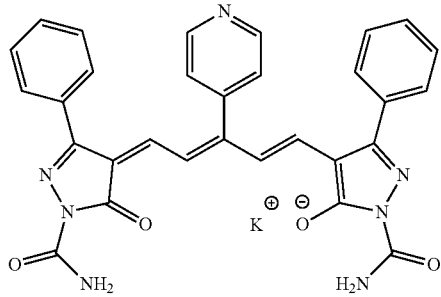
TABLE 24
|   | A | $R^b, R^d$ |
|---|---|---|
| Compound 2504 | A-1 | R-50 |
| 2505 | A-1 | R-51 |
| 2506 | A-1 | R-52 |
| 2507 | A-1 | R-53 |
| 2508 | A-1 | R-54 |
| 2509 | A-1 | R-55 |
| 2510 | A-1 | R-56 |
| 2511 | A-1 | R-57 |
| 2512 | A-1 | R-58 |
| 2513 | A-1 | R-59 |
| 2514 | A-1 | R-60 |
| 2515 | A-1 | R-61 |
| 2516 | A-1 | R-62 |
| 2517 | A-1 | R-63 |
| 2518 | A-1 | R-64 |
| 2519 | A-1 | R-65 |
| 2520 | A-1 | R-66 |
| 2521 | A-1 | R-67 |
| 2522 | A-1 | R-68 |
| 2523 | A-1 | R-69 |
| 2524 | A-1 | R-70 |
| 2525 | A-1 | R-71 |
| 2526 | A-1 | R-72 |
| 2527 | A-1 | R-73 |
| 2528 | A-1 | R-74 |
| 2529 | A-1 | R-75 |
| 2530 | A-1 | R-76 |
| 2531 | A-1 | R-77 |
| 2532 | A-1 | R-78 |
| 2533 | A-1 | R-79 |
| 2534 | A-2 | R-50 |
| 2535 | A-2 | R-51 |
| 2536 | A-2 | R-52 |
| 2537 | A-2 | R-53 |
| 2538 | A-2 | R-54 |
| 2539 | A-2 | R-55 |
| 2540 | A-2 | R-56 |
| 2541 | A-2 | R-57 |
| 2542 | A-2 | R-58 |
| 2543 | A-2 | R-59 |
| 2544 | A-2 | R-60 |
| 2545 | A-2 | R-61 |
| 2546 | A-2 | R-62 |
| 2547 | A-2 | R-63 |
| 2548 | A-2 | R-64 |
| 2549 | A-2 | R-65 |
| 2550 | A-2 | R-66 |
| 2551 | A-2 | R-67 |
| 2552 | A-2 | R-68 |
| 2553 | A-2 | R-69 |
| 2554 | A-2 | R-70 |
| 2555 | A-2 | R-71 |
| 2556 | A-2 | R-72 |
| 2557 | A-2 | R-73 |
| 2558 | A-2 | R-74 |
| 2559 | A-2 | R-75 |
| 2560 | A-2 | R-76 |
| 2561 | A-2 | R-77 |
| 2562 | A-2 | R-78 |
| 2563 | A-2 | R-79 |
| 2564 | A-4 | R-50 |
| 2565 | A-4 | R-51 |
| 2566 | A-4 | R-52 |
| 2567 | A-4 | R-53 |
| 2568 | A-4 | R-54 |
| 2569 | A-4 | R-55 |
| 2570 | A-4 | R-56 |
| 2571 | A-4 | R-57 |
| 2572 | A-4 | R-58 |
| 2573 | A-4 | R-59 |
| 2574 | A-4 | R-60 |
| 2575 | A-4 | R-61 |
| 2576 | A-4 | R-62 |
| 2577 | A-4 | R-63 |
| 2578 | A-4 | R-64 |
| 2579 | A-4 | R-65 |
| 2580 | A-4 | R-66 |
| 2581 | A-4 | R-67 |
| 2582 | A-4 | R-68 |
| 2583 | A-4 | R-69 |
| 2584 | A-4 | R-70 |
| 2585 | A-4 | R-71 |
| 2586 | A-4 | R-72 |
| 2587 | A-4 | R-73 |
| 2588 | A-4 | R-74 |
| 2589 | A-4 | R-75 |

TABLE 24-continued

|          |      | A    | $R^b$, $R^d$ |
|----------|------|------|--------------|
|          | 2590 | A-4  | R-76 |
|          | 2591 | A-4  | R-77 |
|          | 2592 | A-4  | R-78 |
|          | 2593 | A-4  | R-79 |
|          | 2594 | A-5  | R-50 |
|          | 2595 | A-5  | R-51 |
|          | 2596 | A-5  | R-52 |
|          | 2597 | A-5  | R-53 |
|          | 2598 | A-5  | R-54 |
|          | 2599 | A-5  | R-55 |
|          | 2600 | A-5  | R-56 |
|          | 2601 | A-5  | R-57 |
|          | 2602 | A-5  | R-58 |
|          | 2603 | A-5  | R-59 |
|          | 2604 | A-5  | R-60 |
|          | 2605 | A-5  | R-61 |
|          | 2606 | A-5  | R-62 |
|          | 2607 | A-5  | R-63 |
|          | 2608 | A-5  | R-64 |
|          | 2609 | A-5  | R-65 |
|          | 2610 | A-5  | R-66 |
|          | 2611 | A-5  | R-67 |
|          | 2612 | A-5  | R-68 |
|          | 2613 | A-5  | R-69 |
|          | 2614 | A-5  | R-70 |
|          | 2615 | A-5  | R-71 |
|          | 2616 | A-5  | R-72 |
|          | 2617 | A-5  | R-73 |
|          | 2618 | A-5  | R-74 |
|          | 2619 | A-5  | R-75 |
|          | 2620 | A-5  | R-76 |

TABLE 25

|          |      | A    | $R^b$, $R^d$ |
|----------|------|------|--------------|
| Compound | 2621 | A-5  | R-77 |
|          | 2622 | A-5  | R-78 |
|          | 2623 | A-5  | R-79 |
|          | 2624 | A-6  | R-50 |
|          | 2625 | A-6  | R-51 |
|          | 2626 | A-6  | R-52 |
|          | 2627 | A-6  | R-53 |
|          | 2628 | A-6  | R-54 |
|          | 2629 | A-6  | R-55 |
|          | 2630 | A-6  | R-56 |
|          | 2631 | A-6  | R-57 |
|          | 2632 | A-6  | R-58 |
|          | 2633 | A-6  | R-59 |
|          | 2634 | A-6  | R-60 |
|          | 2635 | A-6  | R-61 |
|          | 2636 | A-6  | R-62 |
|          | 2637 | A-6  | R-63 |
|          | 2638 | A-6  | R-64 |
|          | 2639 | A-6  | R-65 |
|          | 2640 | A-6  | R-66 |
|          | 2641 | A-6  | R-67 |
|          | 2642 | A-6  | R-68 |
|          | 2643 | A-6  | R-69 |
|          | 2644 | A-6  | R-70 |
|          | 2645 | A-6  | R-71 |
|          | 2646 | A-6  | R-72 |
|          | 2647 | A-6  | R-73 |
|          | 2648 | A-6  | R-74 |
|          | 2649 | A-6  | R-75 |
|          | 2650 | A-6  | R-76 |
|          | 2651 | A-6  | R-77 |
|          | 2652 | A-6  | R-78 |
|          | 2653 | A-6  | R-79 |
|          | 2654 | A-7  | R-50 |
|          | 2655 | A-7  | R-51 |
|          | 2656 | A-7  | R-52 |
|          | 2657 | A-7  | R-53 |
|          | 2658 | A-7  | R-54 |
|          | 2659 | A-7  | R-55 |

TABLE 25-continued

|      | A    | $R^b$, $R^d$ |
|------|------|--------------|
| 2660 | A-7  | R-56 |
| 2661 | A-7  | R-57 |
| 2662 | A-7  | R-58 |
| 2663 | A-7  | R-59 |
| 2664 | A-7  | R-60 |
| 2665 | A-7  | R-61 |
| 2666 | A-7  | R-62 |
| 2667 | A-7  | R-63 |
| 2668 | A-7  | R-64 |
| 2669 | A-7  | R-65 |
| 2670 | A-7  | R-66 |
| 2671 | A-7  | R-67 |
| 2672 | A-7  | R-68 |
| 2673 | A-7  | R-69 |
| 2674 | A-7  | R-70 |
| 2675 | A-7  | R-71 |
| 2676 | A-7  | R-72 |
| 2677 | A-7  | R-73 |
| 2678 | A-7  | R-74 |
| 2679 | A-7  | R-75 |
| 2680 | A-7  | R-76 |
| 2681 | A-7  | R-77 |
| 2682 | A-7  | R-78 |
| 2683 | A-7  | R-79 |
| 2684 | A-8  | R-50 |
| 2685 | A-8  | R-51 |
| 2686 | A-8  | R-52 |
| 2687 | A-8  | R-53 |
| 2688 | A-8  | R-54 |
| 2689 | A-8  | R-55 |
| 2690 | A-8  | R-56 |
| 2691 | A-8  | R-57 |
| 2692 | A-8  | R-58 |
| 2693 | A-8  | R-59 |
| 2694 | A-8  | R-60 |
| 2695 | A-8  | R-61 |
| 2696 | A-8  | R-62 |
| 2697 | A-8  | R-63 |
| 2698 | A-8  | R-64 |
| 2699 | A-8  | R-65 |
| 2700 | A-8  | R-66 |
| 2701 | A-8  | R-67 |
| 2702 | A-8  | R-68 |
| 2703 | A-8  | R-69 |
| 2704 | A-8  | R-70 |
| 2705 | A-8  | R-71 |
| 2706 | A-8  | R-72 |
| 2707 | A-8  | R-73 |
| 2708 | A-8  | R-74 |
| 2709 | A-8  | R-75 |
| 2710 | A-8  | R-76 |
| 2711 | A-8  | R-77 |
| 2712 | A-8  | R-78 |
| 2713 | A-8  | R-79 |
| 2714 | A-13 | R-50 |
| 2715 | A-13 | R-51 |
| 2716 | A-13 | R-52 |
| 2717 | A-13 | R-53 |
| 2718 | A-13 | R-54 |
| 2719 | A-13 | R-55 |
| 2720 | A-13 | R-56 |
| 2721 | A-13 | R-57 |
| 2722 | A-13 | R-58 |
| 2723 | A-13 | R-59 |
| 2724 | A-13 | R-60 |
| 2725 | A-13 | R-61 |
| 2726 | A-13 | R-62 |
| 2727 | A-13 | R-63 |
| 2728 | A-13 | R-64 |
| 2729 | A-13 | R-65 |
| 2730 | A-13 | R-66 |
| 2731 | A-13 | R-67 |
| 2732 | A-13 | R-68 |
| 2733 | A-13 | R-69 |
| 2734 | A-13 | R-70 |
| 2735 | A-13 | R-71 |

TABLE 25-continued

|  | A | $R^b, R^d$ |
|---|---|---|
| 2736 | A-13 | R-72 |
| 2737 | A-13 | R-73 |

TABLE 26

|  |  | A | $R^b, R^d$ |
|---|---|---|---|
| Compound | 2738 | A-13 | R-74 |
|  | 2739 | A-13 | R-75 |
|  | 2740 | A-13 | R-76 |
|  | 2741 | A-13 | R-77 |
|  | 2742 | A-13 | R-78 |
|  | 2743 | A-13 | R-79 |
|  | 2744 | A-14 | R-50 |
|  | 2745 | A-14 | R-51 |
|  | 2746 | A-14 | R-52 |
|  | 2747 | A-14 | R-53 |
|  | 2748 | A-14 | R-54 |
|  | 2749 | A-14 | R-55 |
|  | 2750 | A-14 | R-56 |
|  | 2751 | A-14 | R-57 |
|  | 2752 | A-14 | R-58 |
|  | 2753 | A-14 | R-59 |
|  | 2754 | A-14 | R-60 |
|  | 2755 | A-14 | R-61 |
|  | 2756 | A-14 | R-62 |
|  | 2757 | A-14 | R-63 |
|  | 2758 | A-14 | R-64 |
|  | 2759 | A-14 | R-65 |
|  | 2760 | A-14 | R-66 |
|  | 2761 | A-14 | R-67 |
|  | 2762 | A-14 | R-68 |
|  | 2763 | A-14 | R-69 |
|  | 2764 | A-14 | R-70 |
|  | 2765 | A-14 | R-71 |
|  | 2766 | A-14 | R-72 |
|  | 2767 | A-14 | R-73 |
|  | 2768 | A-14 | R-74 |
|  | 2769 | A-14 | R-75 |
|  | 2770 | A-14 | R-76 |
|  | 2771 | A-14 | R-77 |
|  | 2772 | A-14 | R-78 |
|  | 2773 | A-14 | R-79 |
|  | 2774 | A-20 | R-50 |
|  | 2775 | A-20 | R-51 |
|  | 2776 | A-20 | R-52 |
|  | 2777 | A-20 | R-53 |
|  | 2778 | A-20 | R-54 |
|  | 2779 | A-20 | R-55 |
|  | 2780 | A-20 | R-56 |
|  | 2781 | A-20 | R-57 |
|  | 2782 | A-20 | R-58 |
|  | 2783 | A-20 | R-59 |
|  | 2784 | A-20 | R-60 |
|  | 2785 | A-20 | R-61 |
|  | 2786 | A-20 | R-62 |
|  | 2787 | A-20 | R-63 |
|  | 2788 | A-20 | R-64 |
|  | 2789 | A-20 | R-65 |
|  | 2790 | A-20 | R-66 |
|  | 2791 | A-20 | R-67 |
|  | 2792 | A-20 | R-68 |
|  | 2793 | A-20 | R-69 |
|  | 2794 | A-20 | R-70 |
|  | 2795 | A-20 | R-71 |
|  | 2796 | A-20 | R-72 |
|  | 2797 | A-20 | R-73 |
|  | 2798 | A-20 | R-74 |
|  | 2799 | A-20 | R-75 |
|  | 2800 | A-20 | R-76 |
|  | 2801 | A-20 | R-77 |
|  | 2802 | A-20 | R-78 |
|  | 2803 | A-20 | R-79 |
|  | 2804 | A-29 | R-50 |
|  | 2805 | A-29 | R-51 |

TABLE 26-continued

|  | A | $R^b, R^d$ |
|---|---|---|
| 2806 | A-29 | R-52 |
| 2807 | A-29 | R-53 |
| 2808 | A-29 | R-54 |
| 2809 | A-29 | R-55 |
| 2810 | A-29 | R-56 |
| 2811 | A-29 | R-57 |
| 2812 | A-29 | R-58 |
| 2813 | A-29 | R-59 |
| 2814 | A-29 | R-60 |
| 2815 | A-29 | R-61 |
| 2816 | A-29 | R-62 |
| 2817 | A-29 | R-63 |
| 2818 | A-29 | R-64 |
| 2819 | A-29 | R-65 |
| 2820 | A-29 | R-66 |
| 2821 | A-29 | R-67 |
| 2822 | A-29 | R-68 |
| 2823 | A-29 | R-69 |
| 2824 | A-29 | R-70 |
| 2825 | A-29 | R-71 |
| 2826 | A-29 | R-72 |
| 2827 | A-29 | R-73 |
| 2828 | A-29 | R-74 |
| 2829 | A-29 | R-75 |
| 2830 | A-29 | R-76 |
| 2831 | A-29 | R-77 |
| 2832 | A-29 | R-78 |
| 2833 | A-29 | R-79 |
| 2834 | A-34 | R-50 |
| 2835 | A-34 | R-51 |
| 2836 | A-34 | R-52 |
| 2837 | A-34 | R-53 |
| 2838 | A-34 | R-54 |
| 2839 | A-34 | R-55 |
| 2840 | A-34 | R-56 |
| 2841 | A-34 | R-57 |
| 2842 | A-34 | R-58 |
| 2843 | A-34 | R-59 |
| 2844 | A-34 | R-60 |
| 2845 | A-34 | R-61 |
| 2846 | A-34 | R-62 |
| 2847 | A-34 | R-63 |
| 2848 | A-34 | R-64 |
| 2849 | A-34 | R-65 |
| 2850 | A-34 | R-66 |
| 2851 | A-34 | R-67 |
| 2852 | A-34 | R-68 |
| 2853 | A-34 | R-69 |
| 2854 | A-34 | R-70 |

TABLE 27

|  |  | A | $R^b, R^d$ |
|---|---|---|---|
| Compound | 2855 | A-34 | R-71 |
|  | 2856 | A-34 | R-72 |
|  | 2857 | A-34 | R-73 |
|  | 2858 | A-34 | R-74 |
|  | 2859 | A-34 | R-75 |
|  | 2860 | A-34 | R-76 |
|  | 2861 | A-34 | R-77 |
|  | 2862 | A-34 | R-78 |
|  | 2863 | A-39 | R-79 |
|  | 2864 | A-39 | R-50 |
|  | 2865 | A-39 | R-51 |
|  | 2866 | A-39 | R-52 |
|  | 2867 | A-39 | R-53 |
|  | 2868 | A-39 | R-54 |
|  | 2869 | A-39 | R-55 |
|  | 2870 | A-39 | R-56 |
|  | 2871 | A-39 | R-57 |
|  | 2872 | A-39 | R-58 |
|  | 2873 | A-39 | R-59 |
|  | 2874 | A-39 | R-60 |
|  | 2875 | A-39 | R-61 |

TABLE 27-continued

| | A | $R^b$, $R^d$ |
|---|---|---|
| 2876 | A-39 | R-62 |
| 2877 | A-39 | R-63 |
| 2878 | A-39 | R-64 |
| 2879 | A-39 | R-65 |
| 2880 | A-39 | R-66 |
| 2881 | A-39 | R-67 |
| 2882 | A-39 | R-68 |
| 2883 | A-39 | R-69 |
| 2884 | A-39 | R-70 |
| 2885 | A-39 | R-71 |
| 2886 | A-39 | R-72 |
| 2887 | A-39 | R-73 |
| 2888 | A-39 | R-74 |
| 2889 | A-39 | R-75 |
| 2890 | A-39 | R-76 |
| 2891 | A-39 | R-77 |
| 2892 | A-39 | R-78 |
| 2893 | A-39 | R-79 |
| 2894 | A-42 | R-50 |
| 2895 | A-42 | R-51 |
| 2896 | A-42 | R-52 |
| 2897 | A-42 | R-53 |
| 2898 | A-42 | R-54 |
| 2899 | A-42 | R-55 |
| 2900 | A-42 | R-56 |
| 2901 | A-42 | R-57 |
| 2902 | A-42 | R-58 |
| 2903 | A-42 | R-59 |
| 2904 | A-42 | R-60 |
| 2905 | A-42 | R-61 |
| 2906 | A-42 | R-62 |
| 2907 | A-42 | R-63 |
| 2908 | A-42 | R-64 |
| 2909 | A-42 | R-65 |
| 2910 | A-42 | R-66 |
| 2911 | A-42 | R-67 |
| 2912 | A-42 | R-68 |
| 2913 | A-42 | R-69 |
| 2914 | A-42 | R-70 |
| 2915 | A-42 | R-71 |
| 2916 | A-42 | R-72 |
| 2917 | A-42 | R-73 |
| 2918 | A-42 | R-74 |
| 2919 | A-42 | R-75 |
| 2920 | A-42 | R-76 |
| 2921 | A-42 | R-77 |
| 2922 | A-42 | R-78 |
| 2923 | A-42 | R-79 |
| 2924 | A-45 | R-50 |
| 2925 | A-45 | R-51 |
| 2926 | A-45 | R-52 |
| 2927 | A-45 | R-53 |
| 2928 | A-45 | R-54 |
| 2929 | A-45 | R-55 |
| 2930 | A-45 | R-56 |
| 2931 | A-45 | R-57 |
| 2932 | A-45 | R-58 |
| 2933 | A-45 | R-59 |
| 2934 | A-45 | R-60 |
| 2935 | A-45 | R-61 |
| 2936 | A-45 | R-62 |
| 2937 | A-45 | R-63 |
| 2938 | A-45 | R-64 |
| 2939 | A-45 | R-65 |
| 2940 | A-45 | R-66 |
| 2941 | A-45 | R-67 |
| 2942 | A-45 | R-68 |
| 2943 | A-45 | R-69 |
| 2944 | A-45 | R-70 |
| 2945 | A-45 | R-71 |
| 2946 | A-45 | R-72 |
| 2947 | A-45 | R-73 |
| 2948 | A-45 | R-74 |
| 2949 | A-45 | R-75 |
| 2950 | A-45 | R-76 |
| 2951 | A-45 | R-77 |
| 2952 | A-45 | R-78 |
| 2953 | A-45 | R-79 |

TABLE 27-continued

| | A | $R^b$, $R^d$ |
|---|---|---|
| 2954 | A-48 | R-50 |
| 2955 | A-48 | R-51 |
| 2956 | A-48 | R-52 |
| 2957 | A-48 | R-53 |
| 2958 | A-48 | R-54 |
| 2959 | A-48 | R-55 |
| 2960 | A-48 | R-56 |
| 2961 | A-48 | R-57 |
| 2962 | A-48 | R-58 |
| 2963 | A-48 | R-59 |
| 2964 | A-48 | R-60 |
| 2965 | A-48 | R-61 |
| 2966 | A-48 | R-62 |
| 2967 | A-48 | R-63 |
| 2968 | A-48 | R-64 |
| 2969 | A-48 | R-65 |
| 2970 | A-48 | R-66 |
| 2971 | A-48 | R-67 |

TABLE 28

| | | A | $R^b$, $R^d$ |
|---|---|---|---|
| Compound | 2972 | A-48 | R-68 |
| | 2973 | A-48 | R-69 |
| | 2974 | A-48 | R-70 |
| | 2975 | A-48 | R-71 |
| | 2976 | A-48 | R-72 |
| | 2977 | A-48 | R-73 |
| | 2978 | A-48 | R-74 |
| | 2979 | A-48 | R-75 |
| | 2980 | A-48 | R-76 |
| | 2981 | A-48 | R-77 |
| | 2982 | A-48 | R-78 |
| | 2983 | A-48 | R-79 |

TABLE 29

| | | A | $R^b$, $R^d$ |
|---|---|---|---|
| Compound | 2984 | A-1 | R-1 |
| | 2985 | A-1 | R-2 |
| | 2986 | A-1 | R-3 |
| | 2987 | A-1 | R-4 |
| | 2988 | A-1 | R-5 |
| | 2989 | A-1 | R-7 |
| | 2990 | A-1 | R-8 |
| | 2991 | A-1 | R-11 |
| | 2992 | A-1 | R-13 |
| | 2993 | A-1 | R-14 |
| | 2994 | A-1 | R-15 |
| | 2995 | A-1 | R-18 |
| | 2996 | A-1 | R-19 |
| | 2997 | A-1 | R-20 |
| | 2998 | A-1 | R-21 |
| | 2999 | A-1 | R-22 |
| | 3000 | A-1 | R-23 |
| | 3001 | A-1 | R-26 |
| | 3002 | A-1 | R-27 |
| | 3003 | A-1 | R-31 |
| | 3004 | A-1 | R-37 |
| | 3005 | A-1 | R-38 |
| | 3006 | A-1 | R-43 |
| | 3007 | A-1 | R-44 |
| | 3008 | A-1 | R-45 |
| | 3009 | A-1 | R-47 |
| | 3010 | A-1 | R-51 |
| | 3011 | A-1 | R-55 |
| | 3012 | A-1 | R-56 |
| | 3013 | A-1 | R-57 |
| | 3014 | A-1 | R-60 |
| | 3015 | A-1 | R-61 |
| | 3016 | A-1 | R-62 |

TABLE 29-continued

|  | A | $R^b, R^d$ |
|---|---|---|
| 3017 | A-1 | R-63 |
| 3018 | A-1 | R-64 |
| 3019 | A-1 | R-65 |
| 3020 | A-1 | R-66 |
| 3021 | A-1 | R-67 |
| 3022 | A-1 | R-68 |
| 3023 | A-1 | R-69 |
| 3024 | A-1 | R-70 |
| 3025 | A-1 | R-71 |
| 3026 | A-1 | R-72 |
| 3027 | A-1 | R-73 |
| 3028 | A-1 | R-74 |
| 3029 | A-1 | R-76 |
| 3030 | A-1 | R-77 |
| 3031 | A-1 | R-78 |
| 3032 | A-1 | R-79 |
| 3033 | A-2 | R-1 |
| 3034 | A-2 | R-2 |
| 3035 | A-2 | R-3 |
| 3036 | A-2 | R-4 |
| 3037 | A-2 | R-5 |
| 3038 | A-2 | R-7 |
| 3039 | A-2 | R-8 |
| 3040 | A-2 | R-11 |
| 3041 | A-2 | R-13 |
| 3042 | A-2 | R-14 |
| 3043 | A-2 | R-15 |
| 3044 | A-2 | R-18 |
| 3045 | A-2 | R-19 |
| 3046 | A-2 | R-20 |
| 3047 | A-2 | R-21 |
| 3048 | A-2 | R-22 |
| 3049 | A-2 | R-23 |
| 3050 | A-2 | R-26 |
| 3051 | A-2 | R-27 |
| 3052 | A-2 | R-31 |
| 3053 | A-2 | R-37 |
| 3054 | A-2 | R-38 |
| 3055 | A-2 | R-43 |
| 3056 | A-2 | R-44 |
| 3057 | A-2 | R-45 |
| 3058 | A-2 | R-47 |
| 3059 | A-2 | R-51 |
| 3060 | A-2 | R-55 |
| 3061 | A-2 | R-56 |
| 3062 | A-2 | R-57 |
| 3063 | A-2 | R-60 |
| 3064 | A-2 | R-61 |
| 3065 | A-2 | R-62 |
| 3066 | A-2 | R-63 |
| 3067 | A-2 | R-64 |
| 3068 | A-2 | R-65 |
| 3069 | A-2 | R-66 |
| 3070 | A-2 | R-67 |
| 3071 | A-2 | R-68 |
| 3072 | A-2 | R-69 |
| 3073 | A-2 | R-70 |
| 3074 | A-2 | R-71 |
| 3075 | A-2 | R-72 |
| 3076 | A-2 | R-73 |
| 3077 | A-2 | R-74 |
| 3078 | A-2 | R-76 |
| 3079 | A-2 | R-77 |
| 3080 | A-2 | R-78 |
| 3081 | A-2 | R-79 |
| 3082 | A-4 | R-1 |
| 3083 | A-4 | R-2 |
| 3084 | A-4 | R-3 |
| 3085 | A-4 | R-4 |
| 3086 | A-4 | R-5 |
| 3087 | A-4 | R-7 |
| 3088 | A-4 | R-8 |
| 3089 | A-4 | R-11 |
| 3090 | A-4 | R-13 |
| 3091 | A-4 | R-14 |
| 3092 | A-4 | R-15 |
| 3093 | A-4 | R-18 |
| 3094 | A-4 | R-19 |

TABLE 29-continued

|  | A | $R^b, R^d$ |
|---|---|---|
| 3095 | A-4 | R-20 |
| 3096 | A-4 | R-21 |
| 3097 | A-4 | R-22 |
| 3098 | A-4 | R-23 |
| 3099 | A-4 | R-26 |
| 3100 | A-4 | R-27 |

TABLE 30

|  |  | A | $R^b, R^d$ |
|---|---|---|---|
| Compound | 3101 | A-4 | R-31 |
|  | 3102 | A-4 | R-37 |
|  | 3103 | A-4 | R-38 |
|  | 3104 | A-4 | R-43 |
|  | 3105 | A-4 | R-44 |
|  | 3106 | A-4 | R-45 |
|  | 3107 | A-4 | R-47 |
|  | 3108 | A-4 | R-51 |
|  | 3109 | A-4 | R-55 |
|  | 3110 | A-4 | R-56 |
|  | 3111 | A-4 | R-57 |
|  | 3112 | A-4 | R-60 |
|  | 3113 | A-4 | R-61 |
|  | 3114 | A-4 | R-62 |
|  | 3115 | A-4 | R-63 |
|  | 3116 | A-4 | R-64 |
|  | 3117 | A-4 | R-65 |
|  | 3118 | A-4 | R-66 |
|  | 3119 | A-4 | R-67 |
|  | 3120 | A-4 | R-68 |
|  | 3121 | A-4 | R-69 |
|  | 3122 | A-4 | R-70 |
|  | 3123 | A-4 | R-71 |
|  | 3124 | A-4 | R-72 |
|  | 3125 | A-4 | R-73 |
|  | 3126 | A-4 | R-74 |
|  | 3127 | A-4 | R-76 |
|  | 3128 | A-4 | R-77 |
|  | 3129 | A-4 | R-78 |
|  | 3130 | A-4 | R-79 |
|  | 3131 | A-5 | R-1 |
|  | 3132 | A-5 | R-2 |
|  | 3133 | A-5 | R-3 |
|  | 3134 | A-5 | R-4 |
|  | 3135 | A-5 | R-5 |
|  | 3136 | A-5 | R-7 |
|  | 3137 | A-5 | R-8 |
|  | 3138 | A-5 | R-11 |
|  | 3139 | A-5 | R-13 |
|  | 3140 | A-5 | R-14 |
|  | 3141 | A-5 | R-15 |
|  | 3142 | A-5 | R-18 |
|  | 3143 | A-5 | R-19 |
|  | 3144 | A-5 | R-20 |
|  | 3145 | A-5 | R-21 |
|  | 3146 | A-5 | R-22 |
|  | 3147 | A-5 | R-23 |
|  | 3148 | A-5 | R-26 |
|  | 3149 | A-5 | R-27 |
|  | 3150 | A-5 | R-31 |
|  | 3151 | A-5 | R-37 |
|  | 3152 | A-5 | R-38 |
|  | 3153 | A-5 | R-43 |
|  | 3154 | A-5 | R-44 |
|  | 3155 | A-5 | R-45 |
|  | 3156 | A-5 | R-47 |
|  | 3157 | A-5 | R-51 |
|  | 3158 | A-5 | R-55 |
|  | 3159 | A-5 | R-56 |
|  | 3160 | A-5 | R-57 |
|  | 3161 | A-5 | R-60 |
|  | 3162 | A-5 | R-61 |
|  | 3163 | A-5 | R-62 |
|  | 3164 | A-5 | R-63 |

TABLE 30-continued

|  | A | $R^b, R^d$ |
|---|---|---|
| 3165 | A-5 | R-64 |
| 3166 | A-5 | R-65 |
| 3167 | A-5 | R-66 |
| 3168 | A-5 | R-67 |
| 3169 | A-5 | R-68 |
| 3170 | A-5 | R-69 |
| 3171 | A-5 | R-70 |
| 3172 | A-5 | R-71 |
| 3173 | A-5 | R-72 |
| 3174 | A-5 | R-73 |
| 3175 | A-5 | R-74 |
| 3176 | A-5 | R-76 |
| 3177 | A-5 | R-77 |
| 3178 | A-5 | R-78 |
| 3179 | A-5 | R-79 |
| 3180 | A-6 | R-1 |
| 3181 | A-6 | R-2 |
| 3182 | A-6 | R-3 |
| 3183 | A-6 | R-4 |
| 3184 | A-6 | R-5 |
| 3185 | A-6 | R-7 |
| 3186 | A-6 | R-8 |
| 3187 | A-6 | R-11 |
| 3188 | A-6 | R-13 |
| 3189 | A-6 | R-14 |
| 3190 | A-6 | R-15 |
| 3191 | A-6 | R-18 |
| 3192 | A-6 | R-19 |
| 3193 | A-6 | R-20 |
| 3194 | A-6 | R-21 |
| 3195 | A-6 | R-22 |
| 3196 | A-6 | R-23 |
| 3197 | A-6 | R-26 |
| 3198 | A-6 | R-27 |
| 3199 | A-6 | R-31 |
| 3200 | A-6 | R-37 |
| 3201 | A-6 | R-38 |
| 3202 | A-6 | R-43 |
| 3203 | A-6 | R-44 |
| 3204 | A-6 | R-45 |
| 3205 | A-6 | R-47 |
| 3206 | A-6 | R-51 |
| 3207 | A-6 | R-55 |
| 3208 | A-6 | R-56 |
| 3209 | A-6 | R-57 |
| 3210 | A-6 | R-60 |
| 3211 | A-6 | R-61 |
| 3212 | A-6 | R-62 |
| 3213 | A-6 | R-63 |
| 3214 | A-6 | R-64 |
| 3215 | A-6 | R-65 |
| 3216 | A-6 | R-66 |
| 3217 | A-6 | R-67 |

TABLE 31

|  |  | A | $R^b, R^d$ |
|---|---|---|---|
| Compound | 3218 | A-6 | R-68 |
|  | 3219 | A-6 | R-69 |
|  | 3220 | A-6 | R-70 |
|  | 3221 | A-6 | R-71 |
|  | 3222 | A-6 | R-72 |
|  | 3223 | A-6 | R-73 |
|  | 3224 | A-6 | R-74 |
|  | 3225 | A-6 | R-76 |
|  | 3226 | A-6 | R-77 |
|  | 3227 | A-6 | R-78 |
|  | 3228 | A-6 | R-79 |
|  | 3229 | A-7 | R-1 |
|  | 3230 | A-7 | R-2 |
|  | 3231 | A-7 | R-3 |
|  | 3232 | A-7 | R-4 |
|  | 3233 | A-7 | R-5 |
|  | 3234 | A-7 | R-7 |

TABLE 31-continued

|  | A | $R^b, R^d$ |
|---|---|---|
| 3235 | A-7 | R-8 |
| 3236 | A-7 | R-11 |
| 3237 | A-7 | R-13 |
| 3238 | A-7 | R-14 |
| 3239 | A-7 | R-15 |
| 3240 | A-7 | R-18 |
| 3241 | A-7 | R-19 |
| 3242 | A-7 | R-20 |
| 3243 | A-7 | R-21 |
| 3244 | A-7 | R-22 |
| 3245 | A-7 | R-23 |
| 3246 | A-7 | R-26 |
| 3247 | A-7 | R-27 |
| 3248 | A-7 | R-31 |
| 3249 | A-7 | R-37 |
| 3250 | A-7 | R-38 |
| 3251 | A-7 | R-43 |
| 3252 | A-7 | R-44 |
| 3253 | A-7 | R-45 |
| 3254 | A-7 | R-47 |
| 3255 | A-7 | R-51 |
| 3256 | A-7 | R-55 |
| 3257 | A-7 | R-56 |
| 3258 | A-7 | R-57 |
| 3259 | A-7 | R-60 |
| 3260 | A-7 | R-61 |
| 3261 | A-7 | R-62 |
| 3262 | A-7 | R-63 |
| 3263 | A-7 | R-64 |
| 3264 | A-7 | R-65 |
| 3265 | A-7 | R-66 |
| 3266 | A-7 | R-67 |
| 3267 | A-7 | R-68 |
| 3268 | A-7 | R-69 |
| 3269 | A-7 | R-70 |
| 3270 | A-7 | R-71 |
| 3271 | A-7 | R-72 |
| 3272 | A-7 | R-73 |
| 3273 | A-7 | R-74 |
| 3274 | A-7 | R-76 |
| 3275 | A-7 | R-77 |
| 3276 | A-7 | R-78 |
| 3277 | A-7 | R-79 |
| 3278 | A-8 | R-1 |
| 3279 | A-8 | R-2 |
| 3280 | A-8 | R-3 |
| 3281 | A-8 | R-4 |
| 3282 | A-8 | R-5 |
| 3283 | A-8 | R-7 |
| 3284 | A-8 | R-8 |
| 3285 | A-8 | R-11 |
| 3286 | A-8 | R-13 |
| 3287 | A-8 | R-14 |
| 3288 | A-8 | R-15 |
| 3289 | A-8 | R-18 |
| 3290 | A-8 | R-19 |
| 3291 | A-8 | R-20 |
| 3292 | A-8 | R-21 |
| 3293 | A-8 | R-22 |
| 3294 | A-8 | R-23 |
| 3295 | A-8 | R-26 |
| 3296 | A-8 | R-27 |
| 3297 | A-8 | R-31 |
| 3298 | A-8 | R-37 |
| 3299 | A-8 | R-38 |
| 3300 | A-8 | R-43 |
| 3301 | A-8 | R-44 |
| 3302 | A-8 | R-45 |
| 3303 | A-8 | R-47 |
| 3304 | A-8 | R-51 |
| 3305 | A-8 | R-55 |
| 3306 | A-8 | R-56 |
| 3307 | A-8 | R-57 |
| 3308 | A-8 | R-60 |
| 3309 | A-8 | R-61 |
| 3310 | A-8 | R-62 |
| 3311 | A-8 | R-63 |
| 3312 | A-8 | R-64 |

TABLE 31-continued

|  |  | A | $R^b, R^d$ |
|---|---|---|---|
|  | 3313 | A-8 | R-65 |
|  | 3314 | A-8 | R-66 |
|  | 3315 | A-8 | R-67 |
|  | 3316 | A-8 | R-68 |
|  | 3317 | A-8 | R-69 |
|  | 3318 | A-8 | R-70 |
|  | 3319 | A-8 | R-71 |
|  | 3320 | A-8 | R-72 |
|  | 3321 | A-8 | R-73 |
|  | 3322 | A-8 | R-74 |
|  | 3323 | A-8 | R-76 |
|  | 3324 | A-8 | R-77 |
|  | 3325 | A-8 | R-78 |
|  | 3326 | A-8 | R-79 |
|  | 3327 | A-20 | R-1 |
|  | 3328 | A-20 | R-2 |
|  | 3329 | A-20 | R-3 |
|  | 3330 | A-20 | R-4 |
|  | 3331 | A-20 | R-5 |
|  | 3332 | A-20 | R-7 |
|  | 3333 | A-20 | R-8 |
|  | 3334 | A-20 | R-11 |

TABLE 32

|  |  | A | $R^b, R^d$ |
|---|---|---|---|
| Compound | 3335 | A-20 | R-13 |
|  | 3336 | A-20 | R-14 |
|  | 3337 | A-20 | R-15 |
|  | 3338 | A-20 | R-18 |
|  | 3339 | A-20 | R-19 |
|  | 3340 | A-20 | R-20 |
|  | 3341 | A-20 | R-21 |
|  | 3342 | A-20 | R-22 |
|  | 3343 | A-20 | R-23 |
|  | 3344 | A-20 | R-26 |
|  | 3345 | A-20 | R-27 |
|  | 3346 | A-20 | R-31 |
|  | 3347 | A-20 | R-37 |
|  | 3348 | A-20 | R-38 |
|  | 3349 | A-20 | R-43 |
|  | 3350 | A-20 | R-44 |
|  | 3351 | A-20 | R-45 |
|  | 3352 | A-20 | R-47 |
|  | 3353 | A-20 | R-51 |
|  | 3354 | A-20 | R-55 |
|  | 3355 | A-20 | R-56 |
|  | 3356 | A-20 | R-57 |
|  | 3357 | A-20 | R-60 |
|  | 3358 | A-20 | R-61 |
|  | 3359 | A-20 | R-62 |
|  | 3360 | A-20 | R-63 |
|  | 3361 | A-20 | R-64 |
|  | 3362 | A-20 | R-65 |
|  | 3363 | A-20 | R-66 |
|  | 3364 | A-20 | R-67 |
|  | 3365 | A-20 | R-68 |
|  | 3366 | A-20 | R-69 |
|  | 3367 | A-20 | R-70 |
|  | 3368 | A-20 | R-71 |
|  | 3369 | A-20 | R-72 |
|  | 3370 | A-20 | R-73 |
|  | 3371 | A-20 | R-74 |
|  | 3372 | A-20 | R-76 |
|  | 3373 | A-20 | R-77 |
|  | 3374 | A-20 | R-78 |
|  | 3375 | A-20 | R-79 |
|  | 3376 | A-34 | R-1 |
|  | 3377 | A-34 | R-2 |
|  | 3378 | A-34 | R-3 |
|  | 3379 | A-34 | R-4 |
|  | 3380 | A-34 | R-5 |
|  | 3381 | A-34 | R-7 |
|  | 3382 | A-34 | R-8 |

TABLE 32-continued

|  | A | $R^b, R^d$ |
|---|---|---|
| 3383 | A-34 | R-11 |
| 3384 | A-34 | R-13 |
| 3385 | A-34 | R-14 |
| 3386 | A-34 | R-15 |
| 3387 | A-34 | R-18 |
| 3388 | A-34 | R-19 |
| 3389 | A-34 | R-20 |
| 3390 | A-34 | R-21 |
| 3391 | A-34 | R-22 |
| 3392 | A-34 | R-23 |
| 3393 | A-34 | R-26 |
| 3394 | A-34 | R-27 |
| 3395 | A-34 | R-31 |
| 3396 | A-34 | R-37 |
| 3397 | A-34 | R-38 |
| 3398 | A-34 | R-43 |
| 3399 | A-34 | R-44 |
| 3400 | A-34 | R-45 |
| 3401 | A-34 | R-47 |
| 3402 | A-34 | R-51 |
| 3403 | A-34 | R-55 |
| 3404 | A-34 | R-56 |
| 3405 | A-34 | R-57 |
| 3406 | A-34 | R-60 |
| 3407 | A-34 | R-61 |
| 3408 | A-34 | R-62 |
| 3409 | A-34 | R-63 |
| 3410 | A-34 | R-64 |
| 3411 | A-34 | R-65 |
| 3412 | A-34 | R-66 |
| 3413 | A-34 | R-67 |
| 3414 | A-34 | R-68 |
| 3415 | A-34 | R-69 |
| 3416 | A-34 | R-70 |
| 3417 | A-34 | R-71 |
| 3418 | A-34 | R-72 |
| 3419 | A-34 | R-73 |
| 3420 | A-34 | R-74 |
| 3421 | A-34 | R-76 |
| 3422 | A-34 | R-77 |
| 3423 | A-34 | R-78 |
| 3424 | A-34 | R-79 |
| 3425 | A-39 | R-1 |
| 3426 | A-39 | R-2 |
| 3427 | A-39 | R-3 |
| 3428 | A-39 | R-4 |
| 3429 | A-39 | R-5 |
| 3430 | A-39 | R-7 |
| 3431 | A-39 | R-8 |
| 3432 | A-39 | R-11 |
| 3433 | A-39 | R-13 |
| 3434 | A-39 | R-14 |
| 3435 | A-39 | R-15 |
| 3436 | A-39 | R-18 |
| 3437 | A-39 | R-19 |
| 3438 | A-39 | R-20 |
| 3439 | A-39 | R-21 |
| 3440 | A-39 | R-22 |
| 3441 | A-39 | R-23 |
| 3442 | A-39 | R-26 |
| 3443 | A-39 | R-27 |
| 3444 | A-39 | R-31 |
| 3445 | A-39 | R-37 |
| 3446 | A-39 | R-38 |
| 3447 | A-39 | R-43 |
| 3448 | A-39 | R-44 |
| 3449 | A-39 | R-45 |
| 3450 | A-39 | R-47 |
| 3451 | A-39 | R-51 |

TABLE 33

|  | | A | $R^b$, $R^d$ |
|---|---|---|---|
| Compound | 3452 | A-39 | R-55 |
| | 3453 | A-39 | R-56 |
| | 3454 | A-39 | R-57 |
| | 3455 | A-39 | R-60 |
| | 3456 | A-39 | R-61 |
| | 3457 | A-39 | R-62 |
| | 3458 | A-39 | R-63 |
| | 3459 | A-39 | R-64 |
| | 3460 | A-39 | R-65 |
| | 3461 | A-39 | R-66 |
| | 3462 | A-39 | R-67 |
| | 3463 | A-39 | R-68 |
| | 3464 | A-39 | R-69 |
| | 3465 | A-39 | R-70 |
| | 3466 | A-39 | R-71 |
| | 3467 | A-39 | R-72 |
| | 3468 | A-39 | R-73 |
| | 3469 | A-39 | R-74 |
| | 3470 | A-39 | R-76 |
| | 3471 | A-39 | R-77 |
| | 3472 | A-39 | R-78 |
| | 3473 | A-39 | R-79 |
| | 3474 | A-41 | R-1 |
| | 3475 | A-41 | R-2 |
| | 3476 | A-41 | R-3 |
| | 3477 | A-41 | R-4 |
| | 3478 | A-41 | R-5 |
| | 3479 | A-41 | R-7 |
| | 3480 | A-41 | R-8 |
| | 3481 | A-41 | R-11 |
| | 3482 | A-41 | R-13 |
| | 3483 | A-41 | R-14 |
| | 3484 | A-41 | R-15 |
| | 3485 | A-41 | R-18 |
| | 3486 | A-41 | R-19 |
| | 3487 | A-41 | R-20 |
| | 3488 | A-41 | R-21 |
| | 3489 | A-41 | R-22 |
| | 3490 | A-41 | R-23 |
| | 3491 | A-41 | R-26 |
| | 3492 | A-41 | R-27 |
| | 3493 | A-41 | R-31 |
| | 3494 | A-41 | R-37 |
| | 3495 | A-41 | R-38 |
| | 3496 | A-41 | R-43 |
| | 3497 | A-41 | R-44 |
| | 3498 | A-41 | R-45 |
| | 3499 | A-41 | R-47 |
| | 3500 | A-41 | R-51 |
| | 3501 | A-41 | R-55 |
| | 3502 | A-41 | R-56 |
| | 3503 | A-41 | R-57 |
| | 3504 | A-41 | R-60 |
| | 3505 | A-41 | R-61 |
| | 3506 | A-41 | R-62 |
| | 3507 | A-41 | R-63 |
| | 3508 | A-41 | R-64 |
| | 3509 | A-41 | R-65 |
| | 3510 | A-41 | R-66 |
| | 3511 | A-41 | R-67 |
| | 3512 | A-41 | R-68 |
| | 3513 | A-41 | R-69 |
| | 3514 | A-41 | R-70 |
| | 3515 | A-41 | R-71 |
| | 3516 | A-41 | R-72 |
| | 3517 | A-41 | R-73 |
| | 3518 | A-41 | R-74 |
| | 3519 | A-41 | R-76 |
| | 3520 | A-41 | R-77 |
| | 3521 | A-41 | R-78 |
| | 3522 | A-41 | R-79 |
| | 3523 | A-42 | R-1 |
| | 3524 | A-42 | R-2 |
| | 3525 | A-42 | R-3 |
| | 3526 | A-42 | R-4 |
| | 3527 | A-42 | R-5 |
| | 3528 | A-42 | R-7 |
| | 3529 | A-42 | R-8 |
| | 3530 | A-42 | R-11 |
| | 3531 | A-42 | R-13 |
| | 3532 | A-42 | R-14 |
| | 3533 | A-42 | R-15 |
| | 3534 | A-42 | R-18 |
| | 3535 | A-42 | R-19 |
| | 3536 | A-42 | R-20 |
| | 3537 | A-42 | R-21 |
| | 3538 | A-42 | R-22 |
| | 3539 | A-42 | R-23 |
| | 3540 | A-42 | R-26 |
| | 3541 | A-42 | R-27 |
| | 3542 | A-42 | R-31 |
| | 3543 | A-42 | R-37 |
| | 3544 | A-42 | R-38 |
| | 3545 | A-42 | R-43 |
| | 3546 | A-42 | R-44 |
| | 3547 | A-42 | R-45 |
| | 3548 | A-42 | R-47 |
| | 3549 | A-42 | R-51 |
| | 3550 | A-42 | R-55 |
| | 3551 | A-42 | R-56 |
| | 3552 | A-42 | R-57 |
| | 3553 | A-42 | R-60 |
| | 3554 | A-42 | R-61 |
| | 3555 | A-42 | R-62 |
| | 3556 | A-42 | R-63 |
| | 3557 | A-42 | R-64 |
| | 3558 | A-42 | R-65 |
| | 3559 | A-42 | R-66 |
| | 3560 | A-42 | R-67 |
| | 3561 | A-42 | R-68 |
| | 3562 | A-42 | R-69 |
| | 3563 | A-42 | R-70 |
| | 3564 | A-42 | R-71 |
| | 3565 | A-42 | R-72 |
| | 3566 | A-42 | R-73 |
| | 3567 | A-42 | R-74 |
| | 3568 | A-42 | R-76 |

TABLE 34

|  | | A | $R^b$, $R^d$ |
|---|---|---|---|
| Compound | 3569 | A-42 | R-77 |
| | 3570 | A-42 | R-78 |
| | 3571 | A-42 | R-79 |
| | 3572 | A-45 | R-1 |
| | 3573 | A-45 | R-2 |
| | 3574 | A-45 | R-3 |
| | 3575 | A-45 | R-4 |
| | 3576 | A-45 | R-5 |
| | 3577 | A-45 | R-7 |
| | 3578 | A-45 | R-8 |
| | 3579 | A-45 | R-11 |
| | 3580 | A-45 | R-13 |
| | 3581 | A-45 | R-14 |
| | 3582 | A-45 | R-15 |
| | 3583 | A-45 | R-18 |
| | 3584 | A-45 | R-19 |
| | 3585 | A-45 | R-20 |
| | 3586 | A-45 | R-21 |
| | 3587 | A-45 | R-22 |
| | 3588 | A-45 | R-23 |
| | 3589 | A-45 | R-26 |
| | 3590 | A-45 | R-27 |
| | 3591 | A-45 | R-31 |
| | 3592 | A-45 | R-37 |
| | 3593 | A-45 | R-38 |
| | 3594 | A-45 | R-43 |
| | 3595 | A-45 | R-44 |
| | 3596 | A-45 | R-45 |
| | 3597 | A-45 | R-47 |
| | 3598 | A-45 | R-51 |
| | 3599 | A-45 | R-55 |

TABLE 34-continued

| | A | $R^b$, $R^d$ |
|---|---|---|
| 3600 | A-45 | R-56 |
| 3601 | A-45 | R-57 |
| 3602 | A-45 | R-60 |
| 3603 | A-45 | R-61 |
| 3604 | A-45 | R-62 |
| 3605 | A-45 | R-63 |
| 3606 | A-45 | R-64 |
| 3607 | A-45 | R-65 |
| 3608 | A-45 | R-66 |
| 3609 | A-45 | R-67 |
| 3610 | A-45 | R-68 |
| 3611 | A-45 | R-69 |
| 3612 | A-45 | R-70 |
| 3613 | A-45 | R-71 |
| 3614 | A-45 | R-72 |
| 3615 | A-45 | R-73 |
| 3616 | A-45 | R-74 |
| 3617 | A-45 | R-76 |
| 3618 | A-45 | R-77 |
| 3619 | A-45 | R-78 |
| 3620 | A-45 | R-79 |
| 3621 | A-48 | R-1 |
| 3622 | A-48 | R-2 |
| 3623 | A-48 | R-3 |
| 3624 | A-48 | R-4 |
| 3625 | A-48 | R-5 |
| 3626 | A-48 | R-7 |
| 3627 | A-48 | R-8 |
| 3628 | A-48 | R-11 |
| 3629 | A-48 | R-13 |
| 3630 | A-48 | R-14 |
| 3631 | A-48 | R-15 |
| 3632 | A-48 | R-18 |
| 3633 | A-48 | R-19 |
| 3634 | A-48 | R-20 |
| 3635 | A-48 | R-21 |
| 3636 | A-48 | R-22 |
| 3637 | A-48 | R-23 |
| 3638 | A-48 | R-26 |
| 3639 | A-48 | R-27 |
| 3640 | A-48 | R-31 |
| 3641 | A-48 | R-37 |
| 3642 | A-48 | R-38 |
| 3643 | A-48 | R-43 |
| 3644 | A-48 | R-44 |
| 3645 | A-48 | R-45 |
| 3646 | A-48 | R-47 |
| 3647 | A-48 | R-51 |
| 3648 | A-48 | R-55 |
| 3649 | A-48 | R-56 |
| 3650 | A-48 | R-57 |
| 3651 | A-48 | R-60 |
| 3652 | A-48 | R-61 |
| 3653 | A-48 | R-62 |
| 3654 | A-48 | R-63 |
| 3655 | A-48 | R-64 |
| 3656 | A-48 | R-65 |
| 3657 | A-48 | R-66 |
| 3658 | A-48 | R-67 |
| 3659 | A-48 | R-68 |
| 3660 | A-48 | R-69 |
| 3661 | A-48 | R-70 |
| 3662 | A-48 | R-71 |
| 3663 | A-48 | R-72 |
| 3664 | A-48 | R-73 |
| 3665 | A-48 | R-74 |
| 3666 | A-48 | R-76 |
| 3667 | A-48 | R-77 |
| 3668 | A-48 | R-78 |
| 3669 | A-48 | R-79 |

TABLE 35

| | | A | $R^b$, $R^d$ |
|---|---|---|---|
| Compound | 3670 | A-1 | R-1 |
| | 3671 | A-1 | R-2 |
| | 3672 | A-1 | R-3 |
| | 3673 | A-1 | R-4 |
| | 3674 | A-1 | R-5 |
| | 3675 | A-1 | R-7 |
| | 3676 | A-1 | R-8 |
| | 3677 | A-1 | R-11 |
| | 3678 | A-1 | R-13 |
| | 3679 | A-1 | R-14 |
| | 3680 | A-1 | R-15 |
| | 3681 | A-1 | R-18 |
| | 3682 | A-1 | R-19 |
| | 3683 | A-1 | R-20 |
| | 3684 | A-1 | R-21 |
| | 3685 | A-1 | R-22 |
| | 3686 | A-1 | R-23 |
| | 3687 | A-1 | R-26 |
| | 3688 | A-1 | R-27 |
| | 3689 | A-1 | R-31 |
| | 3690 | A-1 | R-37 |
| | 3691 | A-1 | R-38 |
| | 3692 | A-1 | R-43 |
| | 3693 | A-1 | R-44 |
| | 3694 | A-1 | R-45 |
| | 3695 | A-1 | R-47 |
| | 3696 | A-1 | R-51 |
| | 3697 | A-1 | R-55 |
| | 3698 | A-1 | R-56 |
| | 3699 | A-1 | R-57 |
| | 3700 | A-1 | R-60 |
| | 3701 | A-1 | R-61 |
| | 3702 | A-1 | R-62 |
| | 3703 | A-1 | R-63 |
| | 3704 | A-1 | R-64 |
| | 3705 | A-1 | R-65 |
| | 3706 | A-1 | R-66 |
| | 3707 | A-1 | R-67 |
| | 3708 | A-1 | R-68 |
| | 3709 | A-1 | R-69 |
| | 3710 | A-1 | R-70 |
| | 3711 | A-1 | R-71 |
| | 3712 | A-1 | R-72 |
| | 3713 | A-1 | R-73 |
| | 3714 | A-1 | R-74 |
| | 3715 | A-1 | R-76 |
| | 3716 | A-1 | R-77 |
| | 3717 | A-1 | R-78 |
| | 3718 | A-1 | R-79 |
| | 3719 | A-2 | R-1 |
| | 3720 | A-2 | R-2 |
| | 3721 | A-2 | R-3 |
| | 3722 | A-2 | R-4 |
| | 3723 | A-2 | R-5 |
| | 3724 | A-2 | R-7 |
| | 3725 | A-2 | R-8 |
| | 3726 | A-2 | R-11 |
| | 3727 | A-2 | R-13 |
| | 3728 | A-2 | R-14 |
| | 3729 | A-2 | R-15 |
| | 3730 | A-2 | R-18 |
| | 3731 | A-2 | R-19 |
| | 3732 | A-2 | R-20 |
| | 3733 | A-2 | R-21 |
| | 3734 | A-2 | R-22 |
| | 3735 | A-2 | R-23 |
| | 3736 | A-2 | R-26 |
| | 3737 | A-2 | R-27 |
| | 3738 | A-2 | R-31 |
| | 3739 | A-2 | R-37 |
| | 3740 | A-2 | R-38 |
| | 3741 | A-2 | R-43 |
| | 3742 | A-2 | R-44 |
| | 3743 | A-2 | R-45 |
| | 3744 | A-2 | R-47 |
| | 3745 | A-2 | R-51 |
| | 3746 | A-2 | R-55 |
| | 3747 | A-2 | R-56 |

TABLE 35-continued

|  | A | $R^b$, $R^d$ |
|---|---|---|
| 3748 | A-2 | R-57 |
| 3749 | A-2 | R-60 |
| 3750 | A-2 | R-61 |
| 3751 | A-2 | R-62 |
| 3752 | A-2 | R-63 |
| 3753 | A-2 | R-64 |
| 3754 | A-2 | R-65 |
| 3755 | A-2 | R-66 |
| 3756 | A-2 | R-67 |
| 3757 | A-2 | R-68 |
| 3758 | A-2 | R-69 |
| 3759 | A-2 | R-70 |
| 3760 | A-2 | R-71 |
| 3761 | A-2 | R-72 |
| 3762 | A-2 | R-73 |
| 3763 | A-2 | R-74 |
| 3764 | A-2 | R-76 |
| 3765 | A-2 | R-77 |
| 3766 | A-2 | R-78 |
| 3767 | A-2 | R-79 |
| 3768 | A-4 | R-1 |
| 3769 | A-4 | R-2 |
| 3770 | A-4 | R-3 |
| 3771 | A-4 | R-4 |
| 3772 | A-4 | R-5 |
| 3773 | A-4 | R-7 |
| 3774 | A-4 | R-8 |
| 3775 | A-4 | R-11 |
| 3776 | A-4 | R-13 |
| 3777 | A-4 | R-14 |
| 3778 | A-4 | R-15 |
| 3779 | A-4 | R-18 |
| 3780 | A-4 | R-19 |
| 3781 | A-4 | R-20 |
| 3782 | A-4 | R-21 |
| 3783 | A-4 | R-22 |
| 3784 | A-4 | R-23 |
| 3785 | A-4 | R-26 |
| 3786 | A-4 | R-27 |

TABLE 36

|  |  | A | $R^b$, $R^d$ |
|---|---|---|---|
| Compound | 3787 | A-4 | R-31 |
|  | 3788 | A-4 | R-37 |
|  | 3789 | A-4 | R-38 |
|  | 3790 | A-4 | R-43 |
|  | 3791 | A-4 | R-44 |
|  | 3792 | A-4 | R-45 |
|  | 3793 | A-4 | R-47 |
|  | 3794 | A-4 | R-51 |
|  | 3795 | A-4 | R-55 |
|  | 3796 | A-4 | R-56 |
|  | 3797 | A-4 | R-57 |
|  | 3798 | A-4 | R-60 |
|  | 3799 | A-4 | R-61 |
|  | 3800 | A-4 | R-62 |
|  | 3801 | A-4 | R-63 |
|  | 3802 | A-4 | R-64 |
|  | 3803 | A-4 | R-65 |
|  | 3804 | A-4 | R-66 |
|  | 3805 | A-4 | R-67 |
|  | 3806 | A-4 | R-68 |
|  | 3807 | A-4 | R-69 |
|  | 3808 | A-4 | R-70 |
|  | 3809 | A-4 | R-71 |
|  | 3810 | A-4 | R-72 |
|  | 3811 | A-4 | R-73 |
|  | 3812 | A-4 | R-74 |
|  | 3813 | A-4 | R-76 |
|  | 3814 | A-4 | R-77 |
|  | 3815 | A-4 | R-78 |
|  | 3816 | A-4 | R-79 |
|  | 3817 | A-5 | R-1 |

TABLE 36-continued

|  | A | $R^b$, $R^d$ |
|---|---|---|
| 3818 | A-5 | R-2 |
| 3819 | A-5 | R-3 |
| 3820 | A-5 | R-4 |
| 3821 | A-5 | R-5 |
| 3822 | A-5 | R-7 |
| 3823 | A-5 | R-8 |
| 3824 | A-5 | R-11 |
| 3825 | A-5 | R-13 |
| 3826 | A-5 | R-14 |
| 3827 | A-5 | R-15 |
| 3828 | A-5 | R-18 |
| 3829 | A-5 | R-19 |
| 3830 | A-5 | R-20 |
| 3831 | A-5 | R-21 |
| 3832 | A-5 | R-22 |
| 3833 | A-5 | R-23 |
| 3834 | A-5 | R-26 |
| 3835 | A-5 | R-27 |
| 3836 | A-5 | R-31 |
| 3837 | A-5 | R-37 |
| 3838 | A-5 | R-38 |
| 3839 | A-5 | R-43 |
| 3840 | A-5 | R-44 |
| 3841 | A-5 | R-45 |
| 3842 | A-5 | R-47 |
| 3843 | A-5 | R-51 |
| 3844 | A-5 | R-55 |
| 3845 | A-5 | R-56 |
| 3846 | A-5 | R-57 |
| 3847 | A-5 | R-60 |
| 3848 | A-5 | R-61 |
| 3849 | A-5 | R-62 |
| 3850 | A-5 | R-63 |
| 3851 | A-5 | R-64 |
| 3852 | A-5 | R-65 |
| 3853 | A-5 | R-66 |
| 3854 | A-5 | R-67 |
| 3855 | A-5 | R-68 |
| 3856 | A-5 | R-69 |
| 3857 | A-5 | R-70 |
| 3858 | A-5 | R-71 |
| 3859 | A-5 | R-72 |
| 3860 | A-5 | R-73 |
| 3861 | A-5 | R-74 |
| 3862 | A-5 | R-76 |
| 3863 | A-5 | R-77 |
| 3864 | A-5 | R-78 |
| 3865 | A-5 | R-79 |
| 3866 | A-6 | R-1 |
| 3867 | A-6 | R-2 |
| 3868 | A-6 | R-3 |
| 3869 | A-6 | R-4 |
| 3870 | A-6 | R-5 |
| 3871 | A-6 | R-7 |
| 3872 | A-6 | R-8 |
| 3873 | A-6 | R-11 |
| 3874 | A-6 | R-13 |
| 3875 | A-6 | R-14 |
| 3876 | A-6 | R-15 |
| 3877 | A-6 | R-18 |
| 3878 | A-6 | R-19 |
| 3879 | A-6 | R-20 |
| 3880 | A-6 | R-21 |
| 3881 | A-6 | R-22 |
| 3882 | A-6 | R-23 |
| 3883 | A-6 | R-26 |
| 3884 | A-6 | R-27 |
| 3885 | A-6 | R-31 |
| 3886 | A-6 | R-37 |
| 3887 | A-6 | R-38 |
| 3888 | A-6 | R-43 |
| 3889 | A-6 | R-44 |
| 3890 | A-6 | R-45 |
| 3891 | A-6 | R-47 |
| 3892 | A-6 | R-51 |
| 3893 | A-6 | R-55 |
| 3894 | A-6 | R-56 |
| 3895 | A-6 | R-57 |

TABLE 36-continued

| | A | $R^b$, $R^d$ |
|---|---|---|
| 3896 | A-6 | R-60 |
| 3897 | A-6 | R-61 |
| 3898 | A-6 | R-62 |
| 3899 | A-6 | R-63 |
| 3900 | A-6 | R-64 |
| 3901 | A-6 | R-65 |
| 3902 | A-6 | R-66 |
| 3903 | A-6 | R-67 |

TABLE 37

| | | A | $R^b$, $R^d$ |
|---|---|---|---|
| Compound | 3904 | A-6 | R-68 |
| | 3905 | A-6 | R-69 |
| | 3906 | A-6 | R-70 |
| | 3907 | A-6 | R-71 |
| | 3908 | A-6 | R-72 |
| | 3909 | A-6 | R-73 |
| | 3910 | A-6 | R-74 |
| | 3911 | A-6 | R-76 |
| | 3912 | A-6 | R-77 |
| | 3913 | A-6 | R-78 |
| | 3914 | A-6 | R-79 |
| | 3915 | A-7 | R-1 |
| | 3916 | A-7 | R-2 |
| | 3917 | A-7 | R-3 |
| | 3918 | A-7 | R-4 |
| | 3919 | A-7 | R-5 |
| | 3920 | A-7 | R-7 |
| | 3921 | A-7 | R-8 |
| | 3922 | A-7 | R-11 |
| | 3923 | A-7 | R-13 |
| | 3924 | A-7 | R-14 |
| | 3925 | A-7 | R-15 |
| | 3926 | A-7 | R-18 |
| | 3927 | A-7 | R-19 |
| | 3928 | A-7 | R-20 |
| | 3929 | A-7 | R-21 |
| | 3930 | A-7 | R-22 |
| | 3931 | A-7 | R-23 |
| | 3932 | A-7 | R-26 |
| | 3933 | A-7 | R-27 |
| | 3934 | A-7 | R-31 |
| | 3935 | A-7 | R-37 |
| | 3936 | A-7 | R-38 |
| | 3937 | A-7 | R-43 |
| | 3938 | A-7 | R-44 |
| | 3939 | A-7 | R-45 |
| | 3940 | A-7 | R-47 |
| | 3941 | A-7 | R-51 |
| | 3942 | A-7 | R-55 |
| | 3943 | A-7 | R-56 |
| | 3944 | A-7 | R-57 |
| | 3945 | A-7 | R-60 |
| | 3946 | A-7 | R-61 |
| | 3947 | A-7 | R-62 |
| | 3948 | A-7 | R-63 |
| | 3949 | A-7 | R-64 |
| | 3950 | A-7 | R-65 |
| | 3951 | A-7 | R-66 |
| | 3952 | A-7 | R-67 |
| | 3953 | A-7 | R-68 |
| | 3954 | A-7 | R-69 |
| | 3955 | A-7 | R-70 |
| | 3956 | A-7 | R-71 |
| | 3957 | A-7 | R-72 |
| | 3958 | A-7 | R-73 |
| | 3959 | A-7 | R-74 |
| | 3960 | A-7 | R-76 |
| | 3961 | A-7 | R-77 |
| | 3962 | A-7 | R-78 |
| | 3963 | A-7 | R-79 |
| | 3964 | A-8 | R-1 |
| | 3965 | A-8 | R-2 |

TABLE 37-continued

| | A | $R^b$, $R^d$ |
|---|---|---|
| 3966 | A-8 | R-3 |
| 3967 | A-8 | R-4 |
| 3968 | A-8 | R-5 |
| 3969 | A-8 | R-7 |
| 3970 | A-8 | R-8 |
| 3971 | A-8 | R-11 |
| 3972 | A-8 | R-13 |
| 3973 | A-8 | R-14 |
| 3974 | A-8 | R-15 |
| 3975 | A-8 | R-18 |
| 3976 | A-8 | R-19 |
| 3977 | A-8 | R-20 |
| 3978 | A-8 | R-21 |
| 3979 | A-8 | R-22 |
| 3980 | A-8 | R-23 |
| 3981 | A-8 | R-26 |
| 3982 | A-8 | R-27 |
| 3983 | A-8 | R-31 |
| 3984 | A-8 | R-37 |
| 3985 | A-8 | R-38 |
| 3986 | A-8 | R-43 |
| 3987 | A-8 | R-44 |
| 3988 | A-8 | R-45 |
| 3989 | A-8 | R-47 |
| 3990 | A-8 | R-51 |
| 3991 | A-8 | R-55 |
| 3992 | A-8 | R-56 |
| 3993 | A-8 | R-57 |
| 3994 | A-8 | R-60 |
| 3995 | A-8 | R-61 |
| 3996 | A-8 | R-62 |
| 3997 | A-8 | R-63 |
| 3998 | A-8 | R-64 |
| 3999 | A-8 | R-65 |
| 4000 | A-8 | R-66 |
| 4001 | A-8 | R-67 |
| 4002 | A-8 | R-68 |
| 4003 | A-8 | R-69 |
| 4004 | A-8 | R-70 |
| 4005 | A-8 | R-71 |
| 4006 | A-8 | R-72 |
| 4007 | A-8 | R-73 |
| 4008 | A-8 | R-74 |
| 4009 | A-8 | R-76 |
| 4010 | A-8 | R-77 |
| 4011 | A-8 | R-78 |
| 4012 | A-8 | R-79 |
| 4013 | A-20 | R-1 |
| 4014 | A-20 | R-2 |
| 4015 | A-20 | R-3 |
| 4016 | A-20 | R-4 |
| 4017 | A-20 | R-5 |
| 4018 | A-20 | R-7 |
| 4019 | A-20 | R-8 |
| 4020 | A-20 | R-11 |

TABLE 38

| | | A | $R^b$, $R^d$ |
|---|---|---|---|
| Compound | 4021 | A-20 | R-13 |
| | 4022 | A-20 | R-14 |
| | 4023 | A-20 | R-15 |
| | 4024 | A-20 | R-18 |
| | 4025 | A-20 | R-19 |
| | 4026 | A-20 | R-20 |
| | 4027 | A-20 | R-21 |
| | 4028 | A-20 | R-22 |
| | 4029 | A-20 | R-23 |
| | 4030 | A-20 | R-26 |
| | 4031 | A-20 | R-27 |
| | 4032 | A-20 | R-31 |
| | 4033 | A-20 | R-37 |
| | 4034 | A-20 | R-38 |
| | 4035 | A-20 | R-43 |

TABLE 38-continued

|  | A | $R^b, R^d$ |
|---|---|---|
| 4036 | A-20 | R-44 |
| 4037 | A-20 | R-45 |
| 4038 | A-20 | R-47 |
| 4039 | A-20 | R-51 |
| 4040 | A-20 | R-55 |
| 4041 | A-20 | R-56 |
| 4042 | A-20 | R-57 |
| 4043 | A-20 | R-60 |
| 4044 | A-20 | R-61 |
| 4045 | A-20 | R-62 |
| 4046 | A-20 | R-63 |
| 4047 | A-20 | R-64 |
| 4048 | A-20 | R-65 |
| 4049 | A-20 | R-66 |
| 4050 | A-20 | R-67 |
| 4051 | A-20 | R-68 |
| 4052 | A-20 | R-69 |
| 4053 | A-20 | R-70 |
| 4054 | A-20 | R-71 |
| 4055 | A-20 | R-72 |
| 4056 | A-20 | R-73 |
| 4057 | A-20 | R-74 |
| 4058 | A-20 | R-76 |
| 4059 | A-20 | R-77 |
| 4060 | A-20 | R-78 |
| 4061 | A-20 | R-79 |
| 4062 | A-34 | R-1 |
| 4063 | A-34 | R-2 |
| 4064 | A-34 | R-3 |
| 4065 | A-34 | R-4 |
| 4066 | A-34 | R-5 |
| 4067 | A-34 | R-7 |
| 4068 | A-34 | R-8 |
| 4069 | A-34 | R-11 |
| 4070 | A-34 | R-13 |
| 4071 | A-34 | R-14 |
| 4072 | A-34 | R-15 |
| 4073 | A-34 | R-18 |
| 4074 | A-34 | R-19 |
| 4075 | A-34 | R-20 |
| 4076 | A-34 | R-21 |
| 4077 | A-34 | R-22 |
| 4078 | A-34 | R-23 |
| 4079 | A-34 | R-26 |
| 4080 | A-34 | R-27 |
| 4081 | A-34 | R-31 |
| 4082 | A-34 | R-37 |
| 4083 | A-34 | R-38 |
| 4084 | A-34 | R-43 |
| 4085 | A-34 | R-44 |
| 4086 | A-34 | R-45 |
| 4087 | A-34 | R-47 |
| 4088 | A-34 | R-51 |
| 4089 | A-34 | R-55 |
| 4090 | A-34 | R-56 |
| 4091 | A-34 | R-57 |
| 4092 | A-34 | R-60 |
| 4093 | A-34 | R-61 |
| 4094 | A-34 | R-62 |
| 4095 | A-34 | R-63 |
| 4096 | A-34 | R-64 |
| 4097 | A-34 | R-65 |
| 4098 | A-34 | R-66 |
| 4099 | A-34 | R-67 |
| 4100 | A-34 | R-68 |
| 4101 | A-34 | R-69 |
| 4102 | A-34 | R-70 |
| 4103 | A-34 | R-71 |
| 4104 | A-34 | R-72 |
| 4105 | A-34 | R-73 |
| 4106 | A-34 | R-74 |
| 4107 | A-34 | R-76 |
| 4108 | A-34 | R-77 |
| 4109 | A-34 | R-78 |
| 4110 | A-34 | R-79 |
| 4111 | A-39 | R-1 |
| 4112 | A-39 | R-2 |
| 4113 | A-39 | R-3 |

TABLE 38-continued

|  | A | $R^b, R^d$ |
|---|---|---|
| 4114 | A-39 | R-4 |
| 4115 | A-39 | R-5 |
| 4116 | A-39 | R-7 |
| 4117 | A-39 | R-8 |
| 4118 | A-39 | R-11 |
| 4119 | A-39 | R-13 |
| 4120 | A-39 | R-14 |
| 4121 | A-39 | R-15 |
| 4122 | A-39 | R-18 |
| 4123 | A-39 | R-19 |
| 4124 | A-39 | R-20 |
| 4125 | A-39 | R-21 |
| 4126 | A-39 | R-22 |
| 4127 | A-39 | R-23 |
| 4128 | A-39 | R-26 |
| 4129 | A-39 | R-27 |
| 4130 | A-39 | R-31 |
| 4131 | A-39 | R-37 |
| 4132 | A-39 | R-38 |
| 4133 | A-39 | R-43 |
| 4134 | A-39 | R-44 |
| 4135 | A-39 | R-45 |
| 4136 | A-39 | R-47 |
| 4137 | A-39 | R-51 |

TABLE 39

|  |  | A | $R^b, R^d$ |
|---|---|---|---|
| Compound | 4138 | A-39 | R-55 |
|  | 4139 | A-39 | R-56 |
|  | 4140 | A-39 | R-57 |
|  | 4141 | A-39 | R-60 |
|  | 4142 | A-39 | R-61 |
|  | 4143 | A-39 | R-62 |
|  | 4144 | A-39 | R-63 |
|  | 4145 | A-39 | R-64 |
|  | 4146 | A-39 | R-65 |
|  | 4147 | A-39 | R-66 |
|  | 4148 | A-39 | R-67 |
|  | 4149 | A-39 | R-68 |
|  | 4150 | A-39 | R-69 |
|  | 4151 | A-39 | R-70 |
|  | 4152 | A-39 | R-71 |
|  | 4153 | A-39 | R-72 |
|  | 4154 | A-39 | R-73 |
|  | 4155 | A-39 | R-74 |
|  | 4156 | A-39 | R-76 |
|  | 4157 | A-39 | R-77 |
|  | 4158 | A-39 | R-78 |
|  | 4159 | A-39 | R-79 |
|  | 4160 | A-41 | R-1 |
|  | 4161 | A-41 | R-2 |
|  | 4162 | A-41 | R-3 |
|  | 4163 | A-41 | R-4 |
|  | 4164 | A-41 | R-5 |
|  | 4165 | A-41 | R-7 |
|  | 4166 | A-41 | R-8 |
|  | 4167 | A-41 | R-11 |
|  | 4168 | A-41 | R-13 |
|  | 4169 | A-41 | R-14 |
|  | 4170 | A-41 | R-15 |
|  | 4171 | A-41 | R-18 |
|  | 4172 | A-41 | R-19 |
|  | 4173 | A-41 | R-20 |
|  | 4174 | A-41 | R-21 |
|  | 4175 | A-41 | R-22 |
|  | 4176 | A-41 | R-23 |
|  | 4177 | A-41 | R-26 |
|  | 4178 | A-41 | R-27 |
|  | 4179 | A-41 | R-31 |
|  | 4180 | A-41 | R-37 |
|  | 4181 | A-41 | R-38 |
|  | 4182 | A-41 | R-43 |
|  | 4183 | A-41 | R-44 |

TABLE 39-continued

| Compound | A | $R^b, R^d$ |
|---|---|---|
| 4184 | A-41 | R-45 |
| 4185 | A-41 | R-47 |
| 4186 | A-41 | R-51 |
| 4187 | A-41 | R-55 |
| 4188 | A-41 | R-56 |
| 4189 | A-41 | R-57 |
| 4190 | A-41 | R-60 |
| 4191 | A-41 | R-61 |
| 4192 | A-41 | R-62 |
| 4193 | A-41 | R-63 |
| 4194 | A-41 | R-64 |
| 4195 | A-41 | R-65 |
| 4196 | A-41 | R-66 |
| 4197 | A-41 | R-67 |
| 4198 | A-41 | R-68 |
| 4199 | A-41 | R-69 |
| 4200 | A-41 | R-70 |
| 4201 | A-41 | R-71 |
| 4202 | A-41 | R-72 |
| 4203 | A-41 | R-73 |
| 4204 | A-41 | R-74 |
| 4205 | A-41 | R-76 |
| 4206 | A-41 | R-77 |
| 4207 | A-41 | R-78 |
| 4208 | A-41 | R-79 |
| 4209 | A-42 | R-1 |
| 4210 | A-42 | R-2 |
| 4211 | A-42 | R-3 |
| 4212 | A-42 | R-4 |
| 4213 | A-42 | R-5 |
| 4214 | A-42 | R-7 |
| 4215 | A-42 | R-8 |
| 4216 | A-42 | R-11 |
| 4217 | A-42 | R-13 |
| 4218 | A-42 | R-14 |
| 4219 | A-42 | R-15 |
| 4220 | A-42 | R-18 |
| 4221 | A-42 | R-19 |
| 4222 | A-42 | R-20 |
| 4223 | A-42 | R-21 |
| 4224 | A-42 | R-22 |
| 4225 | A-42 | R-23 |
| 4226 | A-42 | R-26 |
| 4227 | A-42 | R-27 |
| 4228 | A-42 | R-31 |
| 4229 | A-42 | R-37 |
| 4230 | A-42 | R-38 |
| 4231 | A-42 | R-43 |
| 4232 | A-42 | R-44 |
| 4233 | A-42 | R-45 |
| 4234 | A-42 | R-47 |
| 4235 | A-42 | R-51 |
| 4236 | A-42 | R-55 |
| 4237 | A-42 | R-56 |
| 4238 | A-42 | R-57 |
| 4239 | A-42 | R-60 |
| 4240 | A-42 | R-61 |
| 4241 | A-42 | R-62 |
| 4242 | A-42 | R-63 |
| 4243 | A-42 | R-64 |
| 4244 | A-42 | R-65 |
| 4245 | A-42 | R-66 |
| 4246 | A-42 | R-67 |
| 4247 | A-42 | R-68 |
| 4248 | A-42 | R-69 |
| 4249 | A-42 | R-70 |
| 4250 | A-42 | R-71 |
| 4251 | A-42 | R-72 |
| 4252 | A-42 | R-73 |
| 4253 | A-42 | R-74 |
| 4254 | A-42 | R-76 |

TABLE 40

| Compound | A | $R^b, R^d$ |
|---|---|---|
| 4255 | A-42 | R-77 |
| 4256 | A-42 | R-78 |
| 4257 | A-42 | R-79 |
| 4258 | A-45 | R-1 |
| 4259 | A-45 | R-2 |
| 4260 | A-45 | R-3 |
| 4261 | A-45 | R-4 |
| 4262 | A-45 | R-5 |
| 4263 | A-45 | R-7 |
| 4264 | A-45 | R-8 |
| 4265 | A-45 | R-11 |
| 4266 | A-45 | R-13 |
| 4267 | A-45 | R-14 |
| 4268 | A-45 | R-15 |
| 4269 | A-45 | R-18 |
| 4270 | A-45 | R-19 |
| 4271 | A-45 | R-20 |
| 4272 | A-45 | R-21 |
| 4273 | A-45 | R-22 |
| 4274 | A-45 | R-23 |
| 4275 | A-45 | R-26 |
| 4276 | A-45 | R-27 |
| 4277 | A-45 | R-31 |
| 4278 | A-45 | R-37 |
| 4279 | A-45 | R-38 |
| 4280 | A-45 | R-43 |
| 4281 | A-45 | R-44 |
| 4282 | A-45 | R-45 |
| 4283 | A-45 | R-47 |
| 4284 | A-45 | R-51 |
| 4285 | A-45 | R-55 |
| 4286 | A-45 | R-56 |
| 4287 | A-45 | R-57 |
| 4288 | A-45 | R-60 |
| 4289 | A-45 | R-61 |
| 4290 | A-45 | R-62 |
| 4291 | A-45 | R-63 |
| 4292 | A-45 | R-64 |
| 4293 | A-45 | R-65 |
| 4294 | A-45 | R-66 |
| 4295 | A-45 | R-67 |
| 4296 | A-45 | R-68 |
| 4297 | A-45 | R-69 |
| 4298 | A-45 | R-70 |
| 4299 | A-45 | R-71 |
| 4300 | A-45 | R-72 |
| 4301 | A-45 | R-73 |
| 4302 | A-45 | R-74 |
| 4303 | A-45 | R-76 |
| 4304 | A-45 | R-77 |
| 4305 | A-45 | R-78 |
| 4306 | A-45 | R-79 |
| 4307 | A-48 | R-1 |
| 4308 | A-48 | R-2 |
| 4309 | A-48 | R-3 |
| 4310 | A-48 | R-4 |
| 4311 | A-48 | R-5 |
| 4312 | A-48 | R-7 |
| 4313 | A-48 | R-8 |
| 4314 | A-48 | R-11 |
| 4315 | A-48 | R-13 |
| 4316 | A-48 | R-14 |
| 4317 | A-48 | R-15 |
| 4318 | A-48 | R-18 |
| 4319 | A-48 | R-19 |
| 4320 | A-48 | R-20 |
| 4321 | A-48 | R-21 |
| 4322 | A-48 | R-22 |
| 4323 | A-48 | R-23 |
| 4324 | A-48 | R-26 |
| 4325 | A-48 | R-27 |
| 4326 | A-48 | R-31 |
| 4327 | A-48 | R-37 |
| 4328 | A-48 | R-38 |
| 4329 | A-48 | R-43 |
| 4330 | A-48 | R-44 |
| 4331 | A-48 | R-45 |
| 4332 | A-48 | R-47 |

TABLE 40-continued

| | A | $R^b, R^d$ |
|---|---|---|
| 4333 | A-48 | R-51 |
| 4334 | A-48 | R-55 |
| 4335 | A-48 | R-56 |
| 4336 | A-48 | R-57 |
| 4337 | A-48 | R-60 |
| 4338 | A-48 | R-61 |
| 4339 | A-48 | R-62 |
| 4340 | A-48 | R-63 |
| 4341 | A-48 | R-64 |
| 4342 | A-48 | R-65 |
| 4343 | A-48 | R-66 |
| 4344 | A-48 | R-67 |
| 4345 | A-48 | R-68 |
| 4346 | A-48 | R-69 |
| 4347 | A-48 | R-70 |
| 4348 | A-48 | R-71 |
| 4349 | A-48 | R-72 |
| 4350 | A-48 | R-73 |
| 4351 | A-48 | R-74 |
| 4352 | A-48 | R-76 |
| 4353 | A-48 | R-77 |
| 4354 | A-48 | R-78 |
| 4355 | A-48 | R-79 |

TABLE 41

| | | A | $R^b, R^d$ |
|---|---|---|---|
| Compound | 4356 | A-1 | R-1 |
| | 4357 | A-1 | R-2 |
| | 4358 | A-1 | R-3 |
| | 4359 | A-1 | R-4 |
| | 4360 | A-1 | R-5 |
| | 4361 | A-1 | R-7 |
| | 4362 | A-1 | R-8 |
| | 4363 | A-1 | R-11 |
| | 4364 | A-1 | R-13 |
| | 4365 | A-1 | R-14 |
| | 4366 | A-1 | R-15 |
| | 4367 | A-1 | R-18 |
| | 4368 | A-1 | R-19 |
| | 4369 | A-1 | R-20 |
| | 4370 | A-1 | R-21 |
| | 4371 | A-1 | R-22 |
| | 4372 | A-1 | R-23 |
| | 4373 | A-1 | R-26 |
| | 4374 | A-1 | R-27 |
| | 4375 | A-1 | R-31 |
| | 4376 | A-1 | R-37 |
| | 4377 | A-1 | R-38 |
| | 4378 | A-1 | R-43 |
| | 4379 | A-1 | R-44 |
| | 4380 | A-1 | R-45 |
| | 4381 | A-1 | R-47 |
| | 4382 | A-1 | R-51 |
| | 4383 | A-1 | R-55 |
| | 4384 | A-1 | R-56 |
| | 4385 | A-1 | R-57 |
| | 4386 | A-1 | R-60 |
| | 4387 | A-1 | R-61 |
| | 4388 | A-1 | R-62 |
| | 4389 | A-1 | R-63 |
| | 4390 | A-1 | R-64 |
| | 4391 | A-1 | R-65 |
| | 4392 | A-1 | R-66 |
| | 4393 | A-1 | R-67 |
| | 4394 | A-1 | R-68 |
| | 4395 | A-1 | R-69 |
| | 4396 | A-1 | R-70 |
| | 4397 | A-1 | R-71 |
| | 4398 | A-1 | R-72 |
| | 4399 | A-1 | R-73 |
| | 4400 | A-1 | R-74 |
| | 4401 | A-1 | R-76 |
| | 4402 | A-1 | R-77 |

TABLE 41-continued

| | A | $R^b, R^d$ |
|---|---|---|
| 4403 | A-1 | R-78 |
| 4404 | A-1 | R-79 |
| 4405 | A-2 | R-1 |
| 4406 | A-2 | R-2 |
| 4407 | A-2 | R-3 |
| 4408 | A-2 | R-4 |
| 4409 | A-2 | R-5 |
| 4410 | A-2 | R-7 |
| 4411 | A-2 | R-8 |
| 4412 | A-2 | R-11 |
| 4413 | A-2 | R-13 |
| 4414 | A-2 | R-14 |
| 4415 | A-2 | R-15 |
| 4416 | A-2 | R-18 |
| 4417 | A-2 | R-19 |
| 4418 | A-2 | R-20 |
| 4419 | A-2 | R-21 |
| 4420 | A-2 | R-22 |
| 4421 | A-2 | R-23 |
| 4422 | A-2 | R-26 |
| 4423 | A-2 | R-27 |
| 4424 | A-2 | R-31 |
| 4425 | A-2 | R-37 |
| 4426 | A-2 | R-38 |
| 4427 | A-2 | R-43 |
| 4428 | A-2 | R-44 |
| 4429 | A-2 | R-45 |
| 4430 | A-2 | R-47 |
| 4431 | A-2 | R-51 |
| 4432 | A-2 | R-55 |
| 4433 | A-2 | R-56 |
| 4434 | A-2 | R-57 |
| 4435 | A-2 | R-60 |
| 4436 | A-2 | R-61 |
| 4437 | A-2 | R-62 |
| 4438 | A-2 | R-63 |
| 4439 | A-2 | R-64 |
| 4440 | A-2 | R-65 |
| 4441 | A-2 | R-66 |
| 4442 | A-2 | R-67 |
| 4443 | A-2 | R-68 |
| 4444 | A-2 | R-69 |
| 4445 | A-2 | R-70 |
| 4446 | A-2 | R-71 |
| 4447 | A-2 | R-72 |
| 4448 | A-2 | R-73 |
| 4449 | A-2 | R-74 |
| 4450 | A-2 | R-76 |
| 4451 | A-2 | R-77 |
| 4452 | A-2 | R-78 |
| 4453 | A-2 | R-79 |
| 4454 | A-4 | R-1 |
| 4455 | A-4 | R-2 |
| 4456 | A-4 | R-3 |
| 4457 | A-4 | R-4 |
| 4458 | A-4 | R-5 |
| 4459 | A-4 | R-7 |
| 4460 | A-4 | R-8 |
| 4461 | A-4 | R-11 |
| 4462 | A-4 | R-13 |
| 4463 | A-4 | R-14 |
| 4464 | A-4 | R-15 |
| 4465 | A-4 | R-18 |
| 4466 | A-4 | R-19 |
| 4467 | A-4 | R-20 |
| 4468 | A-4 | R-21 |
| 4469 | A-4 | R-22 |
| 4470 | A-4 | R-23 |
| 4471 | A-4 | R-26 |
| 4472 | A-4 | R-27 |

TABLE 42

| Compound | A | $R^b, R^d$ |
|---|---|---|
| 4473 | A-4 | R-31 |
| 4474 | A-4 | R-37 |
| 4475 | A-4 | R-38 |
| 4476 | A-4 | R-43 |
| 4477 | A-4 | R-44 |
| 4478 | A-4 | R-45 |
| 4479 | A-4 | R-47 |
| 4480 | A-4 | R-51 |
| 4481 | A-4 | R-55 |
| 4482 | A-4 | R-56 |
| 4483 | A-4 | R-57 |
| 4484 | A-4 | R-60 |
| 4485 | A-4 | R-61 |
| 4486 | A-4 | R-62 |
| 4487 | A-4 | R-63 |
| 4488 | A-4 | R-64 |
| 4489 | A-4 | R-65 |
| 4490 | A-4 | R-66 |
| 4491 | A-4 | R-67 |
| 4492 | A-4 | R-68 |
| 4493 | A-4 | R-69 |
| 4494 | A-4 | R-70 |
| 4495 | A-4 | R-71 |
| 4496 | A-4 | R-72 |
| 4497 | A-4 | R-73 |
| 4498 | A-4 | R-74 |
| 4499 | A-4 | R-76 |
| 4500 | A-4 | R-77 |
| 4501 | A-4 | R-78 |
| 4502 | A-4 | R-79 |
| 4503 | A-5 | R-1 |
| 4504 | A-5 | R-2 |
| 4505 | A-5 | R-3 |
| 4506 | A-5 | R-4 |
| 4507 | A-5 | R-5 |
| 4508 | A-5 | R-7 |
| 4509 | A-5 | R-8 |
| 4510 | A-5 | R-11 |
| 4511 | A-5 | R-13 |
| 4512 | A-5 | R-14 |
| 4513 | A-5 | R-15 |
| 4514 | A-5 | R-18 |
| 4515 | A-5 | R-19 |
| 4516 | A-5 | R-20 |
| 4517 | A-5 | R-21 |
| 4518 | A-5 | R-22 |
| 4519 | A-5 | R-23 |
| 4520 | A-5 | R-26 |
| 4521 | A-5 | R-27 |
| 4522 | A-5 | R-31 |
| 4523 | A-5 | R-37 |
| 4524 | A-5 | R-38 |
| 4525 | A-5 | R-43 |
| 4526 | A-5 | R-44 |
| 4527 | A-5 | R-45 |
| 4528 | A-5 | R-47 |
| 4529 | A-5 | R-51 |
| 4530 | A-5 | R-55 |
| 4531 | A-5 | R-56 |
| 4532 | A-5 | R-57 |
| 4533 | A-5 | R-60 |
| 4534 | A-5 | R-61 |
| 4535 | A-5 | R-62 |
| 4536 | A-5 | R-63 |
| 4537 | A-5 | R-64 |
| 4538 | A-5 | R-65 |
| 4539 | A-5 | R-66 |
| 4540 | A-5 | R-67 |
| 4541 | A-5 | R-68 |
| 4542 | A-5 | R-69 |
| 4543 | A-5 | R-70 |
| 4544 | A-5 | R-71 |
| 4545 | A-5 | R-72 |
| 4546 | A-5 | R-73 |
| 4547 | A-5 | R-74 |
| 4548 | A-5 | R-76 |
| 4549 | A-5 | R-77 |
| 4550 | A-5 | R-78 |
| 4551 | A-5 | R-79 |
| 4552 | A-6 | R-1 |
| 4553 | A-6 | R-2 |
| 4554 | A-6 | R-3 |
| 4555 | A-6 | R-4 |
| 4556 | A-6 | R-5 |
| 4557 | A-6 | R-7 |
| 4558 | A-6 | R-8 |
| 4559 | A-6 | R-11 |
| 4560 | A-6 | R-13 |
| 4561 | A-6 | R-14 |
| 4562 | A-6 | R-15 |
| 4563 | A-6 | R-18 |
| 4564 | A-6 | R-19 |
| 4565 | A-6 | R-20 |
| 4566 | A-6 | R-21 |
| 4567 | A-6 | R-22 |
| 4568 | A-6 | R-23 |
| 4569 | A-6 | R-26 |
| 4570 | A-6 | R-27 |
| 4571 | A-6 | R-31 |
| 4572 | A-6 | R-37 |
| 4573 | A-6 | R-38 |
| 4574 | A-6 | R-43 |
| 4575 | A-6 | R-44 |
| 4576 | A-6 | R-45 |
| 4577 | A-6 | R-47 |
| 4578 | A-6 | R-51 |
| 4579 | A-6 | R-55 |
| 4580 | A-6 | R-56 |
| 4581 | A-6 | R-57 |
| 4582 | A-6 | R-60 |
| 4583 | A-6 | R-61 |
| 4584 | A-6 | R-62 |
| 4585 | A-6 | R-63 |
| 4586 | A-6 | R-64 |
| 4587 | A-6 | R-65 |
| 4588 | A-6 | R-66 |
| 4589 | A-6 | R-67 |

TABLE 43

| Compound | A | $R^b, R^d$ |
|---|---|---|
| 4590 | A-6 | R-68 |
| 4591 | A-6 | R-69 |
| 4592 | A-6 | R-70 |
| 4593 | A-6 | R-71 |
| 4594 | A-6 | R-72 |
| 4595 | A-6 | R-73 |
| 4596 | A-6 | R-74 |
| 4597 | A-6 | R-76 |
| 4598 | A-6 | R-77 |
| 4599 | A-6 | R-78 |
| 4600 | A-6 | R-79 |
| 4601 | A-7 | R-1 |
| 4602 | A-7 | R-2 |
| 4603 | A-7 | R-3 |
| 4604 | A-7 | R-4 |
| 4605 | A-7 | R-5 |
| 4606 | A-7 | R-7 |
| 4607 | A-7 | R-8 |
| 4608 | A-7 | R-11 |
| 4609 | A-7 | R-13 |
| 4610 | A-7 | R-14 |
| 4611 | A-7 | R-15 |
| 4612 | A-7 | R-18 |
| 4613 | A-7 | R-19 |
| 4614 | A-7 | R-20 |
| 4615 | A-7 | R-21 |
| 4616 | A-7 | R-22 |
| 4617 | A-7 | R-23 |
| 4618 | A-7 | R-26 |
| 4619 | A-7 | R-27 |
| 4620 | A-7 | R-31 |

TABLE 43-continued

| Compound | A | $R^b, R^d$ |
|---|---|---|
| 4621 | A-7 | R-37 |
| 4622 | A-7 | R-38 |
| 4623 | A-7 | R-43 |
| 4624 | A-7 | R-44 |
| 4625 | A-7 | R-45 |
| 4626 | A-7 | R-47 |
| 4627 | A-7 | R-51 |
| 4628 | A-7 | R-55 |
| 4629 | A-7 | R-56 |
| 4630 | A-7 | R-57 |
| 4631 | A-7 | R-60 |
| 4632 | A-7 | R-61 |
| 4633 | A-7 | R-62 |
| 4634 | A-7 | R-63 |
| 4635 | A-7 | R-64 |
| 4636 | A-7 | R-65 |
| 4637 | A-7 | R-66 |
| 4638 | A-7 | R-67 |
| 4639 | A-7 | R-68 |
| 4640 | A-7 | R-69 |
| 4641 | A-7 | R-70 |
| 4642 | A-7 | R-71 |
| 4643 | A-7 | R-72 |
| 4644 | A-7 | R-73 |
| 4645 | A-7 | R-74 |
| 4646 | A-7 | R-76 |
| 4647 | A-7 | R-77 |
| 4648 | A-7 | R-78 |
| 4649 | A-7 | R-79 |
| 4650 | A-8 | R-1 |
| 4651 | A-8 | R-2 |
| 4652 | A-8 | R-3 |
| 4653 | A-8 | R-4 |
| 4654 | A-8 | R-5 |
| 4655 | A-8 | R-7 |
| 4656 | A-8 | R-8 |
| 4657 | A-8 | R-11 |
| 4658 | A-8 | R-13 |
| 4659 | A-8 | R-14 |
| 4660 | A-8 | R-15 |
| 4661 | A-8 | R-18 |
| 4662 | A-8 | R-19 |
| 4663 | A-8 | R-20 |
| 4664 | A-8 | R-21 |
| 4665 | A-8 | R-22 |
| 4666 | A-8 | R-23 |
| 4667 | A-8 | R-26 |
| 4668 | A-8 | R-27 |
| 4669 | A-8 | R-31 |
| 4670 | A-8 | R-37 |
| 4671 | A-8 | R-38 |
| 4672 | A-8 | R-43 |
| 4673 | A-8 | R-44 |
| 4674 | A-8 | R-45 |
| 4675 | A-8 | R-47 |
| 4676 | A-8 | R-51 |
| 4677 | A-8 | R-55 |
| 4678 | A-8 | R-56 |
| 4679 | A-8 | R-57 |
| 4680 | A-8 | R-60 |
| 4681 | A-8 | R-61 |
| 4682 | A-8 | R-62 |
| 4683 | A-8 | R-63 |
| 4684 | A-8 | R-64 |
| 4685 | A-8 | R-65 |
| 4686 | A-8 | R-66 |
| 4687 | A-8 | R-67 |
| 4688 | A-8 | R-68 |
| 4689 | A-8 | R-69 |
| 4690 | A-8 | R-70 |
| 4691 | A-8 | R-71 |
| 4692 | A-8 | R-72 |
| 4693 | A-8 | R-73 |
| 4694 | A-8 | R-74 |
| 4695 | A-8 | R-76 |
| 4696 | A-8 | R-77 |
| 4697 | A-8 | R-78 |
| 4698 | A-8 | R-79 |
| 4699 | A-20 | R-1 |
| 4700 | A-20 | R-2 |
| 4701 | A-20 | R-3 |
| 4702 | A-20 | R-4 |
| 4703 | A-20 | R-5 |
| 4704 | A-20 | R-7 |
| 4705 | A-20 | R-8 |
| 4706 | A-20 | R-11 |

TABLE 44

| Compound | A | $R^b, R^d$ |
|---|---|---|
| 4707 | A-20 | R-13 |
| 4708 | A-20 | R-14 |
| 4709 | A-20 | R-15 |
| 4710 | A-20 | R-18 |
| 4711 | A-20 | R-19 |
| 4712 | A-20 | R-20 |
| 4713 | A-20 | R-21 |
| 4714 | A-20 | R-22 |
| 4715 | A-20 | R-23 |
| 4716 | A-20 | R-26 |
| 4717 | A-20 | R-27 |
| 4718 | A-20 | R-31 |
| 4719 | A-20 | R-37 |
| 4720 | A-20 | R-38 |
| 4721 | A-20 | R-43 |
| 4722 | A-20 | R-44 |
| 4723 | A-20 | R-45 |
| 4724 | A-20 | R-47 |
| 4725 | A-20 | R-51 |
| 4726 | A-20 | R-55 |
| 4727 | A-20 | R-56 |
| 4728 | A-20 | R-57 |
| 4729 | A-20 | R-60 |
| 4730 | A-20 | R-61 |
| 4731 | A-20 | R-62 |
| 4732 | A-20 | R-63 |
| 4733 | A-20 | R-64 |
| 4734 | A-20 | R-65 |
| 4735 | A-20 | R-66 |
| 4736 | A-20 | R-67 |
| 4737 | A-20 | R-68 |
| 4738 | A-20 | R-69 |
| 4739 | A-20 | R-70 |
| 4740 | A-20 | R-71 |
| 4741 | A-20 | R-72 |
| 4742 | A-20 | R-73 |
| 4743 | A-20 | R-74 |
| 4744 | A-20 | R-76 |
| 4745 | A-20 | R-77 |
| 4746 | A-20 | R-78 |
| 4747 | A-20 | R-79 |
| 4748 | A-34 | R-1 |
| 4749 | A-34 | R-2 |
| 4750 | A-34 | R-3 |
| 4751 | A-34 | R-4 |
| 4752 | A-34 | R-5 |
| 4753 | A-34 | R-7 |
| 4754 | A-34 | R-8 |
| 4755 | A-34 | R-11 |
| 4756 | A-34 | R-13 |
| 4757 | A-34 | R-14 |
| 4758 | A-34 | R-15 |
| 4759 | A-34 | R-18 |
| 4760 | A-34 | R-19 |
| 4761 | A-34 | R-20 |
| 4762 | A-34 | R-21 |
| 4763 | A-34 | R-22 |
| 4764 | A-34 | R-23 |
| 4765 | A-34 | R-26 |
| 4766 | A-34 | R-27 |
| 4767 | A-34 | R-31 |
| 4768 | A-34 | R-37 |

TABLE 44-continued

| Compound | A | $R^b$, $R^d$ |
|---|---|---|
| 4769 | A-34 | R-38 |
| 4770 | A-34 | R-43 |
| 4771 | A-34 | R-44 |
| 4772 | A-34 | R-45 |
| 4773 | A-34 | R-47 |
| 4774 | A-34 | R-51 |
| 4775 | A-34 | R-55 |
| 4776 | A-34 | R-56 |
| 4777 | A-34 | R-57 |
| 4778 | A-34 | R-60 |
| 4779 | A-34 | R-61 |
| 4780 | A-34 | R-62 |
| 4781 | A-34 | R-63 |
| 4782 | A-34 | R-64 |
| 4783 | A-34 | R-65 |
| 4784 | A-34 | R-66 |
| 4785 | A-34 | R-67 |
| 4786 | A-34 | R-68 |
| 4787 | A-34 | R-69 |
| 4788 | A-34 | R-70 |
| 4789 | A-34 | R-71 |
| 4790 | A-34 | R-72 |
| 4791 | A-34 | R-73 |
| 4792 | A-34 | R-74 |
| 4793 | A-34 | R-76 |
| 4794 | A-34 | R-77 |
| 4795 | A-34 | R-78 |
| 4796 | A-34 | R-79 |
| 4797 | A-39 | R-1 |
| 4798 | A-39 | R-2 |
| 4799 | A-39 | R-3 |
| 4800 | A-39 | R-4 |
| 4801 | A-39 | R-5 |
| 4802 | A-39 | R-7 |
| 4803 | A-39 | R-8 |
| 4804 | A-39 | R-11 |
| 4805 | A-39 | R-13 |
| 4806 | A-39 | R-14 |
| 4807 | A-39 | R-15 |
| 4808 | A-39 | R-18 |
| 4809 | A-39 | R-19 |
| 4810 | A-39 | R-20 |
| 4811 | A-39 | R-21 |
| 4812 | A-39 | R-22 |
| 4813 | A-39 | R-23 |
| 4814 | A-39 | R-26 |
| 4815 | A-39 | R-27 |
| 4816 | A-39 | R-31 |
| 4817 | A-39 | R-37 |
| 4818 | A-39 | R-38 |
| 4819 | A-39 | R-43 |
| 4820 | A-39 | R-44 |
| 4821 | A-39 | R-45 |
| 4822 | A-39 | R-47 |
| 4823 | A-39 | R-51 |

TABLE 45

| Compound | A | $R^b$, $R^d$ |
|---|---|---|
| 4824 | A-39 | R-55 |
| 4825 | A-39 | R-56 |
| 4826 | A-39 | R-57 |
| 4827 | A-39 | R-60 |
| 4828 | A-39 | R-61 |
| 4829 | A-39 | R-62 |
| 4830 | A-39 | R-63 |
| 4831 | A-39 | R-64 |
| 4832 | A-39 | R-65 |
| 4833 | A-39 | R-66 |
| 4834 | A-39 | R-67 |
| 4835 | A-39 | R-68 |
| 4836 | A-39 | R-69 |
| 4837 | A-39 | R-70 |
| 4838 | A-39 | R-71 |

TABLE 45-continued

| Compound | A | $R^b$, $R^d$ |
|---|---|---|
| 4839 | A-39 | R-72 |
| 4840 | A-39 | R-73 |
| 4841 | A-39 | R-74 |
| 4842 | A-39 | R-76 |
| 4843 | A-39 | R-77 |
| 4844 | A-39 | R-78 |
| 4845 | A-39 | R-79 |
| 4846 | A-41 | R-1 |
| 4847 | A-41 | R-2 |
| 4848 | A-41 | R-3 |
| 4849 | A-41 | R-4 |
| 4850 | A-41 | R-5 |
| 4851 | A-41 | R-7 |
| 4852 | A-41 | R-8 |
| 4853 | A-41 | R-11 |
| 4854 | A-41 | R-13 |
| 4855 | A-41 | R-14 |
| 4856 | A-41 | R-15 |
| 4857 | A-41 | R-18 |
| 4858 | A-41 | R-19 |
| 4859 | A-41 | R-20 |
| 4860 | A-41 | R-21 |
| 4861 | A-41 | R-22 |
| 4862 | A-41 | R-23 |
| 4863 | A-41 | R-26 |
| 4864 | A-41 | R-27 |
| 4865 | A-41 | R-31 |
| 4866 | A-41 | R-37 |
| 4867 | A-41 | R-38 |
| 4868 | A-41 | R-43 |
| 4869 | A-41 | R-44 |
| 4870 | A-41 | R-45 |
| 4871 | A-41 | R-47 |
| 4872 | A-41 | R-51 |
| 4873 | A-41 | R-55 |
| 4874 | A-41 | R-56 |
| 4875 | A-41 | R-57 |
| 4876 | A-41 | R-60 |
| 4877 | A-41 | R-61 |
| 4878 | A-41 | R-62 |
| 4879 | A-41 | R-63 |
| 4880 | A-41 | R-64 |
| 4881 | A-41 | R-65 |
| 4882 | A-41 | R-66 |
| 4883 | A-41 | R-67 |
| 4884 | A-41 | R-68 |
| 4885 | A-41 | R-69 |
| 4886 | A-41 | R-70 |
| 4887 | A-41 | R-71 |
| 4888 | A-41 | R-72 |
| 4889 | A-41 | R-73 |
| 4890 | A-41 | R-74 |
| 4891 | A-41 | R-76 |
| 4892 | A-41 | R-77 |
| 4893 | A-41 | R-78 |
| 4894 | A-41 | R-79 |
| 4895 | A-42 | R-1 |
| 4896 | A-42 | R-2 |
| 4897 | A-42 | R-3 |
| 4898 | A-42 | R-4 |
| 4899 | A-42 | R-5 |
| 4900 | A-42 | R-7 |
| 4901 | A-42 | R-8 |
| 4902 | A-42 | R-11 |
| 4903 | A-42 | R-13 |
| 4904 | A-42 | R-14 |
| 4905 | A-42 | R-15 |
| 4906 | A-42 | R-18 |
| 4907 | A-42 | R-19 |
| 4908 | A-42 | R-20 |
| 4909 | A-42 | R-21 |
| 4910 | A-42 | R-22 |
| 4911 | A-42 | R-23 |
| 4912 | A-42 | R-26 |
| 4913 | A-42 | R-27 |
| 4914 | A-42 | R-31 |
| 4915 | A-42 | R-37 |
| 4916 | A-42 | R-38 |

TABLE 45-continued

| Compound | A | $R^b$, $R^d$ |
|---|---|---|
| 4917 | A-42 | R-43 |
| 4918 | A-42 | R-44 |
| 4919 | A-42 | R-45 |
| 4920 | A-42 | R-47 |
| 4921 | A-42 | R-51 |
| 4922 | A-42 | R-55 |
| 4923 | A-42 | R-56 |
| 4924 | A-42 | R-57 |
| 4925 | A-42 | R-60 |
| 4926 | A-42 | R-61 |
| 4927 | A-42 | R-62 |
| 4928 | A-42 | R-63 |
| 4929 | A-42 | R-64 |
| 4930 | A-42 | R-65 |
| 4931 | A-42 | R-66 |
| 4932 | A-42 | R-67 |
| 4933 | A-42 | R-68 |
| 4934 | A-42 | R-69 |
| 4935 | A-42 | R-70 |
| 4936 | A-42 | R-71 |
| 4937 | A-42 | R-72 |
| 4938 | A-42 | R-73 |
| 4939 | A-42 | R-74 |
| 4940 | A-42 | R-76 |

TABLE 46

| Compound | A | $R^b$, $R^d$ |
|---|---|---|
| 4941 | A-42 | R-77 |
| 4942 | A-42 | R-78 |
| 4943 | A-42 | R-79 |
| 4944 | A-45 | R-1 |
| 4945 | A-45 | R-2 |
| 4946 | A-45 | R-3 |
| 4947 | A-45 | R-4 |
| 4948 | A-45 | R-5 |
| 4949 | A-45 | R-7 |
| 4950 | A-45 | R-8 |
| 4951 | A-45 | R-11 |
| 4952 | A-45 | R-13 |
| 4953 | A-45 | R-14 |
| 4954 | A-45 | R-15 |
| 4955 | A-45 | R-18 |
| 4956 | A-45 | R-19 |
| 4957 | A-45 | R-20 |
| 4958 | A-45 | R-21 |
| 4959 | A-45 | R-22 |
| 4960 | A-45 | R-23 |
| 4961 | A-45 | R-26 |
| 4962 | A-45 | R-27 |
| 4963 | A-45 | R-31 |
| 4964 | A-45 | R-37 |
| 4965 | A-45 | R-38 |
| 4966 | A-45 | R-43 |
| 4967 | A-45 | R-44 |
| 4968 | A-45 | R-45 |
| 4969 | A-45 | R-47 |
| 4970 | A-45 | R-51 |
| 4971 | A-45 | R-55 |
| 4972 | A-45 | R-56 |
| 4973 | A-45 | R-57 |
| 4974 | A-45 | R-60 |
| 4975 | A-45 | R-61 |
| 4976 | A-45 | R-62 |
| 4977 | A-45 | R-63 |
| 4978 | A-45 | R-64 |
| 4979 | A-45 | R-65 |
| 4980 | A-45 | R-66 |
| 4981 | A-45 | R-67 |
| 4982 | A-45 | R-68 |
| 4983 | A-45 | R-69 |
| 4984 | A-45 | R-70 |
| 4985 | A-45 | R-71 |
| 4986 | A-45 | R-72 |

TABLE 46-continued

| Compound | A | $R^b$, $R^d$ |
|---|---|---|
| 4987 | A-45 | R-73 |
| 4988 | A-45 | R-74 |
| 4989 | A-45 | R-76 |
| 4990 | A-45 | R-77 |
| 4991 | A-45 | R-78 |
| 4992 | A-45 | R-79 |
| 4993 | A-48 | R-1 |
| 4994 | A-48 | R-2 |
| 4995 | A-48 | R-3 |
| 4996 | A-48 | R-4 |
| 4997 | A-48 | R-5 |
| 4998 | A-48 | R-7 |
| 4999 | A-48 | R-8 |
| 5000 | A-48 | R-11 |
| 5001 | A-48 | R-13 |
| 5002 | A-48 | R-14 |
| 5003 | A-48 | R-15 |
| 5004 | A-48 | R-18 |
| 5005 | A-48 | R-19 |
| 5006 | A-48 | R-20 |
| 5007 | A-48 | R-21 |
| 5008 | A-48 | R-22 |
| 5009 | A-48 | R-23 |
| 5010 | A-48 | R-26 |
| 5011 | A-48 | R-27 |
| 5012 | A-48 | R-31 |
| 5013 | A-48 | R-37 |
| 5014 | A-48 | R-38 |
| 5015 | A-48 | R-43 |
| 5016 | A-48 | R-44 |
| 5017 | A-48 | R-45 |
| 5018 | A-48 | R-47 |
| 5019 | A-48 | R-51 |
| 5020 | A-48 | R-55 |
| 5021 | A-48 | R-56 |
| 5022 | A-48 | R-57 |
| 5023 | A-48 | R-60 |
| 5024 | A-48 | R-61 |
| 5025 | A-48 | R-62 |
| 5026 | A-48 | R-63 |
| 5027 | A-48 | R-64 |
| 5028 | A-48 | R-65 |
| 5029 | A-48 | R-66 |
| 5030 | A-48 | R-67 |
| 5031 | A-48 | R-68 |
| 5032 | A-48 | R-69 |
| 5033 | A-48 | R-70 |
| 5034 | A-48 | R-71 |
| 5035 | A-48 | R-72 |
| 5036 | A-48 | R-73 |
| 5037 | A-48 | R-74 |
| 5038 | A-48 | R-76 |
| 5039 | A-48 | R-77 |
| 5040 | A-48 | R-78 |
| 5041 | A-48 | R-79 |

TABLE 47

| Compound | A | $R^b$, $R^d$ |
|---|---|---|
| 5042 | A-1 | R-1 |
| 5043 | A-1 | R-2 |
| 5044 | A-1 | R-3 |
| 5045 | A-1 | R-4 |
| 5046 | A-1 | R-5 |
| 5047 | A-1 | R-7 |
| 5048 | A-1 | R-8 |
| 5049 | A-1 | R-11 |
| 5050 | A-1 | R-13 |
| 5051 | A-1 | R-14 |
| 5052 | A-1 | R-15 |
| 5053 | A-1 | R-18 |
| 5054 | A-1 | R-19 |
| 5055 | A-1 | R-20 |
| 5056 | A-1 | R-21 |

TABLE 47-continued

| Compound | A | $R^b$, $R^d$ |
|---|---|---|
| 5057 | A-1 | R-22 |
| 5058 | A-1 | R-23 |
| 5059 | A-1 | R-26 |
| 5060 | A-1 | R-27 |
| 5061 | A-1 | R-31 |
| 5062 | A-1 | R-37 |
| 5063 | A-1 | R-38 |
| 5064 | A-1 | R-43 |
| 5065 | A-1 | R-44 |
| 5066 | A-1 | R-45 |
| 5067 | A-1 | R-47 |
| 5068 | A-1 | R-51 |
| 5069 | A-1 | R-55 |
| 5070 | A-1 | R-56 |
| 5071 | A-1 | R-57 |
| 5072 | A-1 | R-60 |
| 5073 | A-1 | R-61 |
| 5074 | A-1 | R-62 |
| 5075 | A-1 | R-63 |
| 5076 | A-1 | R-64 |
| 5077 | A-1 | R-65 |
| 5078 | A-1 | R-66 |
| 5079 | A-1 | R-67 |
| 5080 | A-1 | R-68 |
| 5081 | A-1 | R-69 |
| 5082 | A-1 | R-70 |
| 5083 | A-1 | R-71 |
| 5084 | A-1 | R-72 |
| 5085 | A-1 | R-73 |
| 5086 | A-1 | R-74 |
| 5087 | A-1 | R-76 |
| 5088 | A-1 | R-77 |
| 5089 | A-1 | R-78 |
| 5090 | A-1 | R-79 |
| 5091 | A-2 | R-1 |
| 5092 | A-2 | R-2 |
| 5093 | A-2 | R-3 |
| 5094 | A-2 | R-4 |
| 5095 | A-2 | R-5 |
| 5096 | A-2 | R-7 |
| 5097 | A-2 | R-8 |
| 5098 | A-2 | R-11 |
| 5099 | A-2 | R-13 |
| 5100 | A-2 | R-14 |
| 5101 | A-2 | R-15 |
| 5102 | A-2 | R-18 |
| 5103 | A-2 | R-19 |
| 5104 | A-2 | R-20 |
| 5105 | A-2 | R-21 |
| 5106 | A-2 | R-22 |
| 5107 | A-2 | R-23 |
| 5108 | A-2 | R-26 |
| 5109 | A-2 | R-27 |
| 5110 | A-2 | R-31 |
| 5111 | A-2 | R-37 |
| 5112 | A-2 | R-38 |
| 5113 | A-2 | R-43 |
| 5114 | A-2 | R-44 |
| 5115 | A-2 | R-45 |
| 5116 | A-2 | R-47 |
| 5117 | A-2 | R-51 |
| 5118 | A-2 | R-55 |
| 5119 | A-2 | R-56 |
| 5120 | A-2 | R-57 |
| 5121 | A-2 | R-60 |
| 5122 | A-2 | R-61 |
| 5123 | A-2 | R-62 |
| 5124 | A-2 | R-63 |
| 5125 | A-2 | R-64 |
| 5126 | A-2 | R-65 |
| 5127 | A-2 | R-66 |
| 5128 | A-2 | R-67 |
| 5129 | A-2 | R-68 |
| 5130 | A-2 | R-69 |
| 5131 | A-2 | R-70 |
| 5132 | A-2 | R-71 |
| 5133 | A-2 | R-72 |
| 5134 | A-2 | R-73 |
| 5135 | A-2 | R-74 |
| 5136 | A-2 | R-76 |
| 5137 | A-2 | R-77 |
| 5138 | A-2 | R-78 |
| 5139 | A-2 | R-79 |
| 5140 | A-4 | R-1 |
| 5141 | A-4 | R-2 |
| 5142 | A-4 | R-3 |
| 5143 | A-4 | R-4 |
| 5144 | A-4 | R-5 |
| 5145 | A-4 | R-7 |
| 5146 | A-4 | R-8 |
| 5147 | A-4 | R-11 |
| 5148 | A-4 | R-13 |
| 5149 | A-4 | R-14 |
| 5150 | A-4 | R-15 |
| 5151 | A-4 | R-18 |
| 5152 | A-4 | R-19 |
| 5153 | A-4 | R-20 |
| 5154 | A-4 | R-21 |
| 5155 | A-4 | R-22 |
| 5156 | A-4 | R-23 |
| 5157 | A-4 | R-26 |
| 5158 | A-4 | R-27 |

TABLE 48

| Compound | A | $R^b$, $R^d$ |
|---|---|---|
| 5159 | A-4 | R-31 |
| 5160 | A-4 | R-37 |
| 5161 | A-4 | R-38 |
| 5162 | A-4 | R-43 |
| 5163 | A-4 | R-44 |
| 5164 | A-4 | R-45 |
| 5165 | A-4 | R-47 |
| 5166 | A-4 | R-51 |
| 5167 | A-4 | R-55 |
| 5168 | A-4 | R-56 |
| 5169 | A-4 | R-57 |
| 5170 | A-4 | R-60 |
| 5171 | A-4 | R-61 |
| 5172 | A-4 | R-62 |
| 5173 | A-4 | R-63 |
| 5174 | A-4 | R-64 |
| 5175 | A-4 | R-65 |
| 5176 | A-4 | R-66 |
| 5177 | A-4 | R-67 |
| 5178 | A-4 | R-68 |
| 5179 | A-4 | R-69 |
| 5180 | A-4 | R-70 |
| 5181 | A-4 | R-71 |
| 5182 | A-4 | R-72 |
| 5183 | A-4 | R-73 |
| 5184 | A-4 | R-74 |
| 5185 | A-4 | R-76 |
| 5186 | A-4 | R-77 |
| 5187 | A-4 | R-78 |
| 5188 | A-4 | R-79 |
| 5189 | A-5 | R-1 |
| 5190 | A-5 | R-2 |
| 5191 | A-5 | R-3 |
| 5192 | A-5 | R-4 |
| 5193 | A-5 | R-5 |
| 5194 | A-5 | R-7 |
| 5195 | A-5 | R-8 |
| 5196 | A-5 | R-11 |
| 5197 | A-5 | R-13 |
| 5198 | A-5 | R-14 |
| 5199 | A-5 | R-15 |
| 5200 | A-5 | R-18 |
| 5201 | A-5 | R-19 |
| 5202 | A-5 | R-20 |
| 5203 | A-5 | R-21 |
| 5204 | A-5 | R-22 |

TABLE 48-continued

| Compound | A | $R^b, R^d$ |
|---|---|---|
| 5205 | A-5 | R-23 |
| 5206 | A-5 | R-26 |
| 5207 | A-5 | R-27 |
| 5208 | A-5 | R-31 |
| 5209 | A-5 | R-37 |
| 5210 | A-5 | R-38 |
| 5211 | A-5 | R-43 |
| 5212 | A-5 | R-44 |
| 5213 | A-5 | R-45 |
| 5214 | A-5 | R-47 |
| 5215 | A-5 | R-51 |
| 5216 | A-5 | R-55 |
| 5217 | A-5 | R-56 |
| 5218 | A-5 | R-57 |
| 5219 | A-5 | R-60 |
| 5220 | A-5 | R-61 |
| 5221 | A-5 | R-62 |
| 5222 | A-5 | R-63 |
| 5223 | A-5 | R-64 |
| 5224 | A-5 | R-65 |
| 5225 | A-5 | R-66 |
| 5226 | A-5 | R-67 |
| 5227 | A-5 | R-68 |
| 5228 | A-5 | R-69 |
| 5229 | A-5 | R-70 |
| 5230 | A-5 | R-71 |
| 5231 | A-5 | R-72 |
| 5232 | A-5 | R-73 |
| 5233 | A-5 | R-74 |
| 5234 | A-5 | R-76 |
| 5235 | A-5 | R-77 |
| 5236 | A-5 | R-78 |
| 5237 | A-5 | R-79 |
| 5238 | A-6 | R-1 |
| 5239 | A-6 | R-2 |
| 5240 | A-6 | R-3 |
| 5241 | A-6 | R-4 |
| 5242 | A-6 | R-5 |
| 5243 | A-6 | R-7 |
| 5244 | A-6 | R-8 |
| 5245 | A-6 | R-11 |
| 5246 | A-6 | R-13 |
| 5247 | A-6 | R-14 |
| 5248 | A-6 | R-15 |
| 5249 | A-6 | R-18 |
| 5250 | A-6 | R-19 |
| 5251 | A-6 | R-20 |
| 5252 | A-6 | R-21 |
| 5253 | A-6 | R-22 |
| 5254 | A-6 | R-23 |
| 5255 | A-6 | R-26 |
| 5256 | A-6 | R-27 |
| 5257 | A-6 | R-31 |
| 5258 | A-6 | R-37 |
| 5259 | A-6 | R-38 |
| 5260 | A-6 | R-43 |
| 5261 | A-6 | R-44 |
| 5262 | A-6 | R-45 |
| 5263 | A-6 | R-47 |
| 5264 | A-6 | R-51 |
| 5265 | A-6 | R-55 |
| 5266 | A-6 | R-56 |
| 5267 | A-6 | R-57 |
| 5268 | A-6 | R-60 |
| 5269 | A-6 | R-61 |
| 5270 | A-6 | R-62 |
| 5271 | A-6 | R-63 |
| 5272 | A-6 | R-64 |
| 5273 | A-6 | R-65 |
| 5274 | A-6 | R-66 |
| 5275 | A-6 | R-67 |

TABLE 49

| Compound | A | $R^b, R^d$ |
|---|---|---|
| 5276 | A-6 | R-68 |
| 5277 | A-6 | R-69 |
| 5278 | A-6 | R-70 |
| 5279 | A-6 | R-71 |
| 5280 | A-6 | R-72 |
| 5281 | A-6 | R-73 |
| 5282 | A-6 | R-74 |
| 5283 | A-6 | R-76 |
| 5284 | A-6 | R-77 |
| 5285 | A-6 | R-78 |
| 5286 | A-6 | R-79 |
| 5287 | A-7 | R-1 |
| 5288 | A-7 | R-2 |
| 5289 | A-7 | R-3 |
| 5290 | A-7 | R-4 |
| 5291 | A-7 | R-5 |
| 5292 | A-7 | R-7 |
| 5293 | A-7 | R-8 |
| 5294 | A-7 | R-11 |
| 5295 | A-7 | R-13 |
| 5296 | A-7 | R-14 |
| 5297 | A-7 | R-15 |
| 5298 | A-7 | R-18 |
| 5299 | A-7 | R-19 |
| 5300 | A-7 | R-20 |
| 5301 | A-7 | R-21 |
| 5302 | A-7 | R-22 |
| 5303 | A-7 | R-23 |
| 5304 | A-7 | R-26 |
| 5305 | A-7 | R-27 |
| 5306 | A-7 | R-31 |
| 5307 | A-7 | R-37 |
| 5308 | A-7 | R-38 |
| 5309 | A-7 | R-43 |
| 5310 | A-7 | R-44 |
| 5311 | A-7 | R-45 |
| 5312 | A-7 | R-47 |
| 5313 | A-7 | R-51 |
| 5314 | A-7 | R-55 |
| 5315 | A-7 | R-56 |
| 5316 | A-7 | R-57 |
| 5317 | A-7 | R-60 |
| 5318 | A-7 | R-61 |
| 5319 | A-7 | R-62 |
| 5320 | A-7 | R-63 |
| 5321 | A-7 | R-64 |
| 5322 | A-7 | R-65 |
| 5323 | A-7 | R-66 |
| 5324 | A-7 | R-67 |
| 5325 | A-7 | R-68 |
| 5326 | A-7 | R-69 |
| 5327 | A-7 | R-70 |
| 5328 | A-7 | R-71 |
| 5329 | A-7 | R-72 |
| 5330 | A-7 | R-73 |
| 5331 | A-7 | R-74 |
| 5332 | A-7 | R-76 |
| 5333 | A-7 | R-77 |
| 5334 | A-7 | R-78 |
| 5335 | A-7 | R-79 |
| 5336 | A-8 | R-1 |
| 5337 | A-8 | R-2 |
| 5338 | A-8 | R-3 |
| 5339 | A-8 | R-4 |
| 5340 | A-8 | R-5 |
| 5341 | A-8 | R-7 |
| 5342 | A-8 | R-8 |
| 5343 | A-8 | R-11 |
| 5344 | A-8 | R-13 |
| 5345 | A-8 | R-14 |
| 5346 | A-8 | R-15 |
| 5347 | A-8 | R-18 |
| 5348 | A-8 | R-19 |
| 5349 | A-8 | R-20 |
| 5350 | A-8 | R-21 |
| 5351 | A-8 | R-22 |
| 5352 | A-8 | R-23 |
| 5353 | A-8 | R-26 |

TABLE 49-continued

| Compound | A | $R^b$, $R^d$ |
|---|---|---|
| 5354 | A-8 | R-27 |
| 5355 | A-8 | R-31 |
| 5356 | A-8 | R-37 |
| 5357 | A-8 | R-38 |
| 5358 | A-8 | R-43 |
| 5359 | A-8 | R-44 |
| 5360 | A-8 | R-45 |
| 5361 | A-8 | R-47 |
| 5362 | A-8 | R-51 |
| 5363 | A-8 | R-55 |
| 5364 | A-8 | R-56 |
| 5365 | A-8 | R-57 |
| 5366 | A-8 | R-60 |
| 5367 | A-8 | R-61 |
| 5368 | A-8 | R-62 |
| 5369 | A-8 | R-63 |
| 5370 | A-8 | R-64 |
| 5371 | A-8 | R-65 |
| 5372 | A-8 | R-66 |
| 5373 | A-8 | R-67 |
| 5374 | A-8 | R-68 |
| 5375 | A-8 | R-69 |
| 5376 | A-8 | R-70 |
| 5377 | A-8 | R-71 |
| 5378 | A-8 | R-72 |
| 5379 | A-8 | R-73 |
| 5380 | A-8 | R-74 |
| 5381 | A-8 | R-76 |
| 5382 | A-8 | R-77 |
| 5383 | A-8 | R-78 |
| 5384 | A-8 | R-79 |
| 5385 | A-20 | R-1 |
| 5386 | A-20 | R-2 |
| 5387 | A-20 | R-3 |
| 5388 | A-20 | R-4 |
| 5389 | A-20 | R-5 |
| 5390 | A-20 | R-7 |
| 5391 | A-20 | R-8 |
| 5392 | A-20 | R-11 |

TABLE 50

| Compound | A | $R^b$, $R^d$ |
|---|---|---|
| 5393 | A-20 | R-13 |
| 5394 | A-20 | R-14 |
| 5395 | A-20 | R-15 |
| 5396 | A-20 | R-18 |
| 5397 | A-20 | R-19 |
| 5398 | A-20 | R-20 |
| 5399 | A-20 | R-21 |
| 5400 | A-20 | R-22 |
| 5401 | A-20 | R-23 |
| 5402 | A-20 | R-26 |
| 5403 | A-20 | R-27 |
| 5404 | A-20 | R-31 |
| 5405 | A-20 | R-37 |
| 5406 | A-20 | R-38 |
| 5407 | A-20 | R-43 |
| 5408 | A-20 | R-44 |
| 5409 | A-20 | R-45 |
| 5410 | A-20 | R-47 |
| 5411 | A-20 | R-51 |
| 5412 | A-20 | R-55 |
| 5413 | A-20 | R-56 |
| 5414 | A-20 | R-57 |
| 5415 | A-20 | R-60 |
| 5416 | A-20 | R-61 |
| 5417 | A-20 | R-62 |
| 5418 | A-20 | R-63 |
| 5419 | A-20 | R-64 |
| 5420 | A-20 | R-65 |
| 5421 | A-20 | R-66 |
| 5422 | A-20 | R-67 |
| 5423 | A-20 | R-68 |

TABLE 50-continued

| Compound | A | $R^b$, $R^d$ |
|---|---|---|
| 5424 | A-20 | R-69 |
| 5425 | A-20 | R-70 |
| 5426 | A-20 | R-71 |
| 5427 | A-20 | R-72 |
| 5428 | A-20 | R-73 |
| 5429 | A-20 | R-74 |
| 5430 | A-20 | R-76 |
| 5431 | A-20 | R-77 |
| 5432 | A-20 | R-78 |
| 5433 | A-20 | R-79 |
| 5434 | A-34 | R-1 |
| 5435 | A-34 | R-2 |
| 5436 | A-34 | R-3 |
| 5437 | A-34 | R-4 |
| 5438 | A-34 | R-5 |
| 5439 | A-34 | R-7 |
| 5440 | A-34 | R-8 |
| 5441 | A-34 | R-11 |
| 5442 | A-34 | R-13 |
| 5443 | A-34 | R-14 |
| 5444 | A-34 | R-15 |
| 5445 | A-34 | R-18 |
| 5446 | A-34 | R-19 |
| 5447 | A-34 | R-20 |
| 5448 | A-34 | R-21 |
| 5449 | A-34 | R-22 |
| 5450 | A-34 | R-23 |
| 5451 | A-34 | R-26 |
| 5452 | A-34 | R-27 |
| 5453 | A-34 | R-31 |
| 5454 | A-34 | R-37 |
| 5455 | A-34 | R-38 |
| 5456 | A-34 | R-43 |
| 5457 | A-34 | R-44 |
| 5458 | A-34 | R-45 |
| 5459 | A-34 | R-47 |
| 5460 | A-34 | R-51 |
| 5461 | A-34 | R-55 |
| 5462 | A-34 | R-56 |
| 5463 | A-34 | R-57 |
| 5464 | A-34 | R-60 |
| 5465 | A-34 | R-61 |
| 5466 | A-34 | R-62 |
| 5467 | A-34 | R-63 |
| 5468 | A-34 | R-64 |
| 5469 | A-34 | R-65 |
| 5470 | A-34 | R-66 |
| 5471 | A-34 | R-67 |
| 5472 | A-34 | R-68 |
| 5473 | A-34 | R-69 |
| 5474 | A-34 | R-70 |
| 5475 | A-34 | R-71 |
| 5476 | A-34 | R-72 |
| 5477 | A-34 | R-73 |
| 5478 | A-34 | R-74 |
| 5479 | A-34 | R-76 |
| 5480 | A-34 | R-77 |
| 5481 | A-34 | R-78 |
| 5482 | A-34 | R-79 |
| 5483 | A-39 | R-1 |
| 5484 | A-39 | R-2 |
| 5485 | A-39 | R-3 |
| 5486 | A-39 | R-4 |
| 5487 | A-39 | R-5 |
| 5488 | A-39 | R-7 |
| 5489 | A-39 | R-8 |
| 5490 | A-39 | R-11 |
| 5491 | A-39 | R-13 |
| 5492 | A-39 | R-14 |
| 5493 | A-39 | R-15 |
| 5494 | A-39 | R-18 |
| 5495 | A-39 | R-19 |
| 5496 | A-39 | R-20 |
| 5497 | A-39 | R-21 |
| 5498 | A-39 | R-22 |
| 5499 | A-39 | R-23 |
| 5500 | A-39 | R-26 |
| 5501 | A-39 | R-27 |

TABLE 50-continued

| Compound | A | $R^b, R^d$ |
| --- | --- | --- |
| 5502 | A-39 | R-31 |
| 5503 | A-39 | R-37 |
| 5504 | A-39 | R-38 |
| 5505 | A-39 | R-43 |
| 5506 | A-39 | R-44 |
| 5507 | A-39 | R-45 |
| 5508 | A-39 | R-47 |
| 5509 | A-39 | R-51 |

TABLE 51

| Compound | A | $R^b, R^d$ |
| --- | --- | --- |
| 5510 | A-39 | R-55 |
| 5511 | A-39 | R-56 |
| 5512 | A-39 | R-57 |
| 5513 | A-39 | R-60 |
| 5514 | A-39 | R-61 |
| 5515 | A-39 | R-62 |
| 5516 | A-39 | R-63 |
| 5517 | A-39 | R-64 |
| 5518 | A-39 | R-65 |
| 5519 | A-39 | R-66 |
| 5520 | A-39 | R-67 |
| 5521 | A-39 | R-68 |
| 5522 | A-39 | R-69 |
| 5523 | A-39 | R-70 |
| 5524 | A-39 | R-71 |
| 5525 | A-39 | R-72 |
| 5526 | A-39 | R-73 |
| 5527 | A-39 | R-74 |
| 5528 | A-39 | R-76 |
| 5529 | A-39 | R-77 |
| 5530 | A-39 | R-78 |
| 5531 | A-39 | R-79 |
| 5532 | A-41 | R-1 |
| 5533 | A-41 | R-2 |
| 5534 | A-41 | R-3 |
| 5535 | A-41 | R-4 |
| 5536 | A-41 | R-5 |
| 5537 | A-41 | R-7 |
| 5538 | A-41 | R-8 |
| 5539 | A-41 | R-11 |
| 5540 | A-41 | R-13 |
| 5541 | A-41 | R-14 |
| 5542 | A-41 | R-15 |
| 5543 | A-41 | R-18 |
| 5544 | A-41 | R-19 |
| 5545 | A-41 | R-20 |
| 5546 | A-41 | R-21 |
| 5547 | A-41 | R-22 |
| 5548 | A-41 | R-23 |
| 5549 | A-41 | R-26 |
| 5550 | A-41 | R-27 |
| 5551 | A-41 | R-31 |
| 5552 | A-41 | R-37 |
| 5553 | A-41 | R-38 |
| 5554 | A-41 | R-43 |
| 5555 | A-41 | R-44 |
| 5556 | A-41 | R-45 |
| 5557 | A-41 | R-47 |
| 5558 | A-41 | R-51 |
| 5559 | A-41 | R-55 |
| 5560 | A-41 | R-56 |
| 5561 | A-41 | R-57 |
| 5562 | A-41 | R-60 |
| 5563 | A-41 | R-61 |
| 5564 | A-41 | R-62 |
| 5565 | A-41 | R-63 |
| 5566 | A-41 | R-64 |
| 5567 | A-41 | R-65 |
| 5568 | A-41 | R-66 |
| 5569 | A-41 | R-67 |
| 5570 | A-41 | R-68 |
| 5571 | A-41 | R-69 |

TABLE 51-continued

| Compound | A | $R^b, R^d$ |
| --- | --- | --- |
| 5572 | A-41 | R-70 |
| 5573 | A-41 | R-71 |
| 5574 | A-41 | R-72 |
| 5575 | A-41 | R-73 |
| 5576 | A-41 | R-74 |
| 5577 | A-41 | R-76 |
| 5578 | A-41 | R-77 |
| 5579 | A-41 | R-78 |
| 5580 | A-41 | R-79 |
| 5581 | A-42 | R-1 |
| 5582 | A-42 | R-2 |
| 5583 | A-42 | R-3 |
| 5584 | A-42 | R-4 |
| 5585 | A-42 | R-5 |
| 5586 | A-42 | R-7 |
| 5587 | A-42 | R-8 |
| 5588 | A-42 | R-11 |
| 5589 | A-42 | R-13 |
| 5590 | A-42 | R-14 |
| 5591 | A-42 | R-15 |
| 5592 | A-42 | R-18 |
| 5593 | A-42 | R-19 |
| 5594 | A-42 | R-20 |
| 5595 | A-42 | R-21 |
| 5596 | A-42 | R-22 |
| 5597 | A-42 | R-23 |
| 5598 | A-42 | R-26 |
| 5599 | A-42 | R-27 |
| 5600 | A-42 | R-31 |
| 5601 | A-42 | R-37 |
| 5602 | A-42 | R-38 |
| 5603 | A-42 | R-43 |
| 5604 | A-42 | R-44 |
| 5605 | A-42 | R-45 |
| 5606 | A-42 | R-47 |
| 5607 | A-42 | R-51 |
| 5608 | A-42 | R-55 |
| 5609 | A-42 | R-56 |
| 5610 | A-42 | R-57 |
| 5611 | A-42 | R-60 |
| 5612 | A-42 | R-61 |
| 5613 | A-42 | R-62 |
| 5614 | A-42 | R-63 |
| 5615 | A-42 | R-64 |
| 5616 | A-42 | R-65 |
| 5617 | A-42 | R-66 |
| 5618 | A-42 | R-67 |
| 5619 | A-42 | R-68 |
| 5620 | A-42 | R-69 |
| 5621 | A-42 | R-70 |
| 5622 | A-42 | R-71 |
| 5623 | A-42 | R-72 |
| 5624 | A-42 | R-73 |
| 5625 | A-42 | R-74 |
| 5626 | A-42 | R-76 |

TABLE 52

| Compound | A | $R^b, R^d$ |
| --- | --- | --- |
| 5627 | A-42 | R-77 |
| 5628 | A-42 | R-78 |
| 5629 | A-42 | R-79 |
| 5630 | A-45 | R-1 |
| 5631 | A-45 | R-2 |
| 5632 | A-45 | R-3 |
| 5633 | A-45 | R-4 |
| 5634 | A-45 | R-5 |
| 5635 | A-45 | R-7 |
| 5636 | A-45 | R-8 |
| 5637 | A-45 | R-11 |
| 5638 | A-45 | R-13 |
| 5639 | A-45 | R-14 |
| 5640 | A-45 | R-15 |
| 5641 | A-45 | R-18 |

TABLE 52-continued

| Compound | A | $R^b$, $R^d$ |
|---|---|---|
| 5642 | A-45 | R-19 |
| 5643 | A-45 | R-20 |
| 5644 | A-45 | R-21 |
| 5645 | A-45 | R-22 |
| 5646 | A-45 | R-23 |
| 5647 | A-45 | R-26 |
| 5648 | A-45 | R-27 |
| 5649 | A-45 | R-31 |
| 5650 | A-45 | R-37 |
| 5651 | A-45 | R-38 |
| 5652 | A-45 | R-43 |
| 5653 | A-45 | R-44 |
| 5654 | A-45 | R-45 |
| 5655 | A-45 | R-47 |
| 5656 | A-45 | R-51 |
| 5657 | A-45 | R-55 |
| 5658 | A-45 | R-56 |
| 5659 | A-45 | R-57 |
| 5660 | A-45 | R-60 |
| 5661 | A-45 | R-61 |
| 5662 | A-45 | R-62 |
| 5663 | A-45 | R-63 |
| 5664 | A-45 | R-64 |
| 5665 | A-45 | R-65 |
| 5666 | A-45 | R-66 |
| 5667 | A-45 | R-67 |
| 5668 | A-45 | R-68 |
| 5669 | A-45 | R-69 |
| 5670 | A-45 | R-70 |
| 5671 | A-45 | R-71 |
| 5672 | A-45 | R-72 |
| 5673 | A-45 | R-73 |
| 5674 | A-45 | R-74 |
| 5675 | A-45 | R-76 |
| 5676 | A-45 | R-77 |
| 5677 | A-45 | R-78 |
| 5678 | A-45 | R-79 |
| 5679 | A-48 | R-1 |
| 5680 | A-48 | R-2 |
| 5681 | A-48 | R-3 |
| 5682 | A-48 | R-4 |
| 5683 | A-48 | R-5 |
| 5684 | A-48 | R-7 |
| 5685 | A-48 | R-8 |
| 5686 | A-48 | R-11 |
| 5687 | A-48 | R-13 |
| 5688 | A-48 | R-14 |
| 5689 | A-48 | R-15 |
| 5690 | A-48 | R-18 |
| 5691 | A-48 | R-19 |
| 5692 | A-48 | R-20 |
| 5693 | A-48 | R-21 |
| 5694 | A-48 | R-22 |
| 5695 | A-48 | R-23 |
| 5696 | A-48 | R-26 |
| 5697 | A-48 | R-27 |
| 5698 | A-48 | R-31 |
| 5699 | A-48 | R-37 |
| 5700 | A-48 | R-38 |
| 5701 | A-48 | R-43 |
| 5702 | A-48 | R-44 |
| 5703 | A-48 | R-45 |
| 5704 | A-48 | R-47 |
| 5705 | A-48 | R-51 |
| 5706 | A-48 | R-55 |
| 5707 | A-48 | R-56 |
| 5708 | A-48 | R-57 |
| 5709 | A-48 | R-60 |
| 5710 | A-48 | R-61 |
| 5711 | A-48 | R-62 |
| 5712 | A-48 | R-63 |
| 5713 | A-48 | R-64 |
| 5714 | A-48 | R-65 |
| 5715 | A-48 | R-66 |
| 5716 | A-48 | R-67 |
| 5717 | A-48 | R-68 |
| 5718 | A-48 | R-69 |
| 5719 | A-48 | R-70 |
| 5720 | A-48 | R-71 |
| 5721 | A-48 | R-72 |
| 5722 | A-48 | R-73 |
| 5723 | A-48 | R-74 |
| 5724 | A-48 | R-76 |
| 5725 | A-48 | R-77 |
| 5726 | A-48 | R-78 |
| 5727 | A-48 | R-79 |

[Absorption Maximum]

An absorption maximum of a dry material of the ink jet recording ink according to the present disclosure is 700 nm to 1000 nm.

From the viewpoint of the invisibility of the obtained printed material, the absorption maximum is more preferably 710 nm to 1000 nm, still more preferably 760 nm to 1000 nm, and even still more preferably 800 nm to 1000 nm.

By adjusting the absorption maximum to be 700 nm to 1000 nm, the invisibility of the obtained infrared absorbing image and the readability of a detector using infrared light are further improved.

In the present disclosure, the dry material of the ink jet recording ink is obtained by applying the ink jet recording ink to OK Top Coat Paper (manufactured by Oji Paper Co., Ltd.) at 0.20 g/m² and naturally drying the ink jet recording ink at 25° C. and a relative humidity of 55% for 24 hours.

The absorption maximum of the dry material is obtained by measuring a reflection spectrum using a spectrophotometer UV-3100PC (manufactured by Shimadzu Corporation) including a 150 mm ϕ large integrating sphere attachment LISR-3100 (manufactured by Shimadzu Corporation).

From the viewpoints of the invisibility and readability of the obtained infrared absorbing image, it is preferable that a maximum absorption wavelength of the dry material of the ink jet recording ink according to the present disclosure in a range of 400 nm to 1000 nm is in a range of 700 nm to 1000 nm.

By measuring an optical density in a range of 400 nm to 1000 nm using the same method of measuring the absorption maximum of the dry material, a value of the maximum absorption wavelength can be measured. The optical density is measured using a spectrophotometer UV-3100PC (manufactured by Shimadzu Corporation) including a 150 mm ϕ large integrating sphere attachment LISR-3100 (manufactured by Shimadzu Corporation).

[J-Aggregate]

From the viewpoint of the invisibility of the obtained infrared absorbing image, it is preferable that in the dry material of the ink jet recording ink according to the present disclosure, at least a part of the colorant represented by any one of Formulae 1 to 3 is a J-aggregate.

The colorant as a J-aggregate forms a so-called a J-band, and thus shows a sharp absorption spectrum peak. The details of the aggregate and J-band of the colorant can be found in a document (for example, Photographic Science and Engineering Vol. 18, No. 323-335 (1974)).

An absorption maximum of the colorant in a J-aggregate state shifts to a longer wavelength side than an absorption maximum of the colorant in a solution state. Accordingly, whether the colorant is in a J-aggregate state or a non-aggregate state can be determined by measuring the absorption maximum in 400 nm to 1000 nm.

In the present disclosure, in a case where a difference between the absorption maximum of the dry material in a range of 700 nm to 1000 nm and an absorption maximum of a solution in which the colorant included in the ink jet recording ink is dissolved in N,N-dimethylformamide (DMF) is 30 nm or more, it is determined that the colorant represented by any one of Formulae 1 to 3 in the dry material is a J-aggregate. From the viewpoint of improving the invisibility of the obtained infrared absorbing image, the difference is preferably 50 nm or more, more preferably 70 nm or more, and still more preferably 100 nm or more.

In addition, the colorant represented by any one of Formulae 1 to 3 may form a J-aggregate in the ink, or may form a J-aggregate in an infrared absorbing image without forming a J-aggregate in the ink while liquid droplets of the colorant are moving to a substrate or after the liquid droplets arrive at the substrate. Further, all the colorants on the substrate do not necessarily form a J-aggregate, and a colorant in a J-aggregate state and a colorant in a molecular dispersion state may be mixed.

It is preferable that the colorant represented by any one of Formulae 1 to 3 forms an aggregate by being simply dissolved in water. In order to promote the formation of an aggregate in the ink or in the infrared absorbing image, an amphoteric compound (gelatin, low molecular weight collagen, oligopeptide, amino acid, or JURYMER ET-410 (manufactured by Toagosei Co., Ltd.)), a salt (for example, an alkali earth metal salt such as barium chloride, strontium chloride, calcium chloride, or magnesium chloride, an alkali metal salt such as potassium chloride or sodium chloride, a group 13 metal salt such as aluminum chloride, an organic salt such as ammonium acetate, an organic intramolecular salt such as betaine, or a salt including an organic polycation or polyanion), an inorganic acid such as hydrochloric acid or sulfuric acid, an organic acid such as acetic acid or p-toluenesulfonic acid, an inorganic base such as potassium carbonate or sodium hydroxide, or an organic base such as trialkylamine or pyridine may be added to the ink.

The content of the amphoteric compound such as gelatin is preferably 10 ppm to 50000 ppm (5 mass %) and more preferably 30 ppm to 20000 ppm (2 mass %) with respect to the total mass of the ink jet recording ink composition.

The content of the salt is preferably 10 ppm to 50000 ppm (5 mass %) and more preferably 30 ppm to 20000 ppm (2 mass %) with respect to the total mass of the ink jet recording ink composition.

The content of the acid and the base is preferably 10 ppm to 50000 ppm (5 mass %) and more preferably 30 ppm to 20000 ppm (2 mass %) with respect to the total mass of the ink jet recording ink composition.

[Divalent Alkali Metal Element and Trivalent Group 13 Metal Element]

In the ink jet recording ink according to the embodiment, it is preferable that the content of at least one of a divalent alkali earth metal element or a trivalent group 13 metal element is 10 ppm to 50000 ppm with respect to the total mass of the ink.

Examples of the divalent alkali earth metal include magnesium, calcium, strontium, barium, and radium.

Examples of the trivalent group 13 metal element include aluminum, gallium, indium, and thallium.

It is preferable that the divalent alkali earth metal element or the trivalent group 13 metal element is an element derived from the alkali earth metal salt or the group 13 metal salt.

From the viewpoint of the storage stability and jettability of the ink, the content of the divalent alkali metal element and the trivalent group 13 metal element is preferably 10 ppm to 50000 ppm (5 mass %), more preferably 10 ppm to 10000 ppm (1 mass %), still more preferably 10 ppm to 1000 ppm (0.1 mass %), and even still more preferably 10 ppm to 100 ppm (0.01 mass %) with respect to the total mass of the ink.

In addition, the content of the divalent alkali metal element or the trivalent group 13 metal element is, as a molar ratio thereof to the colorant, preferably 0.01 equivalents to 1 equivalent, more preferably 0.1 equivalents to 0.8 equivalents, and still more preferably 0.15 equivalents to 0.6 equivalents.

The molar ratio of the content of the divalent alkali metal element or the trivalent group 13 metal element to the colorant being 0.01 equivalents represents that the molar amount of the divalent alkali metal element or the trivalent group 13 metal element/the molar amount of the colorant is 0.01.

As the divalent alkali metal element or the trivalent group 13 metal element, one kind may be included, or two or more kinds may be included.

In a case where two or more divalent alkali metal elements or two or more trivalent group 13 metal elements are included, the content refers to the total content of the two or more divalent alkali metal elements or the two or more trivalent group 13 metal elements.

The content is determined by analyzing a solution in which the ink is diluted with N-methylpyrrolidone and the colorant dispersion is completely dissolved using a plasma optical emission spectrometer (OPTIMA 7300DV, manufactured by PerkinElmer Co., Ltd.).

It is presumed that, in a case where the content of the divalent alkali metal element and the trivalent group 13 metal element is in the above-described range, a plurality of colorants in which a divalent or trivalent metal ion is negatively charged are bonded to each other and are partially crosslinked to each other to form a structure such that the storage stability of the ink is further improved.

In addition, it is presumed that, in a case where the content of the divalent alkali metal element and the trivalent group 13 metal element is in the above-described range, the amount of the crosslinked structure formed is appropriate and excessive aggregation of the colorants is suppressed such that the jettability of the ink is maintained.

[Optical Density]

In the ink jet recording ink according to the present disclosure, from the viewpoint of the invisibility of the obtained infrared absorbing image, it is preferable that an optical density (OD) of the dry material at 450 nm is ⅐ or lower of an optical density of the dry material at an absorption maximum.

It is more preferable the optical density is ⅛ or lower of the optical density at the absorption maximum, and it is still more preferable the optical density is ⅑ or lower of the optical density at the absorption maximum.

By adjusting the optical density (OD) at 450 nm to be ⅐ or lower of the optical density at the absorption maximum, the invisibility of the obtained infrared absorbing image is further improved.

The values of the optical density (OD) at 450 nm and the optical density at the absorption maximum are measured by measuring the optical density of the dry material at 450 nm and the optical density of the dry material at the absorption maximum using the same method as in the determination on whether or not the colorant is in a J-aggregate state or a non-aggregate state. The optical density is measured using a spectrophotometer UV-3100PC (manufactured by Shimadzu Corporation) including a 150 mm φ large integrating sphere attachment LISR-3100 (manufactured by Shimadzu Corporation).

In addition, from the viewpoint of readability, the optical density at the absorption maximum is preferably 0.1 or higher, more preferably 0.3 or higher, and still more preferably 0.5 or higher.

Further, from the viewpoint of invisibility, it is preferable that a maximum value of an optical density of the dry material of the ink jet recording ink according to the present disclosure at 400 nm to 700 nm is 0.5 or lower. The method of measuring the optical density of the dry material is the same as the method of measuring the absorption maximum of the dry material, and the optical density is measured using a spectrophotometer UV-3100PC (manufactured by Shimadzu Corporation) including a 150 mm φ large integrating sphere attachment LISR-3100 (manufactured by Shimadzu Corporation).

<Solvent>

It is preferable that the ink jet recording ink according to the present disclosure includes a solvent.

The solvent is not particularly limited, and various well-known solvents in the field of an ink jet recording ink can be used. It is preferable that the ink jet recording ink includes water.

The content of water is preferably 50 mass % or higher, more preferably 60 mass % or higher, and still more preferably 70 mass % or higher with respect to the total mass of the ink jet recording ink composition.

The upper limit of the content of water is not particularly limited may be determined depending on the contents of other components, and is preferably 99 mass % or lower, more preferably 98 mass % or lower, and still more preferably 95 mass % or lower.

From the viewpoint of improving the jettability of the ink, it is preferable that the ink jet recording ink according to the present disclosure includes water and an organic solvent having a boiling point of 100° C. or higher under 101.325 kPa (hereinafter, also simply referred to as "boiling point") as the solvent. "Under 101.325 kPa" has the same definition as "under 1 atm".

Examples of the organic solvent having a boiling point of 100° C. or higher include ethylene glycol, diethylene glycol, triethylene glycol, tetraethylene glycol, polyethylene glycol, propylene glycol, dipropylene glycol, tripropylene glycol, glycerin, 2-pyrrolidone, butanediol, and hexanediol.

The content of the organic solvent having a boiling point of 100° C. or higher is preferably 1 to 40 mass % and more preferably 2 to 30 mass % with respect to the total mass of the ink jet recording ink composition.

<Surfactant>

The ink may include a surfactant.

As the surfactant, a compound having a structure that includes both a hydrophilic portion and a hydrophobic portion in a molecule can be effectively used, and any one of an anionic surfactant, a cationic surfactant, an amphoteric surfactant, a nonionic surfactant, or a betaine surfactant can also be used.

From the viewpoint of suppressing jetting interference of the ink, as the surfactant, a nonionic surfactant is preferable, and an acetylenic glycol derivative (an acetylenic glycol surfactant) is more preferable.

Examples of the acetylenic glycol surfactant include 2,4,7,9-tetramethyl-5-decyne-4,7-diol and alkylene oxide adduct of 2,4,7,9-tetramethyl-5-decyne-4,7-diol. At least one selected from the examples is preferable.

Examples of a commercially available product of the acetylenic glycol surfactant include SURFYNOL series such as SURFYNOL 104PG manufactured by Nissin Chemical Co., Ltd. and E series such as OLFINE E1010 manufactured by Nissin Chemical Co., Ltd.

As a surfactant other than the acetylenic glycol surfactant, a fluorine surfactant is preferable. Examples of the fluorine surfactant include an anionic surfactant, a nonionic surfactant, and a betaine surfactant. Among these, an anionic surfactant is more preferable. Examples of the anionic surfactant include: Capstone FS-63 and Capstone FS-61 (manufactured by Dupont); FTERGENT 100, FTERGENT 110, and FTERGENT 150 (manufactured by Neos Co., Ltd.); and CHEMGUARD S-760P (manufactured by Chemguard Inc.).

In a case where the ink includes the surfactant, the content of the surfactant (in a case where two or more surfactants are included, the total content) is not particularly limited and is preferably 0.1 mass % or higher, more preferably 0.1 mass % to 10 mass %, and still more preferably 0.2 mass % to 3 mass % with respect to the total mass of the ink jet recording ink composition.

<Other Components>

Examples of the other components of the ink include additives such as an antifading agent, an emulsion stabilizer, a penetration enhancer, a ultraviolet absorber, a preservative, a fungicide, a pH adjuster, a surface tension adjuster, an antifoaming agent, a viscosity adjuster, a dispersant, a dispersion stabilizer, a rust inhibitor, or a chelating agent. Regarding the respective components, compounds described in paragraphs "0044" to "0050" of JP2008-144004A can be used.

<Other Colorants>

The ink may include colorants other than the colorant represented by any one of Formulae 1 to 3. The other colorants are not particularly limited, and well-known colorants in the field of an ink jet recording ink can be used.

From the viewpoint of the invisibility of the obtained infrared absorbing image, the content of the other colorants is preferably 0.1 mass % or lower and more preferably 0.05 mass % or lower with respect to the total mass of the ink jet recording ink composition.

<Preferable Physical Properties of Ink>

A viscosity of the ink is preferably 0.5 mPa·s to 10 mPa·s and more preferably 1 mPa·s to 7 mPa·s.

The viscosity is measured under a condition of 30° C. using VISCOMETER TV-22 (manufactured by Toki Sangyo Co., Ltd.).

In addition, a surface tension of the ink at 25° C. (±1° C.) is preferably 60 mN/m or lower, more preferably 20 mN/m to 50 mN/m, and still more preferably 25 mN/m to 45 mN/m. In a case where the surface tension of the ink is in the above-described range, the occurrence of curling in the substrate is suppressed, which is advantageous. The surface tension is measured with a plate method using an Automatic Surface Tensiometer CBVP-Z (manufactured by Kyowa Interface Science Co., Ltd.).

<Method of Manufacturing Ink>

A method of manufacturing the ink jet recording ink according to the present disclosure is not particularly limited, and the ink jet recording ink can be manufactured (prepared) using a well-known method of manufacturing (preparing) an ink.

For example, the ink jet recording ink can be manufactured using a method of manufacturing an ink described in JP1993-148436A (JP-H5-148436A), JP1993-295312A (JP-H5-295312A), JP1995-097541A (JP-H7-097541A), JP1995-082515A (JP-H7-082515A), JP1995-118584A (JP-H7-118584A), JP1999-286637A (JP-H11-286637A), or JP1999-286637A (JP-H11-286637A).

In addition, as the method of manufacturing the ink jet recording ink according to the present disclosure, the following first aspect or second aspect is preferable.

First aspect: A method of manufacturing the ink jet recording ink includes: a step of dispersing the colorant represented by any one of Formulae 1 to 3 and at least one of a divalent alkali earth metal salt or a trivalent group 13 metal salt in water to prepare an aqueous dispersion such that a total content of a divalent alkali earth metal element and a trivalent group 13 metal element is 10 ppm to 50000 ppm with respect to the total mass of the ink (also referred to as "first preparation step"); and a step of mixing the aqueous dispersion and other components of the ink with each other (also referred to as "first mixing step").

Second aspect: A method of manufacturing the ink jet recording ink includes: a step of dispersing the colorant represented by any one of Formulae 1 to 3 in water to prepare an aqueous dispersion (also referred to as "second preparation step"); and a step of mixing the aqueous dispersion, at least one of a divalent alkali earth metal salt or a trivalent group 13 metal salt, and other components of the ink with each other such that a total content of a divalent alkali earth metal element and a trivalent group 13 metal element is 10 ppm to 50000 ppm with respect to the total mass of the ink (also referred to as "second mixing step").

According to the first aspect or second aspect, an ink jet recording ink having excellent storage stability can be obtained.

Hereinafter, the first aspect and the second aspect will be described in detail.

(First Aspect)

[First Preparation Step]

The first preparation step is a step of dispersing the colorant represented by any one of Formulae 1 to 3 and at least one of a divalent alkali earth metal salt or a trivalent group 13 metal salt in water to prepare an aqueous dispersion (colorant dispersion) such that a total content of a divalent alkali earth metal element and a trivalent group 13 metal element is 10 ppm to 50000 ppm with respect to the total mass of the ink.

The content of the colorant represented by any one of Formulae 1 to 3 in the aqueous dispersion is preferably 0.1 to 70 mass % and more preferably 1.0 to 30 mass % with respect to the total mass of the aqueous dispersion.

The content of the divalent alkali earth metal salt and the trivalent group 13 metal salt in the aqueous dispersion is preferably 20 to 100000 ppm with respect to the total mass of the aqueous dispersion.

In addition, during the preparation of the aqueous dispersion, a surfactant may be further added in order to improve dispersibility.

Examples of the surfactant include the surfactants included in the above-described ink.

The content of the surfactant in the aqueous dispersion is preferably 0.1 to 5 mass % with respect to the total mass of the aqueous dispersion.

As a dispersion method, various well-known dispersion methods can be used without any particular limitation. Examples of the dispersion method include a dispersion method using a paint shaker.

[First Mixing Step]

The first mixing step is a step of mixing the aqueous dispersion and other components of the ink with each other.

In the first mixing step, the ink jet recording ink according to the present disclosure can be obtained.

After the first mixing step, a solution obtained after mixing may be filtered through a filter to obtain the ink jet recording ink according to the present disclosure.

Examples of the other components of the ink include the components included in the ink such as other colorants, the solvent such as water, the surfactant, or other components.

In the first mixing step, the content of the aqueous dispersion is preferably 10 to 90 mass % with respect to the total mass of the ink.

As a mixing method, well-known mixing methods can be used without any particular limitation. Examples of the mixing method include a method of stirring the respective components in a container.

(Second Aspect)

[Second Preparation Step]

The second preparation step is a step of dispersing the colorant represented by any one of Formulae 1 to 3 in water to prepare an aqueous dispersion.

A preferable aspect of the second preparation step is the same as the first preparation step except that the divalent alkali earth metal salt and the trivalent group 13 metal salt are not added.

[Second Mixing Step]

The second mixing step is a step of mixing the aqueous dispersion, at least one of a divalent alkali earth metal salt or a trivalent group 13 metal salt, and other components of the ink such that a total content of a divalent alkali earth metal element and a trivalent group 13 metal element is 10 ppm to 50000 ppm with respect to the total mass of the ink.

A preferable aspect of the second preparation step is the same as the first preparation step except that the divalent alkali earth metal salt and the trivalent group 13 metal salt are further added for mixing.

(Ink Jet Recording Method)

The ink jet recording method according to the present disclosure includes a step of forming an infrared absorbing image using the ink jet recording ink according to the present disclosure.

<Step of Forming Infrared Absorbing Image>

The step of forming an infrared absorbing image is a step of applying the ink jet recording ink according to the present disclosure to a substrate using an ink jet method.

According to this step, the ink can be selectively applied to the substrate, and a desired infrared absorbing image can be formed.

The substrate on which the infrared absorbing image is to be formed is not particularly limited as long as an infrared absorbing pattern can be formed. Examples of the substrate include paper, cloth, wood, a metal plate, and a plastic film.

As the paper, for example, plain paper, recycled paper, coated paper, or ink jet recording paper can be used without any particular limitation.

A visible image may be formed on the substrate using an ink jet method or other well-known methods.

The infrared absorbing image which is formed in this step is not particularly limited, and an infrared absorbing image formed of a plurality of component patterns (for example, dot patterns or line patterns), in other words, an infrared absorbing image that is a set of a plurality of component patterns is preferable.

The diameter of the dot pattern is preferably 25 μm to 70 μm and more preferably 30 μm to 60 μm.

The ink jet method is not particularly limited and may be any one of well-known methods such as an electric charge control method of jetting ink using an electrostatic attraction force, a drop-on-demand method (pressure pulse method) using a vibration pressure of a piezoelectric element, an acoustic ink jet method of jetting ink using a radiation pressure by converting an electrical signal into an acoustic beam and irradiating the ink with the acoustic beam, or a thermal ink jet method (Bubble Jet (registered trade name)) of heating ink to form bubbles and using a pressure generated from the bubbles.

As the ink jet method, in particular, an ink jet method described in JP1988-059936A (JP-S54-059936A) can be preferably used, in which a rapid volume change occurs in the ink due to the action of thermal energy, and the ink is jetted from a nozzle due to a force generated by the stage change.

In addition, the ink jet method can also refer to a method described in paragraphs "0093" to 0105" of JP2003-306623A.

Examples of an ink jet head used in the ink jet method include: a shuttle type that performs recording using a short serial head while causing the head to scan a substrate in a width direction; and a line type that uses a line head in which recording elements are arranged corresponding to the entire region of one side of a substrate.

In the line type, pattern formation can be performed on the entire surface of a substrate by scanning the substrate in a direction perpendicular to a direction in which the recording elements are arranged, and a transport system such as a carriage that scans a short head is unnecessary.

In addition, the movement of the carriage and complex scanning control on the substrate are not necessary, and only the substrate moves. Therefore, an increase in the recording speed can be realized as compared to the shuttle type.

The ink jet recording method according to the embodiment is applicable to the shuttle type or the line type but is preferably applicable to the line type.

From the viewpoint of obtaining a high-accuracy pattern, the amount of liquid droplets of the ink ejected from the ink jet head is preferably 1 pL (picoliters; hereinafter, the same shall be applied) to 10 pL and more preferably 1.5 pL to 6 pL.

In the infrared absorbing image formed in this step, the amount of the colorant represented by any one of Formulae 1 to 3 applied per unit area is preferably 0.05 g/m$^2$ to 1.0 g/m$^2$ and more preferably 0.1 g/m$^2$ to 0.5 g/m$^2$.

(Printed Material)

A first aspect of a printed material according to the present disclosure includes: a substrate; and an infrared absorbing image that is a dry material of the ink jet recording ink according to the present disclosure.

In this aspect, "drying" refers to volatilizing and removing at least a part of water or the organic solvent in the ink jet recording ink, and a material obtained by drying the ink jet recording ink refers to "dry material".

A second aspect of the printed material according to the present disclosure includes: a substrate; and an infrared absorbing image, in which the infrared absorbing image includes the colorant represented by Formula 1.

In any one of the aspects, it is preferable that the printed material according to the present disclosure is a printed material that is obtained using the ink jet recording method.

<First Aspect of Printed Material>

[Substrate]

The substrate in the first aspect of the printed material according to the present disclosure is the same as the substrate in the ink jet recording method according to the present disclosure, and a preferable aspect thereof is also the same.

[Infrared Absorbing Image]

The infrared absorbing image in the first aspect of the printed material according to the present disclosure is the dry material of the ink jet recording ink according to the present disclosure.

A method of obtaining the dry material using the ink jet recording ink according to the present disclosure is not particularly limited, and the dry material can be obtained using the ink jet recording method.

In addition, an absorption maximum of the infrared absorbing image in the first aspect of the printed material according to the present disclosure is preferably 700 nm to 1000 nm, more preferably 710 nm to 1000 nm, still more preferably 760 nm to 1000 nm, and even still more preferably 800 nm to 1000 nm.

The absorption maximum is measured using the same method as the method of measuring the absorption maximum of the dry material of the ink jet recording ink composition according to the present disclosure.

In addition, from the viewpoints of the invisibility and readability of the infrared absorbing image, it is preferable that a maximum absorption wavelength of the infrared absorbing image in the first aspect of the printed material according to the present disclosure in a range of 400 nm to 1000 nm is 700 nm to 1000 nm.

The maximum absorption wavelength is measured using the same method as the method of measuring the maximum absorption wavelength of the dry material of the ink jet recording ink composition according to the present disclosure.

From the viewpoint of the invisibility of the infrared absorbing image, it is preferable that an optical density (OD) of the infrared absorbing image in the first aspect of the printed material according to the present disclosure at 450 nm is 1/7 or lower of an optical density of the infrared absorbing image at an absorption maximum. It is more preferable the optical density is 1/8 or lower of the optical density at the absorption maximum, and it is still more preferable the optical density is 1/9 or lower of the optical density at the absorption maximum.

In addition, from the viewpoint of readability, the optical density of the infrared absorbing image at the absorption maximum is preferably 0.1 or higher, more preferably 0.3 or higher, and still more preferably 0.5 or higher.

The optical density is measured using the same method as the method of measuring the optical density of the dry material of the ink jet recording ink composition according to the present disclosure.

In the infrared absorbing image in the first aspect of the printed material according to the present disclosure, the content of the colorant represented by any one of Formulae 1 to 3 per unit area is preferably 0.05 g/m$^2$ to 1.0 g/m$^2$ and more preferably 0.1 g/m$^2$ to 0.5 g/m$^2$.

<Second Aspect of Printed Material>

[Substrate]

The substrate in the second aspect of the printed material according to the present disclosure is the same as the substrate in the ink jet recording method according to the present disclosure, and a preferable aspect thereof is also the same.

[Infrared Absorbing Image]

The colorant represented by Formula 1 included in the infrared absorbing image in the second aspect of the printed material according to the present disclosure has the same definition and the same preferable aspect as the colorant represented by Formula 1 in the ink jet recording ink according to the present disclosure.

In the infrared absorbing image in the printed material according to the present disclosure, it is preferable that the colorant represented by any one of Formulae 1 to 3 is a J-aggregate. Whether or not the colorant represented by any one of Formulae 1 to 3 is a J-aggregate can be determined using the same method as the method of determining whether the colorant in the dry material of the ink jet recording ink composition according to the present disclosure is in a J-aggregate state or a non-aggregate state.

In addition, in the infrared absorbing image in the second aspect of the printed material according to the present disclosure, the absorption maximum of the infrared absorbing image, the maximum absorption wavelength in a range of 400 nm to 1000 nm, the ratio of the optical density (OD) at 450 nm to the optical density at the absorption maximum, the optical density at the absorption maximum, and the content of the colorant represented by any one of Formulae 1 to 3 per unit area have the same definitions and the same preferable aspects as those of the first aspect of the printed material according to the present disclosure, respectively.

(Infrared Reading Method)

An infrared reading method according to the present disclosure includes a step of reading an infrared absorbing image that is a dry material of the ink jet recording ink according to the present disclosure or an infrared absorbing image that is included in the printed material according to the present disclosure.

<Step of Reading Infrared Absorbing Image>

A method of reading the infrared absorbing image is not particularly limited, and a well-known method can be used.

For example, a method of reading the infrared absorbing image by irradiating the infrared absorbing image with infrared light from an oblique direction and reading reflected light using an optical receiver provided in the vicinity of an infrared output portion to determine whether or not absorption of infrared light is present.

As a light source used for reading the infrared absorbing image, for example, a laser or a light emitting diode (LED) is used.

A wavelength used for reading the infrared absorbing image may be in a range of 700 nm to 1000 nm. For example, it is preferable that 850 nm that is a wavelength of a general LED is used.

EXAMPLES

Hereinafter, the present invention will be described in detail using Examples. Materials, used amounts, ratios, treatment details, treatment procedures, and the like shown in the following examples can be appropriately changed within a range not departing from the scope of the embodiment of the present invention. Accordingly, the scope of the embodiment of the present invention is not limited to the following specific examples. In Examples, unless specified otherwise, "part(s)" and "%" represent "part(s) by mass" and "mass %".

Hereinafter, Compounds 1 to 5727 according to Examples represent the same compounds as Compounds 1 to 5727 shown in the specific examples of the colorant represented by any one of Formulae 1 to 3.

Examples 1 to 8 and Comparative Examples 1 to 3

<Preparation of Ink 1>
[Preparation of Colorant Dispersion] The following composition was dispersed using a paint shaker for 2 hours to obtain a solid dispersion of Compound 1.
—Composition—
DEMOL SNB (manufactured Kao Corporation): 0.5 parts by mass
Compound 1: 2.0 parts by mass
Ultrapure water: 97.5 parts by mass
[Preparation of Ink] A mixture of the respective components having the following composition was stirred at 35° C. for 1 hour. Next, the mixture was filtered under reduced pressure using a microfilter having an average pore size of 5 μm to prepare the ink jet recording ink composition (ink 1) according to present disclosure.
—Composition—
Colorant dispersion described above: 50 parts by mass
Propylene glycol: 20 parts by mass
OLFINE E1010: 1 part by mass
Triethanolamine: 0.2 parts by mass
Ultrapure water (specific resistance value: 18 MΩ·cm or higher): an amount adjusted such that the total amount of the composition was 100 parts by mass
Here, OLFINE E1010 was an acetylenic glycol surfactant manufactured by Nissin Chemical Co., Ltd.

<Preparation of Inks 2 to 8>

Inks 2 to 7 or 8 were prepared under the same conditions as those of the preparation of Ink 1, except that Compounds 2 to 7 or 2497 were used instead of Compound 1, respectively.

<Preparation of Ink 9>
[Preparation of Colorant Dispersion] The following composition was dispersed using a paint shaker for 2 hours to obtain a solid dispersion of Compound 1.
—Composition—
DEMOL SNB (manufactured Kao Corporation): 0.5 parts by mass
Compound 1: 2.0 parts by mass
Anhydrous calcium chloride: 0.006 parts by mass in terms of calcium (0.0165 parts by mass in terms of anhydrous calcium chloride)
Ultrapure water: an amount adjusted such that the total amount of the composition was 100 parts by mass
[Preparation of Ink] A mixture of the respective components having the following composition was stirred at 35° C. for 1 hour. Next, the mixture was filtered under reduced pressure using a microfilter having an average pore size of 5 μm to prepare the ink jet recording ink composition (ink 9) according to present disclosure.
—Composition—
Colorant dispersion described above: 50 parts by mass
Propylene glycol: 20 parts by mass
OLFINE E1010: 1 part by mass
Triethanolamine: 0.2 parts by mass
Ultrapure water (specific resistance value: 18 MΩ·cm or higher): an amount adjusted such that the total amount of the composition was 100 parts by mass
Here, OLFINE E1010 was an acetylenic glycol surfactant manufactured by Nissin Chemical Co., Ltd.

The amount of calcium in Ink 9 obtained in the above preparation was 30 ppm.

<Preparation of Ink 10>

The following composition was dispersed using a paint shaker for 2 hours to obtain a solid dispersion of Compound 1.

133

—Composition—
DEMOL SNB (manufactured Kao Corporation): 0.5 parts by mass
Compound 1: 2.0 parts by mass
Ultrapure water: 97.5 parts by mass

[Preparation of Ink] A mixture of the respective components having the following composition was stirred at 35° C. for 1 hour. Next, the mixture was filtered under reduced pressure using a microfilter having an average pore size of 5 μm to prepare the ink jet recording ink composition (ink 10) according to present disclosure.

—Composition—
Colorant dispersion described above: 50 parts by mass
Propylene glycol: 20 parts by mass
OLFINE E1010: 1 part by mass
Triethanolamine: 0.2 parts by mass
Anhydrous calcium chloride: 0.003 parts by mass in terms of calcium (0.00825 parts by mass in terms of anhydrous calcium chloride)
Ultrapure water (specific resistance value: 18 MΩ·cm or higher): an amount adjusted such that the total amount of the composition was 100 parts by mass The amount of calcium in Ink 10 obtained in the above preparation was 30 ppm.

<Preparation of Ink 11>
Ink 11 was prepared under the same conditions as those of Ink 9, except that anhydrous magnesium chloride: 0.004 parts by mass in terms of magnesium (0.014 parts by mass in terms of anhydrous magnesium chloride) was used instead of anhydrous calcium chloride: 0.006 parts by mass in terms of calcium (0.0165 parts by mass in terms of anhydrous calcium chloride)

The amount of magnesium in Ink 11 obtained in the above preparation was 20 ppm.

<Preparation of Ink 12>
Ink 12 was prepared under the same conditions as those of Ink 9, except that strontium chloride hexahydrate: 0.013 parts by mass in terms of strontium (0.040 parts by mass in terms of strontium chloride hexahydrate) was used instead of anhydrous calcium chloride: 0.006 parts by mass in terms of calcium (0.0165 parts by mass in terms of anhydrous calcium chloride).

The amount of strontium in Ink 12 obtained in the above preparation was 65 ppm.

<Preparation of Comparative Ink 1>
Comparative Ink 1 was prepared using the same method as described in Example 1 of JP2008-144004A.

<Preparation of Comparative Ink 2>
Comparative Ink 2 was prepared using the same method as that of Ink I-1 described in Example of JP2002-294107A.

<Preparation of Comparative Ink 3>
Ink was prepared under the same conditions as in Example 1, except that the following solid dispersed dye 1 was used instead of Compound 1. The following solid dispersed dye 1 was synthesized using the same method as described in JP1999-282136A (JP-H11-282136A).

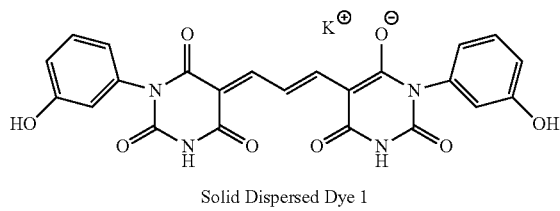 [SMILES: [K+] ; O=C1NC(=O)N(c2cccc(O)c2)C(=O)/C1=C/C=C/c1c([O-])n(-c2cccc(O)c2)c(=O)[nH]c1=O]

Solid Dispersed Dye 1

134

<Preparation of Printed Material>
[Printed Material A]
Each of Inks 1 to 12 or Comparative Inks 1 to 3 was charged into an ink tank of an ink jet recording apparatus (DMP-2831, manufactured by Fujifilm Dimatix Inc.) and was jetted from an ink jet head to OK Top Coat Paper (manufactured by Oji Paper Co., Ltd.) to print a solid image. As a result, each of Printed Materials A-1 to A-8 or Comparative Printed Materials A-1 to A-3 was obtained.

"Solid image" refers to a surface image that is formed by applying an ink having a halftone dot rate of 100%.

[Printed Material B]
Each of Inks 1 to 12 or Comparative Inks 1 to 3 was charged into an ink tank of an ink jet recording apparatus (DMP-2831, manufactured by Fujifilm Dimatix Inc.) and was jetted from the ink jet head of the ink jet recording apparatus to a 5.4 mm×5.4 mm square region of OK Top Coat Paper (manufactured by Oji Paper Co., Ltd.). As a result, an infrared absorbing pattern formed of a plurality of dot patterns was formed.

Hereinafter, the details of the infrared absorbing pattern formed as described above will be described.

The 5.4 mm×5.4 mm square region of the treatment liquid coating surface was vertically divided into nine and horizontally divided into nine. As a result, 81 first lattices in total was assumed. Further, each of the first lattices was vertically divided into three and horizontally divided into three. As a result, nine second lattices was assumed per one first lattice. In the 5.4 mm×5.4 mm square region, the number of second lattices was 729 (=81×9).

Among the nine second lattices included in one first lattice, a dot pattern having a diameter of 50 μm was formed at a center portion of one second lattice. The number of dot patterns in one first lattice is 1 to 9.

FIG. 1 is a schematic plan view showing an example of arrangement of dot patterns in one first lattice.

As shown in FIG. 1, in this example, a dot pattern 14 was formed at a center portion of each of seven second lattices 12 among nine second lattices 12 in a first lattice 11. In FIG. 1, reference numeral "12" is added to only some second lattices, and reference numeral "14" is added to only some dot patterns.

In the 5.4 mm×5.4 mm square region, the number of dot patterns (that is, the arrangement of dot patterns) varies depending on first lattices.

The infrared absorbing pattern formed in the Examples was a set of the above-described dot patterns.

<Evaluation>
[Measurement of Properties] The following measurement and evaluation were performed on Inks 1 to 12, Comparative Inks 1 to 3, Printed Materials A-1 to A-8, and Comparative Printed Materials A-1 to A-3 obtained as described above. The results of the measurement and evaluation are shown in Table 53 below.

In the item "Compound Used" of Table 53, the kind of the colorant represented by Formula 1 included in the ink is shown. In addition, Comparative Examples 1 to 3 do not include the colorant represented by Formula 1. Therefore, an oblique line is drawn.

In addition, in the item "Solution", "Absorption Maximum (nm)" represents the absorption maximum of the solution in which DMF was used for dissolving. In the item "Ink", "Absorption Maximum A (nm)", "Difference (nm) between A and B", "Maximum Absorption Wavelength" and "Optical Density Ratio" represent the absorption maximum of the dry material obtained using the above-described method, a difference between the absorption maximum A and the absorption maximum B, the maximum absorption wavelength in a range of 400 nm to 1000 nm, and a ratio of the optical density of the dry material at 450 nm to the optical density at the absorption maximum, respectively.

In addition, in the item "Printed Material A", "Absorption Maximum A (nm)", "Difference (nm) between A and B", and "Maximum Absorption Wavelength" represent the absorption maximum of the infrared absorbing image in Printed Material A obtained using the above-described method, a difference between the absorption maximum A and the absorption maximum B, and the maximum absorption wavelength of the infrared absorbing image in Printed material in a range of 400 nm to 1000 nm, respectively.

[Invisibility]

Invisibility was evaluated using Printed Materials A-1 to A-8 and Comparative Printed Materials A-1 to A-3. Regarding invisibility, the optical density (OD) at 450 nm and the optical density at the absorption maximum were measured using a spectrophotometer UV-3100PC (manufactured by Shimadzu Corporation) including a 150 mm φ large integrating sphere attachment LISR-3100 (manufactured by Shimadzu Corporation) and were determined based on the following evaluation standards. The results are shown in Table 54.

In a case where the evaluation result is A, B, or C, there is no problem in practice. A or B is preferable, and A is more preferable.

—Evaluation Standards—

A: "Optical density at 450 nm/Optical density at Absorption Maximum" is 1/10 (0.1) or lower B: "Optical density at 450 nm/Optical density at Absorption Maximum" is higher than 1/10 and 1/7 (0.14) or lower C: "Optical density at 450 nm/Optical density at Absorption Maximum" is higher than 1/7 and 1/5 (0.2) or lower D: "Optical density at 450 nm/Optical density at Absorption Maximum" is higher than 1/5

[Light Fastness]

Under the same conditions as those of Printed Materials A-1 to A-8 and Comparative Printed Materials A-1 to A-3, three printed materials were prepared using each of the ink jet recording inks such that the optical densities (OD; reflection densities) at the absorption maximum were 0.5, 1, and 1.5, respectively. By adjusting the jetting amount of the ink jet recording ink, the optical density can be adjusted.

Each of the printed materials was irradiated with xenon light (85000 lx) using a weather meter (ATLAS C. I65) for 6 days. The optical density of the printed material at the absorption maximum was measured before and after the irradiation of xenon light, and "(Optical Density after Irradiation)/(Optical Density before Irradiation)=Colorant Residue Rate" was evaluated.

All the optical densities were measured using a spectrophotometer UV-3100PC (manufactured by Shimadzu Corporation) including a 150 mm φ large integrating sphere attachment LISR-3100 (manufactured by Shimadzu Corporation).

In a case where the evaluation result is A, B, or C, there is no problem in practice. A or B is preferable, and A is more preferable.

—Evaluation Standards—

A: The colorant residue rate was 90% or higher at all the densities

B: The colorant residue rate was 75% or higher at all the densities

C: The colorant residue rate was lower than 75% at at least one density but was 60% or higher at all the densities D: The colorant residue rate was lower than 60% at at least one density

[Moist Heat Resistance] Using the same method as the method of preparing the printed material in the evaluation of light fastness, three printed materials were prepared using each of the ink jet recording inks such that the optical densities (OD; reflection densities) at the absorption maximum were 0.5, 1, and 1.5, respectively.

Each of the printed materials was left to stand in a box set to 60° C. and a humidity of 90% for 7 days. The optical density of the image after standing was measured, and "(Optical Density after Standing)/(Optical Density before Standing)=Colorant Residue Rate" was evaluated.

All the optical densities were measured using a spectrophotometer UV-3100PC (manufactured by Shimadzu Corporation) including a 150 mm φ large integrating sphere attachment LISR-3100 (manufactured by Shimadzu Corporation).

In a case where the evaluation result is A, B, or C, there is no problem in practice. A or B is preferable, and A is more preferable.

—Evaluation Standards—

A: The colorant residue rate was 90% or higher at all the densities

B: The colorant residue rate was 75% or higher at all the densities

C: The colorant residue rate was lower than 75% at at least one density but was 60% or higher at all the densities D: The colorant residue rate was lower than 60% at at least one density

[Readability] (IR Readability of Infrared Absorbing Pattern)

Using an infrared reader "0.8 mm Height Flat Top Infrared LED (manufactured by Everlight Electronics Co., Ltd.), the infrared absorbing pattern formed as described above was read, and the IR readability of the infrared absorbing pattern was evaluated based on the following evaluation standards.

—Evaluation Standards of Readability of Infrared Absorbing Pattern—

A: In a case where the infrared reader was held over the infrared absorbing pattern, a read sound was generated within 3 seconds, and the read of the infrared absorbing pattern was verified B: In a case where the infrared reader was held over the infrared absorbing pattern, a read sound was generated in a period of longer than 3 seconds and shorter than 10 seconds, and the read of the infrared absorbing pattern was verified C: Even in a case where the infrared reader was held over the infrared absorbing pattern, a read sound was not generated, and the read was not verified

[Dispersion Easiness]<Dispersion Method 1 (Easy Dispersion Treatment)>

The composition was dispersed using a paint shaker for 2 hours to obtain a solid dispersion of each of the compounds.

<Dispersion Method 2 (Complex Dispersion Treatment)>

The composition was dispersed using an Eiger motor mill for 5 hours to obtain a solid dispersion of each of the compounds.

An ink was prepared using each of the dispersions prepared using the dispersion method 1 and the dispersion method 2, the ink was charged into an ink tank of an ink jet recording apparatus (DMP-2831, manufactured by Fujifilm Dimatix Inc.), and ink jettability was evaluated using the following method. The evaluation result was set as an index for dispersion easiness.

(Ink Jettability)

By observing an ink jetting portion of the ink jet head by visual inspection while jetting the ink from the ink jet head, the ink jettability was evaluated based on the following evaluation standards.

In the following description, "Defective Nozzle Number Ratio (%)" refers to a ratio of the number of defective nozzles to the number of all the nozzles.

—Evaluation Standards of Ink Jettability—

1: The defective nozzle number ratio was lower than 10%
2: The defective nozzle number ratio was 10% or higher —Evaluation Standards of Dispersion Easiness—

A: The ink jettability was 1 in all the dispersion methods
B: The ink jettability was 1 in any one of the dispersion methods
C: The ink jettability was 2 in all the dispersion methods

[Storage Stability] The ink (25 g) was put into a 30 mL bottom formed of polyethylene, the bottle was covered with a lid, and the ink was left to stand under a condition of a constant-temperature tank (25° C.) for 1 week. The viscosity of the ink was measured before and after the standing, a ratio of viscosity increase (%) caused by the standing (that is, a ratio of the viscosity after the standing to the viscosity before the standing) was obtained, and the storage stability of the ink was evaluated based on the following evaluation standards.

In addition, the viscosity of the ink was measured under a condition of liquid temperature: 25° C. by using VISCOMETER RE-85L (manufactured by Toki Sangyo Co., Ltd.) as a viscometer.

—Evaluation Standards of Storage Stability of Ink—

AA: An increase ratio of viscosity caused by standing at 25° C. for 1 week was lower than 5%, and an increase ratio of viscosity caused by standing at 40° C. for 1 week was lower than 10%

A: An increase ratio of viscosity caused by standing at 25° C. for 1 week was lower than 5%, and an increase ratio of viscosity caused by standing at 40° C. for 1 week was 10% or higher B: An increase ratio of viscosity caused by standing at 25° C. for 1 week was 5% or higher and lower than 10%

C: An increase ratio of viscosity caused by standing at 25° C. for 1 week was 10% or higher D: Precipitation occurred after standing at 25° C. for 1 week

TABLE 53

| | Solvent | Ink | | | | Printed Material | | | |
|---|---|---|---|---|---|---|---|---|---|
| | Compound Used | Absorption Maximum B (nm) | Absorption Maximum A (nm) | Difference between A and B | Optical Density | Optical Density Ratio | Absorption Maximum A (nm) | Difference between A and B | Optical Density | Optical Density Ratio |
| Example 1 | 1 | 620 | 850 | 230 | 1 | 0.015 | 845 | 225 | 0.80 | 0.05 |
| Example 2 | 2 | 620 | 830 | 210 | 1 | 0.017 | 830 | 210 | 0.81 | 0.06 |
| Example 3 | 3 | 625 | 860 | 235 | 1 | 0.015 | 855 | 230 | 0.80 | 0.05 |
| Example 4 | 4 | 620 | 850 | 230 | 1 | 0.015 | 850 | 230 | 0.82 | 0.07 |
| Example 5 | 5 | 620 | 840 | 220 | 1 | 0.020 | 840 | 220 | 0.79 | 0.08 |
| Example 6 | 6 | 620 | 780 | 160 | 1 | 0.017 | 780 | 160 | 0.75 | 0.06 |
| Example 7 | 7 | 620 | 720 | 100 | 1 | 0.016 | 725 | 105 | 0.70 | 0.06 |
| Example 8 | 2497 | 685 | 800 | 115 | 1 | 0.035 | 800 | 115 | 0.85 | 0.12 |
| Example 9 | 1 | 620 | 850 | 230 | 1 | 0.015 | 845 | 225 | 0.80 | 0.05 |
| Example 10 | 1 | 620 | 850 | 230 | 1 | 0.015 | 845 | 225 | 0.80 | 0.05 |
| Example 11 | 1 | 620 | 850 | 230 | 1 | 0.015 | 845 | 225 | 0.80 | 0.05 |
| Example 12 | 1 | 620 | 850 | 230 | 1 | 0.015 | 845 | 225 | 0.80 | 0.05 |
| Comparative Example 1 | | 620 | 850 | 230 | 1 | 0.02 | 830 | 210 | 0.75 | 0.09 |
| Comparative Example 2 | | 490 | 560 | 70 | 1 | 0.42 | 550 | 60 | 0.90 | 0.55 |
| Comparative Example 3 | | 490 | 540 | 50 | 1 | 0.56 | 530 | 40 | 0.85 | 0.68 |

TABLE 54

| | Invisibility | Light Fastness | Moist Heat Resistance | Readability | Dispersion Easiness | Storage Stability |
|---|---|---|---|---|---|---|
| Example 1 | A | A | A | A | A | A |
| Example 2 | A | A | A | A | A | A |
| Example 3 | A | A | A | A | A | A |
| Example 4 | A | B | B | A | A | A |
| Example 5 | A | B | B | A | A | A |
| Example 6 | A | A | B | A | A | A |
| Example 7 | A | B | C | B | A | A |
| Example 8 | B | C | C | A | A | A |
| Example 9 | A | A | A | A | A | AA |
| Example 10 | A | A | A | A | A | AA |
| Example 11 | A | A | A | A | A | AA |
| Example 12 | A | A | A | A | A | AA |
| Comparative Example 1 | A | B | B | A | C | C |
| Comparative Example 2 | D | C | C | C | C | C |

TABLE 54-continued

|  | Invisibility | Light Fastness | Moist Heat Resistance | Readability | Dispersion Easiness | Storage Stability |
|---|---|---|---|---|---|---|
| Comparative Example 3 | D | D | D | C | C | C |

Examples 13 to 336

<Preparation of Inks 13 to 336>

Inks 13 to 336 were prepared under the same conditions as those of the preparation of Ink 1, except that Compounds shown in Tables 55 to 72 were used instead of Compound 1, respectively.

<Evaluation>

Using the same methods as in Example 1, the evaluation of properties and the evaluation of invisibility, weather fastness, moist heat resistance, readability, dispersion easiness, and storage stability were performed.

The evaluation results are shown in Tables 55 to 72.

TABLE 55

|  | | Solvent | Ink | | | | Printed Material | | | |
|---|---|---|---|---|---|---|---|---|---|---|
|  | Compound Used | Absorption Maximum B (nm) | Absorption Maximum A (nm) | Difference between A and B | Optical Density | Optical Density Ratio | Absorption Maximum A (nm) | Difference between A and B | Optical Density | Optical Density Ratio |
| Example 13 | 8 | 620 | 850 | 230 | 1 | 0.018 | 840 | 220 | 0.80 | 0.06 |
| Example 14 | 10 | 620 | 850 | 230 | 1 | 0.015 | 835 | 215 | 0.80 | 0.06 |
| Example 15 | 13 | 620 | 840 | 220 | 1 | 0.016 | 835 | 215 | 0.79 | 0.06 |
| Example 16 | 17 | 620 | 830 | 210 | 1 | 0.016 | 825 | 205 | 0.79 | 0.06 |
| Example 17 | 19 | 620 | 820 | 200 | 1 | 0.016 | 815 | 195 | 0.79 | 0.06 |
| Example 18 | 20 | 620 | 840 | 220 | 1 | 0.016 | 835 | 215 | 0.79 | 0.06 |
| Example 19 | 21 | 620 | 810 | 190 | 1 | 0.017 | 805 | 185 | 0.78 | 0.06 |
| Example 20 | 25 | 620 | 800 | 180 | 1 | 0.014 | 800 | 180 | 0.84 | 0.04 |
| Example 21 | 27 | 620 | 830 | 210 | 1 | 0.018 | 825 | 205 | 0.78 | 0.07 |
| Example 22 | 32 | 620 | 780 | 160 | 1 | 0.020 | 770 | 150 | 0.77 | 0.08 |
| Example 23 | 34 | 620 | 800 | 180 | 1 | 0.020 | 790 | 170 | 0.78 | 0.07 |
| Example 24 | 39 | 620 | 800 | 180 | 1 | 0.020 | 790 | 170 | 0.78 | 0.07 |
| Example 25 | 44 | 620 | 800 | 180 | 1 | 0.020 | 790 | 170 | 0.78 | 0.07 |
| Example 26 | 51 | 620 | 800 | 180 | 1 | 0.020 | 790 | 170 | 0.78 | 0.07 |
| Example 27 | 53 | 620 | 790 | 170 | 1 | 0.020 | 785 | 165 | 0.78 | 0.07 |
| Example 28 | 56 | 620 | 830 | 210 | 1 | 0.020 | 825 | 205 | 0.81 | 0.07 |
| Example 29 | 58 | 620 | 830 | 210 | 1 | 0.017 | 820 | 200 | 0.81 | 0.07 |
| Example 30 | 61 | 620 | 820 | 200 | 1 | 0.018 | 820 | 200 | 0.80 | 0.07 |
| Example 32 | 65 | 620 | 810 | 190 | 1 | 0.018 | 810 | 190 | 0.80 | 0.07 |
| Example 33 | 67 | 620 | 800 | 180 | 1 | 0.018 | 800 | 180 | 0.80 | 0.07 |
| Example 34 | 68 | 620 | 820 | 200 | 1 | 0.018 | 820 | 200 | 0.80 | 0.07 |
| Example 35 | 69 | 620 | 790 | 170 | 1 | 0.019 | 790 | 170 | 0.79 | 0.07 |
| Example 36 | 73 | 620 | 780 | 160 | 1 | 0.016 | 785 | 165 | 0.85 | 0.05 |
| Example 37 | 75 | 620 | 810 | 190 | 1 | 0.020 | 810 | 190 | 0.79 | 0.08 |
| Example 38 | 80 | 620 | 760 | 140 | 1 | 0.022 | 755 | 135 | 0.78 | 0.09 |
| Example 39 | 82 | 620 | 780 | 160 | 1 | 0.022 | 775 | 155 | 0.79 | 0.08 |
| Example 40 | 87 | 620 | 780 | 160 | 1 | 0.022 | 775 | 155 | 0.79 | 0.08 |
| Example 41 | 92 | 620 | 780 | 160 | 1 | 0.022 | 775 | 155 | 0.79 | 0.08 |
| Example 42 | 99 | 620 | 780 | 160 | 1 | 0.022 | 775 | 155 | 0.79 | 0.08 |
| Example 43 | 101 | 620 | 770 | 150 | 1 | 0.022 | 770 | 150 | 0.79 | 0.08 |
| Example 44 | 153 | 620 | 780 | 160 | 1 | 0.015 | 780 | 160 | 0.74 | 0.07 |
| Example 45 | 155 | 620 | 780 | 160 | 1 | 0.015 | 780 | 160 | 0.74 | 0.07 |
| Example 46 | 158 | 620 | 770 | 150 | 1 | 0.016 | 770 | 150 | 0.73 | 0.07 |
| Example 47 | 162 | 620 | 760 | 140 | 1 | 0.016 | 760 | 140 | 0.73 | 0.07 |
| Example 48 | 164 | 620 | 750 | 130 | 1 | 0.016 | 750 | 130 | 0.73 | 0.07 |
| Example 49 | 165 | 620 | 770 | 150 | 1 | 0.016 | 770 | 150 | 0.73 | 0.07 |
| Example 50 | 166 | 620 | 740 | 120 | 1 | 0.017 | 740 | 120 | 0.72 | 0.07 |
| Example 51 | 170 | 620 | 730 | 110 | 1 | 0.014 | 730 | 110 | 0.78 | 0.05 |

TABLE 56

|  | | Solvent | Ink | | | | Printed Material | | | |
|---|---|---|---|---|---|---|---|---|---|---|
|  | Compound Used | Absorption Maximum B (nm) | Absorption Maximum A (nm) | Difference between A and B | Optical Density | Optical Density Ratio | Absorption Maximum A (nm) | Difference between A and B | Optical Density | Optical Density Ratio |
| Example 52 | 172 | 620 | 760 | 140 | 1 | 0.018 | 760 | 140 | 0.72 | 0.08 |
| Example 53 | 177 | 620 | 710 | 90 | 1 | 0.020 | 710 | 90 | 0.71 | 0.09 |
| Example 54 | 179 | 620 | 730 | 110 | 1 | 0.020 | 730 | 110 | 0.72 | 0.08 |

TABLE 56-continued

|  | Compound Used | Solvent Absorption Maximum B (nm) | Ink Absorption Maximum A (nm) | Ink Difference between A and B | Ink Optical Density | Ink Optical Density Ratio | Printed Material Absorption Maximum A (nm) | Printed Material Difference between A and B | Printed Material Optical Density | Printed Material Optical Density Ratio |
|---|---|---|---|---|---|---|---|---|---|---|
| Example 55 | 184 | 620 | 730 | 110 | 1 | 0.020 | 730 | 110 | 0.72 | 0.08 |
| Example 56 | 189 | 620 | 730 | 110 | 1 | 0.020 | 730 | 110 | 0.72 | 0.08 |
| Example 57 | 196 | 620 | 730 | 110 | 1 | 0.020 | 730 | 110 | 0.72 | 0.08 |
| Example 58 | 198 | 620 | 720 | 100 | 1 | 0.020 | 720 | 100 | 0.72 | 0.08 |
| Example 59 | 348 | 620 | 830 | 210 | 1 | 0.016 | 825 | 205 | 0.79 | 0.06 |
| Example 60 | 349 | 620 | 830 | 210 | 1 | 0.019 | 820 | 200 | 0.79 | 0.07 |
| Example 61 | 351 | 620 | 830 | 210 | 1 | 0.016 | 815 | 195 | 0.79 | 0.07 |
| Example 62 | 354 | 620 | 820 | 200 | 1 | 0.017 | 815 | 195 | 0.78 | 0.07 |
| Example 63 | 358 | 620 | 810 | 190 | 1 | 0.017 | 805 | 185 | 0.78 | 0.07 |
| Example 64 | 360 | 620 | 800 | 180 | 1 | 0.017 | 795 | 175 | 0.78 | 0.07 |
| Example 65 | 361 | 620 | 820 | 200 | 1 | 0.017 | 815 | 195 | 0.78 | 0.07 |
| Example 66 | 362 | 620 | 790 | 170 | 1 | 0.018 | 785 | 165 | 0.77 | 0.07 |
| Example 67 | 366 | 620 | 780 | 160 | 1 | 0.015 | 780 | 160 | 0.83 | 0.05 |
| Example 68 | 368 | 620 | 810 | 190 | 1 | 0.019 | 805 | 185 | 0.77 | 0.08 |
| Example 69 | 373 | 620 | 760 | 140 | 1 | 0.021 | 750 | 130 | 0.76 | 0.09 |
| Example 70 | 375 | 620 | 780 | 160 | 1 | 0.021 | 770 | 150 | 0.77 | 0.08 |
| Example 71 | 380 | 620 | 780 | 160 | 1 | 0.021 | 770 | 150 | 0.77 | 0.08 |
| Example 72 | 385 | 620 | 780 | 160 | 1 | 0.021 | 770 | 150 | 0.77 | 0.08 |
| Example 73 | 392 | 620 | 780 | 160 | 1 | 0.021 | 770 | 150 | 0.77 | 0.08 |
| Example 74 | 394 | 620 | 770 | 150 | 1 | 0.021 | 765 | 145 | 0.77 | 0.08 |
| Example 75 | 1867 | 620 | 790 | 170 | 1 | 0.015 | 785 | 165 | 0.77 | 0.06 |
| Example 76 | 1868 | 620 | 790 | 170 | 1 | 0.018 | 780 | 160 | 0.77 | 0.07 |
| Example 77 | 1870 | 620 | 790 | 170 | 1 | 0.015 | 775 | 155 | 0.77 | 0.07 |
| Example 78 | 1873 | 620 | 780 | 160 | 1 | 0.016 | 775 | 155 | 0.76 | 0.07 |
| Example 79 | 1877 | 620 | 770 | 150 | 1 | 0.016 | 765 | 145 | 0.76 | 0.07 |
| Example 80 | 1879 | 620 | 760 | 140 | 1 | 0.016 | 755 | 135 | 0.76 | 0.07 |
| Example 81 | 1880 | 620 | 780 | 160 | 1 | 0.016 | 775 | 155 | 0.76 | 0.07 |
| Example 82 | 1881 | 620 | 750 | 130 | 1 | 0.017 | 745 | 125 | 0.75 | 0.07 |
| Example 83 | 1885 | 620 | 740 | 120 | 1 | 0.014 | 740 | 120 | 0.81 | 0.05 |
| Example 84 | 1887 | 620 | 770 | 150 | 1 | 0.018 | 765 | 145 | 0.75 | 0.08 |
| Example 85 | 1892 | 620 | 720 | 100 | 1 | 0.020 | 710 | 90 | 0.74 | 0.09 |
| Example 86 | 1894 | 620 | 740 | 120 | 1 | 0.020 | 730 | 110 | 0.75 | 0.08 |
| Example 87 | 1899 | 620 | 740 | 120 | 1 | 0.020 | 730 | 110 | 0.75 | 0.08 |
| Example 88 | 1904 | 620 | 740 | 120 | 1 | 0.020 | 730 | 110 | 0.75 | 0.08 |
| Example 89 | 1911 | 620 | 740 | 120 | 1 | 0.020 | 730 | 110 | 0.75 | 0.08 |

TABLE 57

|  | Compound Used | Solvent Absorption Maximum B (nm) | Ink Absorption Maximum A (nm) | Ink Difference between A and B | Ink Optical Density | Ink Optical Density Ratio | Printed Material Absorption Maximum A (nm) | Printed Material Difference between A and B | Printed Material Optical Density | Printed Material Optical Density Ratio |
|---|---|---|---|---|---|---|---|---|---|---|
| Example 90 | 1913 | 620 | 730 | 110 | 1 | 0.020 | 725 | 105 | 0.75 | 0.08 |
| Example 91 | 2014 | 620 | 840 | 220 | 1 | 0.015 | 845 | 225 | 0.80 | 0.05 |
| Example 92 | 2015 | 620 | 840 | 220 | 1 | 0.018 | 840 | 220 | 0.80 | 0.06 |
| Example 93 | 2017 | 620 | 840 | 220 | 1 | 0.015 | 835 | 215 | 0.80 | 0.06 |
| Example 94 | 2020 | 620 | 830 | 210 | 1 | 0.016 | 835 | 215 | 0.79 | 0.06 |
| Example 95 | 2024 | 620 | 820 | 200 | 1 | 0.016 | 825 | 205 | 0.79 | 0.06 |
| Example 96 | 2026 | 620 | 810 | 190 | 1 | 0.016 | 815 | 195 | 0.79 | 0.06 |
| Example 97 | 2027 | 620 | 830 | 210 | 1 | 0.016 | 835 | 215 | 0.79 | 0.06 |
| Example 98 | 2028 | 620 | 800 | 180 | 1 | 0.017 | 805 | 185 | 0.78 | 0.06 |
| Example 99 | 2032 | 620 | 790 | 170 | 1 | 0.014 | 800 | 180 | 0.84 | 0.04 |
| Example 100 | 2034 | 620 | 820 | 200 | 1 | 0.018 | 825 | 205 | 0.78 | 0.07 |
| Example 101 | 2039 | 620 | 770 | 150 | 1 | 0.020 | 770 | 150 | 0.77 | 0.08 |
| Example 102 | 2041 | 620 | 790 | 170 | 1 | 0.020 | 790 | 170 | 0.78 | 0.07 |
| Example 103 | 2046 | 620 | 790 | 170 | 1 | 0.020 | 790 | 170 | 0.78 | 0.07 |
| Example 104 | 2051 | 620 | 790 | 170 | 1 | 0.020 | 790 | 170 | 0.78 | 0.07 |
| Example 105 | 2058 | 620 | 790 | 170 | 1 | 0.020 | 790 | 170 | 0.78 | 0.07 |
| Example 106 | 2060 | 620 | 780 | 160 | 1 | 0.020 | 785 | 165 | 0.78 | 0.07 |
| Example 107 | 2505 | 620 | 840 | 220 | 1 | 0.016 | 835 | 215 | 0.79 | 0.07 |
| Example 108 | 2509 | 620 | 840 | 220 | 1 | 0.016 | 835 | 215 | 0.79 | 0.07 |
| Example 109 | 2510 | 620 | 840 | 220 | 1 | 0.016 | 835 | 215 | 0.79 | 0.07 |
| Example 110 | 2514 | 620 | 840 | 220 | 1 | 0.016 | 835 | 215 | 0.79 | 0.07 |
| Example 111 | 2515 | 620 | 840 | 220 | 1 | 0.016 | 835 | 215 | 0.79 | 0.07 |
| Example 112 | 2517 | 620 | 840 | 220 | 1 | 0.016 | 835 | 215 | 0.79 | 0.07 |
| Example 113 | 2518 | 620 | 840 | 220 | 1 | 0.016 | 835 | 215 | 0.79 | 0.07 |
| Example 114 | 2524 | 620 | 830 | 210 | 1 | 0.017 | 825 | 205 | 0.78 | 0.07 |
| Example 115 | 2525 | 620 | 830 | 210 | 1 | 0.017 | 825 | 205 | 0.78 | 0.07 |

TABLE 57-continued

|  | Compound Used | Solvent Absorption Maximum B (nm) | Ink Absorption Maximum A (nm) | Difference between A and B | Optical Density | Optical Density Ratio | Printed Material Absorption Maximum A (nm) | Difference between A and B | Optical Density | Optical Density Ratio |
| --- | --- | --- | --- | --- | --- | --- | --- | --- | --- | --- |
| Example 116 | 2526 | 620 | 830 | 210 | 1 | 0.017 | 825 | 205 | 0.78 | 0.07 |
| Example 117 | 2530 | 620 | 820 | 200 | 1 | 0.016 | 815 | 195 | 0.79 | 0.06 |
| Example 118 | 2531 | 620 | 820 | 200 | 1 | 0.016 | 815 | 195 | 0.79 | 0.06 |
| Example 119 | 2532 | 620 | 770 | 150 | 1 | 0.022 | 775 | 155 | 0.79 | 0.08 |
| Example 120 | 2533 | 620 | 770 | 150 | 1 | 0.022 | 775 | 155 | 0.79 | 0.08 |
| Example 121 | 2535 | 620 | 820 | 200 | 1 | 0.018 | 815 | 195 | 0.80 | 0.08 |
| Example 122 | 2539 | 620 | 820 | 200 | 1 | 0.018 | 815 | 195 | 0.80 | 0.08 |
| Example 123 | 2540 | 620 | 820 | 200 | 1 | 0.018 | 815 | 195 | 0.80 | 0.08 |
| Example 124 | 2544 | 620 | 820 | 200 | 1 | 0.018 | 815 | 195 | 0.80 | 0.08 |
| Example 125 | 2545 | 620 | 820 | 200 | 1 | 0.018 | 815 | 195 | 0.80 | 0.08 |
| Example 126 | 2547 | 620 | 820 | 200 | 1 | 0.018 | 815 | 195 | 0.80 | 0.08 |
| Example 127 | 2548 | 620 | 820 | 200 | 1 | 0.018 | 815 | 195 | 0.80 | 0.08 |

TABLE 58

|  | Compound Used | Solvent Absorption Maximum B (nm) | Ink Absorption Maximum A (nm) | Difference between A and B | Optical Density | Optical Density Ratio | Printed Material Absorption Maximum A (nm) | Difference between A and B | Optical Density | Optical Density Ratio |
| --- | --- | --- | --- | --- | --- | --- | --- | --- | --- | --- |
| Example 128 | 2554 | 620 | 810 | 190 | 1 | 0.019 | 805 | 185 | 0.79 | 0.08 |
| Example 129 | 2555 | 620 | 810 | 190 | 1 | 0.019 | 805 | 185 | 0.79 | 0.08 |
| Example 130 | 2556 | 620 | 810 | 190 | 1 | 0.019 | 805 | 185 | 0.79 | 0.08 |
| Example 131 | 2560 | 620 | 800 | 180 | 1 | 0.018 | 795 | 175 | 0.80 | 0.07 |
| Example 132 | 2561 | 620 | 800 | 180 | 1 | 0.018 | 795 | 175 | 0.80 | 0.07 |
| Example 133 | 2562 | 620 | 750 | 130 | 1 | 0.024 | 755 | 135 | 0.80 | 0.09 |
| Example 134 | 2563 | 620 | 750 | 130 | 1 | 0.024 | 755 | 135 | 0.80 | 0.09 |
| Example 135 | 2685 | 620 | 820 | 200 | 1 | 0.016 | 815 | 195 | 0.78 | 0.08 |
| Example 136 | 2689 | 620 | 820 | 200 | 1 | 0.016 | 815 | 195 | 0.78 | 0.08 |
| Example 137 | 2690 | 620 | 820 | 200 | 1 | 0.016 | 815 | 195 | 0.78 | 0.08 |
| Example 138 | 2694 | 620 | 820 | 200 | 1 | 0.016 | 815 | 195 | 0.78 | 0.08 |
| Example 139 | 2695 | 620 | 820 | 200 | 1 | 0.016 | 815 | 195 | 0.78 | 0.08 |
| Example 140 | 2697 | 620 | 820 | 200 | 1 | 0.016 | 815 | 195 | 0.78 | 0.08 |
| Example 141 | 2698 | 620 | 820 | 200 | 1 | 0.016 | 815 | 195 | 0.78 | 0.08 |
| Example 142 | 2704 | 620 | 810 | 190 | 1 | 0.017 | 805 | 185 | 0.77 | 0.08 |
| Example 143 | 2705 | 620 | 810 | 190 | 1 | 0.017 | 805 | 185 | 0.77 | 0.08 |
| Example 144 | 2706 | 620 | 810 | 190 | 1 | 0.017 | 805 | 185 | 0.77 | 0.08 |
| Example 145 | 2710 | 620 | 800 | 180 | 1 | 0.016 | 795 | 175 | 0.78 | 0.07 |
| Example 146 | 2711 | 620 | 800 | 180 | 1 | 0.016 | 795 | 175 | 0.78 | 0.07 |
| Example 147 | 2712 | 620 | 750 | 130 | 1 | 0.022 | 755 | 135 | 0.78 | 0.09 |
| Example 148 | 2713 | 620 | 750 | 130 | 1 | 0.022 | 755 | 135 | 0.78 | 0.09 |
| Example 149 | 2865 | 620 | 780 | 160 | 1 | 0.015 | 775 | 155 | 0.76 | 0.08 |
| Example 150 | 2869 | 620 | 780 | 160 | 1 | 0.015 | 775 | 155 | 0.76 | 0.08 |
| Example 151 | 2870 | 620 | 780 | 160 | 1 | 0.015 | 775 | 155 | 0.76 | 0.08 |
| Example 152 | 2874 | 620 | 780 | 160 | 1 | 0.015 | 775 | 155 | 0.76 | 0.08 |
| Example 153 | 2875 | 620 | 780 | 160 | 1 | 0.015 | 775 | 155 | 0.76 | 0.08 |
| Example 154 | 2877 | 620 | 780 | 160 | 1 | 0.015 | 775 | 155 | 0.76 | 0.08 |
| Example 155 | 2878 | 620 | 780 | 160 | 1 | 0.015 | 775 | 155 | 0.76 | 0.08 |
| Example 156 | 2884 | 620 | 770 | 150 | 1 | 0.016 | 765 | 145 | 0.75 | 0.08 |
| Example 157 | 2885 | 620 | 770 | 150 | 1 | 0.016 | 765 | 145 | 0.75 | 0.08 |
| Example 158 | 2886 | 620 | 770 | 150 | 1 | 0.016 | 765 | 145 | 0.75 | 0.08 |
| Example 159 | 2890 | 620 | 760 | 140 | 1 | 0.015 | 755 | 135 | 0.76 | 0.07 |
| Example 160 | 2891 | 620 | 760 | 140 | 1 | 0.015 | 755 | 135 | 0.76 | 0.07 |
| Example 161 | 2892 | 620 | 710 | 90 | 1 | 0.021 | 715 | 95 | 0.76 | 0.09 |
| Example 162 | 2893 | 620 | 710 | 90 | 1 | 0.021 | 715 | 95 | 0.76 | 0.09 |
| Example 163 | 2895 | 620 | 830 | 210 | 1 | 0.015 | 825 | 205 | 0.79 | 0.07 |
| Example 164 | 2899 | 620 | 830 | 210 | 1 | 0.015 | 825 | 205 | 0.79 | 0.07 |
| Example 165 | 2900 | 620 | 830 | 210 | 1 | 0.015 | 825 | 205 | 0.79 | 0.07 |

TABLE 59

| | | Solvent | Ink | | | | Printed Material | | | |
|---|---|---|---|---|---|---|---|---|---|---|
| | Compound Used | Absorption Maximum B (nm) | Absorption Maximum A (nm) | Difference between A and B | Optical Density | Optical Density Ratio | Absorption Maximum A (nm) | Difference between A and B | Optical Density | Optical Density Ratio |
| Example 166 | 2904 | 620 | 830 | 210 | 1 | 0.015 | 825 | 205 | 0.79 | 0.07 |
| Example 167 | 2905 | 620 | 830 | 210 | 1 | 0.015 | 825 | 205 | 0.79 | 0.07 |
| Example 168 | 2907 | 620 | 830 | 210 | 1 | 0.015 | 825 | 205 | 0.79 | 0.07 |
| Example 169 | 2908 | 620 | 830 | 210 | 1 | 0.015 | 825 | 205 | 0.79 | 0.07 |
| Example 170 | 2914 | 620 | 820 | 200 | 1 | 0.016 | 815 | 195 | 0.78 | 0.07 |
| Example 171 | 2915 | 620 | 820 | 200 | 1 | 0.016 | 815 | 195 | 0.78 | 0.07 |
| Example 172 | 2916 | 620 | 820 | 200 | 1 | 0.016 | 815 | 195 | 0.78 | 0.07 |
| Example 173 | 2920 | 620 | 810 | 190 | 1 | 0.015 | 805 | 185 | 0.79 | 0.06 |
| Example 174 | 2921 | 620 | 810 | 190 | 1 | 0.015 | 805 | 185 | 0.79 | 0.06 |
| Example 175 | 2922 | 620 | 760 | 140 | 1 | 0.021 | 765 | 145 | 0.79 | 0.08 |
| Example 176 | 2923 | 620 | 760 | 140 | 1 | 0.021 | 765 | 145 | 0.79 | 0.08 |
| Example 177 | 2984 | 620 | 850 | 230 | 1 | 0.015 | 845 | 225 | 0.80 | 0.05 |
| Example 178 | 2985 | 620 | 850 | 230 | 1 | 0.018 | 840 | 220 | 0.80 | 0.06 |
| Example 179 | 2987 | 620 | 850 | 230 | 1 | 0.015 | 835 | 215 | 0.80 | 0.06 |
| Example 180 | 2989 | 620 | 840 | 220 | 1 | 0.016 | 835 | 215 | 0.79 | 0.06 |
| Example 181 | 2991 | 620 | 830 | 210 | 1 | 0.016 | 825 | 205 | 0.79 | 0.06 |
| Example 182 | 2992 | 620 | 820 | 200 | 1 | 0.016 | 815 | 195 | 0.79 | 0.06 |
| Example 183 | 2993 | 620 | 840 | 220 | 1 | 0.016 | 835 | 215 | 0.79 | 0.06 |
| Example 184 | 2994 | 620 | 810 | 190 | 1 | 0.017 | 805 | 185 | 0.78 | 0.06 |
| Example 185 | 3033 | 620 | 830 | 210 | 1 | 0.017 | 830 | 210 | 0.81 | 0.06 |
| Example 186 | 3034 | 620 | 830 | 210 | 1 | 0.020 | 825 | 205 | 0.81 | 0.07 |
| Example 187 | 3036 | 620 | 830 | 210 | 1 | 0.017 | 820 | 200 | 0.81 | 0.07 |
| Example 188 | 3038 | 620 | 820 | 200 | 1 | 0.018 | 820 | 200 | 0.80 | 0.07 |
| Example 189 | 3040 | 620 | 810 | 190 | 1 | 0.018 | 810 | 190 | 0.80 | 0.07 |
| Example 190 | 3041 | 620 | 800 | 180 | 1 | 0.018 | 800 | 180 | 0.80 | 0.07 |
| Example 191 | 3042 | 620 | 820 | 200 | 1 | 0.018 | 820 | 200 | 0.80 | 0.07 |
| Example 192 | 3043 | 620 | 790 | 170 | 1 | 0.019 | 790 | 170 | 0.79 | 0.07 |
| Example 193 | 3131 | 620 | 830 | 210 | 1 | 0.016 | 825 | 205 | 0.79 | 0.06 |
| Example 194 | 3132 | 620 | 730 | 110 | 1 | 0.023 | 735 | 115 | 0.77 | 0.1 |
| Example 195 | 3134 | 620 | 760 | 140 | 1 | 0.016 | 755 | 135 | 0.75 | 0.09 |
| Example 196 | 3136 | 620 | 760 | 140 | 1 | 0.016 | 755 | 135 | 0.75 | 0.09 |
| Example 197 | 3138 | 620 | 760 | 140 | 1 | 0.016 | 755 | 135 | 0.75 | 0.09 |
| Example 198 | 3139 | 620 | 760 | 140 | 1 | 0.016 | 755 | 135 | 0.75 | 0.09 |
| Example 199 | 3140 | 620 | 760 | 140 | 1 | 0.016 | 755 | 135 | 0.75 | 0.09 |
| Example 200 | 3141 | 620 | 760 | 140 | 1 | 0.016 | 755 | 135 | 0.75 | 0.09 |
| Example 201 | 3425 | 620 | 790 | 170 | 1 | 0.015 | 785 | 165 | 0.77 | 0.06 |
| Example 202 | 3426 | 620 | 790 | 170 | 1 | 0.018 | 780 | 160 | 0.77 | 0.07 |
| Example 203 | 3428 | 620 | 790 | 170 | 1 | 0.015 | 775 | 155 | 0.77 | 0.07 |

TABLE 60

| | | Solvent | Ink | | | | Printed Material | | | |
|---|---|---|---|---|---|---|---|---|---|---|
| | Compound Used | Absorption Maximum B (nm) | Absorption Maximum A (nm) | Difference between A and B | Optical Density | Optical Density Ratio | Absorption Maximum A (nm) | Difference between A and B | Optical Density | Optical Density Ratio |
| Example 204 | 3430 | 620 | 780 | 160 | 1 | 0.016 | 775 | 155 | 0.76 | 0.07 |
| Example 205 | 3432 | 620 | 770 | 150 | 1 | 0.016 | 765 | 145 | 0.76 | 0.07 |
| Example 206 | 3433 | 620 | 760 | 140 | 1 | 0.016 | 755 | 135 | 0.76 | 0.07 |
| Example 207 | 3434 | 620 | 780 | 160 | 1 | 0.016 | 775 | 155 | 0.76 | 0.07 |
| Example 208 | 3435 | 620 | 750 | 130 | 1 | 0.017 | 745 | 125 | 0.75 | 0.07 |
| Example 209 | 3523 | 620 | 840 | 220 | 1 | 0.015 | 845 | 225 | 0.80 | 0.05 |
| Example 210 | 3524 | 620 | 840 | 220 | 1 | 0.018 | 840 | 220 | 0.80 | 0.06 |
| Example 211 | 3526 | 620 | 840 | 220 | 1 | 0.015 | 835 | 215 | 0.80 | 0.06 |
| Example 212 | 3528 | 620 | 830 | 210 | 1 | 0.016 | 835 | 215 | 0.79 | 0.06 |
| Example 213 | 3530 | 620 | 820 | 200 | 1 | 0.016 | 825 | 205 | 0.79 | 0.06 |
| Example 214 | 3531 | 620 | 810 | 190 | 1 | 0.016 | 815 | 195 | 0.79 | 0.06 |
| Example 215 | 3532 | 620 | 830 | 210 | 1 | 0.016 | 835 | 215 | 0.79 | 0.06 |
| Example 216 | 3533 | 620 | 800 | 180 | 1 | 0.017 | 805 | 185 | 0.78 | 0.06 |
| Example 217 | 3670 | 620 | 850 | 230 | 1 | 0.015 | 845 | 225 | 0.80 | 0.05 |
| Example 218 | 3671 | 620 | 850 | 230 | 1 | 0.018 | 840 | 220 | 0.80 | 0.06 |
| Example 219 | 3673 | 620 | 850 | 230 | 1 | 0.015 | 835 | 215 | 0.80 | 0.06 |
| Example 220 | 3675 | 620 | 840 | 220 | 1 | 0.016 | 835 | 215 | 0.79 | 0.06 |
| Example 221 | 3677 | 620 | 830 | 210 | 1 | 0.016 | 825 | 205 | 0.79 | 0.06 |
| Example 222 | 3678 | 620 | 820 | 200 | 1 | 0.016 | 815 | 195 | 0.79 | 0.06 |
| Example 223 | 3679 | 620 | 840 | 220 | 1 | 0.016 | 835 | 215 | 0.79 | 0.06 |
| Example 224 | 3680 | 620 | 810 | 190 | 1 | 0.017 | 805 | 185 | 0.78 | 0.06 |
| Example 225 | 3719 | 620 | 830 | 210 | 1 | 0.017 | 830 | 210 | 0.81 | 0.06 |
| Example 226 | 3720 | 620 | 830 | 210 | 1 | 0.020 | 825 | 205 | 0.81 | 0.07 |

TABLE 60-continued

| | | Solvent | Ink | | | | Printed Material | | | |
|---|---|---|---|---|---|---|---|---|---|---|
| | Compound Used | Absorption Maximum B (nm) | Absorption Maximum A (nm) | Difference between A and B | Optical Density | Optical Density Ratio | Absorption Maximum A (nm) | Difference between A and B | Optical Density | Optical Density Ratio |
| Example 227 | 3722 | 620 | 830 | 210 | 1 | 0.017 | 820 | 200 | 0.81 | 0.07 |
| Example 228 | 3724 | 620 | 820 | 200 | 1 | 0.018 | 820 | 200 | 0.80 | 0.07 |
| Example 229 | 3726 | 620 | 810 | 190 | 1 | 0.018 | 810 | 190 | 0.80 | 0.07 |
| Example 230 | 3727 | 620 | 800 | 180 | 1 | 0.018 | 800 | 180 | 0.80 | 0.07 |
| Example 231 | 3728 | 620 | 820 | 200 | 1 | 0.018 | 820 | 200 | 0.80 | 0.07 |
| Example 232 | 3729 | 620 | 790 | 170 | 1 | 0.019 | 790 | 170 | 0.79 | 0.07 |
| Example 233 | 3817 | 620 | 830 | 210 | 1 | 0.016 | 825 | 205 | 0.79 | 0.06 |
| Example 234 | 3818 | 620 | 800 | 180 | 1 | 0.019 | 800 | 180 | 0.79 | 0.08 |
| Example 235 | 3820 | 620 | 790 | 170 | 1 | 0.019 | 790 | 170 | 0.79 | 0.08 |
| Example 236 | 3822 | 620 | 780 | 160 | 1 | 0.019 | 780 | 160 | 0.79 | 0.08 |
| Example 237 | 3824 | 620 | 800 | 180 | 1 | 0.019 | 800 | 180 | 0.79 | 0.08 |
| Example 238 | 3825 | 620 | 770 | 150 | 1 | 0.02 | 770 | 150 | 0.78 | 0.08 |
| Example 239 | 3826 | 620 | 810 | 190 | 1 | 0.017 | 805 | 185 | 0.78 | 0.07 |
| Example 240 | 3827 | 620 | 710 | 90 | 1 | 0.024 | 715 | 95 | 0.76 | 0.11 |
| Example 241 | 4111 | 620 | 790 | 170 | 1 | 0.015 | 785 | 165 | 0.77 | 0.06 |

TABLE 61

| | | Solvent | Ink | | | | Printed Material | | | |
|---|---|---|---|---|---|---|---|---|---|---|
| | Compound Used | Absorption Maximum B (nm) | Absorption Maximum A (nm) | Difference between A and B | Optical Density | Optical Density Ratio | Absorption Maximum A (nm) | Difference between A and B | Optical Density | Optical Density Ratio |
| Example 242 | 4112 | 620 | 790 | 170 | 1 | 0.018 | 780 | 160 | 0.77 | 0.07 |
| Example 243 | 4114 | 620 | 790 | 170 | 1 | 0.015 | 775 | 155 | 0.77 | 0.07 |
| Example 244 | 4116 | 620 | 780 | 160 | 1 | 0.016 | 775 | 155 | 0.76 | 0.07 |
| Example 245 | 4118 | 620 | 770 | 150 | 1 | 0.016 | 765 | 145 | 0.76 | 0.07 |
| Example 246 | 4119 | 620 | 760 | 140 | 1 | 0.016 | 755 | 135 | 0.76 | 0.07 |
| Example 247 | 4120 | 620 | 780 | 160 | 1 | 0.016 | 775 | 155 | 0.76 | 0.07 |
| Example 248 | 4121 | 620 | 750 | 130 | 1 | 0.017 | 745 | 125 | 0.75 | 0.07 |
| Example 249 | 4209 | 620 | 840 | 220 | 1 | 0.015 | 845 | 225 | 0.80 | 0.05 |
| Example 250 | 4210 | 620 | 840 | 220 | 1 | 0.018 | 840 | 220 | 0.80 | 0.06 |
| Example 251 | 4212 | 620 | 840 | 220 | 1 | 0.015 | 835 | 215 | 0.80 | 0.06 |
| Example 252 | 4214 | 620 | 830 | 210 | 1 | 0.016 | 835 | 215 | 0.79 | 0.06 |
| Example 253 | 4216 | 620 | 820 | 200 | 1 | 0.016 | 825 | 205 | 0.79 | 0.06 |
| Example 254 | 4217 | 620 | 810 | 190 | 1 | 0.016 | 815 | 195 | 0.79 | 0.06 |
| Example 255 | 4218 | 620 | 830 | 210 | 1 | 0.016 | 835 | 215 | 0.79 | 0.06 |
| Example 256 | 4219 | 620 | 800 | 180 | 1 | 0.017 | 805 | 185 | 0.78 | 0.06 |
| Example 257 | 4356 | 620 | 850 | 230 | 1 | 0.015 | 845 | 225 | 0.80 | 0.05 |
| Example 258 | 4357 | 620 | 850 | 230 | 1 | 0.018 | 840 | 220 | 0.80 | 0.06 |
| Example 259 | 4359 | 620 | 850 | 230 | 1 | 0.015 | 835 | 215 | 0.80 | 0.06 |
| Example 260 | 4361 | 620 | 840 | 220 | 1 | 0.016 | 835 | 215 | 0.79 | 0.06 |
| Example 261 | 4363 | 620 | 830 | 210 | 1 | 0.016 | 825 | 205 | 0.79 | 0.06 |
| Example 262 | 4364 | 620 | 820 | 200 | 1 | 0.016 | 815 | 195 | 0.79 | 0.06 |
| Example 263 | 4365 | 620 | 840 | 220 | 1 | 0.016 | 835 | 215 | 0.79 | 0.06 |
| Example 264 | 4366 | 620 | 810 | 190 | 1 | 0.017 | 805 | 185 | 0.78 | 0.06 |
| Example 265 | 4405 | 620 | 830 | 210 | 1 | 0.017 | 830 | 210 | 0.81 | 0.06 |
| Example 266 | 4406 | 620 | 830 | 210 | 1 | 0.020 | 825 | 205 | 0.81 | 0.07 |
| Example 267 | 4408 | 620 | 830 | 210 | 1 | 0.017 | 820 | 200 | 0.81 | 0.07 |
| Example 268 | 4410 | 620 | 820 | 200 | 1 | 0.018 | 820 | 200 | 0.80 | 0.07 |
| Example 269 | 4412 | 620 | 810 | 190 | 1 | 0.018 | 810 | 190 | 0.80 | 0.07 |
| Example 270 | 4413 | 620 | 800 | 180 | 1 | 0.018 | 800 | 180 | 0.80 | 0.07 |
| Example 271 | 4414 | 620 | 820 | 200 | 1 | 0.018 | 820 | 200 | 0.80 | 0.07 |
| Example 272 | 4415 | 620 | 790 | 170 | 1 | 0.019 | 790 | 170 | 0.79 | 0.07 |
| Example 273 | 4503 | 620 | 830 | 210 | 1 | 0.016 | 825 | 205 | 0.79 | 0.06 |
| Example 274 | 4504 | 620 | 800 | 180 | 1 | 0.019 | 800 | 180 | 0.79 | 0.08 |
| Example 275 | 4506 | 620 | 790 | 170 | 1 | 0.019 | 790 | 170 | 0.79 | 0.08 |
| Example 276 | 4508 | 620 | 780 | 160 | 1 | 0.019 | 780 | 160 | 0.79 | 0.08 |
| Example 277 | 4510 | 620 | 800 | 180 | 1 | 0.019 | 800 | 180 | 0.79 | 0.08 |
| Example 278 | 4511 | 620 | 770 | 150 | 1 | 0.02 | 770 | 150 | 0.78 | 0.08 |
| Example 279 | 4512 | 620 | 810 | 190 | 1 | 0.017 | 805 | 185 | 0.78 | 0.07 |

TABLE 62

| | | Solvent | Ink | | | | Printed Material | | | |
|---|---|---|---|---|---|---|---|---|---|---|
| | Compound Used | Absorption Maximum B (nm) | Absorption Maximum A (nm) | Difference between A and B | Optical Density | Optical Density Ratio | Absorption Maximum A (nm) | Difference between A and B | Optical Density | Optical Density Ratio |
| Example 280 | 4513 | 620 | 780 | 160 | 1 | 0.02 | 780 | 160 | 0.78 | 0.09 |
| Example 281 | 4797 | 620 | 790 | 170 | 1 | 0.015 | 785 | 165 | 0.77 | 0.06 |
| Example 282 | 4798 | 620 | 790 | 170 | 1 | 0.018 | 780 | 160 | 0.77 | 0.07 |
| Example 283 | 4800 | 620 | 790 | 170 | 1 | 0.015 | 775 | 155 | 0.77 | 0.07 |
| Example 284 | 4802 | 620 | 780 | 160 | 1 | 0.016 | 775 | 155 | 0.76 | 0.07 |
| Example 285 | 4804 | 620 | 770 | 150 | 1 | 0.016 | 765 | 145 | 0.76 | 0.07 |
| Example 286 | 4805 | 620 | 760 | 140 | 1 | 0.016 | 755 | 135 | 0.76 | 0.07 |
| Example 287 | 4806 | 620 | 780 | 160 | 1 | 0.016 | 775 | 155 | 0.76 | 0.07 |
| Example 288 | 4807 | 620 | 750 | 130 | 1 | 0.017 | 745 | 125 | 0.75 | 0.07 |
| Example 289 | 4895 | 620 | 840 | 220 | 1 | 0.015 | 845 | 225 | 0.80 | 0.05 |
| Example 290 | 4896 | 620 | 840 | 220 | 1 | 0.018 | 840 | 220 | 0.80 | 0.06 |
| Example 291 | 4898 | 620 | 840 | 220 | 1 | 0.015 | 835 | 215 | 0.80 | 0.06 |
| Example 292 | 4900 | 620 | 830 | 210 | 1 | 0.016 | 835 | 215 | 0.79 | 0.06 |
| Example 293 | 4902 | 620 | 820 | 200 | 1 | 0.016 | 825 | 205 | 0.79 | 0.06 |
| Example 294 | 4903 | 620 | 810 | 190 | 1 | 0.016 | 815 | 195 | 0.79 | 0.06 |
| Example 295 | 4904 | 620 | 830 | 210 | 1 | 0.016 | 835 | 215 | 0.79 | 0.06 |
| Example 296 | 4905 | 620 | 800 | 180 | 1 | 0.017 | 805 | 185 | 0.78 | 0.06 |
| Example 297 | 5042 | 620 | 850 | 230 | 1 | 0.015 | 845 | 225 | 0.80 | 0.05 |
| Example 298 | 5043 | 620 | 850 | 230 | 1 | 0.018 | 840 | 220 | 0.80 | 0.06 |
| Example 299 | 5045 | 620 | 850 | 230 | 1 | 0.015 | 835 | 215 | 0.80 | 0.06 |
| Example 300 | 5047 | 620 | 840 | 220 | 1 | 0.016 | 835 | 215 | 0.79 | 0.06 |
| Example 301 | 5049 | 620 | 830 | 210 | 1 | 0.016 | 825 | 205 | 0.79 | 0.06 |
| Example 302 | 5050 | 620 | 820 | 200 | 1 | 0.016 | 815 | 195 | 0.79 | 0.06 |
| Example 303 | 5051 | 620 | 840 | 220 | 1 | 0.016 | 835 | 215 | 0.79 | 0.06 |
| Example 304 | 5052 | 620 | 810 | 190 | 1 | 0.017 | 805 | 185 | 0.78 | 0.06 |
| Example 305 | 5091 | 620 | 830 | 210 | 1 | 0.017 | 830 | 210 | 0.81 | 0.06 |
| Example 306 | 5092 | 620 | 830 | 210 | 1 | 0.020 | 825 | 205 | 0.81 | 0.07 |
| Example 307 | 5094 | 620 | 830 | 210 | 1 | 0.017 | 820 | 200 | 0.81 | 0.07 |
| Example 308 | 5096 | 620 | 820 | 200 | 1 | 0.018 | 820 | 200 | 0.80 | 0.07 |
| Example 309 | 5098 | 620 | 810 | 190 | 1 | 0.018 | 810 | 190 | 0.80 | 0.07 |
| Example 310 | 5099 | 620 | 800 | 180 | 1 | 0.018 | 800 | 180 | 0.80 | 0.07 |
| Example 311 | 5100 | 620 | 820 | 200 | 1 | 0.018 | 820 | 200 | 0.80 | 0.07 |
| Example 312 | 5101 | 620 | 790 | 170 | 1 | 0.019 | 790 | 170 | 0.79 | 0.07 |
| Example 313 | 5189 | 620 | 830 | 210 | 1 | 0.016 | 825 | 205 | 0.79 | 0.06 |
| Example 314 | 5190 | 620 | 800 | 180 | 1 | 0.019 | 800 | 180 | 0.79 | 0.08 |
| Example 315 | 5192 | 620 | 790 | 170 | 1 | 0.019 | 790 | 170 | 0.79 | 0.08 |
| Example 316 | 5194 | 620 | 780 | 160 | 1 | 0.019 | 780 | 160 | 0.79 | 0.08 |
| Example 317 | 5196 | 620 | 800 | 180 | 1 | 0.019 | 800 | 180 | 0.79 | 0.08 |

TABLE 63

| | | Solvent | Ink | | | | Printed Material | | | |
|---|---|---|---|---|---|---|---|---|---|---|
| | Compound Used | Absorption Maximum B (nm) | Absorption Maximum A (nm) | Difference between A and B | Optical Density | Optical Density Ratio | Absorption Maximum A (nm) | Difference between A and B | Optical Density | Optical Density Ratio |
| Example 318 | 5197 | 620 | 770 | 150 | 1 | 0.02 | 770 | 150 | 0.78 | 0.08 |
| Example 319 | 5198 | 620 | 810 | 190 | 1 | 0.017 | 805 | 185 | 0.78 | 0.07 |
| Example 320 | 5199 | 620 | 780 | 160 | 1 | 0.02 | 780 | 160 | 0.78 | 0.09 |
| Example 321 | 5483 | 620 | 790 | 170 | 1 | 0.015 | 785 | 165 | 0.77 | 0.06 |
| Example 322 | 5484 | 620 | 790 | 170 | 1 | 0.018 | 780 | 160 | 0.77 | 0.07 |
| Example 323 | 5486 | 620 | 790 | 170 | 1 | 0.015 | 775 | 155 | 0.77 | 0.07 |
| Example 324 | 5488 | 620 | 780 | 160 | 1 | 0.016 | 775 | 155 | 0.76 | 0.07 |
| Example 325 | 5490 | 620 | 770 | 150 | 1 | 0.016 | 765 | 145 | 0.76 | 0.07 |
| Example 326 | 5491 | 620 | 760 | 140 | 1 | 0.016 | 755 | 135 | 0.76 | 0.07 |
| Example 327 | 5492 | 620 | 780 | 160 | 1 | 0.016 | 775 | 155 | 0.76 | 0.07 |
| Example 328 | 5493 | 620 | 750 | 130 | 1 | 0.017 | 745 | 125 | 0.75 | 0.07 |
| Example 329 | 5581 | 620 | 840 | 220 | 1 | 0.015 | 845 | 225 | 0.80 | 0.05 |
| Example 330 | 5582 | 620 | 840 | 220 | 1 | 0.018 | 840 | 220 | 0.80 | 0.06 |
| Example 331 | 5584 | 620 | 840 | 220 | 1 | 0.015 | 835 | 215 | 0.80 | 0.06 |
| Example 332 | 5586 | 620 | 830 | 210 | 1 | 0.016 | 835 | 215 | 0.79 | 0.06 |
| Example 333 | 5588 | 620 | 820 | 200 | 1 | 0.016 | 825 | 205 | 0.79 | 0.06 |
| Example 334 | 5589 | 620 | 810 | 190 | 1 | 0.016 | 815 | 195 | 0.79 | 0.06 |
| Example 335 | 5590 | 620 | 830 | 210 | 1 | 0.016 | 835 | 215 | 0.79 | 0.06 |
| Example 336 | 5591 | 620 | 800 | 180 | 1 | 0.017 | 805 | 185 | 0.78 | 0.06 |

TABLE 64

| | Invisibility | Light Fastness | Moist Heat Resistance | Readability | Dispersion Easiness | Storage Stability |
|---|---|---|---|---|---|---|
| Example 13 | A | A | B | A | A | A |
| Example 14 | A | A | A | A | A | A |
| Example 15 | A | A | A | A | A | A |
| Example 16 | A | A | A | A | A | A |
| Example 17 | A | A | A | A | A | A |
| Example 18 | A | A | A | A | A | A |
| Example 19 | A | A | A | A | A | A |
| Example 20 | A | B | A | A | A | A |
| Example 21 | A | B | A | A | A | A |
| Example 22 | A | B | C | A | A | A |
| Example 23 | A | B | C | A | A | A |
| Example 24 | A | B | C | A | A | A |
| Example 25 | A | B | C | A | A | A |
| Example 26 | A | B | C | A | A | A |
| Example 27 | A | B | C | A | A | A |
| Example 28 | A | A | B | A | A | A |
| Example 29 | A | A | A | A | A | A |
| Example 30 | A | A | A | A | A | A |
| Example 32 | A | A | A | A | A | A |
| Example 33 | A | A | A | A | A | A |
| Example 34 | A | A | A | A | A | A |
| Example 35 | A | A | A | A | A | A |
| Example 36 | A | B | A | A | A | A |
| Example 37 | A | B | A | A | A | A |
| Example 38 | A | B | C | A | A | A |
| Example 39 | A | B | C | A | A | A |
| Example 40 | A | B | C | A | A | A |
| Example 41 | A | B | C | A | A | A |
| Example 42 | A | B | C | A | A | A |
| Example 43 | A | B | C | A | A | A |
| Example 44 | A | A | A | A | A | A |
| Example 45 | A | A | A | A | A | A |
| Example 46 | A | A | A | A | A | A |
| Example 47 | A | A | A | A | A | A |
| Example 48 | A | A | A | A | A | A |
| Example 49 | A | A | A | A | A | A |
| Example 50 | A | A | A | A | B | A |
| Example 51 | A | B | A | A | B | A |

TABLE 65

| | Invisibility | Light Fastness | Moist Heat Resistance | Readability | Dispersion Easiness | Storage Stability |
|---|---|---|---|---|---|---|
| Example 52 | A | B | A | A | A | A |
| Example 53 | A | B | C | A | B | A |
| Example 54 | A | B | C | A | B | A |
| Example 55 | A | B | C | A | B | A |
| Example 56 | A | B | C | A | B | A |
| Example 57 | A | B | C | A | B | A |
| Example 58 | A | B | C | A | B | A |
| Example 59 | A | A | A | A | A | A |
| Example 60 | A | A | B | A | A | A |
| Example 61 | A | A | A | A | A | A |
| Example 62 | A | A | A | A | A | A |
| Example 63 | A | A | A | A | A | A |
| Example 64 | A | A | A | A | A | A |
| Example 65 | A | A | A | A | A | A |
| Example 66 | A | A | A | A | A | A |
| Example 67 | A | B | A | A | A | A |
| Example 68 | A | B | A | A | A | A |
| Example 69 | A | B | C | A | A | A |
| Example 70 | A | B | C | A | A | A |
| Example 71 | A | B | C | A | A | A |
| Example 72 | A | B | C | A | A | A |
| Example 73 | A | B | C | A | A | A |
| Example 74 | A | B | C | A | A | A |
| Example 75 | A | A | A | A | A | A |
| Example 76 | A | A | B | A | A | A |
| Example 77 | A | A | A | A | A | A |
| Example 78 | A | A | A | A | A | A |
| Example 79 | A | A | A | A | A | A |
| Example 80 | A | A | A | A | A | A |

TABLE 65-continued

|  | Invisibility | Light Fastness | Moist Heat Resistance | Readability | Dispersion Easiness | Storage Stability |
|---|---|---|---|---|---|---|
| Example 81 | A | A | A | A | A | A |
| Example 82 | A | A | A | A | B | A |
| Example 83 | A | B | A | A | B | A |
| Example 84 | A | B | A | A | A | A |
| Example 85 | A | B | C | A | B | A |
| Example 86 | A | B | C | A | B | A |
| Example 87 | A | B | C | A | B | A |
| Example 88 | A | B | C | A | B | A |
| Example 89 | A | B | C | A | B | A |

TABLE 66

|  | Invisibility | Light Fastness | Moist Heat Resistance | Readability | Dispersion Easiness | Storage Stability |
|---|---|---|---|---|---|---|
| Example 90 | A | B | C | A | B | A |
| Example 91 | A | A | A | A | A | A |
| Example 92 | A | A | B | A | A | A |
| Example 93 | A | A | A | A | A | A |
| Example 94 | A | A | A | A | A | A |
| Example 95 | A | A | A | A | A | A |
| Example 96 | A | A | A | A | A | A |
| Example 97 | A | A | A | A | A | A |
| Example 98 | A | A | A | A | A | A |
| Example 99 | A | B | A | A | A | A |
| Example 100 | A | B | A | A | A | A |
| Example 101 | A | B | C | A | A | A |
| Example 102 | A | B | C | A | A | A |
| Example 103 | A | B | C | A | A | A |
| Example 104 | A | B | C | A | A | A |
| Example 105 | A | B | C | A | A | A |
| Example 106 | A | B | C | A | A | A |
| Example 107 | A | A | A | A | A | A |
| Example 108 | A | A | A | A | A | A |
| Example 109 | A | A | A | A | A | A |
| Example 110 | A | A | A | A | A | A |
| Example 111 | A | A | A | A | A | A |
| Example 112 | A | A | A | A | A | A |
| Example 113 | A | A | A | A | A | A |
| Example 114 | A | A | A | A | A | A |
| Example 115 | A | A | A | A | A | A |
| Example 116 | A | A | A | A | A | A |
| Example 117 | A | A | A | A | A | A |
| Example 118 | A | A | A | A | A | A |
| Example 119 | A | A | A | A | A | A |
| Example 120 | A | A | A | A | A | A |
| Example 121 | A | A | A | A | A | A |
| Example 122 | A | A | A | A | A | A |
| Example 123 | A | A | A | A | A | A |
| Example 124 | A | A | A | A | A | A |
| Example 125 | A | A | A | A | A | A |
| Example 126 | A | A | A | A | A | A |
| Example 127 | A | A | A | A | A | A |

TABLE 67

|  | Invisibility | Light Fastness | Moist Heat Resistance | Readability | Dispersion Easiness | Storage Stability |
|---|---|---|---|---|---|---|
| Example 128 | A | A | A | A | A | A |
| Example 129 | A | A | A | A | A | A |
| Example 130 | A | A | A | A | A | A |
| Example 131 | A | A | A | A | A | A |
| Example 132 | A | A | A | A | A | A |
| Example 133 | A | A | A | A | A | A |
| Example 134 | A | A | A | A | A | A |
| Example 135 | A | A | A | A | A | A |
| Example 136 | A | A | A | A | A | A |

TABLE 67-continued

|  | Invisibility | Light Fastness | Moist Heat Resistance | Readability | Dispersion Easiness | Storage Stability |
|---|---|---|---|---|---|---|
| Example 137 | A | A | A | A | A | A |
| Example 138 | A | A | A | A | A | A |
| Example 139 | A | A | A | A | A | A |
| Example 140 | A | A | A | A | A | A |
| Example 141 | A | A | A | A | A | A |
| Example 142 | A | A | A | A | A | A |
| Example 143 | A | A | A | A | A | A |
| Example 144 | A | A | A | A | A | A |
| Example 145 | A | A | A | A | A | A |
| Example 146 | A | A | A | A | A | A |
| Example 147 | A | A | A | A | A | A |
| Example 148 | A | A | A | A | A | A |
| Example 149 | A | A | A | A | A | A |
| Example 150 | A | A | A | A | A | A |
| Example 151 | A | A | A | A | A | A |
| Example 152 | A | A | A | A | A | A |
| Example 153 | A | A | A | A | A | A |
| Example 154 | A | A | A | A | A | A |
| Example 155 | A | A | A | A | A | A |
| Example 156 | A | A | A | A | A | A |
| Example 157 | A | A | A | A | A | A |
| Example 158 | A | A | A | A | A | A |
| Example 159 | A | A | A | A | A | A |
| Example 160 | A | A | A | A | A | A |
| Example 161 | A | A | A | A | A | A |
| Example 162 | A | A | A | A | A | A |
| Example 163 | A | A | A | A | A | A |
| Example 164 | A | A | A | A | A | A |
| Example 165 | A | A | A | A | A | A |

TABLE 68

|  | Invisibility | Light Fastness | Moist Heat Resistance | Readability | Dispersion Easiness | Storage Stability |
|---|---|---|---|---|---|---|
| Example 166 | A | A | A | A | A | A |
| Example 167 | A | A | A | A | A | A |
| Example 168 | A | A | A | A | A | A |
| Example 169 | A | A | A | A | A | A |
| Example 170 | A | A | A | A | A | A |
| Example 171 | A | A | A | A | A | A |
| Example 172 | A | A | A | A | A | A |
| Example 173 | A | A | A | A | A | A |
| Example 174 | A | A | A | A | A | A |
| Example 175 | A | A | A | A | A | A |
| Example 176 | A | A | A | A | A | A |
| Example 177 | A | A | A | A | A | B |
| Example 178 | A | A | B | A | A | B |
| Example 179 | A | A | A | A | A | B |
| Example 180 | A | A | A | A | A | B |
| Example 181 | A | A | A | A | A | B |
| Example 182 | A | A | A | A | A | B |
| Example 183 | A | A | A | A | A | B |
| Example 184 | A | A | A | A | A | B |
| Example 185 | A | A | A | A | A | B |
| Example 186 | A | A | B | A | A | B |
| Example 187 | A | A | A | A | A | B |
| Example 188 | A | A | A | A | A | B |
| Example 189 | A | A | A | A | A | B |
| Example 190 | A | A | A | A | A | B |
| Example 191 | A | A | A | A | A | B |
| Example 192 | A | A | A | A | A | B |
| Example 193 | A | A | A | A | A | B |
| Example 194 | A | A | B | A | B | B |
| Example 195 | A | A | A | A | A | B |
| Example 196 | A | A | A | A | A | B |
| Example 197 | A | A | A | A | A | B |
| Example 198 | A | A | A | A | A | B |
| Example 199 | A | A | A | A | A | B |
| Example 200 | A | A | A | A | A | B |
| Example 201 | A | A | A | A | A | B |
| Example 202 | A | A | B | A | A | B |
| Example 203 | A | A | A | A | A | B |

TABLE 69

| | Invisibility | Light Fastness | Moist Heat Resistance | Readability | Dispersion Easiness | Storage Stability |
|---|---|---|---|---|---|---|
| Example 204 | A | A | A | A | A | B |
| Example 205 | A | A | A | A | A | B |
| Example 206 | A | A | A | A | A | B |
| Example 207 | A | A | A | A | A | B |
| Example 208 | A | A | A | A | B | B |
| Example 209 | A | A | A | A | A | B |
| Example 210 | A | A | B | A | A | B |
| Example 211 | A | A | A | A | A | B |
| Example 212 | A | A | A | A | A | B |
| Example 213 | A | A | A | A | A | B |
| Example 214 | A | A | A | A | A | B |
| Example 215 | A | A | A | A | A | B |
| Example 216 | A | A | A | A | A | B |
| Example 217 | A | A | A | A | A | A |
| Example 218 | A | A | B | A | A | A |
| Example 219 | A | A | A | A | A | A |
| Example 220 | A | A | A | A | A | A |
| Example 221 | A | A | A | A | A | A |
| Example 222 | A | A | A | A | A | A |
| Example 223 | A | A | A | A | A | A |
| Example 224 | A | A | A | A | A | A |
| Example 225 | A | A | A | A | A | A |
| Example 226 | A | A | B | A | A | A |
| Example 227 | A | A | A | A | A | A |
| Example 228 | A | A | A | A | A | A |
| Example 229 | A | A | A | A | A | A |
| Example 230 | A | A | A | A | A | A |
| Example 231 | A | A | A | A | A | A |
| Example 232 | A | A | A | A | A | A |
| Example 233 | A | A | A | A | A | A |
| Example 234 | A | A | B | A | A | A |
| Example 235 | A | A | A | A | A | A |
| Example 236 | A | A | A | A | A | A |
| Example 237 | A | A | A | A | A | A |
| Example 238 | A | A | A | A | A | A |
| Example 239 | A | A | A | A | A | A |
| Example 240 | A | A | A | A | A | A |
| Example 241 | A | A | A | A | A | A |

TABLE 70

| | Invisibility | Light Fastness | Moist Heat Resistance | Readability | Dispersion Easiness | Storage Stability |
|---|---|---|---|---|---|---|
| Example 242 | A | A | B | A | A | A |
| Example 243 | A | A | A | A | A | A |
| Example 244 | A | A | A | A | A | A |
| Example 245 | A | A | A | A | A | A |
| Example 246 | A | A | A | A | A | A |
| Example 247 | A | A | A | A | A | A |
| Example 248 | A | A | A | A | B | A |
| Example 249 | A | A | A | A | A | A |
| Example 250 | A | A | B | A | A | A |
| Example 251 | A | A | A | A | A | A |
| Example 252 | A | A | A | A | A | A |
| Example 253 | A | A | A | A | A | A |
| Example 254 | A | A | A | A | A | A |
| Example 255 | A | A | A | A | A | A |
| Example 256 | A | A | A | A | A | A |
| Example 257 | A | A | A | A | A | A |
| Example 258 | A | A | B | A | A | A |
| Example 259 | A | A | A | A | A | A |
| Example 260 | A | A | A | A | A | A |
| Example 261 | A | A | A | A | A | A |
| Example 262 | A | A | A | A | A | A |
| Example 263 | A | A | A | A | A | A |
| Example 264 | A | A | A | A | A | A |
| Example 265 | A | A | A | A | A | A |
| Example 266 | A | A | B | A | A | A |
| Example 267 | A | A | A | A | A | A |
| Example 268 | A | A | A | A | A | A |
| Example 269 | A | A | A | A | A | A |
| Example 270 | A | A | A | A | A | A |

TABLE 70-continued

|  | Invisibility | Light Fastness | Moist Heat Resistance | Readability | Dispersion Easiness | Storage Stability |
|---|---|---|---|---|---|---|
| Example 271 | A | A | A | A | A | A |
| Example 272 | A | A | A | A | A | A |
| Example 273 | A | A | A | A | A | A |
| Example 274 | A | A | B | A | A | A |
| Example 275 | A | A | A | A | A | A |
| Example 276 | A | A | A | A | A | A |
| Example 277 | A | A | A | A | A | A |
| Example 278 | A | A | A | A | A | A |
| Example 279 | A | A | A | A | A | A |

TABLE 71

|  | Invisibility | Light Fastness | Moist Heat Resistance | Readability | Dispersion Easiness | Storage Stability |
|---|---|---|---|---|---|---|
| Example 280 | A | A | A | A | A | A |
| Example 281 | A | A | A | A | A | A |
| Example 282 | A | A | B | A | A | A |
| Example 283 | A | A | A | A | A | A |
| Example 284 | A | A | A | A | A | A |
| Example 285 | A | A | A | A | A | A |
| Example 286 | A | A | A | A | A | A |
| Example 287 | A | A | A | A | A | A |
| Example 288 | A | A | A | A | B | A |
| Example 289 | A | A | A | A | A | A |
| Example 290 | A | A | B | A | A | A |
| Example 291 | A | A | A | A | A | A |
| Example 292 | A | A | A | A | A | A |
| Example 293 | A | A | A | A | A | A |
| Example 294 | A | A | A | A | A | A |
| Example 295 | A | A | A | A | A | A |
| Example 296 | A | A | A | A | A | A |
| Example 297 | A | A | A | A | A | A |
| Example 298 | A | A | B | A | A | A |
| Example 299 | A | A | A | A | A | A |
| Example 300 | A | A | A | A | A | A |
| Example 301 | A | A | A | A | A | A |
| Example 302 | A | A | A | A | A | A |
| Example 303 | A | A | A | A | A | A |
| Example 304 | A | A | A | A | A | A |
| Example 305 | A | A | A | A | A | A |
| Example 306 | A | A | B | A | A | A |
| Example 307 | A | A | A | A | A | A |
| Example 308 | A | A | A | A | A | A |
| Example 309 | A | A | A | A | A | A |
| Example 310 | A | A | A | A | A | A |
| Example 311 | A | A | A | A | A | A |
| Example 312 | A | A | A | A | A | A |
| Example 313 | A | A | A | A | A | A |
| Example 314 | A | A | B | A | A | A |
| Example 315 | A | A | A | A | A | A |
| Example 316 | A | A | A | A | A | A |
| Example 317 | A | A | A | A | A | A |

TABLE 72

|  | Invisibility | Light Fastness | Moist Heat Resistance | Readability | Dispersion Easiness | Storage Stability |
|---|---|---|---|---|---|---|
| Example 318 | A | A | A | A | A | A |
| Example 319 | A | A | A | A | A | A |
| Example 320 | A | A | A | A | A | A |
| Example 321 | A | A | A | A | A | A |
| Example 322 | A | A | B | A | A | A |
| Example 323 | A | A | A | A | A | A |
| Example 324 | A | A | A | A | A | A |
| Example 325 | A | A | A | A | A | A |
| Example 326 | A | A | A | A | A | A |

TABLE 72-continued

|  | Invisibility | Light Fastness | Moist Heat Resistance | Readability | Dispersion Easiness | Storage Stability |
|---|---|---|---|---|---|---|
| Example 327 | A | A | A | A | A | A |
| Example 328 | A | A | A | A | B | A |
| Example 329 | A | A | A | A | A | A |
| Example 330 | A | A | B | A | A | A |
| Example 331 | A | A | A | A | A | A |
| Example 332 | A | A | A | A | A | A |
| Example 333 | A | A | A | A | A | A |
| Example 334 | A | A | A | A | A | A |
| Example 335 | A | A | A | A | A | A |
| Example 336 | A | A | A | A | A | A |

EXPLANATION OF REFERENCES

11: first lattice
12: second lattice
14: dot pattern

What is claimed is:

1. An ink jet recording ink comprising:
a colorant represented by the following Formula 1,
wherein an absorption maximum of a dry material of the ink jet recording ink is 700 nm to 1000 nm,

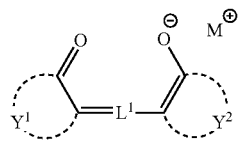

Formula 1 in Formula 1, $Y^1$ and $Y^2$ each independently represent a non-metal atomic group which forms an aliphatic ring or a heterocycle, $M^+$ represents a proton or a monovalent alkali metal cation or organic cation, $L^1$ represents a methine chain including 5 or 7 methine groups, and a methine group at a center of the methine chain has a substituent represented by the following Formula A, and

 Formula A in Formula A, $S^A$ represents a single bond, an alkylene group, an alkenylene group, an alkynylene group, —O—, —S—, —NR$^{L1}$—, —C(═O)—, —C(═O)O—, —C(═O)NR$^{L1}$—, —S(═O)$_2$—, —OR$^{L2}$—, or a group including a combination thereof, $R^{L1}$ represents a hydrogen atom, a halogen atom, an alkyl group, an aryl group, or a monovalent heterocyclic group, $R^{L2}$ represents an alkylene group, an arylene group, or a divalent heterocyclic group, $T^A$ represents a halogen atom, an alkyl group, a cycloalkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group, in a case where $S^A$ represents a single bond or an alkylene group and $T^A$ represents an alkyl group, the total number of carbon atoms included in $S^A$ and $T^A$ is 3 or more, and * represents a binding site to the methine group at the center of the methine chain.

2. The ink jet recording ink according to claim 1, wherein the colorant represented by Formula 1 is a colorant represented by the following Formula 2,

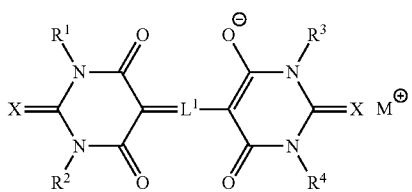

Formula 2 in Formula 2, $M^+$ represents a proton or a monovalent alkali metal cation or organic cation, $L^1$ represents a methine chain including 5 or 7 methine groups, and a methine group at a center of the methine chain has a substituent represented by the following Formula A,

 Formula A, in Formula A, $S^A$ represents a single bond, an alkylene group, an alkenylene group, an alkynylene group, —O—, —S—, —NR$^{L1}$—, —C(═O)—, —C(═O)O—, —C(═O)NR$^{L1}$—, —S(═O)$_2$—, —OR$^{L2}$—, or a group including a combination thereof, $R^{L1}$ represents a hydrogen atom, a halogen atom, an alkyl group, an aryl group, or a monovalent heterocyclic group, $R^{L2}$ represents an alkylene group, an arylene group, or a divalent heterocyclic group, $T^A$ represents a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group, in a case where $S^A$ represents a single bond or an alkylene group and $T^A$ represents an alkyl group, the total number of carbon atoms included in $S^A$ and $T^A$ is 3 or more, and * represents a binding site to the methine group at the center of the methine chain, $R^1$, $R^2$, $R^3$, and $R^4$ each independently represent a hydrogen atom, an alkyl group, an aryl group, or a monovalent heterocyclic group, and X's each independently represent an O atom, a S atom, or a Se atom.

3. The ink jet recording ink according to claim 2, wherein in Formula 2, at least one selected from the group consisting of $R^1$, $R^2$, $R^3$, and $R^4$ represents a hydrogen atom.

4. The ink jet recording ink according to claim 2, wherein the colorant represented by Formula 2 is a colorant represented by the following Formula 3,

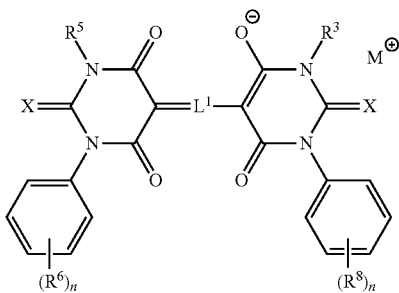

Formula 3 in Formula 3, M⁺ represents a proton or a monovalent alkali metal cation or organic cation, $L^1$ represents a methine chain including 5 or 7 methine groups, and a methine group at a center of the methine chain has a substituent represented by the following Formula A, $$*—S^A-T^A \quad \text{Formula A,}$$

in Formula A, $S^A$ represents a single bond, an alkylene group, an alkenylene group, an alkynylene group, —O—, —S—, —NR$^{L1}$—, —C(=O)—, —C(=O)O—, —C(=O)NR$^{L1}$—, —S(=O)$_2$—, —OR$^{L2}$—, or a group including a combination thereof, $R^{L1}$ represents a hydrogen atom, a halogen atom, an alkyl group, an aryl group, or a monovalent heterocyclic group, $R^{L2}$ represents an alkylene group, an arylene group, or a divalent heterocyclic group, $T^A$ represents a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group, in a case where $S^A$ represents a single bond or an alkylene group and $T^A$ represents an alkyl group, the total number of carbon atoms included in $S^A$ and $T^A$ is 3 or more, and * represents a binding site to the methine group at the center of the methine chain, $R^5$ and $R^7$ each independently represent a hydrogen atom, an alkyl group, an aryl group, or a monovalent heterocyclic group, $R^6$ and $R^8$ each independently represent an alkyl group, a halogen atom, an alkenyl group, an aryl group, a monovalent heterocyclic group, a nitro group, a cyano group, —OR$^{L3}$, —C(=O)R$^{L3}$, —C(=O)OR$^{L3}$, —OC(=O)R$^{L3}$, —N(R$^{L3}$)$_2$, —NHC(=O)R$^{L3}$, —C(=O)N(R$^{L3}$)$_2$, —NHC(=O)OR$^{L3}$, —OC(=O)N(R$^{L3}$)$_2$, —NHC(=O)N(R$^{L3}$)$_2$, —SR$^{L3}$, —S(=O)$_2$R$^{L3}$, —S(=O)$_2$OR$^{L3}$, —NHS(=O)$_2$R$^{L3}$, or —S(=O)$_2$N(R$^{L3}$)$_2$, $R^{L3}$'s each independently represent a hydrogen atom, an alkyl group, an alkenyl group, an aryl group, or a monovalent heterocyclic group, n's each independently represent an integer of 1 to 5, and X's each independently represent an O atom, a S atom, or a Se atom.

5. The ink jet recording ink according to claim 4, wherein in Formula 3, at least one selected from the group consisting of $R^5$, $R^6$, $R^7$, and $R^8$ has a hydrogen-bonding group.

6. The ink jet recording ink according to claim 1, wherein in Formulae 1 to 3, M⁺ represents a monovalent alkali metal cation.

7. The ink jet recording ink according to claim 1, wherein in the dry material, at least a part of the colorant represented by any one of Formulae 1 to 3 is a J-aggregate.

8. The ink jet recording ink according to claim 1, wherein an optical density of the dry material at 450 nm is ⅐ or lower of an optical density of the dry material at an absorption maximum.

9. The ink jet recording ink according to claim 1, comprising:
water and an organic solvent having a boiling point of 100° C. or higher under 101.325 kPa as a solvent.

10. The ink jet recording ink according to claim 1, wherein a content of at least one of a divalent alkali earth metal element or a trivalent group 13 metal element is 10 ppm to 50000 ppm with respect to a total mass of the ink.

11. An ink jet recording method comprising:
a step of forming an infrared absorbing image using the ink jet recording ink according to claim 1.

12. A printed material for infrared reading, comprising:
a substrate; and
an infrared absorbing image formed of a plurality of component patterns that is a dry material of the ink jet recording ink according to claim 1.

13. A printed material for infrared reading, comprising:
a substrate; and
an infrared absorbing image formed of a plurality of component patterns,
wherein the infrared absorbing image includes a colorant represented by the following Formula 1, and
an absorption maximum of the infrared absorbing image is 700 nm to 1000 nm,

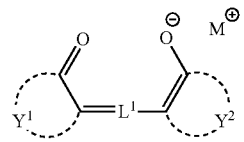

Formula 1 in Formula 1, $Y^1$ and $Y^2$ each independently represent a non-metal atomic group which forms an aliphatic ring or a heterocycle, M⁺ represents a proton or a monovalent alkali metal cation or organic cation, $L^1$ represents a methine chain including 5 or 7 methine groups, and a methine group at a center of the methine chain has a substituent represented by the following Formula A, and $$*—S^A-T^A \quad \text{Formula A,}$$

in Formula A, $S^A$ represents a single bond, an alkylene group, an alkenylene group, an alkynylene group, —O—, —S—, —NR$^{L1}$—, —C(=O)—, —C(=O)O—, —C(=O)NR$^{L1}$—, —S(=O)$_2$—, —OR$^{L2}$—, or a group including a combination thereof, $R^{L1}$ represents a hydrogen atom, a halogen atom, an alkyl group, an aryl group, or a monovalent heterocyclic group, $R^{L2}$ represents an alkylene group, an arylene group, or a divalent heterocyclic group, $T^A$ represents a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group, in a case where $S^A$ represents a single bond or an alkylene group and $T^4$ represents an alkyl group, the total number of carbon atoms included in $S^A$ and $T^4$ is 3 or more, and * represents a binding site to the methine group at the center of the methine chain.

14. An infrared reading method comprising:
a step of reading an infrared absorbing image that is a dry material of the ink jet recording ink according to claim 1.

15. A method of manufacturing the ink jet recording ink according to claim 10, comprising:
a step of dispersing the colorant and at least one of a divalent alkali earth metal salt or a trivalent group 13 metal salt in water to prepare an aqueous dispersion such that a total content of a divalent alkali earth metal element and a trivalent group 13 metal element is 10 ppm to 50000 ppm with respect to the total mass of the ink; and
a step of mixing the aqueous dispersion and other components of the ink with each other.

16. A method of manufacturing the ink jet recording ink according to claim 10, comprising:
a step of dispersing the colorant in water to prepare an aqueous dispersion; and
a step of mixing the aqueous dispersion, at least one of a divalent alkali earth metal salt or a trivalent group 13 metal salt, and other components of the ink with each other such that a total content of a divalent alkali earth metal element and a trivalent group 13 metal element is 10 ppm to 50000 ppm with respect to the total mass of the ink.

* * * * *